US012287602B2

(12) United States Patent
Yang et al.

(10) Patent No.: US 12,287,602 B2
(45) Date of Patent: Apr. 29, 2025

(54) DEVELOPING CARTRIDGE

(71) Applicant: Zhuhai Ninestar Information Technology Co., Ltd, Zhuhai (CN)

(72) Inventors: Hao Yang, Zhuhai (CN); Chen Cheng, Zhuhai (CN); Xin Lv, Zhuhai (CN); Hailong Ma, Zhuhai (CN); Wenjie Zhao, Zhuhai (CN); Leizhi Kuang, Zhuhai (CN); Jiming Zhou, Zhuhai (CN); Xinyu Wu, Zhuhai (CN); Changbiao Wang, Zhuhai (CN); Qingrui Zhu, Zhuhai (CN); Haoli Huang, Zhuhai (CN); Junyu Tao, Zhuhai (CN); Tiansheng Peng, Zhuhai (CN); Yuanyuan Sun, Zhuhai (CN); Caixia Chen, Zhuhai (CN)

(73) Assignee: Zhuhai Ninestar Information Technology Co., Ltd, Zhuhai (CN)

( * ) Notice: Subject to any disclaimer, the term of this patent is extended or adjusted under 35 U.S.C. 154(b) by 0 days.

(21) Appl. No.: 18/793,699

(22) Filed: Aug. 2, 2024

(65) Prior Publication Data

US 2024/0393740 A1 Nov. 28, 2024

Related U.S. Application Data

(63) Continuation of application No. PCT/CN2024/078936, filed on Feb. 28, 2024.

(30) Foreign Application Priority Data

Mar. 2, 2023 (CN) ......................... 202320387100.9
Mar. 6, 2023 (CN) ......................... 202320398882.6
(Continued)

(51) Int. Cl.
*G03G 15/00* (2006.01)
*G03G 15/08* (2006.01)
(Continued)

(52) U.S. Cl.
CPC ..... *G03G 21/1846* (2013.01); *G03G 15/0806* (2013.01); *G03G 15/0889* (2013.01);
(Continued)

(58) Field of Classification Search
CPC ........... G03G 15/0806; G03G 15/0889; G03G 21/1633; G03G 21/1814; G03G 21/1846;
(Continued)

(56) References Cited

U.S. PATENT DOCUMENTS 11,402,796 B2 † 8/2022 Wang
2017/0219995 A1 * 8/2017 Sato .................. G03G 21/1817
2022/0283537 A1 * 9/2022 Fukamachi ........ G03G 21/1885

FOREIGN PATENT DOCUMENTS

CN 208156416 U 11/2018
CN 201910033493.1 † 5/2019
(Continued)

OTHER PUBLICATIONS

The World Intellectual Property Organization (WIPO) International Search Report for PCT/CN2024/078936 Jun. 12, 2024 8 Pages (including translation).

*Primary Examiner* — Hoang X Ngo
(74) *Attorney, Agent, or Firm* — ANOVA LAW GROUP, PLLC

(57) ABSTRACT

A developing cartridge includes: a cartridge body for accommodating developers; a driving part at a first end in a first direction; a developing roller rotatable about a rotation axis extending along the first direction and positioned at a third end in a second direction; a storage medium for storing information; an electrical contact surface electrically connected to the storage medium and fixed relative to the cartridge body, and a lifting element configured to lift up the cartridge body in the third direction. The electrical contact surface is positioned at the first end in the first direction and
(Continued)

is farther away from the developing roller relative to the driving part. The lifting element is farther away from the developing roller in the second direction away from the driving part.

20 Claims, 55 Drawing Sheets

(30) Foreign Application Priority Data

| | | |
|---|---|---|
| Mar. 28, 2023 | (CN) | 202320652271.X |
| Mar. 31, 2023 | (CN) | 202320681998.0 |
| Apr. 21, 2023 | (CN) | 202320921976.7 |
| May 11, 2023 | (CN) | 202321141021.6 |
| Jun. 19, 2023 | (CN) | 202321576248.3 |
| Jun. 29, 2023 | (CN) | 202321696218.6 |
| Feb. 28, 2024 | (CN) | 202410224960.X |
| Feb. 28, 2024 | (CN) | 202420386065.3 |

(51) Int. Cl.
*G03G 21/16* (2006.01)
*G03G 21/18* (2006.01)

(52) U.S. Cl.
CPC ..... *G03G 21/1633* (2013.01); *G03G 21/1814* (2013.01); *G03G 21/1867* (2013.01); *G03G 21/1878* (2013.01)

(58) Field of Classification Search
CPC ........... G03G 21/1867; G03G 21/1871; G03G 21/1875; G03G 21/1878
See application file for complete search history.

(56) References Cited

FOREIGN PATENT DOCUMENTS

| | | | |
|---|---|---|---|
| CN | 209657088 | U | 11/2019 |
| CN | 201920675322.4 | † | 11/2019 |
| CN | 113721438 | A | 11/2021 |
| CN | 216210492 | U | 4/2022 |
| CN | 218675690 | U | 3/2023 |
| WO | 2022270243 | A1 | 12/2022 |
| WO | 2023020445 | A1 | 2/2023 |

* cited by examiner
† cited by third party

DEVELOPING CARTRIDGE

CROSS-REFERENCE TO RELATED APPLICATION

This application is a continuation of International Patent Application No. PCT/CN2024/078936, filed on Feb. 28, 2024, which claims the priorities of Chinese Patent Application No. 202320387100.9, filed on Mar. 2, 2023, Chinese Patent Application No. 202320398882.6, filed on Mar. 6, 2023, Chinese Patent Application No. 202320652271.X, filed on Mar. 28, 2023, Chinese Patent Application No. 202320681998.0, filed on Mar. 21, 2023, Chinese Patent Application No. 202320921976.7, filed on Apr. 21, 2023, Chinese Patent Application No. 202321141021.6, filed on May 11, 2023, Chinese Patent Application No. 202321576248.3, filed on Jun. 19, 2023, and Chinese Patent Application No. 202321696218.6, filed on Jun. 29, 2023, and this application further claims the priorities of Chinese Patent Application No. 202410224960.X, filed on Feb. 28, 2024, and Chinese Patent Application No. 202420386065.3, filed on Feb. 28, 2024. The contents of all of the above are incorporated herein by reference in their entirety.

TECHNICAL FIELD

The present disclosure generally relates to the field of electronic image forming technology and, more particularly, relates to a developing cartridge, a process cartridge, and an identification element.

BACKGROUND

An image forming device is usually provided with an identification contact for reading information stored in a chip (a storage medium) and thus identifying information of a developing cartridge. To ensure that the identification contact is in stable contact with an electrical contact surface of the chip, the identification contact is usually disposed in a recess in the image forming device, such that the chip is limited by side walls of the recess after entering the recess to ensure that the electrical contact surface of the chip remains stable during the contact with the identification contact to avoid poor contact. However, to adapt to such structure of the image forming device, it is necessary to provide a slide rail on the developing cartridge to enable the chip holder to slide relative to a cartridge body, otherwise the chip cannot enter the recess where the identification contact is positioned and the electrical contact surface of the chip cannot come into electrical contact with the identification contact and the developing cartridge cannot be identified by the image forming device.

SUMMARY

One aspect of the present disclosure provides a developing cartridge. The developing cartridge has a first end and a second end arranged oppositely in a left-right direction, a third end and a fourth end arranged oppositely in a front-rear direction, and a fifth end and a sixth end arranged oppositely in a top-bottom direction. The developing cartridge includes: a cartridge body for accommodating developer; a developing roller rotatable about a rotation axis extending along a first direction and positioned at the third end; a storage medium for storing information; an electrical contact surface fixed relative to the cartridge body; and a lifting element. The left-right direction, the front-rear direction and the top-bottom direction all intersect.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
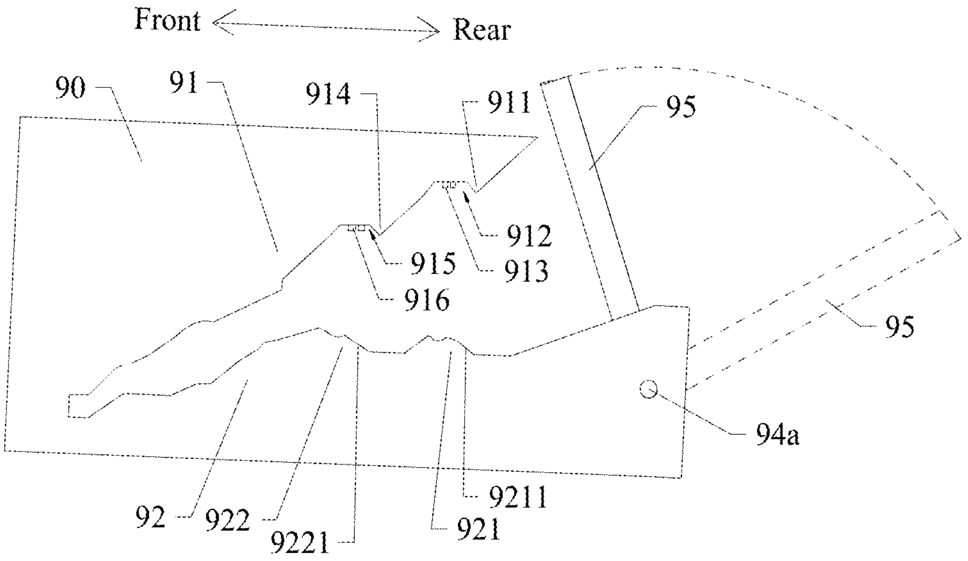
FIG. 1 illustrates a guide rail of an image forming device.

Reference will now be made in detail to exemplary embodiments of the disclosure, which are illustrated in the accompanying drawings. Wherever possible, the same reference numbers will be used throughout the drawings to refer to the same or like units. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

It should be understood that the term "and/or" used in this specification is just for relationship description of related objects, indicating that there can be three kinds of relationships. For example, A and/or B, which can mean that A exists alone, A and B exist at the same time, and B exists alone. In addition, the character "/" in this specification generally indicates that the related objects are in an "or" relationship.

In embodiments of the present disclosure, the terms such as first, second, third, etc. may be used to describe numbers, etc., but these numbers should not be limited to these terms. These terms are only used to distinguish numbers from each other. For example, without departing from the scope of the embodiments of the present disclosure, the first number may also be called a second number, and similarly, the second number may also be called a first number.

Depending on the context, the word "if" as used herein may be interpreted as "when", or "while", or "in response to determining", or "in response to detecting". Similarly, depending on the context, the phrase "if determined" or "if detects (stated condition or event)" may be interpreted as "when determined" or "in response to determining" or "when (stated condition or event) is detected" or "in response to detecting (a stated condition or event)".

Embodiment 1

One embodiment of the present disclosure provides a process cartridge. For the convenience of description, based on the states shown in FIG. 2 and FIG. 3, the process cartridge has a first direction, a second direction and a third direction. This embodiment where the left-right direction may be the first direction, and the front-rear direction may be the second direction, and the up-down direction may be the third direction, is used as an example only for explanation, and does not limit the scope of the present disclosure. The first direction, the second direction and the third direction are not limited.

An image forming device may use an electrophotographic imaging method to form images on recording materials, and include a copy machine, a fax machine, a printer (a laser beam printer, an LED printer, etc.), or a corresponding multi-function printer. The image forming device may be provided with a detachably process cartridge. The image forming device may include an installation cavity (not shown in the figure) for accommodating the process cartridge. The installation cavity may include a first wall 90 and a second wall arranged oppositely in the first direction. For example, in one embodiment shown in FIG. 37, the bottom wall 95*a* of the installation cavity may be positioned between the first wall 90 and the second wall. A door cover 95 may be connected between the first wall 90 and the second wall, and the door cover 95 may be used to close the installation cavity. In one embodiment, the door cover 95 may be rotatably connected to the first wall 90 and the second wall through a rotating shaft 94*a*.

Both the first wall 90 and the second wall may be provided with guide rails, and the guide rails may be used to guide the process cartridge to be installed into the installation cavity. The following description takes the guide rails of the first wall 90 as an example. The guide rails of the second wall may be the same as the guide rail of the first wall 90 or may be different. The guide rails may include an upper guide rail 91 and a lower guide rail 92. The upper guide rail 91 and the lower guide rail 92 may extend along the second direction, and a separation space may be formed between the upper guide rail 91 and the lower guide rail 92. The upper guide rail 91 may include an upper guide part and an identification contact. The upper guide part may be used to guide the installation of a developing cartridge 1 and/or a drum cartridge 5. The identification contact may be positioned in front of the upper guide part in the second direction. The lower end of the identification contact may be positioned above the lower end of the upper guide part, that is, the lower end of the lower guide part may be lower than the lower end of the identification contact. The identification contact may be used to identify the developing cartridge 1 and/or the drum cartridge 5. In one embodiment, the upper guide part may include a first upper guide part 911 and a second upper guide part 914. The second upper guide part 914 may be positioned in front of the first upper guide part 911 in the second direction. The second upper guide part 914 may be used to guide the installation of the developing cartridge 1, and the first upper guide part 911 may be used to guide the installation of the drum cartridge 5. The upper guide rail may be recessed upward to form a recess. The recess may be positioned in front of the upper guide part 911. The identification contact may be disposed in the recess. The recess may be used to limit the identification element of the developing cartridge 1. The recess may include a first recess 912 and a second recess 915. The identification contact may include a first identification contact 913 and a second identification contact 916. The second identification contact 916 may be positioned in front of the first identification contact 913. The second identification contact 916 may be positioned in front of the second upper guide part 914. The second identification contact 916 may be disposed in the second recess 915, and may be used to identify the developing cartridge 1. The first recess 912 may be positioned in front of the first upper guide part 911, and the first identification contact 913 may be disposed in the first recess 912. The first identification contact 913 may be used to identify the drum cartridge 5. The first identification contact 913 may be positioned above the second identification contact 916 in the third direction. The identification contact may also be provided with only the first identification contact 913 or the second identification contact 916.

The lower guide rail 92 may include a lower guide part for guiding the installation of the developing cartridge 1 and/or the drum cartridge 5. In one embodiment, the lower guide part may include a first lower guide part 921 and a second lower guide part 922. The second lower guide part 922 may be positioned in front of the first lower guide part 921. The first lower guide part 921 may include a first lower guide slope 9211, and the front end of the first lower guide slope 9211 may be positioned above the rear end of the first lower guide slope 9211. The second lower guide part 922 may include a second lower guide slope 9221, and the front end of the second lower guide slope 9221 may be positioned above the rear end of the second lower guide slope 9221. The first lower guide part 921 may be positioned behind the second upper guide part 914. The lower guide part may also include only the first lower guide part 921 or the second lower guide part 922 in some other embodiments.

Figure 3:
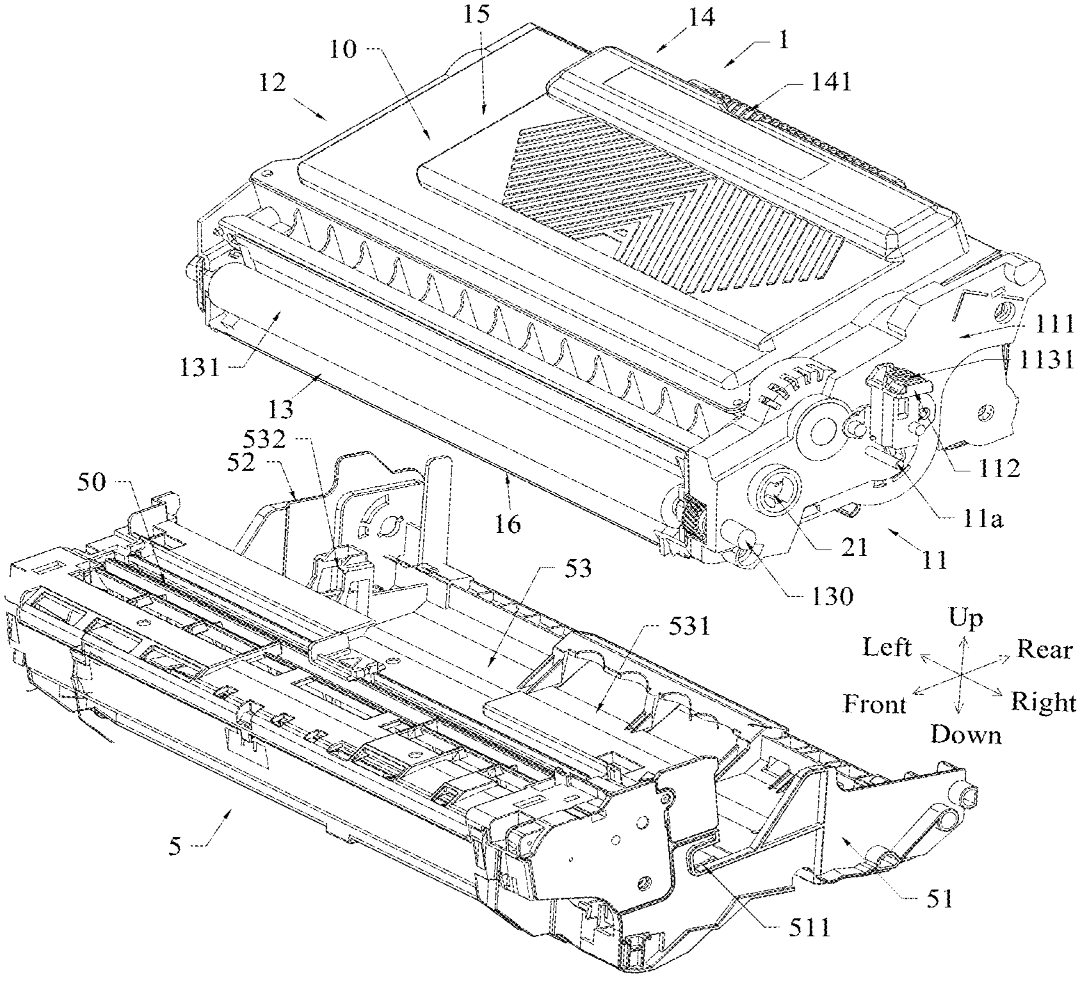
FIG. 3 illustrates an explosive view of FIG. 2 from right to left, according to various disclosed embodiments of the present disclosure.
Figure 4:
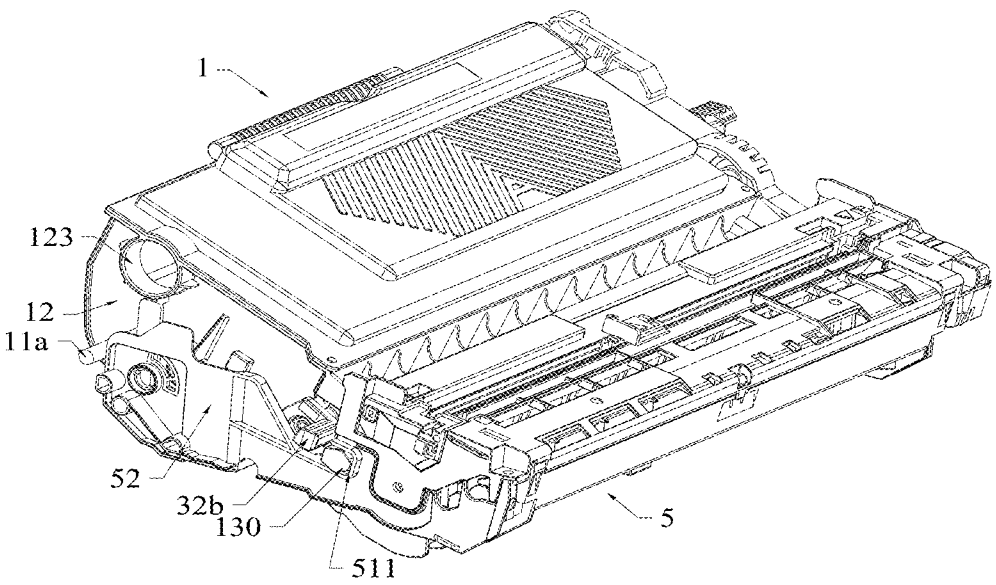
FIG. 4 illustrates an exemplary process cartridge viewed from left to right, according to various disclosed embodiments of the present disclosure.
Figure 5:
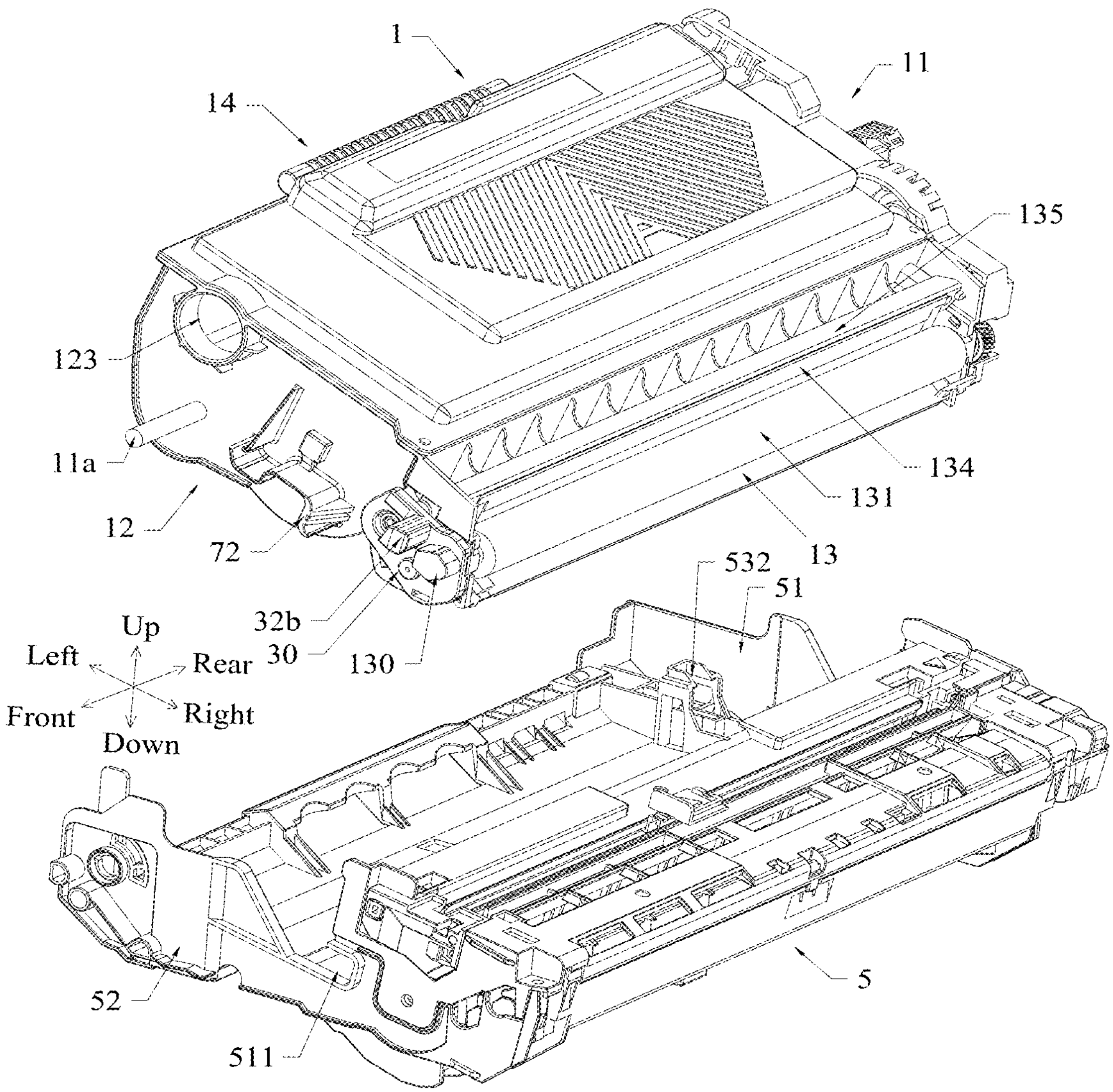
FIG. 5 illustrates an explosive view of FIG. 2 from left to right according to various disclosed embodiments of the present disclosure.

As shown in FIG. 3 to FIG. 5, the drum cartridge 5 may include a drum frame 50 and a photosensitive drum. The rotation axis of the photosensitive drum may extend along the first direction. The photosensitive drum may be used to receive the charged developer delivered by a developing roller 131, to form a visible image on the surface of the photosensitive drum under the action of an electrostatic latent image. The drum frame 50 may rotatably support the photosensitive drum, and the drum frame 50 may also be used to carry the developing cartridge 1. The drum frame 50 may include a first side wall 51, a second side wall 52, and a third side wall 53 positioned between the first side wall 51 and the second side wall 52. The first side wall 51 and the second side wall 52 may be opposite to each other in the first direction. The first side wall 51 and the second side wall 52 may rotatably support the left and right ends of the photosensitive drum respectively. The third side wall 53 may include at least the bottom wall of the drum cartridge. A mounting groove 531 may be formed between the first side wall 51, the second side wall 52 and the third side wall 53, for mounting the developing cartridge 1. The mounting groove 531 may be positioned behind the photosensitive drum. The drum frame 50 may include a drum limiting part 511, and the drum limiting part 511 may be used to limit the developing cartridge 1. In one embodiment, the drum limiting part 511 may be disposed close to the first side wall 51 and/or the second side wall 52, and the drum limiting part 511 may include a limiting opening. The drum frame 50 may also include a drum push member used to push the developing cartridge 1 such that the developing cartridge 1 contacts the photosensitive drum.

One embodiment of the present disclosure provides a developing cartridge. By arranging a lifting element in the cartridge body of the developing cartridge and an electrical contact surface fixed relative to the cartridge body, during the process of installing the developing cartridge to the image forming device, the lifting element may provide an upward force to the developing cartridge, and the developing cartridge may move upward relative to the drum cartridge and the identification contact, such that the electrical contact surface is in electrical contact with the identification contact of the image forming device. Therefore, the image forming device may be able to read the information of the storage medium of the developing cartridge.

The developing cartridge 1 may be able to be detachably mounted on the drum cartridge 5, and the developing cartridge 1 may be mounted on the drum cartridge 5 to form a process cartridge. The developing cartridge 1 may include a cartridge body 10, a developing roller 131, a supply roller, a stirring member, a doctor blade 134, a transmission element, a power supply element, a cartridge limiting part and a push element. The developing cartridge 1 may have a first end 11 and a second end 12 that are oppositely arranged in the first direction. The developing cartridge 1 may have a third end 13 and a fourth end 14 that are oppositely arranged in the second direction. The developing cartridge 1 may have a fifth end 15 and a sixth end 16 that are oppositely arranged in the third direction. The first end 11 of the developing cartridge 1 may be also the first end 11 of the cartridge body 10. Similarly, one of other ends of the developing cartridge 1 may also correspond to a same end of the cartridge body 10. For the convenience of description, as shown in FIG. 3, in one embodiment, the right end of the developing cartridge 1 is the first end 11, the left end of the developing cartridge 1 is the second end 12, the front end of the developing cartridge 1 is the third end 13, and the rear end of the developing cartridge 1 is the fourth end 14, the upper end of the developing cartridge 1 is the fifth end 15, and the lower end of the developing cartridge 1 is the sixth end 16.

The cartridge body 10 may include an accommodating chamber and a developing chamber 135. The accommodating chamber may be positioned at the fourth end of the cartridge body. The developing chamber 135 may be positioned at the third end 13 of the cartridge body 10. The accommodating chamber may be used to accommodate the developer and the stirring member. The developing chamber 135 may be used to accommodate the developing roller 131 and the supply roller. The developing roller 131, the supply roller and the stirring member may all be rotatably arranged between the first end 11 and the second end 12 of the cartridge body 10. The rotation axes of the developing roller 131, the supply roller and the stirring member may all extend along the first direction. The stirring member may include a stirring axle and stirring films. The stirring films may be arranged on the outer periphery of the stirring axle. The stirring films may be used to stir the developer to prevent the developer from agglomerating. The stirring films may also be used to transport the developer in the accommodating chamber to the developing chamber. The cartridge body 10 may be provided with a developer supply opening 123, and the developer supply opening 123 may be used for allowing the developer to enter the cartridge body 10. The developer supply opening 123 may be positioned at the fourth end 14 to facilitate the arrangement of other components in the space of the cartridge body 10. The projection of the developer supply opening 123 in the first direction may at least partially overlap with the accommodating chamber, which facilitates filling of the accommodating chamber with the developer. The developer supply opening 123 may be provided with a matching developer cap. The developer cap may be used to seal the developer supply opening 123 to prevent the developer in the cartridge body 10 from leaking. In some other embodiments, the developer supply opening 123 may also be disposed close to the third end 13, and the projection of the developer supply opening 123 may overlap with the projection of the accommodating chamber in the first direction. In this embodiment, the developer supply opening 123 may be positioned at the second end 12. In some other embodiments, the developer supply opening 123 may also be provided at the first end 11. The supply roller may be used to transport the developer to the developing roller 131. The circumferential surface of the supply roller may abut the circumferential surface of the developing roller to transport the developer to the developing roller 131. The supply roller may be positioned between the developing roller 131 and the stirring member in the front-rear direction, and the supply roller may be closer to the fourth end 14 of the cartridge than the developing roller 131. The third end 13 of the cartridge body 10 may be provided with a developer outlet, and the developer outlet may be positioned at the developing chamber 135. The developing roller 131 may be disposed at the developer outlet, and the developer outlet may be used to transport the developer to the developing roller 131. The developing roller 131 may be used to transport the developer to the photosensitive drum. The doctor blade 134 may be used to scrape developer from the developing roller 131 to ensure an appropriate thickness of the developer on the developing roller 131. The doctor blade 134 may also charge the developer. The doctor blade 134 may extend along the first direction and may be fixedly disposed between the first end 11 and the second end 12 of the cartridge body 10. The doctor blade 134 may extend in the up-down direction, which facilitates the spatial arrangement of other components in the developing chamber 134 and may also reduce excessive developer leakage at the developer outlet. The doctor blade 134 may be detachably installed and fixed at the first end 11 and the second end 12 of the cartridge body 10 to facilitate the disassembly and maintenance of the doctor blade 134. The two ends of the doctor blade 134 may be connected to the cartridge body 10 through threads or snap connection.

Figure 6:
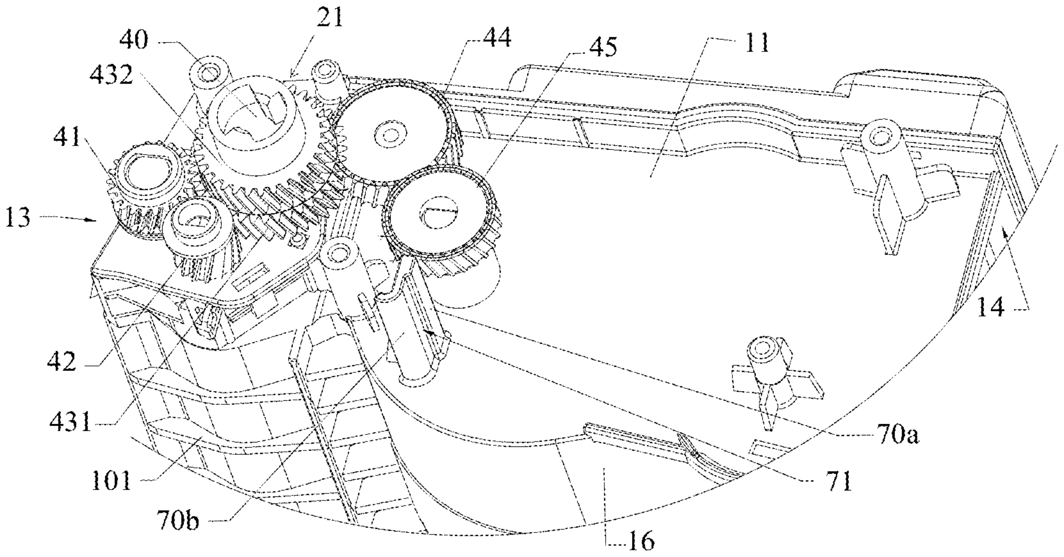
FIG. 6 illustrates a transmission element of an exemplary developing cartridge according to various disclosed embodiments of the present disclosure.

The fourth end 14 of the cartridge body 10 may be provided with a handle 141 for a user to hold the developing cartridge 1. In this embodiment, the handle 141 and the cartridge body 10 may be fixedly arranged. In some other embodiments, the handle 141 may be rotatably connected to the cartridge body 10. The cartridge body 10 may be provided with a rib 101. The rib 101 may be used to reinforce the cartridge body 10. Multiple ribs may extend in the front-to-rear direction. As shown in FIG. 6, in one embodiment, the ribs may be arranged on the outside of the developing chamber where the developing roller is positioned to reinforce the developing chamber and prevent the deformation of the cartridge body 10. In some other embodiments, the ribs may also be arranged inside of the developing chamber.

As shown in FIG. 6, the transmission element may include a driving part 21. The driving part 21 may couple with a power output part of the image forming device to receive the driving force of the image forming device and transmit the driving force to the developing roller 131, the supply roller and the stirring member. The rotation axis of the driving part 21 may extend in the first direction. In one embodiment, the driving part 21 may be rotatably disposed at the first end 11 of the cartridge body 10. The driving part 21 may include a driving gear and a driving receiving part 40 that are coaxially and integrally formed. The driving gear may be closer to the second end 12 of the cartridge body 10 than the driving receiving part 40 in the first direction. The driving receiving part 40 may couple with the power output part of the image forming device to receive the driving force output by the image forming device. In some embodiments, the driving gear may also be installed on the driving receiving part 40, as long as the driving gear is able to rotate together with the driving receiving part 40.

The transmission element may also include a developing roller gear 41, a supply roller gear 42 and a stirring gear 45. The developing roller gear 41 may be coaxially and fixedly installed on one end of the developing roller 131 close to the first end 11 of the cartridge body 10. The developer supply gear 42 may be coaxially fixed and installed on one end of the supply roller close to the first end 11 of the cartridge body 10. The stirring gear 45 may be coaxially and fixedly installed on one end of the stirring axle close to the first end 11 of the cartridge body 10. The rotation axis of the driving part 21 may be closer to the fifth end 15 and the fourth end 14 of the cartridge body 10 than the rotation axis of the developing roller 131, and the rotation axis of the driving part 21 may be closer to the third end 13 of the cartridge body 10 than the rotation axis of the stirring member. The developing roller gear 41, the supply roller gear 42 and the stirring gear 45 may directly or indirectly mesh with the driving gear. After the driving part 21 receives the power output from the image forming device, the developing roller gear 41 may drive the developing roller 131 to rotate, the supply roller gear 42 may drive the supply roller to rotate, and the stirring gear 45 may drive the stirring member to rotate. The developing roller gear 41, the supply roller gear 42 and the stirring gear 45 may directly mesh with the driving gear, which reduces the space occupied by the first end 11 of the cartridge body 10 and is conducive to miniaturization of the developing cartridge 1. The transmission element may also include an idler gear 44 which is rotatably installed at the first end 11 of the cartridge body 10. The rotation axis of the idler gear 44 may extend along the first direction. The idler gear 44 may include a large-diameter idler gear and a small-diameter idler gear coaxially rotating. In the first direction, the large-diameter idler gear may be further away from the second end 12 of the cartridge body 10 than the small-diameter idler gear. The large-diameter idler gear may mesh with the driving gear, and the stirring gear 45 may receive the driving force of the driving part 21 by meshing with the small-diameter idler gear. In some other embodiments, the transmission element may use belt drive, gear train drive with high friction coefficient surface, sprocket chain drive, etc., to replace the gear drive, or use other meshing transmission methods for transmission.

As shown in FIG. 3, the first end 11 of the cartridge body 10 may be provided with a protective cover 111. The protective cover 111 may be used to protect the transmission element. In one embodiment, the protective cover 111 may be detachably fixed and installed at the first end 11 of the cartridge body 10 through threaded connection, snap connection, etc. The protective cover 111 may cover at least part of the transmission element in the first direction. For example, the protective cover 111 may cover the stirring gear 45, the developing roller gear 41, the driving gear and the idler gear 44. The protective cover 111 may be detachably installed on the cartridge body 10 to facilitate the removal of the protective cover 111 to repair and replace the transmission element. The protective cover 111 may also be fixed at the first end of the cartridge body 10 in a non-detachable manner, in some other embodiments.

As shown in FIG. 4 and FIG. 5, the power supply element may include a conductive member 30. The conductive member 30 may be used to contact a power supply part in the image forming device to receive the electric energy output by the image forming device, and transmit the electric energy to the developing roller 131 and the supply roller. In one embodiment, the conductive member 30 may be installed at the second end 12 of the cartridge body 10. The conductive member 30 may include an electrode **32*b*, a first electrical contact part, and a second electrical contact part. The first electrical contact part may be electrically connected to one end of the developing roller 131 close to the second end 12 of the cartridge body 10, and the second electrical contact part may be electrically connected to one end of the supply roller close to the second end 12 of the cartridge body 10. The electrode 32*b* may be used to contact the power supply part in the image forming device to receive the electric energy output by the image forming device, and to transmit the electric energy to the developing roller 131 through the first electric contact part and to the supply roller through the second electric contact part. The electrode 32*b* may be positioned between the rotation axis of the stirring member and the rotation axis of the developing roller 131 in the second direction. In this embodiment, the conductive member 30 may be positioned at the same side as the driving part 21. In some other embodiments, the conductive member 30 may also be positioned at the second end 12, that is, the conductive member 30 and the driving part may be positioned at different sides. The conductive member 30 and the developer supply opening 123** may be positioned at the same side in this embodiment, but may also be at different sides in some other embodiments.

The cartridge limiting parts 130 may be used to cooperate with the drum limiting part 511 of the drum cartridge 5 to limit the movement of the developing cartridge 1 in the third direction and/or the forward direction. The cartridge limiting parts 130 may be positioned at the third end of the cartridge body 10 in the second direction. In one embodiment, the first end 11 and the second end 12 of the cartridge body 10 may be each provided with one cartridge limiting part 130. The projections of the cartridge limiting parts 130 at the first end 11 and the second end 12 in the first direction may overlap with the projection of the developing roller 131 in the first direction, to facilitate the arrangement in the side end space of the cartridge body 10. The cartridge limiting part 130 of the first end 11 may be integrally formed with the protective cover 111, or may be installed and fixed at the protective cover 111. The cartridge limiting part 130 of the first end 11 may also be directly formed with the cartridge body 10, or may be directly installed on the cartridge body 10. The cartridge limiting part 130 of the second end 12 may be integrally formed with the electrode **32*b*, or installed and fixed on the electrode 32*b*, or directly formed with the cartridge body 10 or directly installed on the cartridge body 10. The cartridge limiting parts 130 may be in the shape of a protrusion. Both ends of the developing cartridge 1 in the first direction may be provided with the cartridge limiting parts 130, such that the force received by the developing cartridge 1 when installed on the drum cartridge 5 may be more balanced. In some other embodiments, the developing cartridge 1 may also be provided with the cartridge limit part only at the first end 11 or the second end 12**.

The push element may be used to receive the force of the drum push member of the drum cartridge 5 such that the developing roller 131 comes into contact with the photosensitive drum.

During assembly, the cartridge limiting parts 130 of the developing cartridge 1 may be inserted into the drum limiting parts 511 of the drum cartridge 5. The drum push member of the drum cartridge 5 may abut against the push element, and the drum push member may apply a force toward the photosensitive drum in the second direction to the push element, such that the developing cartridge 1 drives the developing roller 131 to move toward the photosensitive drum to make the developing roller 131 contact the photosensitive drum. Since the cartridge limiting parts 130 of the developing cartridge 1 are inserted into the drum limiting parts 511, the developing cartridge 1 may be prevented from moving too much when moving toward the photosensitive drum, thereby preventing the developing roller 131 from disengaging from the photosensitive drum. That is, the movement of developing cartridge 1 in the up-down direction and/or the forward direction may be limited.

When the developing cartridge 1 is installed into the drum cartridge 5, the developing cartridge 1 and the drum cartridge 5 may form the process cartridge. The first end 11 of the developing cartridge may be opposite to the first side wall 51 of the drum cartridge, and the second end 12 may be opposite to the second side wall 52. The third end 13 may be opposite to the photosensitive drum. When the process cartridge is installed into the installation cavity of the image forming device, the first end 11 and the first side wall 51 may be opposite to the first wall 91, and the second end 12 and the second side wall 52 may be opposite to the second wall.

Figure 2:
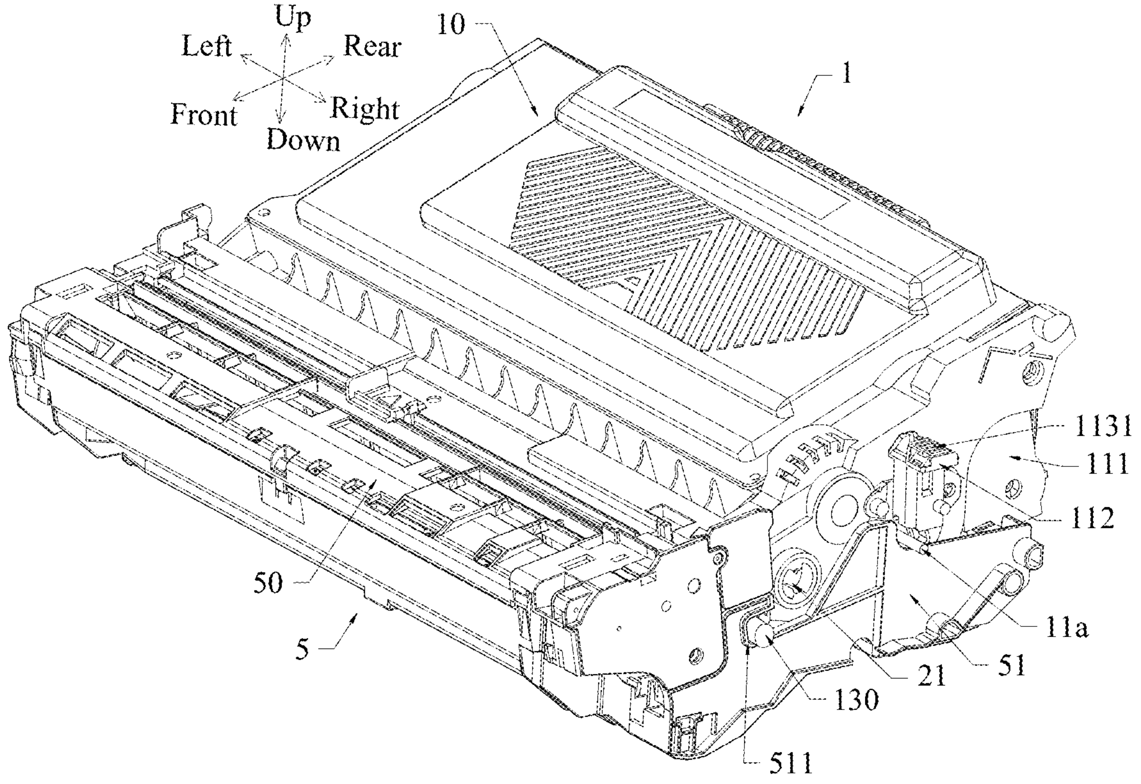
FIG. 2 illustrates a process cartridge formed by mounting a developing cartridge on a drum cartridge according to various disclosed embodiments of the present disclosure.
Figure 7:
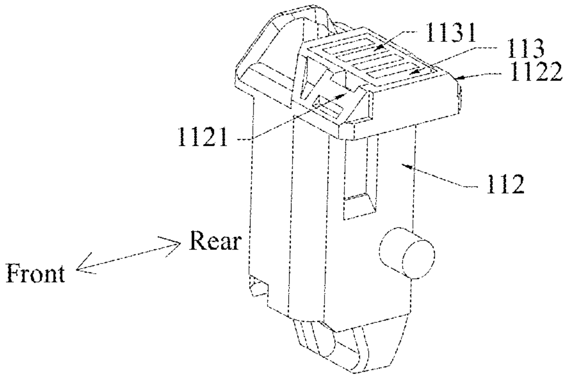
FIG. 7 illustrates an identification element of an exemplary developing cartridge according to various disclosed embodiments of the present disclosure.

As shown in FIG. 2 and FIG. 7, the developing cartridge 1 may further include an identification element for electrical connection with the second identification contact 916 such that the developing cartridge 1 is identified by the image forming device. The identification element may include a bracket 112, a storage medium 113 and an electrical contact surface 1131. The bracket 112 may be used to support the storage medium 113, the storage medium 113 may be used to store information of the developing cartridge 1, and the electrical contact surface 1131 may be used to electrically connect the second identification contact 916 and the storage medium 113. The bracket 112, the storage medium 113 and the electrical contact surface 1131 may be fixed relative to the cartridge body 10 and may be disposed at the first end 11 of the cartridge body 10. In one embodiment, the bracket 112 may be formed by a rightward protrusion of the integrally formed protective cover 111. The bracket 112 may be provided with an installation recess which is formed by being recessed from top to bottom. The storage medium 113 may be fixedly installed in the recess through gluing, snapping, etc. The electrical contact surface 1131 may be fixedly provided on the upper surface of the storage medium 113. Preferably, in one embodiment, after installation, the storage medium 113 may be flush with the bracket 112 to prevent the storage medium 113 from falling off because of interference. The bracket 112 and the protective cover 111 may be integrally formed, which reduces the number of parts and does not require component to costs. The bracket 112 may also be installed and fixed at the protective cover 111, and may be integrally formed with the cartridge body 10 and installed and fixed on the cartridge body 10. The bracket 112 may also be detachably installed and fixed at the protective cover 111 or the cartridge body, such that the bracket 112 is able to be easily disassembled for maintenance or replacement. Compared with the method in which the bracket 112 is directly installed on the cartridge body 10, the bracket 112 may be arranged at the protective cover 111, such that there is no need to set an avoidance position at the protective cover 111 for the bracket 112 to extend from the cartridge body 10 to the side of the protective cover 111, simplifying the development cartridge 1. In some other embodiments, the identification element may also be provided with only the electrical contact surface 1131 and the storage medium 113. In some embodiments, the storage medium 113 may also be disposed in other positions of the cartridge body 10 such as near the handle 141. The electrical contact surface 1131 may be disposed at the first end of the cartridge body 10. The electrical contact surface 1131 may be connected to the storage medium through wires, to achieve the electrical connection between the identification contact and the storage medium 113. In one embodiment, the electrical contact surface 1131 may be flat, such that the electrical contact surface 1131 and the second identification contact 916 may fit together. When the developing cartridge 1 is installed into the image forming device, the electrical contact surface 1131 may extend along the first direction and the second direction, and the electrical contact surface 1131 may intersect the third direction. The electrical contact surface 1131 in some other embodiments may also be a curved surface. The number of the electrical contact surface 1131 may correspond to the number of second identification contact 916, and may be set to one or more, preferably three. In this embodiment, the identification element and the driving part 21 may be disposed on the same side of the developing cartridge. In some embodiments, the driving part 21 may be disposed at the first end of the developing cartridge, and the identification element may be disposed at the second end 12 of the developing cartridge. That is, the identification element and the drive part 21 may be disposed at different sides. In this embodiment, the identification element and the conductive member 30 may be positioned at different sides. In some other embodiments, the identification element and the conductive member 30 may also be on the same side. For example, the identification element and the conductive member 30 may be both positioned at the first end 11 or the second end 12.

Since the second identification contact 916 is positioned in front of the second upper guide part 914 and the lower end of the second upper guide part 914 is lower than the lower end of the second identification contact 916, during the process of installing the developing cartridge into the image forming device, the identification element may need to at least partially pass over the second upper guide part 914 such that the electrical contact surface 1131 is able to contact and electrically connect with the second identification contact 916.

The developing cartridge 1 may further include a lifting element. The lifting element may be used to lift the developing cartridge 1 such that the electrical contact surface 1131 of the identification element is electrically connected to the identification contact of the image forming device. As shown in FIG. 2 and FIG. 3, in one embodiment, the lifting element 11*a* may be disposed at the first end 11 of the cartridge body 10 in the left-right direction. The lifting element 11*a* may be closer to the fourth end 14 than the developing roller 131. The lifting element 11*a* may be fixed with respect to the cartridge body 10.

Figure 8:
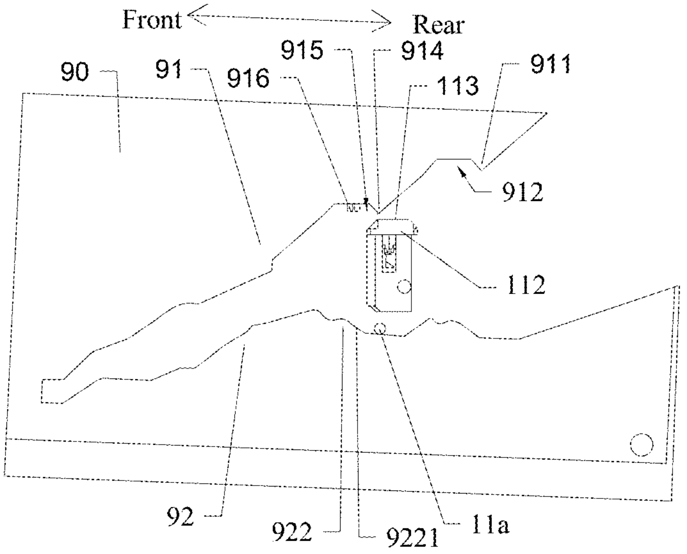
FIG. 8 to FIG. 10 illustrate structures of a developing cartridge installed in an image forming device, according to various disclosed embodiments of the present disclosure.
Figure 9:
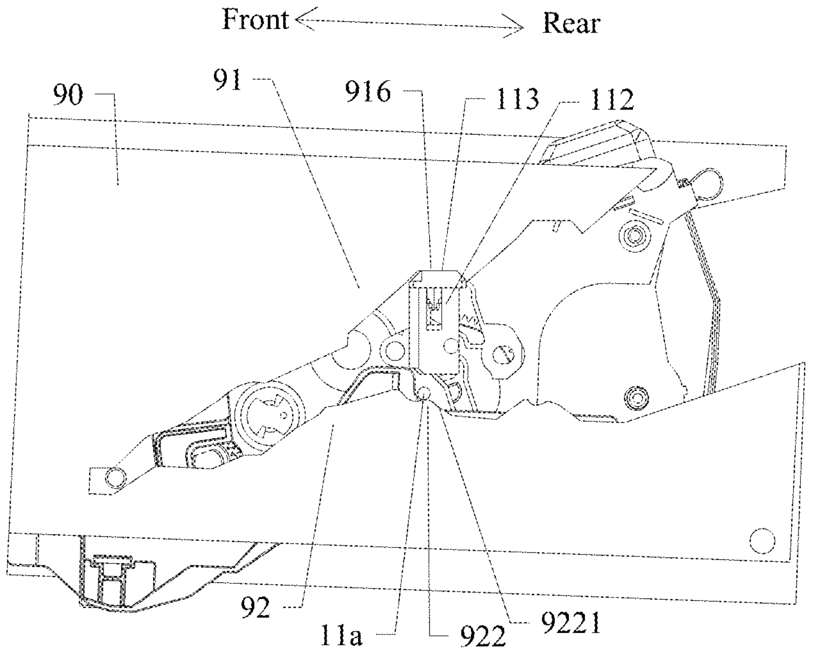

As shown in FIG. 8 and FIG. 9, when the process cartridge formed by the developing cartridge 1 and the drum cartridge 5 is loaded into the image forming device from back to front, the bracket 112 of the developing cartridge 1, the electrical contact surface 1131, and the storage medium 113 may be positioned in a space between the upper guide rail 91 and the lower guide rail 92. The lifting element 11*a* may move forward and upward along the second lower guide slope 9221 of the second lower guide part 922 in the lower guide rail 92 relative to the second identification contact 916. Since the lifting element 11*a* is fixed on the cartridge body 10, the lifting element 11*a* may drive the entire developing cartridge 1 to move forward and upward relative to the second identification contact 916 through the cartridge body 10. That is, the identification element may also move forward and upward relative to the second identification contact 916. Then, the bracket 112, the storage medium 113 and the electrical contact surface 1131 may pass over the second upper guide part 914 and enter the second recess 915, such that the electrical contact surface 1131 contacts and is electrically connected with the second identification contact 916. When the lifting element drives the developing cartridge 1 to move forward and upward, since the cartridge limiting part 130 of the third end 13 of the developing cartridge 1 is limited by the drum limiting part 511 of the drum cartridge 5, the lifting element 11*a* may drive the fourth end 14 of the developing cartridge 1 to swing forward and upward with respect to the drum cartridge 5 with the cartridge limiting part 130 of the third end 13 as an axis. The identification element may swing forward and upward along with the developing cartridge 1, such that the electrical contact surface 1131 enters the second recess 915 and contacts with and is electrically connected to the second identification contacts 916. Therefore, the image forming device is able to read the information of the storage medium 113. During the installation process, when the bracket 112 and the electrical contact surface 1131 pass over the second upper guide part 914, the identification element may not contact the second upper guide part 914, such that the identification element smoothly passes over the second upper guide part 914 to avoid damage of the electrical contact surface 1131 and the storage medium 113. Further, the smooth installation of the developing cartridge 1 may be facilitated, providing a good user experience. It can be understood that the identification element may also have slight contact with the second upper guide part 914 when passing over the second upper guide part 914. Preferably, in one embodiment, after the bracket 112 and the electrical contact surface 1131 pass over the second upper guide part 914, the lifting element 11*a* may move forward and upward along the second lower guide part 922 relative to the second identification contact 916. Since the separation space between the first upper guide part 911 and the lower guide rail 92 is larger than the separation space between the second upper guide part 914 and the lower guide rail 92, the identification element may not contact the first upper guide part 914 and may smoothly cross the first upper guide part 911.

When the process cartridge is taken out of the image forming device, the lifting element 11*a* may move backward and downward along the second lower guide slope 9221 of the second lower guide part 922, and the identification element may be able to pass over the second upper guide part 914, thereby taking out the process cartridge from front to back.

The lifting element 11*a* may move to the front end of the second lower guide slope 9221 and then reach the upper part of the second lower guide part 922, and stay on the upper part of the second lower guide part 922 to prevent the lifting element 11*a* from moving again, thereby ensuring that the electrical contact surface 1131 is in stable contact with the second identification contact 916. The upper part of the second lower guide part 922 may be a flat surface or a curved surface. At the same time, since the second identification contact 916 is retractable, during the movement of the lifting element 11*a* along the second lower guide slope 9221, the electrical contact surface 1131 may compress the second identification contact 916 to maintain abut and electrical connection with the second identification contact 916.

Figure 10:
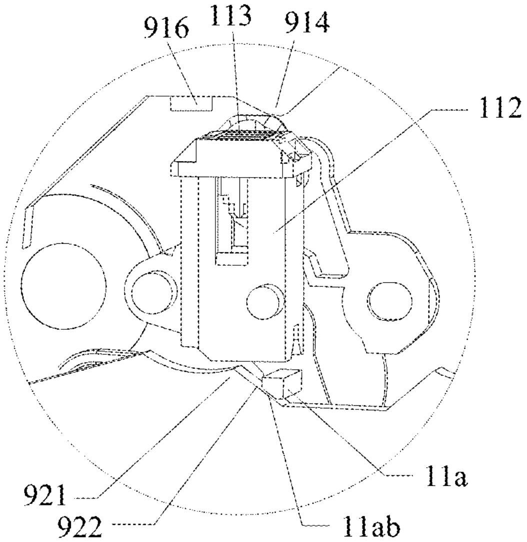
Figure 11:
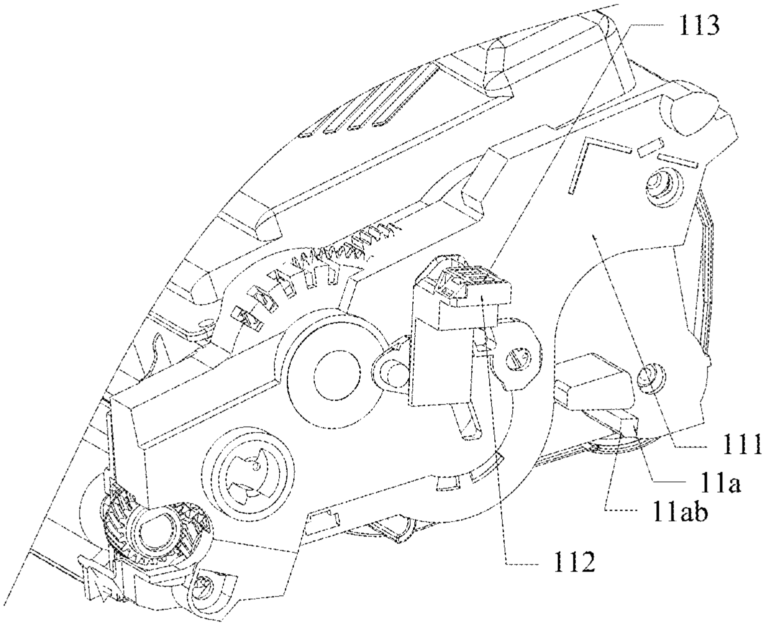
FIG. 11 illustrates an exemplary process cartridge according to various disclosed embodiments of the present disclosure.
Figure 12:
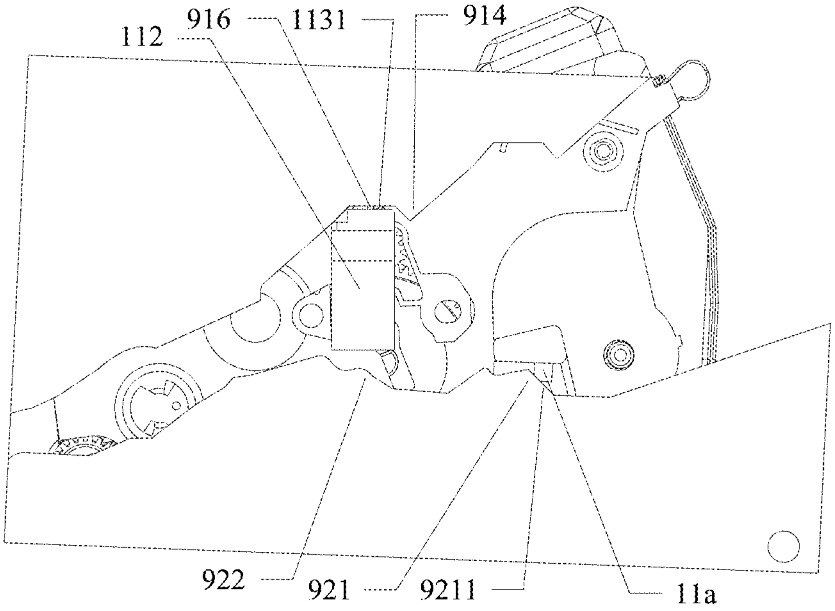
FIG. 12 illustrates a schematic diagram of cooperation between a process cartridge and an image forming device, according to various disclosed embodiments of the present disclosure.

As shown in FIG. 3, in one embodiment, the lifting element 11*a* may be integrally formed with the protective cover 111, and the lifting element 11*a* may protrude to the right from the right end surface of the protective cover 111. The lifting element 11*a* may be positioned at the lower side of the electrical contact surface 1131 and the bracket 112. The projection of the lifting element 11*a* in the first direction may partially coincide with the projection of the stirring gear 45 in the first direction. The lifting element 11*a* may also be installed at the first end 11 of the cartridge body 10 in such a way that the lifting element 11*a* is installed and fixed at the protective cover 111. The lifting element 11*a* may be integrally formed with the cartridge body 10, and may be installed and fixed on the cartridge body 10. It can be understood that the projection of the lifting element 11*a* in the first direction may not coincide with the projection of the stirring gear 45 in the first direction. The lifting element 11*a* may be rod-shaped or block-shaped. The lifting element 11*a* may have a contact surface, and the contact surface may be a curved surface as shown in FIG. 3, or abutment slope an abutment slope 11*ab* as shown in FIG. 10. The front end of the abutment slope 11*ab* may be positioned above the rear end, and the abutment slope 11*ab* may be used to fit the guide slope to make the movement of the lifting element 11*a* along the lower guide rail 921 more stable. In some embodiments, the lifting element 11*a* may also be disposed on the back side of the electrical contact surface 1131 and the bracket 112 as shown in FIG. 11 and FIG. 12. During installation, the lifting element 11*a* may cooperate with the first lower guide slope 9211 of the first lower guide part 921, such that the entire developing cartridge 1 moves forward and upward relative to the drum cartridge 5 and the second identification contact 916. The bracket 112 and the electrical contact surface 1131 may enter the second recess 915, and the electrical contact surface 1131 and the second identification contact 916 may contact and be electrically connected.

In the present disclosure, the developing cartridge 1 may be fixedly provided with the lifting element 11*a* and the identification element fixed relative to the cartridge body 10 at the first end 11 of the cartridge body 10. During the process of installing the process cartridge to the image forming device, the lifting element 11*a* may move forward and upward along the second lower guide part 922 of the lower guide rail 92, to drive the cartridge body 10 to move forward and upward relative to the drum cartridge 5 and the second identification contact 916 as a whole. The identification element may also move forward and upward, such that the electrical contact surface 1131 enters the second recess 915 to contact and electrically connect with the second identification contact 916. Further, the fixed arrangement manner of the bracket 112 relative to the cartridge body 10 may be simple, which reduces the number of parts and reduces the cost.

Furthermore, as shown in FIGS. 4 and 5, the second end 12 of the cartridge body 10 of the developing cartridge may be also provided with the lifting element 11*a*, and the lifting element 11*a* may protrude to the right from the second end 12. By disposing the lifting elements 11*a* at both ends of the cartridge body 10 in the first direction, when the process cartridge is installed into the installation cavity, both ends of the cartridge body 10 may be supported upward by the lower guide rails of the image forming device. That is, the forces at both ends of the cartridge body 10 may be balanced to prevent the cartridge body 10 from deformation during movement.

In the present embodiment, the developing cartridge 1 and the drum cartridge 5 may be separate structures. In some other embodiments, the developing cartridge 1 and the drum cartridge 5 may also be an integrated process cartridge. That is, the photosensitive drum may be directly rotatably installed at the first end 11 and the second end 12 of the developing cartridge 1, the identification element may be disposed at the first end of the process cartridge. The first end 11 of the developing cartridge 1 and the first side wall 51 of the drum cartridge 5 may be the first end of the process cartridge. The second end 12 and the second side wall 52 of the drum cartridge may be also the second end of the process cartridge. The third end 13 of the developing cartridge may be also the third end of the process cartridge. The fourth end 14 of the developing cartridge may be also the fourth end of the process cartridge. The fifth end 15 of the developing cartridge may be also the fifth end 15 of the process cartridge, and the sixth end 16 of the developing cartridge may be also the sixth end of the process cartridge. When the photosensitive drum is directly installed on the developing cartridge, the developing roller 131 may not be exposed, and the photosensitive drum may be partially exposed to transfer the visible developed image to a rotating medium such as a transfer roller or paper.

Embodiment 2

Figure 13:
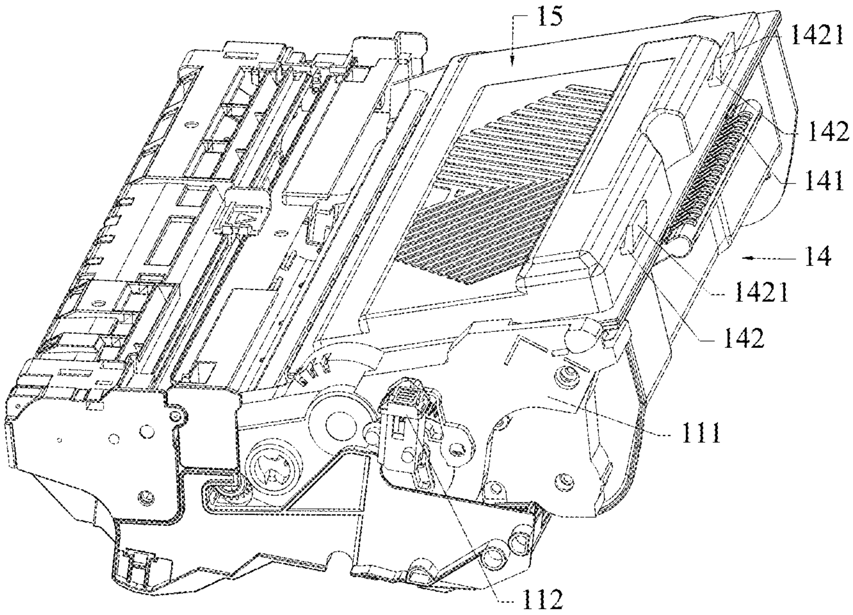
FIG. 13 illustrates another exemplary process cartridge according to various disclosed embodiments of the present disclosure.
Figure 14:
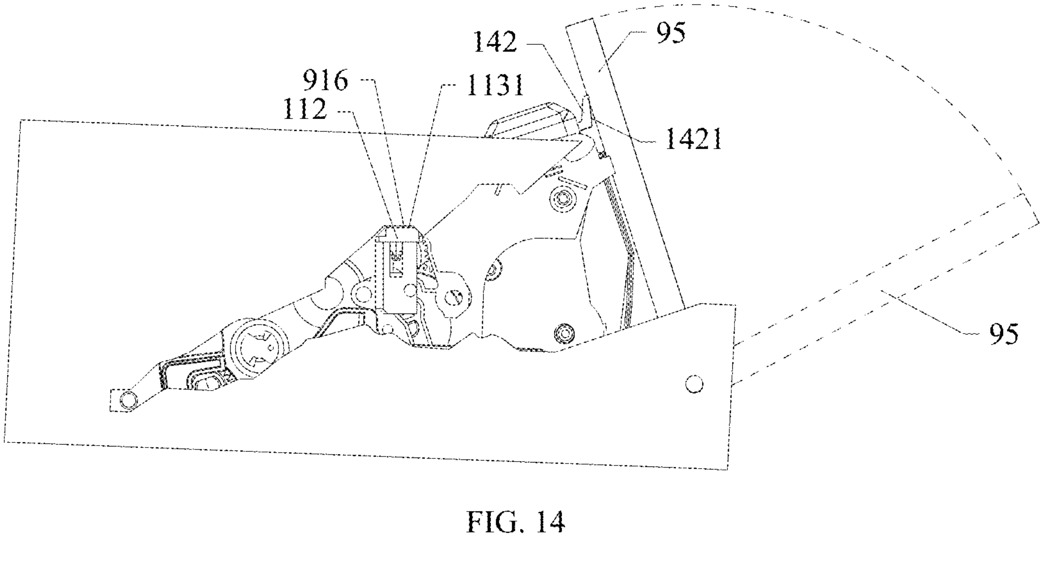
FIG. 14 illustrates a structure of a process cartridge installed in an image forming device according to various disclosed embodiments of the present disclosure.

In another embodiment shown in FIG. 13 and FIG. 14, the lifting element 142 of the developing cartridge 1 may be disposed at the fourth end 14 of the developing cartridge 1, which is different from Embodiment 1. The lifting element 142 may be used to receive the force of the door cover 95 and drive the developing cartridge 1 to move upward relative to the drum cartridge 5, thereby realizing the contact and electrical connection between the electrical contact surface 1131 and the second identification contact 916. Other structures of the developing cartridge 1 may be the same as those in Embodiment 1 and will not be described again here. It should be noted that the case where the lifting element is disposed or positioned at the fourth end 14 of the developing cartridge 1 is a special case in which the lifting element is closer to the fourth end 14 than the developing roller 131.

The lifting element 142 may be fixedly disposed at the fourth end 14 and the fifth end 15 of the cartridge body 10. The lifting element 142 may protrude backward to facilitate the door cover 95 to drive the developing cartridge 1 to move upward by abutting against the lifting element 142 during the closing process. The lifting element 142 may include an abutment slope 1421, and the upper end of the abutment slope 1421 may be further back than the lower end. The abutment slope 1421 may be an inclined plane or a curved surface. During the process of installing the process cartridge into the image forming device, the identification element may pass over the second upper guide part 914. After the process cartridge is installed into the image forming device and before closing the door cover 95, the electrical contact surface 1131 may be positioned below the second recess 915, and may be not in contact with the second identification contact 916 of the second recess 915. During the process of closing the door cover 95, the door cover 95 may abut against the abutment slope 1421, such that the abutment slope 1421 receives an upward force and the developing cartridge 1 swings upward around the cartridge limiting part 130. Therefore, the electrical contact surface 1131 may move upward to contact and electrically connect with the second identification contact 916. Preferably, in one embodiment, when the process cartridge is installed in the image forming device, the electrical contact surface 1131 may be positioned below the second upper guide part 914 and not in contact with the second upper guide part 914, such that the electrical contact surface 1131 is able to smoothly cross the second upper guide part 914.

In some embodiments, there may be one or more lifting elements 142. For example, in one embodiment, there may be two lifting elements 142. One lifting element 142 may be positioned at the first end 11 of the cartridge body 10, and the other lifting element 142 may be positioned at the second end 12 of the cartridge body 10, such that the force of the developing cartridge 1 is more balanced. The lifting elements 142 may be elastic, such that the lifting elements 142 are able to deform to prevent the door cover 95 from being unable to close the installation cavity when the door cover 95 abuts against the lifting elements 142. In one embodiment, the lifting elements 142 may be directly disposed on the cartridge body 10. In some other embodiments, the lifting elements 142 may also be disposed at the protective cover 111 of the first end 11, as long as the lifting elements 142 are able to receive the force of the door cover 95. The lifting elements 142 may be preferably integrally formed with the cartridge body 10 or the protective cover 111. The lifting elements 142 may also be installed and fixed on the cartridge body 10 or the protective cover 111. Preferably, when the electrical contact surface 1131 is provided at the protective cover 111, the lifting elements 142 may be also provided at the protective cover 111, such that the protective cover 111 is able to move upward for a sufficient distance because of the lifting elements 142 receiving the force of the door cover 95, to ensure that the electrical contact surface 1131 is able to be in electrical contact with the second identification contact 916. The lifting elements may be positioned at the fifth end 15 in the third direction. In some other embodiments, the lifting elements 142 may also be positioned at the sixth end 16 in the third direction, as long as the lifting elements 142 are able to receive the force of the door cover 95.

Figure 15:
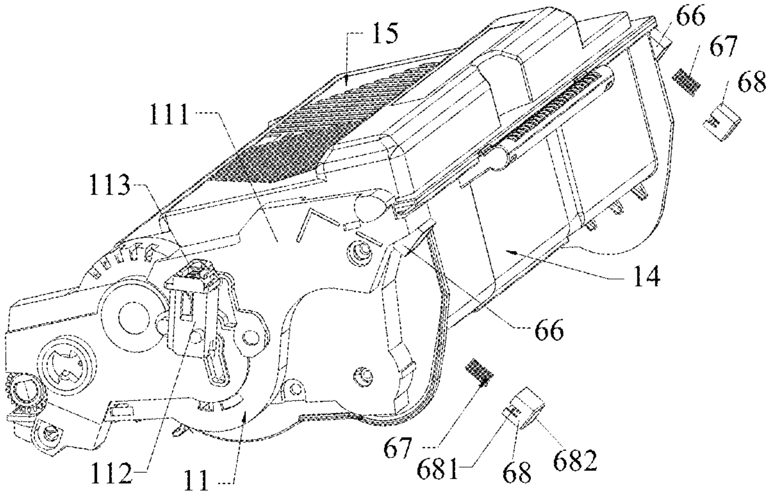
FIG. 15 illustrates another exemplary process cartridge according to various disclosed embodiments of the present disclosure.
Figure 16:
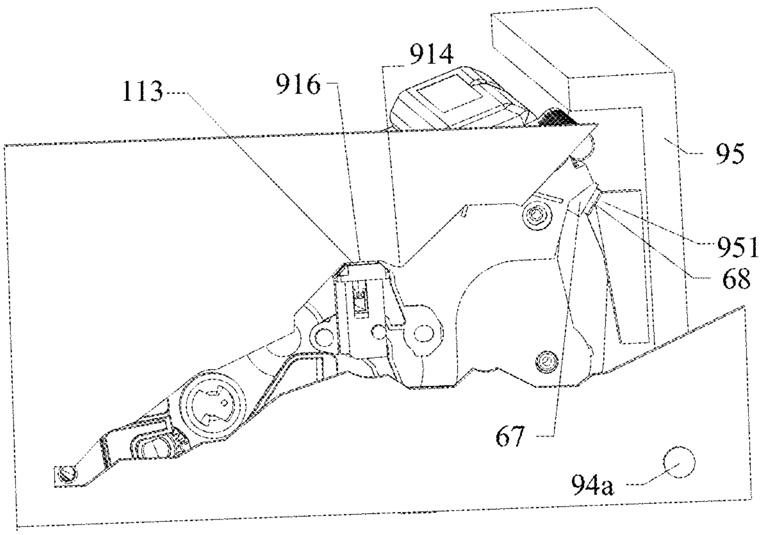
FIG. 16 illustrates a structure of a process cartridge installed in an image forming device according to various disclosed embodiments of the present disclosure.

In a variation of the Embodiment 2 shown in FIG. 15 and FIG. 16, the lifting elements may realize the contact and electrical connection between the electrical contact surface 1131 and the second identification contact 916 in a way same as in Embodiment 2, but may have different structure. In the present embodiment, one lifting element may include a retaining member 66, a reset elastic member 67 and a lifting member 68. The retaining member 66 may be provided on the cartridge body 10. The retaining member 66 may be used to install the reset elastic member 67 and the lifting member 68. The reset elastic member 67 may abut against the retaining member 66 and the lifting member 68. The lifting member 68 may be movably connected to the retaining member 66. The lifting member 68 may be used to abut the door cover 95. The retaining member 66 may be provided at the protective cover 111 at the first end and may be positioned at the fourth end 14 and the fifth end 15. The retaining member 66 may be hollow inside and may be able to accommodate the reset elastic member 67 and the lifting member 68. The retaining member 66 may be provided with a limiting hole, and the lifting member 68 may have a pawl 681. The lifting member 68 may be installed on the retaining member 66 by cooperating with the pawl 681 and the limiting hole, preventing the lifting member 68 from being separated from the retaining member 66. The lifting member 68 may be able to move forward and upward relative to the retaining member 66. The reset elastic member 67 may be installed between the retaining member 66 and the lifting member 68. The reset elastic member 67 may expand or contract along the movement direction of the lifting member 68. The upper end of the abutment slope 682 of the lifting member 68 may be further back than the lower end. The retaining member 66 may be integrally formed with the protective cover 111 or may be installed at the protective cover 111. The retaining member 66 may also be directly integrally formed with the cartridge body 10 or directly installed on the cartridge body 11. The lifting element may be provided at the protective cover 111. Of course, the lifting element may also be directly provided on the cartridge body 10.

The door cover 95 may be provided with a protrusion 951 extending toward the direction of the installation cavity. When the door cover 95 is rotated and closed, the protrusion 951 may abut the lifting member 68 and provide a forward and upward force to the lifting member 68, such that the lifting member 68 moves forward and upward relative to the retaining member 66. Therefore, the cartridge body 10 and the identification element may also move forward and upward. When the lifting member 68 moves forward and upward, the reset elastic member 67 may be compressed and may elastically deform, such that the size of the lifting element may be reduced to prevent the door cover 95 from being unable to close the installation cavity. When the door cover is opened, the elastic force of the reset elastic member 67 may cause the lifting member 68 to reset.

In some other embodiments, in the second direction, the lifting element may be positioned behind the electrical contact surface or the stirring gear (stirring member) or the driving receiving part or the developing roller gear (developing roller). In the second direction, the lifting element may be positioned behind the push member or the locking protrusion.

In Embodiment 2 and its variations, the lifting elements may be provided at the fourth end 14 of the developing cartridge, such that the door cover 95 may lift the developing cartridge 1 upward when closing the door cover 95, thereby achieving the electrical contact between the electrical contact surface 1131 and the second identification contact 916. The way to achieve electrical contact may be simple.

Embodiment 3

Figure 17:
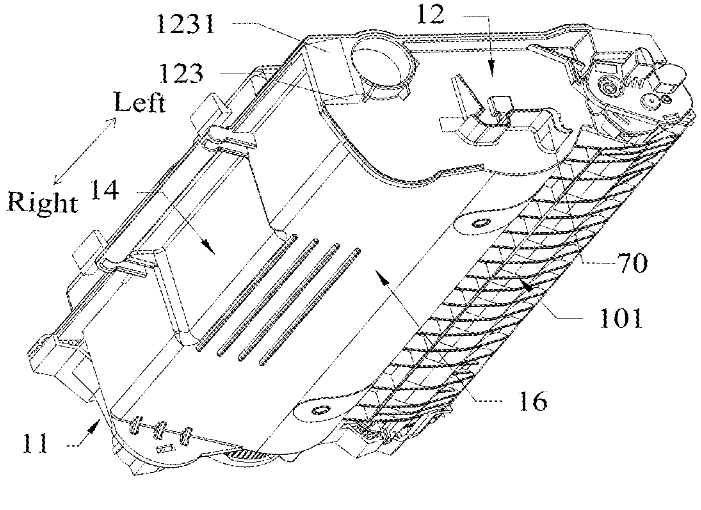
FIG. 17 illustrates another exemplary developing cartridge according to various disclosed embodiments of the present disclosure.

In another embodiment shown in FIG. 17, the lifting element 123 may be disposed at the second end 12, which is different from Embodiment 1. The lifting element 123 may receive the force of the door cover 95 such that the developing cartridge 1 moves toward the first end 11 relative to the drum cartridge 5 to realize the electrical contact between the electrical contact surface 1131 and the second identification contact 916. The lifting element 123 may be fixed at the second end 12 of the cartridge body 10. The lifting element 123 may include an abutment slope 1231, and the front end of the abutment slope 1231 may be further away from the first end 11 than the rear end. The door cover 95 may include a pushing part that is in contact with the lifting element 123. When the door cover 95 is closed, the pushing part may abut against the abutment slope 1231, such that the abutment slope 1231 receives a component force toward the first end 11. Therefore, the abutment slope 1231 may drive the entire developing cartridge 1 to move toward the first end 11 relative to the drum cartridge 5, and the bracket 112 and the electrical contact surface 1131 may also move toward the first end 11. Therefore, the electrical contact surface 1131 positioned at the first end 11 may enter the second recess 915 of the second end of the image forming device, to contact and electrically connect the second identification contact 916. The lifting element 123 may be integrally formed with the cartridge body 10 or installed on the cartridge body 10. It is also possible to provide a protective cover at the second end 12 of the cartridge body 10, and the lifting element may be disposed at the second end 12 of the cartridge body 10 through the protective cover at the second end 12. The lifting element 123 of this embodiment may be positioned at the fifth end 15 in the third direction. In some other embodiments, the lifting element 123 may also be positioned at the sixth end 16 or at an intermediate position in the third direction.

Embodiment 4

Figure 18:
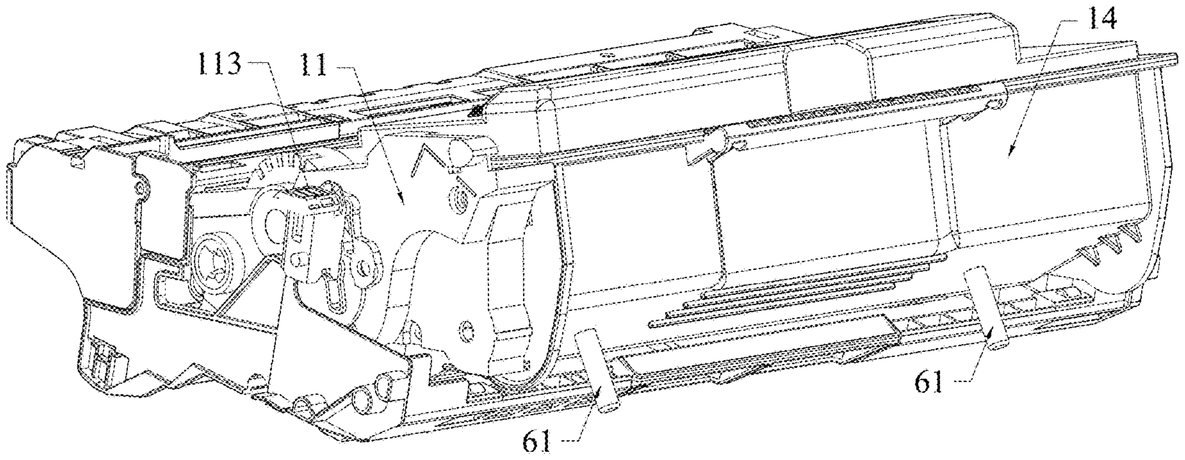
FIG. 18 illustrates another exemplary process cartridge according to various disclosed embodiments of the present disclosure.
Figure 37:
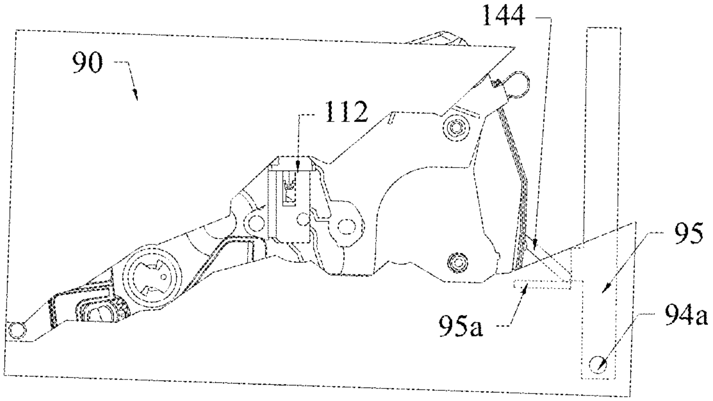
FIG. 37 illustrates a structure of an exemplary process cartridge installed in an image forming device according to various disclosed embodiments of the present disclosure.

In another embodiment shown in FIG. 18, the lifting element 61 may be disposed at the fourth end 14 of the cartridge body 10, which is different from Embodiment 1. The lifting element 61 may be used to cooperate with the bottom wall of the installation cavity, to drive the developing cartridge 1 to move upward relative to the drum cartridge 5, thereby realizing the electrical contact between the electrical contact surface 1131 and the second identification contact 916. The lifting element 61 may be fixed to the fourth end 14 and the sixth end 16 of the cartridge body 10. The lifting element 61 may have a columnar body. The lifting element 61 may extend backward and downward, that is, in a direction away from the cartridge body 10. During the process of installing the process cartridge to the image forming device from back to front, the lifting element 61 may abut against the bottom wall 95*a* of the installation cavity as shown in FIG. 37. The bottom wall 95*a* may have a slope. The upward force received by the lifting element 61 because of the slope may cause the developing cartridge 1 to move upward relative to the drum cartridge 5 and cause the identification element to cross the second upper guide part 914, such that the storage medium 113 is in electrical contact with the second identification contact 916. The lifting element 61 may be disposed at the sixth end 16 in the third direction, reducing the structure of the lifting element 16 and saving costs. The lifting element 61 may also extend rearwardly and downwardly from the fifth end 15. The lifting element 61 may also be rod-shaped or block-shaped.

Embodiment 5

Figure 19:
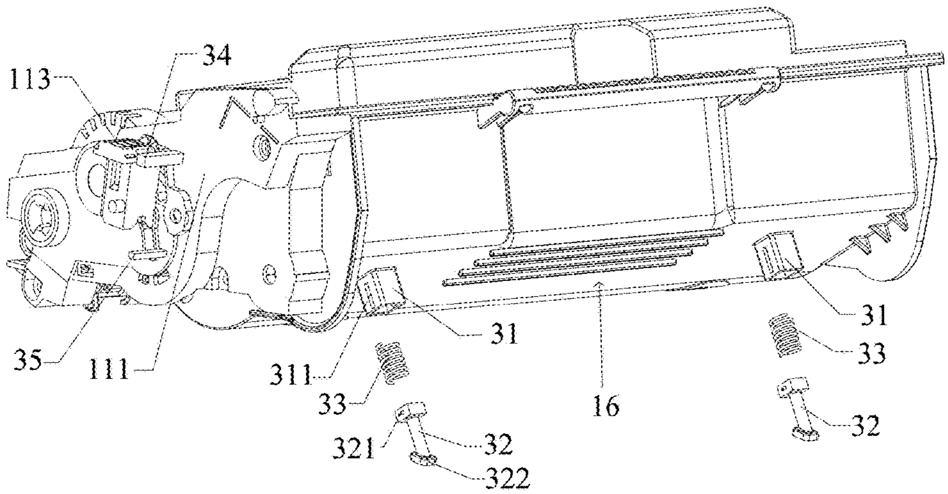
FIG. 19 illustrates another exemplary process cartridge according to various disclosed embodiments of the present disclosure.
Figure 20:
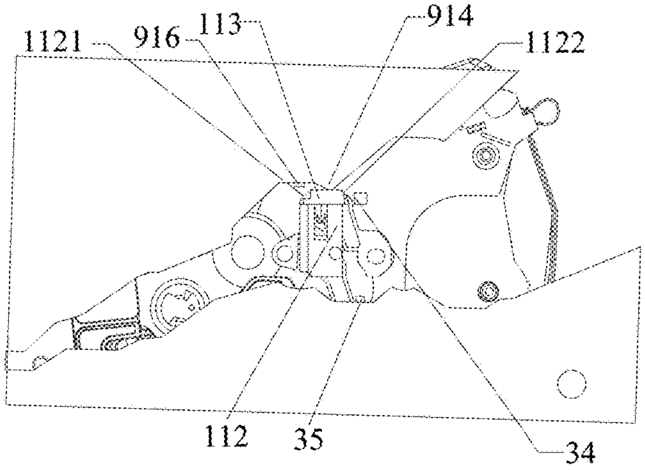
FIG. 20 and FIG. 21 illustrate structures of an exemplary process cartridge installed in an image forming device, according to various disclosed embodiments of the present disclosure.
Figure 21:
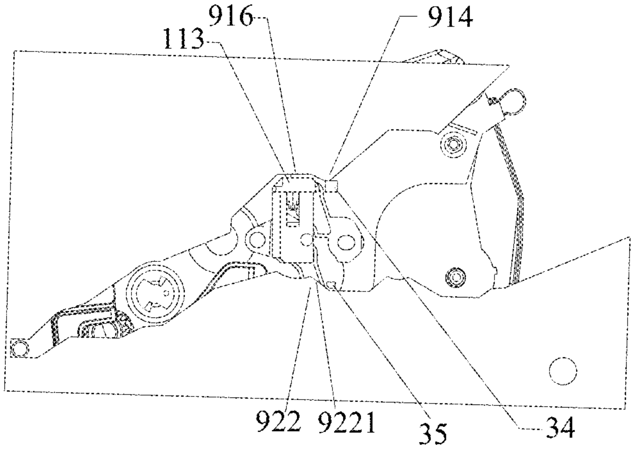

In another embodiment shown in FIG. 19 to FIG. 21, the lifting element may be provided at the fourth end 14 of the cartridge body 10, which is different from Embodiment 1. The lifting element may include a lifting elastic member 33. The lifting elastic member 33 may be able to elastically deform. The lifting element may be used to lift the developing cartridge 1 upward. During the installation process, when the identification element moves to the second upper guide part 914, the bracket 112, the storage medium 113 or the electrical contact surface 1131 may abut the second upper guide part 914 and receive a downward force from the second upper guide part 914. The identification element may transmit the downward force to the lifting elastic member 33 through the cartridge body 10, such that the lifting elastic member 33 is compressed in the third direction, that is, elastically deformed. Therefore, the entire developing cartridge 1 may move downward relative to the drum cartridge. The identification element may also move downward and cross the second upper guide part 914. Under the rebound force of the lifting elastic member 33, the entire developing cartridge 1 may move upward relative to the drum cartridge 5, and the electrical contact surface 1131 may enter the second recess 915 and contact the second identification contact 916 to form the electrical contact.

The lifting element may be provided at the fourth end 14 of the cartridge body 10. The lifting element may include the lifting elastic member 33, an abutment member 32 and a first mounting member 31. The abutment member 32 may be used to contact the drum cartridge 5 or the installation cavity, and may be movably connected to the first mounting member 31. The lifting elastic member 33 may abut against the first mounting member 31 and the abutment member 32. The lifting elastic member 33 may be able to undergo elastic deformation and expand or contract in the up-down direction.

In this embodiment, the lifting elastic member 33 may be a spring. The spring may include a compression spring. The spring may have good elasticity. In other embodiments, the lifting elastic member 33 may be other elastic materials or elastic structures, such as elastic materials including plastics that are able to elastically deform. The first mounting member 31 may protrude downward from the cartridge body 10. The inside of the first mounting member 31 may be hollow to accommodate the lifting elastic member 33 and the abutment member 32. A first chute 311 may be provided on the side wall of the first mounting member 31 and extend upward. The side wall of the abutment member 32 may include a protruding part 321. The protruding part 321 may be inserted into the first chute 311, such that the abutment member 32 is installed on the first mounting member 31 and is able to move upward relative to the first mounting member 31. When the abutment member 32 moves upward relative to the first mounting member 31, the abutment member 32 may compress the lifting elastic member 33. An abutment part 322 may be provided at the lower end of the abutment member 32, and may be used to contact the drum cartridge 5 or the installation cavity. When the developing cartridge is installed into the drum cartridge, the abutment part 322 of the abutment member 32 may abut against the third wall 53 of the drum cartridge, such that there is a gap between the sixth end 15 of the developing cartridge and the third wall 53 of the drum cartridge in the third direction. Therefore, when a downward force is provided to the developing cartridge 1, the developing cartridge may be able to compress the lifting elastic member to move downward relative to the drum cartridge 5. The front end of the abutment part 322 may be higher than the rear end.

During the process of installing the process cartridge into the installation cavity, the bracket 112, the storage medium 113 or the electrical contact surface 1131 may abut the second upper guide part 914 and receives a downward force, such that the developing cartridge receives a downward force. The first mounting member 31 may compress the lifting elastic member 33. The entire developing cartridge 1 may move downward relative to the drum cartridge 5. The identification element may also move downward and cross the second upper guide part 914. Under the rebound force of the lifting elastic member 33, the entire developing cartridge 1 may move upward relative to the drum cartridge 1, and the electrical contact surface 1131 may enter the second recess 915 and make the electrical contact with the second identification contact 916.

The lifting element may be disposed at the sixth end 16 in the third direction, which may reduce the distance between the lifting element and the third wall 53, reduce the structure of the lifting element, and save costs. The lifting element may also be positioned at the fifth end 15 in the third direction, and the lifting element may extend downwardly from the fifth end 15. The first mounting member 31 the abutment member 32 and the lifting elastic member 33 may extend downward and rearward. Therefore, when being installed in the drum cartridge 5, the developing cartridge 1 may receive the forward and upward force from the lifting element. And then, when installing the process cartridge into the installation cavity, it may be convenient for the identification element to move forward and upward after passing over the second upper guide part and make electrical contact with the second identification contact. The lifting elastic member may be directly provided on the cartridge body 10 or may be provided on the cartridge body 10 through the protective cover 111. The first mounting member 31 may be recessed inward on the cartridge body 10 without protruding from the cartridge body 10. The first mounting member 31 may be integrally formed with the cartridge body 10, or fixedly installed on the cartridge body 10, or provided on the cartridge body 10 through the protective cover 111. In this embodiment, the first chute 311 may be positioned at a left wall and a right wall of the first mounting member. The first chute 311 may be a through hole in the left-right directions. In some other embodiments, the first chute 311 may also be a blind hole. In some other embodiments, the first chute 311 may also be provided on the front wall and the rear wall of the first mounting member. In some embodiments, there may be one or more protruding parts 321, and one or more first chutes 311. For example, there may be two protruding parts 321 and two first chutes 311, such that the movement of the abutment member 32 is more stable. The positions of the protruding part 321 and the first chute 311 may be interchangeable. In some embodiments, the interior of the abutment member 32 may be hollow to accommodate the first mounting member 31 and the lifting elastic member 33 into the abutment member 32. In some embodiments, the lifting element may only include the first mounting member 31 and the lifting elastic member 33 without the abutment member 32. The lower end of the lifting elastic member, that is, the end far away from the first mounting member 31, may be used to abut the drum cartridge 5 or the installation cavity, such that the developing cartridge 1 may also be lifted upward. In this embodiment, the abutment member 32 may be provided, which has a good protective effect on the lifting elastic member 33. The lifting elastic member 33 may not be easily deformed, and the effect of the lifting element abutting against the drum cartridge 5 or the installation cavity may be better. In some embodiments, there may be one or more groups of the lifting elements, preferably two groups. One group may be arranged at the first end 11 of the developing cartridge, and the other group may be arranged at the second end 12 of the developing cartridge, such that the developing cartridge may be balanced in the left-right direction.

When the process cartridge is taken out, the identification element may contact the second upper guide part 914 and receive a downward force from the second upper guide part. The identification element may transmit the downward force to the lifting element through the cartridge body 10, such that the lifting element is compressed, that is, has elastic deformation. The entire developing cartridge 1 may move downward relative to the drum cartridge 5, and the identification element may also move downward and cross the second upper guide part, thereby taking out the process cartridge.

The lifting element of this embodiment may be provided with the lifting elastic member that is able to undergo elastic deformation, such that the storage medium 113 on the developing cartridge 1 may come into contact with the second upper guide part 914 and avoid the second upper guide part 914. On the one hand, the developing cartridge 1 may be able to be smoothly installed in place, and the storage medium 113 may make electrical contact with the second identification contact 916. On the other hand, the storage medium 113 may be prevented from being unable to move forward because of the contact with the second upper guide part 914, thereby avoiding damage.

To facilitate the identification element to smoothly pass over the second upper guide part 914 when it is in contact with the second upper guide part 914, as shown in FIG. 7, the front end of the bracket 112 may have a first guide slope 1121 and the rear end may have a second guide slope 1121. The front end of the first guide slope 1121 may be lower than the rear end of the first guide slope 1121, and the rear end of the second guide slope 1122 may be lower than the front end of the second guide slope 1122. The first guide slope 1121 may be used to guide the bracket 112 to move downward when the bracket is in contact with the second upper guide part 914, such that the identification element passes over the second upper guide part 914 and then enters the second recess 915 to prevent the identification element from being damaged by collision. The second guide slope 1122 may be used to guide the bracket 112 to move downward relative to the second upper guide part 914, such that the identification element passes over the second upper guide part and the process cartridge is taken out. The first guide slope 1121 may also be provided at the front end of the electrical contact surface 1131 or the storage medium 113, and the second guide slope 1122 may also be provided at the rear end of the electrical contact surface 1131 or the storage medium 113.

Further, the developing cartridge 1 may be also provided with an upper limiting member 34 and a lower limiting member 35. The upper limiting member 34 may be used to prevent the developing cartridge 1 from moving upward excessively, and the lower limiting member 35 may be used to abut the lower guide rail 92 to prevent the developing cartridge from moving downward excessively. The upper limiting member 34 and the lower limiting member 35 may be positioned at the first end 11 and extend in the first direction away from the first end 11. In one embodiment, the upper limiting member 34 and the lower limiting member 35 may be provided at the protective cover 111 or directly on the cartridge body 10. The upper limiting member 34 and the lower limiting member 35 may be integrated with the protective cover 111 or the cartridge body 10. The upper limiting member 34 and the lower limiting member 35 may be also fixedly installed at the protective cover 111 or the cartridge body 10. In the third direction, the upper limiting member 34 may be positioned above the lower limiting member 35.

When the identification element moves downward across the second upper guide part 914 and into the second recess 915, the rebound force of the lifting elastic member 33 may not allow the identification element to move upward for a sufficient distance, causing the electrical contact surface 1131 to fail to electrically contact with the second identification contact 916. In this embodiment, the lower limiting member 35 may be provided. After the identification element enters the second recess 915, the lower limiting member 35 may move forward and upward along the second lower guide part 922, such that the developing cartridge 1 moves upward simultaneously under the action of the lifting elastic member 33. Therefore, the electrical contact surface 1131 may move upward for a sufficient distance and contact the second identification contact 916. After the developing cartridge 1 works in the image forming device, as the developer in the cartridge body 10 continues to be consumed, the weight of the developing cartridge 1 may gradually decrease, and the developing cartridge 1 may move upward and shake under the action of the lifting element. As a result, the operation of the developing cartridge 1 may be unstable. In this embodiment, after the storage medium 113 comes into contact with the second identification contact 916, the upper limiting member 34 may contact the second upper guide part 914 to prevent the developing cartridge 1 from moving upward or shaking under the action of the lifting element and the unstable electrical contact. Therefore, the developing cartridge 1 may be able to operate stably under the action of the upper limiting member 34 and the lower limiting member 35. It can be understood that an upper limiting member and a lower limiting member may also be provided at the second end 12 of the cartridge body 10.

Figure 22:
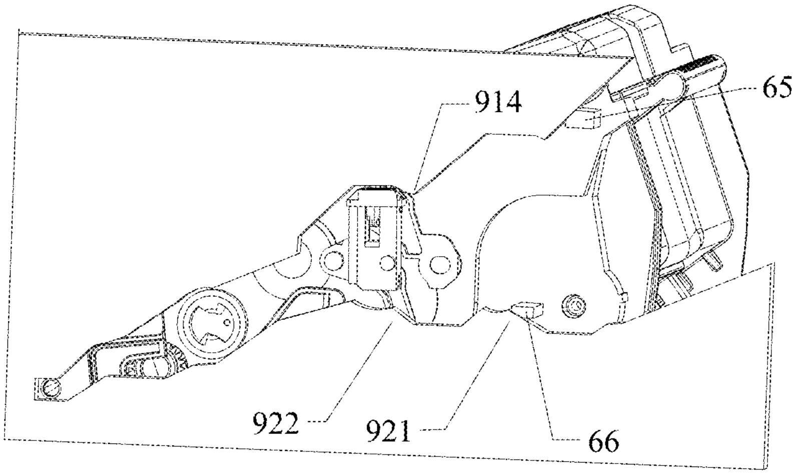
FIG. 22 illustrates a structure of an upper limiting member and a lower limiting member cooperating with an image forming device, according to various disclosed embodiments of the present disclosure.

In a variation of the upper limiting member and the lower limiting member, the upper limiting member 65 and the lower limiting member 66 may have different positions in contact with the guide rail of the image forming device, as shown in FIG. 22, and other settings may be the same. In the second direction, the upper limiting member 65 and the lower limiting member 66 may be closer to the fourth end 14 than the third end 13. The lower limiting member 66 may move forward and upward along the first lower guide part 921 after the identification element enters the second recess 915. After the storage medium 113 comes into contact with the second identification contact 916, the upper limit member 65 may come into contact with the first upper guide part 911.

Figure 23:
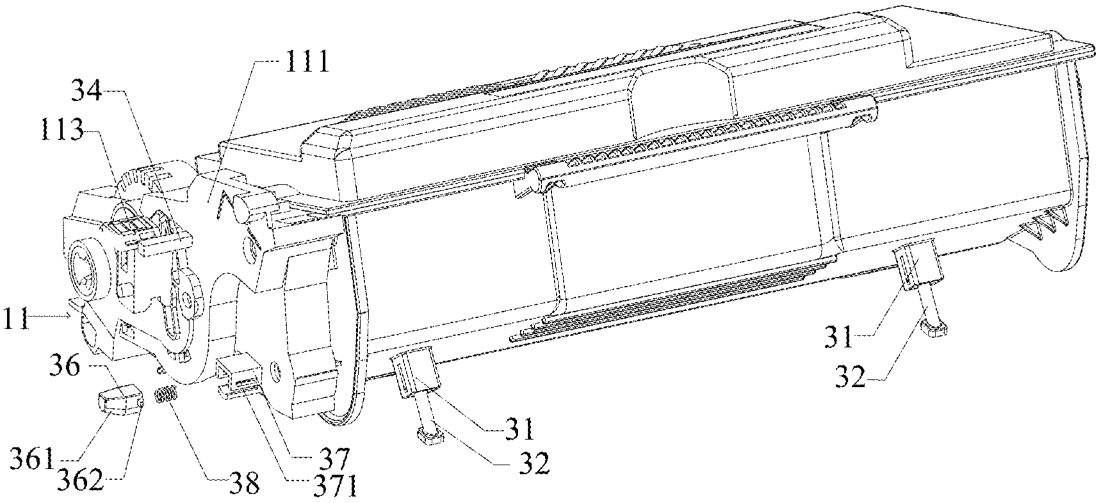
FIG. 23 illustrates an explosive view of an upper limiting member and a lower limiting member of an exemplary developing cartridge, according to various disclosed embodiments of the present disclosure.
Figure 24:
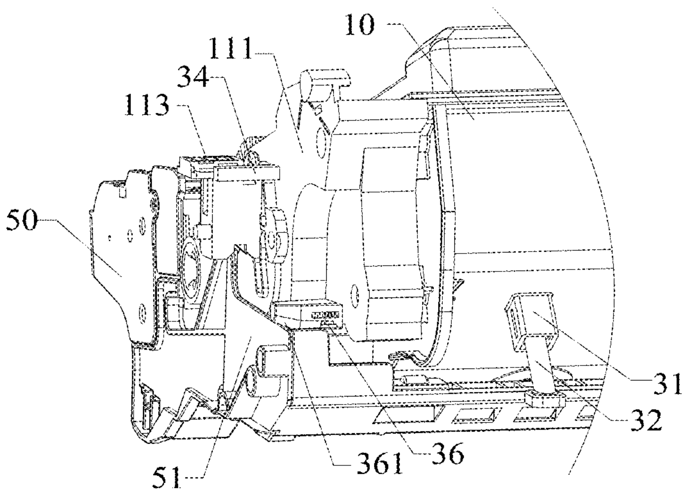
FIG. 24 illustrates a partial structure of an exemplary developing cartridge according to various disclosed embodiments of the present disclosure.
Figure 25:
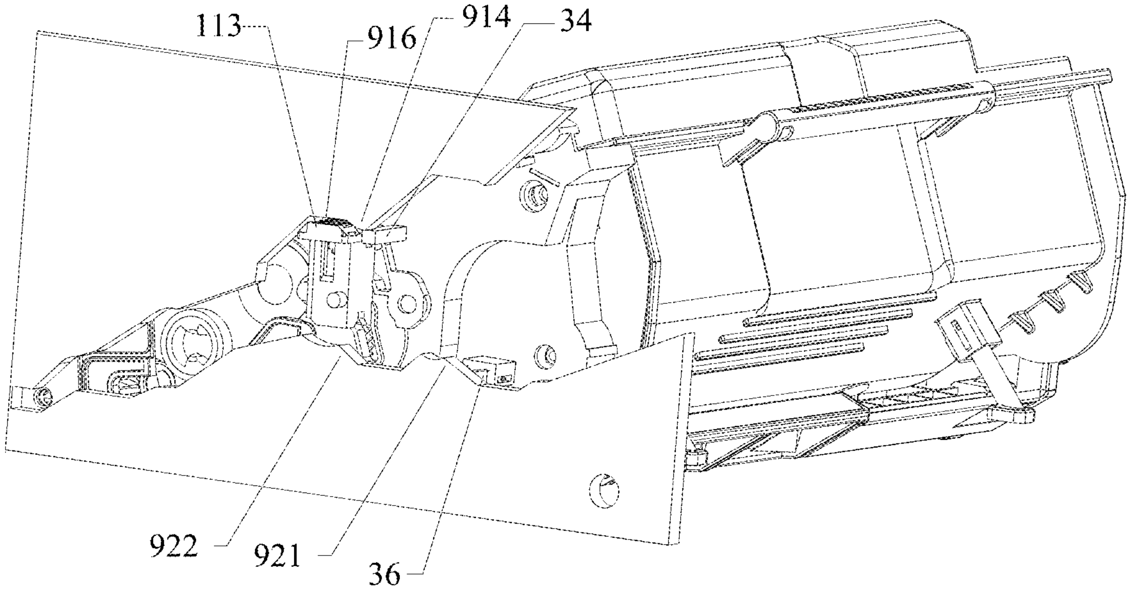
FIG. 25 illustrates an explosive view of an upper limiting member and a lower limiting member of an exemplary developing cartridge, according to various disclosed embodiments of the present disclosure.

In another variation of the upper limiting member and the lower limiting member, as shown in FIG. 23 to FIG. 25, the lower limiting member may be telescopic relative to the cartridge body 10. During the installation process of the process cartridge, the storage medium 113 may interfere with the second upper guide 914 and may move downward, and the developing cartridge 1 may move downward relative to the drum cartridge 5 as a whole under the action of the lifting element to avoid the second upper guide part 914. When the developing cartridge 1 moves downward relative to the drum cartridge 5, the lower limiting member may abut against the first side wall 51 of the drum cartridge 5, causing the lower limiting member to retract relative to the cartridge body 10.

The lower limiting member may be disposed at the first end 11 of the developing cartridge 1. The lower limiting member may include a lower limiting part 36, a limiting mounting part 37 and a limiting elastic member 38. The lower limiting part 36 and the limiting mounting part 37 may be movably connected. The lower limiting part 36 may expand and contract along the first direction relative to the limiting mounting part 37, and the limiting elastic member 38 may be in contact between the lower limiting part 36 and the limiting mounting part 37. There may be a guide surface 361 below the lower limiting part 36. The guide surface 361 may be a flat surface or an arc surface. The guide surface 361 may extend in the first direction away from the second end 12 and extend upward in the third direction. The side wall of the lower limiting part 36 may include a first anti-detachment part 362. The limiting mounting part 37 may be positioned at the first end 11 and protrude outward relative to the side wall of the cartridge body 10 along the first direction. The limiting mounting part 37 may be hollow to accommodate the lower limiting part 36 and the limiting elastic member 38. The limiting mounting part 37 may include a first anti-detachment opening 371, and the first anti-detachment part 362 may cooperate with the anti-detachment opening 371 to prevent the lower limiting part 36 from detaching from the limiting mounting part 37 when moving relative to the limiting mounting part 37. The limiting elastic member 38 may be installed in the hollow part of the limiting mounting part 37 and abut between the lower limiting part 36 and the limiting mounting part 37. The limiting elastic member 38 may be compressed and stretched in the first direction. The limiting elastic member 38 may be preferably a compression spring, and may also be other elastic components or elastic materials in some other embodiments. The limiting mounting part 37 may be directly provided on the cartridge body 10, or may be provided at the protective cover 111. The limiting mounting part 37 may be integrally formed with the cartridge body 10 or the protective cover 111, or may be installed and fixed on the cartridge body 10 or the protective cover 111. In some embodiments, a hole may be opened inside the lower limiting part 37 for the limiting elastic member 38 and the limiting mounting part 37 to be installed. The positions of the first anti-detachment opening 371 and the anti-detachment part 362 may be interchangeable. The first anti-detachment opening may be a through hole or a blind hole. In some embodiments, the lifting element may be integrally formed with the cartridge body or the protective cover and may be able to be elastically deformed, and may also lift the developing cartridge 1 upward.

When the developing cartridge 1 is installed to the drum cartridge 5 and both are not installed in the image forming device, the lower limiting part 36 may contact and may be supported by the first side wall 51 of the drum cartridge 5 and the limiting elastic member 38 may be in a stretched state.

When the process cartridge is installed into the image forming device and the developing cartridge 1 moves downward relative to the drum cartridge 5, the guide surface 361 of the lower limiting part 36 may abut against the first side wall 51 of the drum cartridge 5, and the lower limiting part 36 may be retracted and compress the limiting elastic member 38 relative to the first end 11. As the developing cartridge 1 and the drum cartridge 5 continue to be installed, the storage medium 113 may pass over the second upper guide part 914. Under the action of the lifting element, the developing cartridge 1 may move upward relative to the drum cartridge 5, and the lower limiting part 36 may extend outward relative to the first end 11 under the action of the limiting elastic member 38, and the guide surface 361 of the lower limiting part 36 may abut against the first side wall 51 at different positions along its extension direction, further causing the developing cartridge 1 to move upward relative to the drum cartridge 5. When the storage medium 113 is in contact with the second identification contact 916, the upper limiting member 34 may abut against the upper guide rail 91 to prevent the developing cartridge 1 from moving upward excessively, and the lower limiting part 36 may be supported by the first side wall 51 to limit the downward movement of the developing cartridge 1, to prevent the developing cartridge 1 from being unstable during operation in the image forming device. The lower limiting part 36 may be telescopic relative to the cartridge body 10, which also facilitates taking out the developing cartridge 1 from the image forming device.

In this embodiment, the lower limiting member may be closer to the fourth end 14 than the upper limiting member 34, such that when the developing cartridge 1 is abutted by the second upper guide part 914, it may be easier to overcome the elastic force of the limiting elastic member 38 to move downward relative to the drum cartridge 5. In some embodiments, the lower limiting member may also be closer to the third end 13 than the upper limiting member 34. In some embodiments, the lower limiting part 36 may be supported by the lower guide rail 92 of the image forming device. When the developing cartridge 1 moves downward, the guide surface 361 may be abutted by the lower guide rail 92 and retract. For example, the lower limiting member 36 may be supported by the lower guide rail 92 of the image forming device, and may retract when contacting the first lower guide part 921 or the second lower guide part 922. A telescopic lower limiting part 36 relative to the second end 12 of the cartridge body 10 may also be provided at the second end 12 of the cartridge body 10. In some embodiments, the upper limiting member 34 may also be telescopic relative to the cartridge body 10.

First Variation of Embodiment 5

Figure 26:
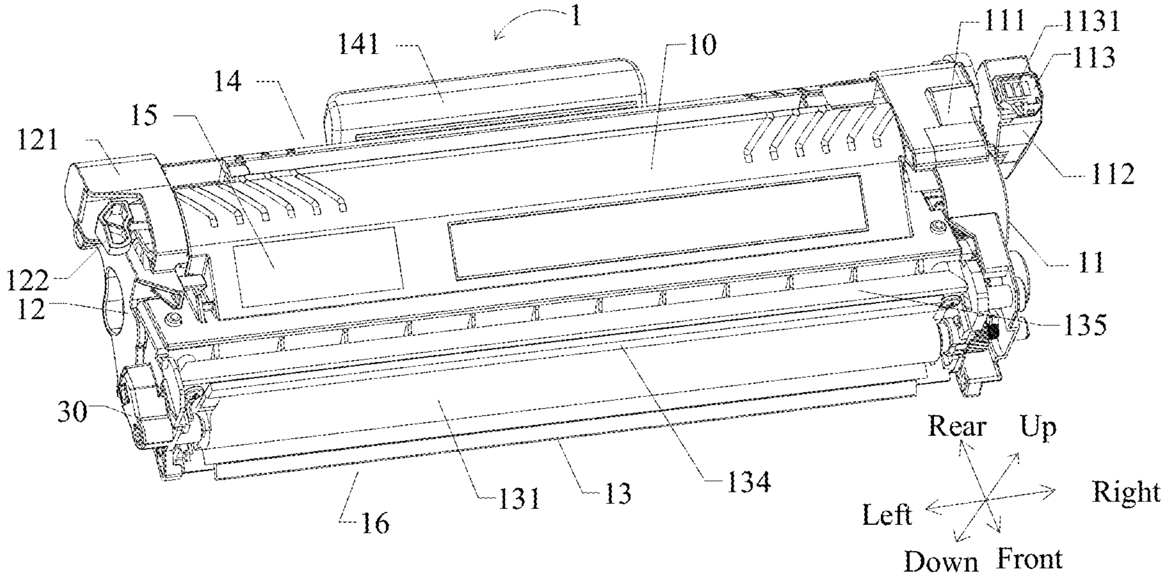
FIG. 26 illustrates another exemplary developing cartridge according to various disclosed embodiments of the present disclosure.
Figure 26A:
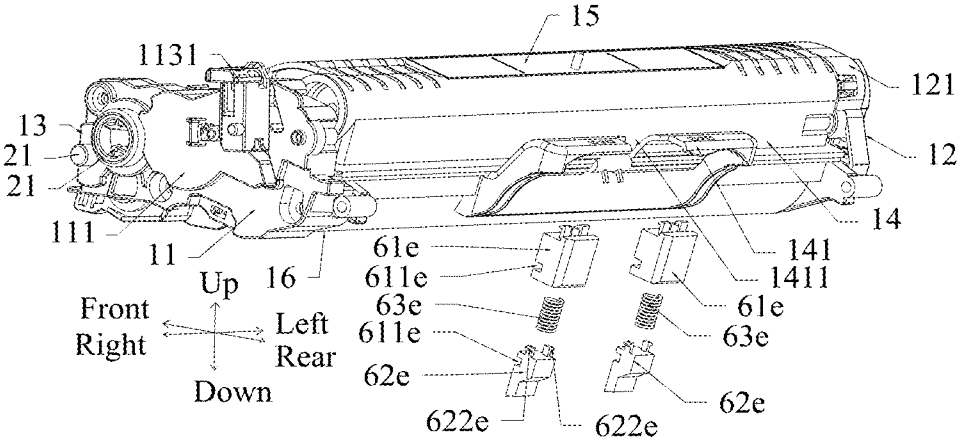
FIG. 26*a* illustrates an explosive view of a lifting element of another exemplary developing cartridge according to various disclosed embodiments of the present disclosure.
Figure 27:
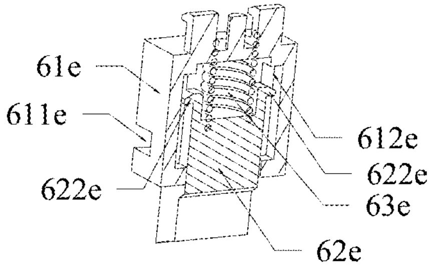
FIG. 27 illustrates a cross-sectional view of a lifting element of another exemplary developing cartridge according to various disclosed embodiments of the present disclosure.
Figure 28:
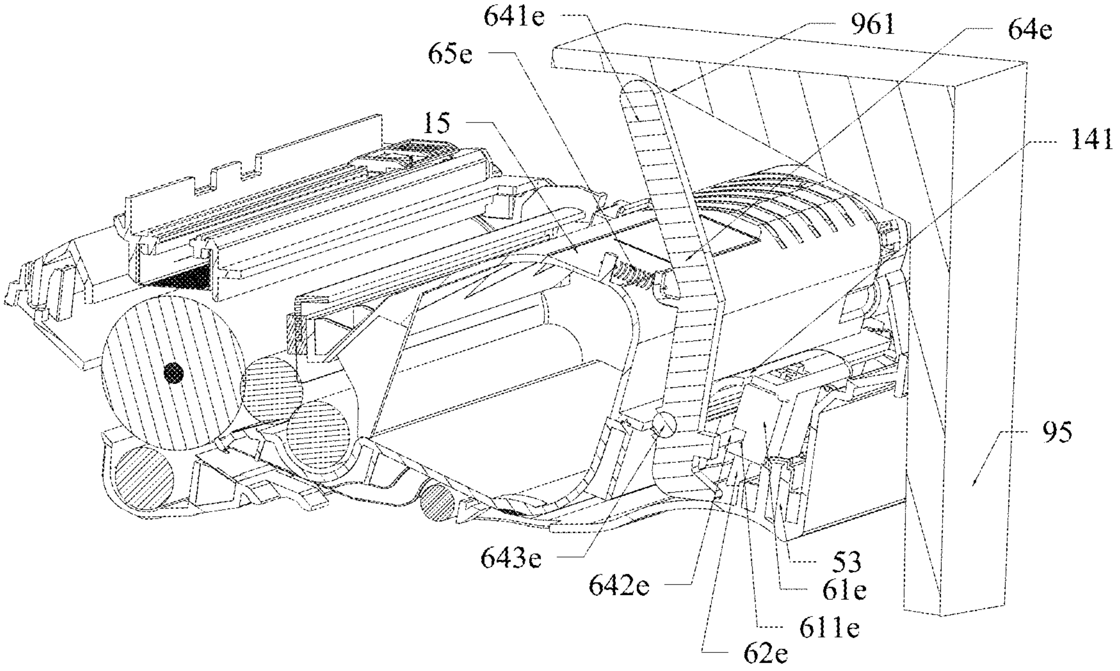
FIG. 28 illustrates a cross-sectional view of an exemplary developing cartridge cooperating with a cover, according to various disclosed embodiments of the present disclosure.

Another embodiment of the present disclosure shown in FIG. 26 to FIG. 28 provides another developing cartridge. The shape and size of the developing cartridge in the present disclosure may be different from the developing cartridge of Embodiment 1, and may be also provided with the cartridge body 10, the developing roller 131, the supply roller, the stirring member, the doctor blade 134, the transmission element, the power supply element, the cartridge limiting part 130, the push element, and the identification element. The configuration and functions of these structures may be same as those in Embodiment 1. It should be noted that developing cartridges of different shapes and sizes do not limit the content disclosed in the different embodiments and modifications of the present disclosure.

The second end 12 of the developing cartridge 1 may be also provided with a detection member 122 and another protective cover 121. The detection member 122 may be used to be detected by the image forming device such that the image forming device is able to identify the developing cartridge 1. The protective cover 121 of the second end 12 may be detachably installed on the cartridge body 10. The protective cover 121 of the second end 12 may at least cover a part of the detection member 122 to protect the detection member 122.

In the present variation of Embodiment 5, a handle 141 may be provided at the fourth end 14 of the cartridge body 10, which is different from Embodiment 5. The specific structure of the lifting element may also be different from Embodiment 5. The principle for the lifting element to realize the electrical contact between the identification element and the second upper guide part 916 may be same as Embodiment 5. The specific structure of the lifting element in this variation and the specific structure of the lifting element in Embodiment 5 may be interchangeable, and the same effect may be achieved. The lifting element in this variation may include a first mounting member 61*e*, a lifting elastic member 63*e* and an abutment member 62*e*. The upper part of the first mounting member 61*e* may be fixedly connected to the handle 141. The abutment member 62*e* may be movably connected to the first mounting member 61*e*. The lifting elastic member 63*e* may abut between the first mounting member 61*e* and the abutment member 62*e*. The abutment member 62*e* may be used to abut the third side wall 53 of the drum cartridge 5 or the bottom wall 95*a* of the installation cavity. For example, a protrusion may be formed on the upper part of the abutment member 62*e*, and the protrusion may be a buckle 622*e*. A hole may be opened in the lower part of the first mounting member 61*e* and a first chute 612*e* may be formed on the wall of the hole. The abutment member 62*e* may be inserted into the first mounting part 61*e* and the buckle 622*e* may cooperate with the first chute 612, such that the abutment member 62*e* may slide relative to the first mounting member 61*e* and be limited by the first mounting member 61*e*. The abutment member 62*e* may be movable in the up-down direction.

Since the handle 141 is further back than other positions of the fourth end 14 of the cartridge body 10 and the front end of the developing cartridge 1 may be limited by the cooperation between the cartridge limiting part 130 and the positioning groove 511, a lever structure may form in the developing cartridge 1 with the cartridge limiting part 130 as a fulcrum. The connection line between the external force and the cartridge limiting part 130 may be the force arm L4 of the external force. Since the lifting element is provided on the handle 141 in this embodiment, the elastic force of the lifting elastic member 63*e* may act on the handle 141, that is, the connection between the handle 141 and the cartridge limiting part 130 may be the force arm L5 of the external force. That is, L4=L5 only when the external force acts on the handle 141. Since the handle 141 is the structure on the developing cartridge 1 that is farthest from the cartridge limiting part 130 (that is, the fulcrum), when external force acts on the position of the developing cartridge 1 except the handle 141, L4<L5, which means that the external force may be more difficult to overcome the elastic force of the lifting elastic member 63*e*. The requirement for the elastic modulus of the lifting elastic member 63*e* may be reduced on the premise of stably supporting the developing cartridge 1, thereby reducing the cost. Further, when the lifting element is disposed at the handle 141 rather than being disposed at the first end 11 or the second end 12, the lifting element may be able to support the developing cartridge 1 more stably, and the developing cartridge 1 may be less likely to tilt at both ends in the first direction.

Furthermore, during the operation of the developing cartridge 1, when the driving receiving member 21 receives the torque output from the image forming device and operates, part of the torque may be transmitted to the cartridge body 10 such that the cartridge body 10 shakes, causing the electrical contact between the electrical contact surface 1131 and the second identification contact 916 to be unstable. To solve this problem, the fourth end 14 of the cartridge body 10 may be rotatably connected to a first swing lever 64*e*. The first swing lever 64*e* may be used to lock the lifting element and prevent the lifting element from moving in the up-down direction. Therefore, the electrical contact between the electrical contact surface 1131 and the second identification contact 916 may be stabler.

The lifting element may be also provided with a swing fitting part. The swing fitting part may be a bayonet 611*e* opened on the front wall of the first mounting member 61*e* and the front wall of the abutment member 62*e*. An avoidance groove 1411 may be provided in the middle of the handle 141 in the first direction for avoiding the first swing lever 64*e*. The first swing lever 64*e* may be rotatably connected to the side wall of the fourth end 14 of the cartridge body 10 through a pivot shaft 643*e*. The pivot shaft 643*e* may extend along the first direction, and the upper end of the first swing lever 64*e* may extend in a direction close to the cartridge body 10. The upper end of the first swing lever 64*e* may be used to receive the force of the door cover 95 to rotate in a direction close to the cartridge body 10. The lower end of the swing lever 64*e* may be provided with a swing lever locking part 642*e*. The swing lever locking part 642*e* may extend in the left-right direction. The swing lever locking part 642*e* may be used to cooperate with the swing lever matching part of the lifting element to lock the lifting element and prevent the lifting element from moving in the up-down direction. The swing lever locking part 642*e* may be specifically rod-shaped and used for inserting into the bayonet 611*e* of the first mounting member 61*e* and the bayonet 611*e* of the abutment component 62*e*.

The door cover 95 of the image forming device may be provided with a door abutment slope 961, and the front end of the door abutment slope may be higher than the rear end.

When the process cartridge is installed in the image forming device and the electrical contact surface 1131 is in contact with the second identification contact 916, the bayonet 611*e* of the first mounting member 61*e* and the bayonet 611*e* of the abutment member 62*e* may be aligned in the front-rear direction. Since the door cover 95 is closed, the door abutment slope 961 on the door cover 95 may contact the upper end of the first swing lever 64*e* and exert a force with a forward component, such that the first swing lever 64*e* rotates counterclockwise shown in FIG. 31*b*. That is, the upper end of the first swing lever 64*e* may move toward the direction close to the cartridge body 10. The swing lever locking part 642*e* at the lower end of the first swing lever 64*e* may swing backward, and the swing lever locking part 642*e* may swing into the two bayonet 611*e* that are aligned. The abutment member 62*e* and the first mounting member 61*e* may be locked, that is, the abutment member 62*e* may be unable to move relative to the first mounting member 61*e*, such the developing cartridge is rigidly supported and the electrical contact between the electrical contact surface 1131 and the second identification contact 916 is stable.

Furthermore, a reset elastic member 65*e* may also be provided between the first swing lever 64*e* and the cartridge body, and the reset elastic member 65*e* may be used to reset the first swing lever 64*e*. The reset elastic member 65*e* may be a tension spring. One end of the reset elastic member 65*e* may be connected to the first swing lever 64*e*, and the other end may be connected to the fifth end 15 of the cartridge body. The reset elastic member 65*e* may be positioned below the pivot shaft 643*e*. When the door cover is closed and the first swing lever 64*e* rotates, the reset elastic member 65*e* may be compressed. When the door cover 95 is opened, the upper end of the first swing link 64*e* may no longer receive the force of the door abutment slope 961 and may rotates in the direction away from the cartridge body 10 under the spring force of the reset elastic member 65*e*. The first swing lever 64*e* may swing clockwise, and the swing lever locking part 642*e* at the lower end of the first swing lever 64*e* may separate from the first mounting member 61*e* and the abutment member 62*e*. Therefore, when taking out the process cartridge from front to back, the process cartridge may be taken out by overcoming the elastic force of the elastic component. The reset elastic member 65*e* may also be disposed below the pivot shaft 643*e*, which can also achieve a reset effect.

Second Variation of Embodiment 5

Figure 28A:
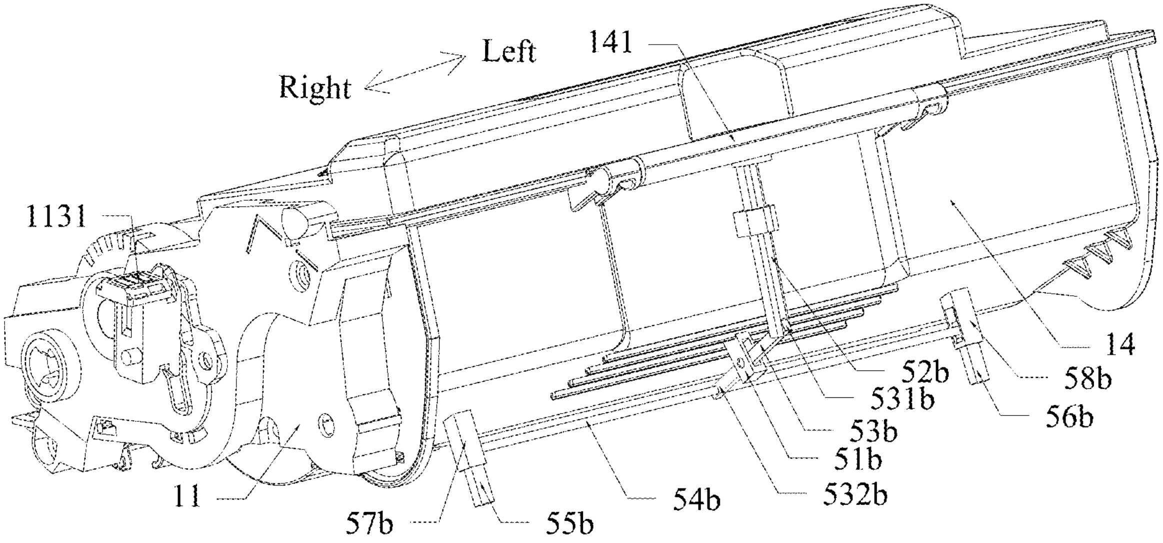
FIG. 28*a* illustrates another exemplary developing cartridge according to various disclosed embodiments of the present disclosure.
Figure 29:
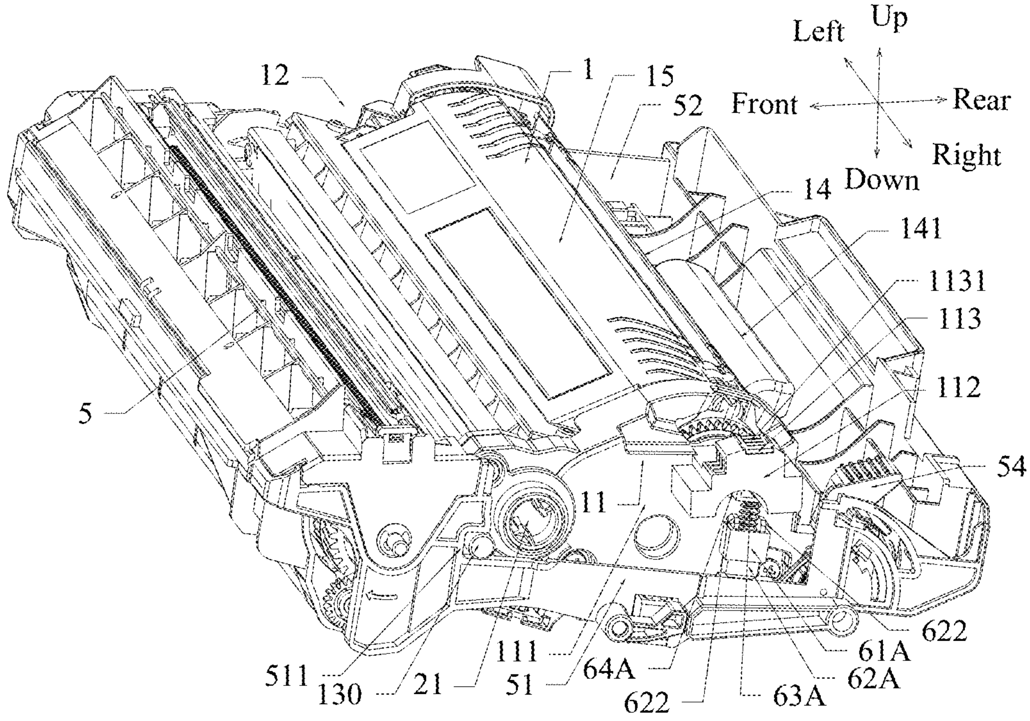
FIG. 29 illustrates another exemplary process cartridge according to various disclosed embodiments of the present disclosure.
Figure 30:
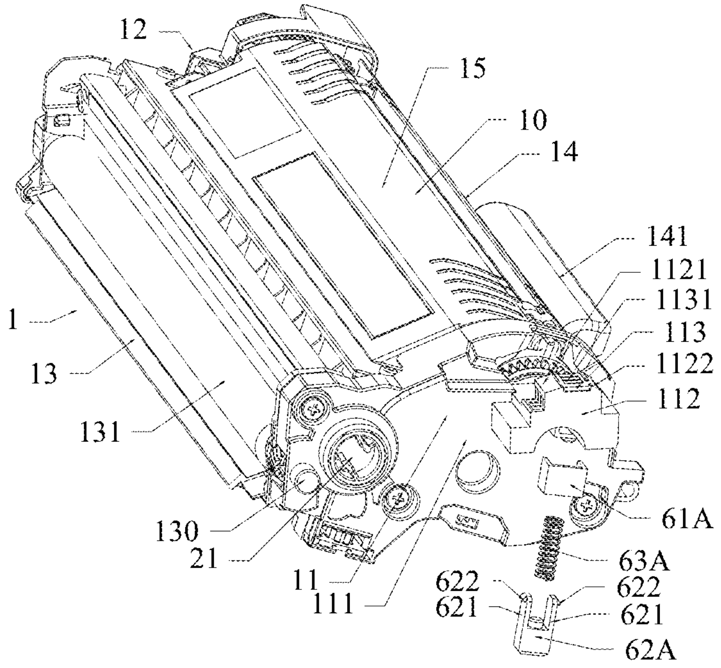
FIG. 30 illustrates an explosive view of an identification element in an exemplary developing cartridge according to various disclosed embodiments of the present disclosure.

In another variation shown in FIG. 28*a*, in addition to the abutment member, the lifting elastic member and the first mounting member, the lifting element may also include a force applying member, which is different from Embodiment 5. The force applying member may be movably connected to the developing cartridge. The force applying member may be used to drive the abutment member to move upward to compress the lifting elastic member. During the process of installing the process cartridge to the image forming device, the user may compress the lifting elastic member through the force applying member, such that the lifting elastic member is compressed to a greater extent before the identification element moves from back to front to be closer to the second upper guide part 916, facilitating the identification element to smoothly pass over the second upper guide part 914 from below and allowing the process cartridge to be installed smoothly. After the process cartridge is installed in the image forming device, the user may release his hand, and the developing cartridge 1 may move upward under the rebound force of the lifting elastic member, such that the electrical contact surface 1131 is electrically connected to the second identification contact 916.

The force applying member may include a first pressing member 52*b* and an adapter. The first pressing member 52*b* may move in the up-down direction relative to the cartridge body 10. The adapter may be rotatably connected to the cartridge body 10, and the lifting elastic member may abut against the first mounting member and the adapter. The lifting elastic member may expand and contract in the up-down direction, that is, may be elastically deformed. When the first pressing member 52*b* moves downward, it may drive the adapter to rotate, such that the lifting elastic member is compressed and then the storage medium 113 and the bracket 112 are able to avoid the second upper guide part 914. After the force on the first pressing member 52*b* is released, the developing cartridge 1 may be lifted upward relative to the drum cartridge 5 under the elastic force of the lifting elastic member, such that the electrical contact surface 113 comes into contact with the second identification contact 916.

The handle 141 may be rotatably connected to the cartridge body 10. The first pressing member 52*b* may extend in the up-down direction, and the upper end of the first pressing member 52*b* may be connected to the handle 141. The adapter may include a first link 53*b* extending in the front-rear direction and a second link 54*b* extending in the left-right direction. The rear end 531*b* of the first link may be connected to the lower end of the first pressing member 52*b*. The middle part of the first link may be rotatably connected to the cartridge body 10. The front end 532*b* of the first link may be connected to the second link 54*b*. The right end of the second link 54*b* may be fixedly connected to the upper end of the abutment member 55*b*. The lifting elastic member may extend in the up-down direction, and the lifting elastic member 55*b* may abut against the bottom wall 95*a* of the drum cartridge or the installation cavity.

The fourth end 14 of the cartridge body 10 may be provided with a first mounting member close to the sixth end 16. The first mounting member may include a first mounting part 51*b* and a second mounting part 57*b*. The first mounting part 51*b* may be positioned at the left side of the second mounting part 57*b* in the left-right direction, and may be positioned behind the second mounting part 57*b* in the front-rear direction. The first mounting part 51*b* may be used to mount the first link 53*b*, and the first link 53*b* may be rotatably connected to the first mounting part 51*b*. The second mounting part 57*b* may be used to install the second link 54*b* and the abutment member 55*b*. The second link 54*b* and the abutment member 55*b* may be movably connected to the second mounting part 57*b*. The lifting elastic member may be positioned between and abut against the second mounting part 57*b* and the upper end of the abutment member 55*b*, and may be used to provide elastic force for the second mounting part 57*b* and the abutment member 55*b*. The first mounting part 51*b* may have through holes in the front-rear directions. The first link 53*b* may be sleeved on the first mounting part 51*b* and rotatably connected with the first mounting part 51*b*. The left wall of the second mounting part 57*b* may have a hole for inserting the right end of the second link 54*b* to be fixedly connected with the abutment member 55.

When the developing cartridge 1 is installed on the drum cartridge 5 and the user does not hold the handle 141, the abutment member 55*b* of the first end 11 may abut against the third wall 53 and protrude relative to the second mounting part 57*b*. When the user installs the developing cartridge 1 and the drum cartridge 5 to the image forming device, the user may hold the handle 141 of the developing cartridge 1 such that the handle 141 rotates downward. The handle 141 may drive the first pressing member 52*b* to move downward. The lower end of the first pressing member 52*b* may drive the first link 53*b* to rotate. Currently, the rear end of the first link 53*b* may move downward, and the front end of the first link 53*b* may move upward. The first link 53*b* may drive the second link 54*b* to move upward. The second links 54*b* may drive the abutment member 55*b* to retract relative to the second mounting part 57*b* and the lifting elastic member 57 may be compressed, such that the storage medium 113 and the bracket 112 avoid the second upper guide part 916 and smoothly cross the second upper guide part. Then the process cartridge may stop moving forward. After the user releases his hand, the abutment member 55*b* may move downward under the rebound force of the lifting elastic member and contact the third wall 53 of the drum cartridge to lift the developing cartridge 1 upward. Therefore, the electrical contact surface may come into contact with the second upper guide part.

The second end 12 of the cartridge body 10 may also be provided with an abutment member 56*b*, a second mounting part 58*b*, an adapter and a second mounting part 54*b*. The second link 54*b* may extend to the left to the second mounting part 54*b* and fixedly connected to the abutment member 56*b*. The first pressing member 52*b* of this embodiment may be connected to the handle 141 to receive the force of the handle 141. The first pressing member 52*b* of some other embodiments may not be connected to the handle 141, but may directly receive the downward force of the user.

Embodiment 6

In another embodiment shown in FIG. 29 to FIG. 31*c*, the lifting element may be provided at the first end 11 of the cartridge body 10, which is different from Embodiment 5. During the installation process, when the identification element contacts the second upper guide part 914 and moves downward, the lifting element may abut against the side wall of the drum cartridge 5 and may be compressed, that is, may be elastically deformed, such that the identification element passes over the second upper guide part 914 and the electrical contact surface 1131 is in contact with and electrically connected to the second identification contact 916.

The lifting element may include a lifting elastic member 63A, an abutment member 62A and a first mounting member. The abutment member 62A may be used to abut against the first side wall 51 of the drum cartridge. The abutment member 62A may be movably connected to the first mounting member. The abutment member 62A may be able to move in the third direction relative to the first mounting member. The lifting elastic member 63A may be in contact between the abutment member 62A and the first mounting member, and the lifting elastic member 63A may expand and contract in the up-down direction, that is, may undergo elastic deformation.

The first mounting member may include a first mounting part 61A. The first mounting part 61A may be integrally formed on the right surface of the protective cover 111 of the first end 11 of the cartridge body 10. The first mounting part 61A may be provided with a holding through hole penetrating along the third direction such that the abutment member 62A is able to penetrate the first mounting part 61A. The abutment member 62A may be provided with deformation parts 621, so that the abutment member 62A may be deformed and installed into the first mounting part 61A. One deformation part 621 may be positioned at the front side of the abutment member 62A, and the other deformation part 621 may be positioned at the rear side of the abutment member 62A. Buckles 622 may be formed on the upper end of each deformation part 621. The two buckles 622 may be respectively connected to upper ends of the front wall and the rear wall of the first mounting part 61A respectively, to prevent the abutment member 62A from being separated from the first mounting part 61A when moving relative to the first mounting part 61A. The upper end of the abutment member 62A may be recessed inward to allow one end of the lifting elastic member 63A to be inserted. The first mounting member may also include a second mounting part 64A. The second mounting part 64A may be provided below the bracket 112 and above the first mounting part 61A. The other end of the lifting elastic member 63A may be in contact with the second mounting part 64A. The holding through hole may be preferably a rectangular hole, and the abutment member 62A may be preferably in the shape of a hexahedron, such that the front, rear, left, and right sides of the abutment member 62A may fit with the front, rear, left, and right side walls of the rectangular hole to prevent the abutment member 62A from rotating opposite to the first mounting part 61A. The second mounting part 64A may be integrally formed with the bracket 112 to reduce the number of the structures. The second mounting part 64A may also be formed independently of the bracket 112 in some other embodiments. The first mounting part 61A may also be mounted and fixed at the protective cover 111. In some other embodiments, the lifting elastic member 63A, the abutment member 62A, the first mounting member and the bracket 112 may also be directly provided on the cartridge body 10 without passing through the protective cover 111.

When the developing cartridge 1 is installed to the drum cartridge 5, the abutment member 62A may contact the upper end of the first side wall 51. Positional deviation may occur when the developing cartridge 1 is installed into the drum cartridge 5. When the first side wall 51 is too thin, there may be a problem that the abutment member 62A and the first side wall 51 are not aligned in the up-down direction and cannot abut. By providing a downward-opening slot at the lower end of the abutment member 62A, the first side wall 51 may be inserted into the slot of the abutment member 62A when the developing cartridge 1 is assembled on the drum cartridge 5, such that the abutment member 62A is able to abut against the first side wall 51.

During the installation process of the process cartridge, when the bracket 112 or the storage medium 113 or the electrical contact surface 1131 comes into contact with the second upper guide part 914, the second upper guide part 914 may exert a downward force on the identification element. The abutment member 62A may abut against the first side wall 51 such that the lifting elastic member 63A is compressed. Therefore, the developing cartridge 1 may swing clockwise at a certain angle along the A2 direction around the cartridge limiting part 130 relative to the drum cartridge 5, and the identification element may move downward relative to the drum cartridge 5 and the second upper guide part 914 for a certain distance to avoid the second upper guide part 914 and prevent the installation process of the developing cartridge from being blocked or the identification element being damaged by collision. After the bracket 112, the storage medium 113, and the electrical contact surface 1131 pass over the second upper guide part 914, under the elastic force of the lifting elastic member 63A, the developing cartridge may swing counterclockwise along the A1 direction to a certain extent around the cartridge limiting part 130, such that the bracket 112, the storage medium 113, and the electrical contact surface 1131 move upward for a certain distance, and the electrical contact surface 1131 comes into electrical contact with the second identification contact 916. The abutment member 62A of this embodiment may also be in contact with the lower guide rail 92, and may also achieve the effect of realizing electrical contact between the electrical contact surface 1131 and the second identification contact. The principle is the same and will not be described again. When the process cartridge is installed in the image forming device, the abutment member 62A may be movable along the lower guide rail 92.

Figure 59:
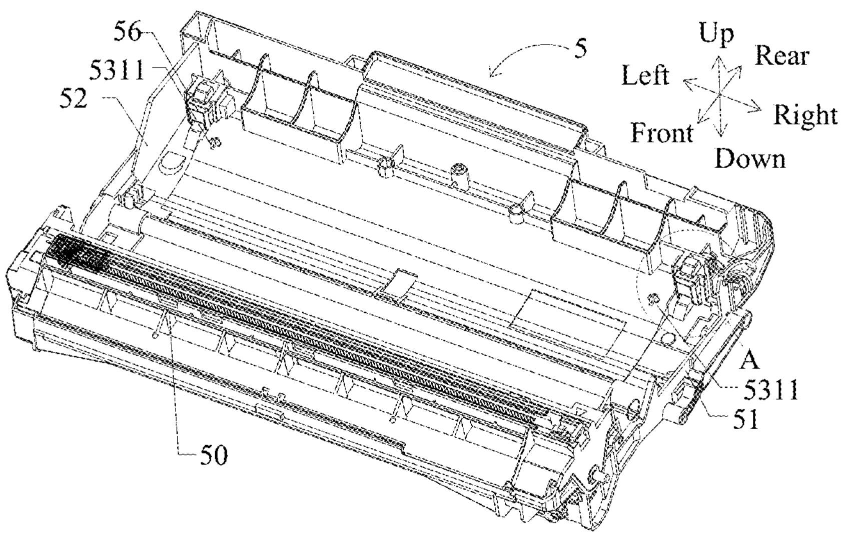
FIG. 59 illustrates a drum cartridge according to various disclosed embodiments of the present disclosure.
Figure 60:
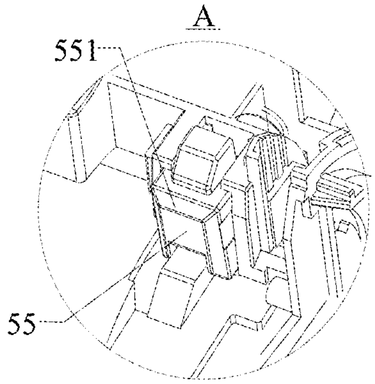
FIG. 60 illustrates an enlarged view of a part A in FIG. 59.

As shown in FIG. 59, the third wall 53 of the drum cartridge may be provided with a support protrusion 5311, and the sixth end 16 of the developing cartridge may be recessed upward corresponding to the position of the support protrusion 5311 to avoid the support protrusion 5311, thereby preventing the developing cartridge from being unable to rotate around the cartridge limit part 130 because of being supported by the support protrusion 5311.

Further, the distance between the lower end of the second upper guide part 914 in the image forming device and the lower end of the second identification contact 916 in the third direction may be L3. That is, after the electrical contact surface 1131 passes through the second upper guide part 914, the electrical contact surface 1131 may have a displacement of length at least L3 upward relative to the second identification contact 916 in the third direction to come into contact with the second identification contact 916. When the developing cartridge 1 is assembled to the drum cartridge 5 and moves downward relative to the drum cartridge 5, since the abutment member 62A abuts the upper end of the first side wall 51, a certain gap between the sixth end 16 of the developing cartridge 1 and the bottom of the third side wall 53 of the drum cartridge 5 may be necessary to prevent the developing cartridge from being blocked by the third side wall 53 and unable to move.

Figure 31:
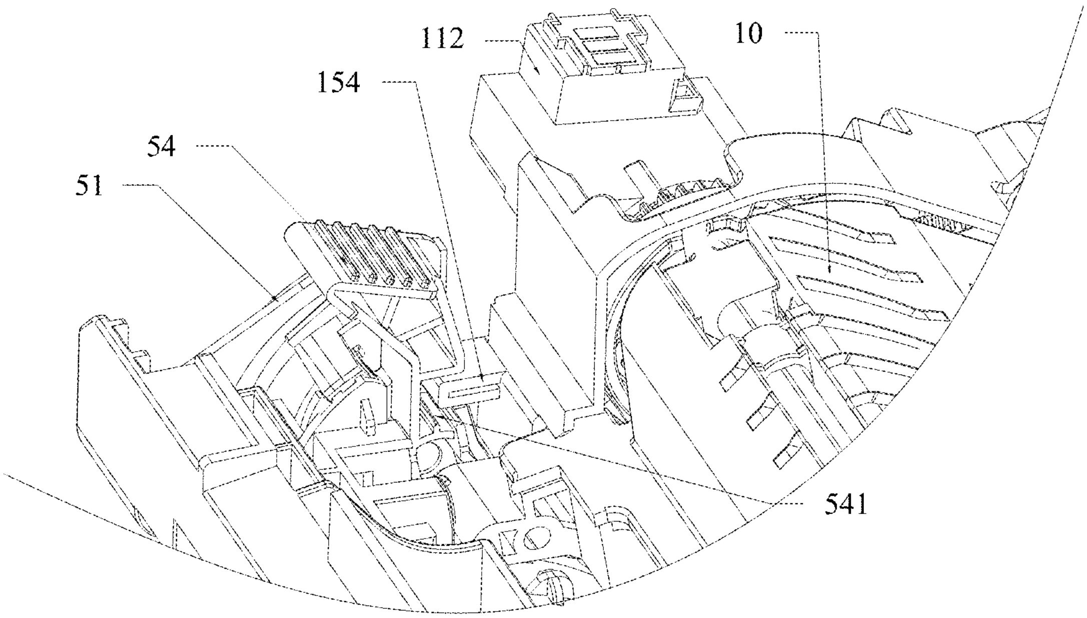
FIG. 31 illustrates a partial structure of an exemplary process cartridge according to various disclosed embodiments of the present disclosure.
Figure 31A:
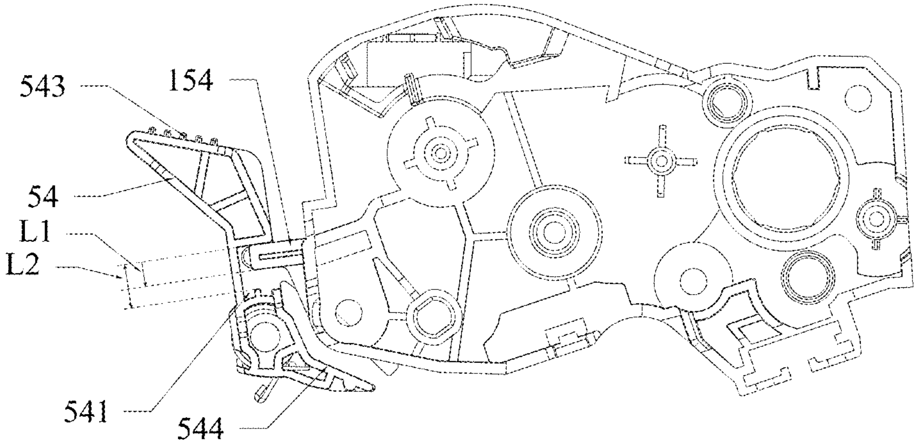
FIG. 31*a* illustrates an exemplary developing cartridge cooperating with a locking component according to various disclosed embodiments of the present disclosure.
Figure 31B:
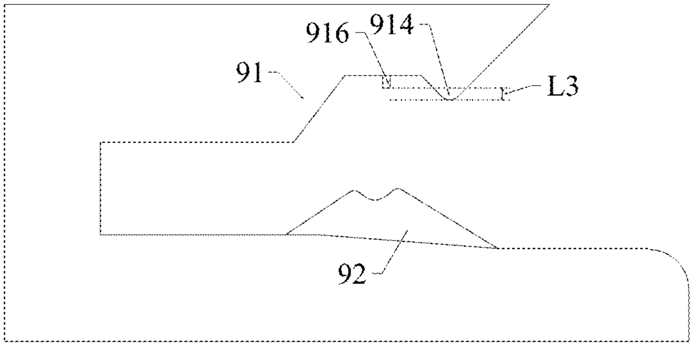
FIG. 31*b* illustrates a structure of a guide rail of an image forming device according to various disclosed embodiments of the present disclosure.
Figure 31C:
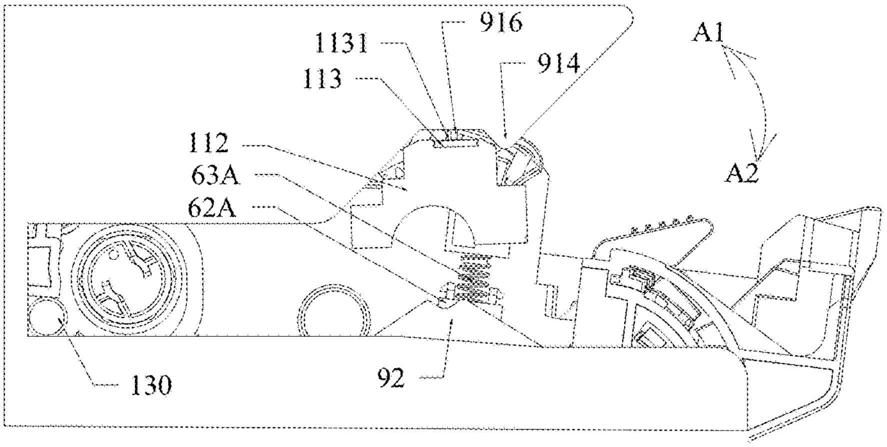
FIG. 31*c* illustrates a structure of an exemplary process cartridge installed in an image forming device according to various disclosed embodiments of the present disclosure.

The developing cartridge 1 may be provided with a locking protrusion 154, and the drum cartridge 5 may be provided with a locking member 54 with a locking groove 541. The locking protrusion 154 may be used to insert into the locking groove 541 to prevent the developing cartridge 1 from being separated from the drum cartridge 5 after being installed in the drum cartridge 5. For example, the locking protrusion 154 may be provided at the fourth end 14 and the locking member 54 may be installed on the first side wall 51 of the drum cartridge 5. The locking member 54 may be able to rotate around an axis extending in the first direction. The locking member 54 may include a pressing part 543 and a lifting part 544. The pressing part 543 may be positioned above the lifting part 544, and the lifting part 544 may be used to lift the developing cartridge 1. The locking member may also include an elastic arm. The elastic arm may be fixedly provided on the locking member 54 and may abut against the blocking protrusion fixedly provided on the first side wall 51 of the drum cartridge 5, causing the locking member 54 to be held in the locked position by the elastic arm. When the user presses the pressing part 543, the locking member 54 may rotate in the counterclockwise direction as shown in FIG. 31*a* and rotate from the locked position to the unlocked position. The elastic arm may be blocked by the blocking protrusion to generate elastic deformation and accumulate elastic potential energy. When the user does not press anymore, the elastic force of the elastic arm may cause the locking member 54 to reverse from the unlocked position to the locked position.

The locking protrusion 154 may be inserted into the locking groove 541 when the locking member 54 is in the locked position, thereby preventing the developing cartridge 1 from being separated from the drum cartridge 5. When the locking member 54 is in the unlocked position, the locking protrusion 154 may not be inserted into the locking groove 541, such that the developing cartridge 1 is able to be taken out from the drum cartridge 5.

When the developing cartridge 1 is installed into the image forming device with the locking member 54 locked to the drum cartridge 5, the developing cartridge 1 may rotate around the cartridge limiting part 130 under the action of the lifting element, and the locking protrusion 154 may move together with the developing cartridge 1, that is, the locking protrusion 154 may move relative to the locking member 54 in the locking groove 541. Therefore, the angle at which the developing cartridge is able to rotate around the cartridge limiting part 130 may be limited by the size of the locking groove 541 in the third direction. When the size of the locking groove 541 in the third direction is constant, the size of the angle at which the developing cartridge 1 is able to rotate around the cartridge limiting part 130 may be adjusted by changing the size of the locking protrusion 154 in the third direction. The size of the locking protrusion 154 in the third direction may be L1. The size of the locking groove 541 in the third direction may be L2, where L2−L1≥L3, thereby ensuring that the swing amplitude when the developing cartridge 1 swings around the cartridge limiting part 130 is sufficient to allow the identification element to avoid the second upper guide part 914. After the identification element crosses the second upper guide part 914, an upward displacement of at least a length L3 may be generated, such that the electrical contact surface 1131 is able to make electrical contact with the second identification contact 916.

Through the above arrangement, the structure or size of the locking member of the existing drum cartridge may not need to be improved, but only the structure or size of the locking protrusion of the developing cartridge may need to be improved to satisfy L2−L1≥L3 and user needs. Only the developing cartridge needs to be replaced, which also reduces development costs.

In some embodiments, the locking groove 541 may also be provided on the locking mating member, and the locking member 54 may be a locking protrusion structure, which may also achieve the above effect. In some embodiments, the locking member 54 and the locking mating member may be elastically matched. When L2−L1<L3, the developing cartridge and its electrical contact surface 1131 may also generate a displacement by a length of at least L3 in the third direction after passing through the second upper guide part 914, thereby achieving electrical contact. In some embodiments, the lifting element may be provided at both the first end 11 and the second end 12 of the cartridge body 10, or only at the second end 12. The bracket 112, the electrical contact surface 1131 or the storage medium 113 may be also provided with a first guide slope 1121 and/or a second guide slope 1122. It can be understood that the same effect can be achieved even if the specific structure of the lifting element in this embodiment adopts the arrangement method of the lifting element in Embodiment 5 and its variations. The arrangement of the locking protrusion 154 and the locking member 54 of this embodiment may also be applied to Embodiment 5 to Embodiment 11 and their variations, and the same effect can be achieved.

In some embodiments, in the second direction, the lifting elastic member may be positioned behind the developing roller or the driving receiving part, and the lifting elastic member may be positioned in front of the locking protrusion or the push elements. In the third direction, the lifting elastic member may be positioned below the electrical contact surface. The lifting elastic member may be positioned at the side of the stirring gear facing away from the developing roller in the second direction. When the developer cartridge is installed into the image forming device with the drum assembly, the abutment member may move forward along the lower guide rail. When the developer cartridge moves forward until the storage medium and the electrical contact surface abut against the second upper guide part (protrusion) of the upper guide rail, the lifting elastic member may be compressed such that the developer cartridge as a whole moves downward and avoids the protrusion. After the electrical contact surface passes over the protrusion, the elastic force of the lifting elastic member may be restored, and the developer cartridge may be lifted upward, such that the electrical contact surface makes electrical contact with the second identification contact. The bracket may be formed integrally with the protective cover, with one part of the bracket being used to support the storage medium and the electrical contact surface, and the other part being used to install the lifting elastic member and the abutment member. These two parts of the bracket may actually be separate structures. The lifting elastic member may abut between the bracket and the abutment member.

Embodiment 7

Figure 32:
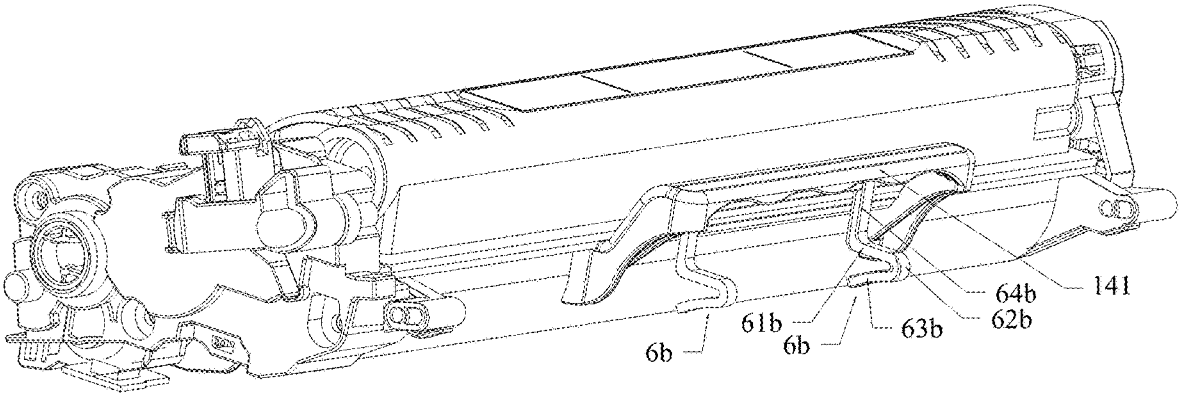
FIG. 32 illustrates another exemplary developing cartridge according to various disclosed embodiments of the present disclosure.

In another embodiment shown in FIG. 32, the way for the lifting element to realize the electrical contact between the identification element and the second upper guide part 916 may be same as Embodiment 5, while the lifting elastic member of the lifting element in the present embodiment may be an elastic rib 6*b*, which is different from Embodiment 5. The elastic rib 6*b* may undergo elastic deformation. The elastic rib 6*b* may be provided at the fourth end 14 of the cartridge body 10. The elastic rib 6*b* may abut against the third side wall 53 of the drum cartridge 5, thereby providing the developing cartridge 1 with a force to move upward relative to the drum cartridge 5. For example, the elastic rib 6*b* may be provided on the handle 141. The elastic rib 6*b* may include a first part 61*b*, a bent part 62*b*, a second part 63*b* and a connecting part 64*b*. The first part 61*b* and the second part 63*b* may extend in the front-rear direction, and may be connected through the bent part 62*b*. The second part 63*b* may be used to connect with the third side wall 53. The connecting part 64*b* may extend in the up-down direction, and two ends of the connecting part 64*b* may be connected to the first part 61*b* and the handle 141 respectively, such that the elastic rib 6*b* is able to extend to a position in contact with the third side wall 53 to avoid not touching the third side wall 53. The elastic rib 6*b* may have good elastic support. The elastic rib 6*b* may be an integrally formed part or may include connected separate parts. The elastic rib 6*b* may be made of elastic material or may be elastic due to its structural arrangement. The elastic rib 6*b* may be integrally formed with the cartridge body 10 or installed on the cartridge body 10. The elastic rib 6*b* may have a simple structure and may be integrally formed with the cartridge body 10 to reduce costs.

Figure 33:
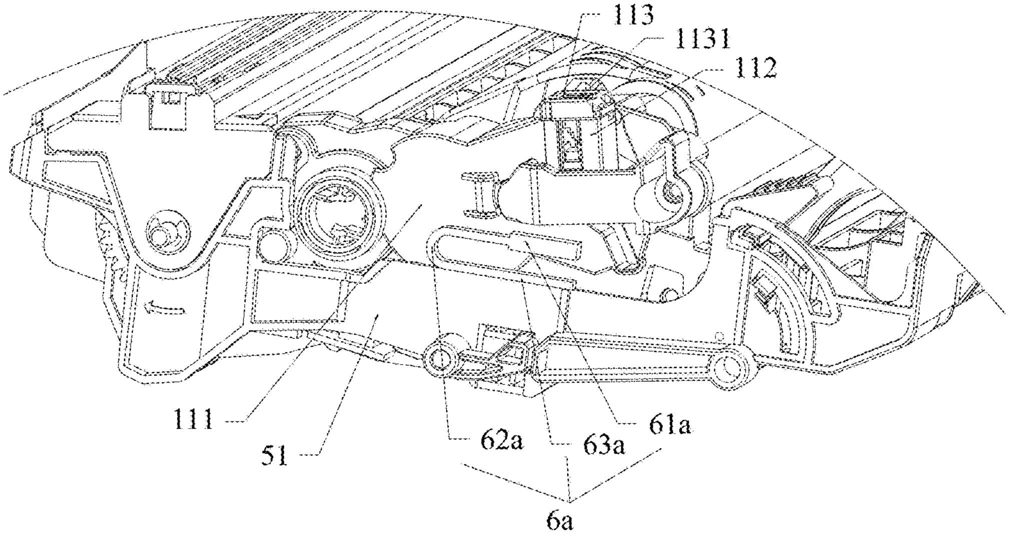
FIG. 33 illustrates another exemplary process cartridge according to various disclosed embodiments of the present disclosure.

In a variation of Embodiment 7 shown in FIG. 33, the elastic rib 6*a* may be arranged at the first end 11 of the cartridge body 10, and the elastic rib 6*a* may be in contact with the first side wall 51 of the drum cartridge 5. For example, the elastic rib 6*a* may be arranged in a U shape, and the elastic rib 6*a* may include a first part 61*a*, a bent part 62*a*, and a second part 63*a*. The first part 61*a* may be connected to the protective cover 111, the second part 63*a* may be connected to the first part 61*a* through the bent part 62*a*, and the second part 63*a* may be used to abut the upper end of the first side wall 51 of the drum cartridge 5. The elastic rib 6*a* may be U-shaped, such that the elastic rib 6*a* has good elasticity and the developing cartridge 1 is elastically supported. The elastic rib 6*a* may be preferably integrally formed with the protective cover 111 or the cartridge body 10. The elastic rib 6*a* may also be provided at the second end 12 for contacting the second side wall 52.

The structures of the lifting element in Embodiment 5 to Embodiment 7 and their variations may be interchanged, to achieve similar benefits. For example, the lifting element in Embodiment 5 may be adopted in the variation of Embodiment 7, and similar benefits may be achieved.

Embodiment 8

Figure 34:
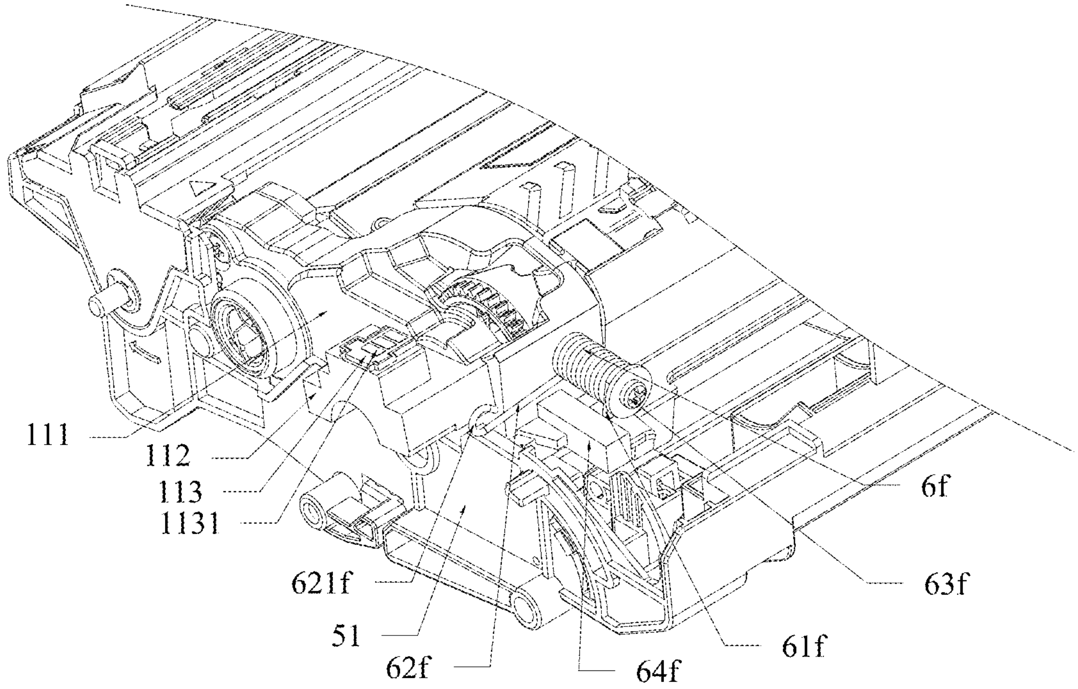
FIG. 34 illustrates a partial structure of another exemplary process cartridge according to various disclosed embodiments of the present disclosure.

In another embodiment shown in FIG. 34, the lifting element may include a lifting elastic member 6*f*, which is different from Embodiment 5. The lifting elastic member 6*f* may extend in the front-rear direction. The lifting elastic member 6*f* may be sleeved at the fourth end 14 of the cartridge body 10. During the installation process, one end of the lifting elastic member 6*f* may abut against the upper end of the side wall of the drum cartridge 5. When the identification element abuts the second upper guide part 914, the developing cartridge 1 may move downward and cross the second upper guide part against the upward force of the side wall of the drum cartridge 5 and the elastic force of the lifting elastic member.

The lifting element may include a first mounting member and the lifting elastic member 6*f*. The lifting elastic member 6*f* may be sleeved on the first mounting member. The lifting elastic member 6*f* may extend in the front-rear direction. The lifting elastic member 6*f* may include a first arm 61*f* and a second arm 62*f*. The first arm 61*f* may abut against the lower end of the first mounting member, and the second arm 62*f* may abut against the upper end of the side wall of the drum cartridge 5. The first mounting member may include a first mounting part and a limiting member 64*f* fixedly provided at the rear end of the protective cover 111. Both the first mounting part and the limiting member 64*f* may protrude rearward, and the first mounting part may be rod-shaped. The lifting elastic member 6*f* may be a torsion spring. The lifting elastic member 6*f* may extend in the front-rear direction and may be sleeved on the first mounting part. The first arm 61*f* of the lifting elastic member 6*f* may abut against the lower end of the limiting member 64*f* to be limited in the upward direction, and the second arm 62*f* may abut against the upper end of the first side wall 51 of the drum cartridge 5 to be upwardly supported. The first arm 61*f* may be limited in the upward direction and the second arm 62*f* may receive an upward supporting force to prevent the lifting elastic member 6*f* from rotating.

During the installation process of the process cartridge, the developing cartridge 1 may be abutted by the second upper guide part 914 and receive a downward force. The developing cartridge may overcome the upward supporting force received by the second arm 62*f* of the lifting elastic member. The second arm **62*f* may deform, causing the developing cartridge to move downward and the identification element to cross the second upper guide part 914. Under the elastic recovery of the lifting elastic member 6*f*, the developing cartridge 1 may move upward relative to the drum cartridge 5, and the electrical contact surface 1131 may move upward and make electrical contact with the second identification contact 916**.

The rear end of the first mounting part may also be provided with a second anti-detachment part **63*f*, and the second anti-detachment part 63*f* may be a protruding structure or a threaded structure. The second anti-detachment part 63*f* may be provided with a threaded structure. Therefore, when the first mounting part and the protective cover 111 are integrally formed, the second anti-detachment part 63*f* may be connected with the first mounting part through threads after the lifting elastic member 6*f* is sleeved on the first mounting part, to prevent the lifting elastic member 6*f* from being detached backward. The second arm 62*f* of the lifting elastic member 6*f* may be provided with a bent part 621*f*. The bent part 621*f* may be used to prevent the end of the second arm 62*f* from scratching the drum cartridge 5. The bent part 621*f*** may be set in an arc shape.

The first arm **61*f* that lifts the elastic member 6*f* may be positioned behind the second arm 62*f*, or may be positioned in front of the second arm 62*f*. The first mounting part may be integrally formed with the protective cover 111 or the cartridge body 10, or can be installed and fixed at the protective cover 111 or the cartridge body 10. The first mounting part of this embodiment may be provided at the protective cover 111, which shortens the distance between the second arm 62*f* of the lifting elastic member 6*f* and the first side wall 51 to facilitate the installation of the lifting elastic member 6*f*. The first mounting part and the limiting member 64*f* may be separate structures in this embodiment. In some other embodiments, the first mounting part and the limiting member 64*f* may be integrally formed or installed and fixed together. In some other embodiments, the first mounting part and the limiting member 64*f* may also be directly provided on the cartridge body 10, or one of them may be provided on the cartridge body 10 and the other may be provided at the protective cover 111. The second arm 62*f* of the lifting elastic member 6*f* may also extend backward to abut the upper end of the third side wall 53. The lifting elastic member 6*f* may be provided at the first end 11 or the second end 12**, or at both ends.

Figure 35:
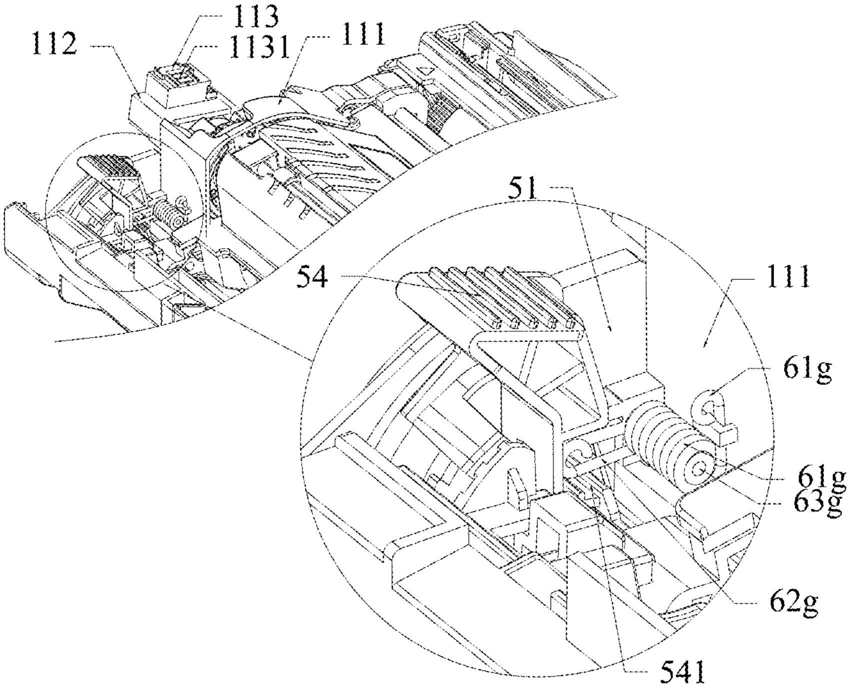
FIG. 35 illustrates a partial structure of another exemplary process cartridge according to various disclosed embodiments of the present disclosure.

In a variation of Embodiment 8 shown in FIG. 35, the first mounting part **63*g* at the rear end of the protective cover 111 may extend along the left-right direction, and the lifting elastic member 6*g* may extend along the left-right direction and may be sleeved on the first mounting part 63*g*. The first arm 61*g* of the lifting elastic member 6*g* may be inserted into the limiting member at the rear end of the protective cover 111 to prevent the lifting elastic member 6*g* from rotating. The second arm 62*g* may be inserted into the locking groove 541 and abut against the lower wall of the locking groove 541 to receive upward support force. Other arrangements of the first mounting part 63*g*** and the limiting member may be the same as in Embodiment 8.

The lifting element in Embodiment 5 to Embodiment 8 and their variations may be able to undergo elastic deformation, such that the storage medium 113 on the developing cartridge 1 is able to avoid the second upper guide part 914 when abutting against the second upper guide part 914. On the one hand, the developing cartridge 1 may be smoothly installed in place, and the storage medium 113 may make electrical contact with the second identification contact 916. On the other hand, the storage medium 113 may be prevented from being unable to move forward due to contact with the second upper guide part 914, thereby avoiding damage.

Embodiment 9

Figure 36:
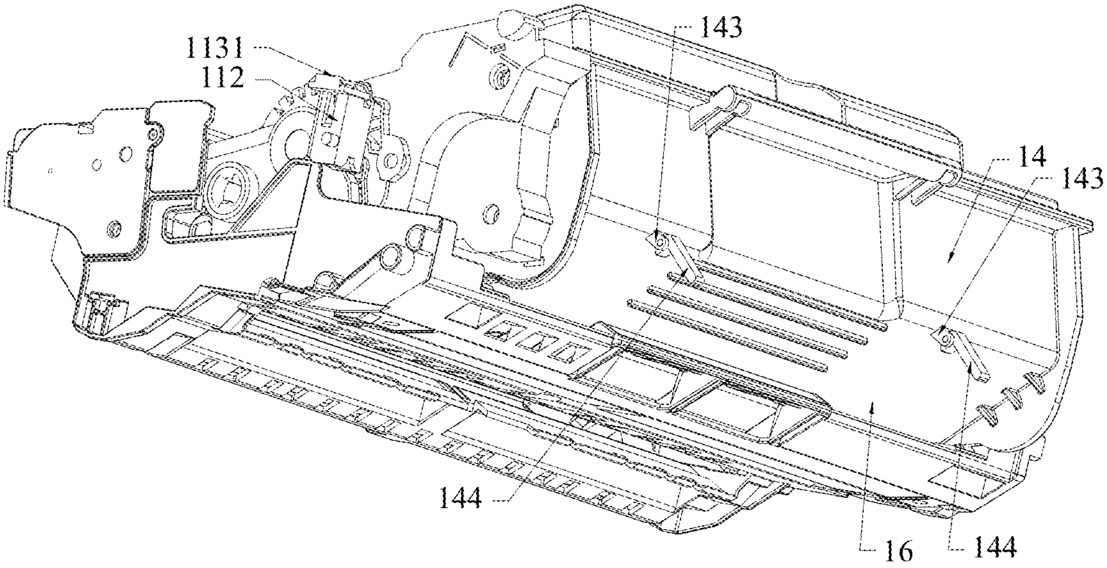
FIG. 36 illustrates another exemplary developing cartridge according to various disclosed embodiments of the present disclosure.

In another embodiment shown in FIG. 36 and FIG. 37, the lifting element 144 may be disposed at the fourth end 14 of the developing cartridge 1, which is different from Embodiment 1. The lifting element 144 may be rotatably connected to the developing cartridge 1. The lifting element 144 may be used to receive the force of the door cover 95 and lift the developing cartridge 1 relative to the drum cartridge 5. For example, the lifting element may be disposed at the fourth end 14 of the developing cartridge. The lifting element may include a rotating mounting part 143 and a rotating member 144. The rotating mounting part 143 may be fixedly arranged at the fourth end 14 of the developing cartridge. The rotating member 144 and the rotating mounting part 143 may be rotatably connected. The rotation axis of the rotating member 144 may extend along the first direction. The rotating member 144 may be rod-shaped for easy rotation. The rotating member 144 may be disposed at the fourth end 14 of the cartridge 10 in the second direction. The upper end of the rotating member 144 may be rotatably connected to the cartridge body 10 through the rotating mounting part 143. The lower end of the rotating member 144 may abut against the bottom wall **95*a* of the installation cavity or the third side wall 53 of the drum cartridge. The rotating member 144 may be used to receive the force of the door cover 95**.

When the process cartridge is installed in the image forming device and the door cover 95 is not closed, the rear end of the rotating member 144 may be further back and lower than the rotating mounting part 143, and the rear end of the rotating member 144 may abut against the bottom wall **95*a* of the installation cavity. Further, the electrical contact surface 1131 may be positioned below the second identification contact 916 and may not be in contact with the second identification contact 916. When the door cover 95 rotates and closes, the door cover 95 may push the lower end of the rotating member 144 such that the lower end of the rotating member 144 swings forward around the rotating mounting part 143. That is, the lower end of the rotating member 144 may rotate in a direction close to the developing roller 131. Since the rotating member 144 abuts against the bottom wall 95*a* of the installation cavity, the bottom wall 95*a* of the installation cavity may provide an upward support force to the rotating member 144, such that the rotating member 144 drives the developing cartridge 1 to swing upward around the cartridge limiting part 130. Therefore, the electrical contact surface 1131 may come into contact with the second identification contact 916. And, under the contact force of the door cover 95, the electrical contact surface 1131 may remain in contact with the second identification contact 916**.

In this embodiment, the rotating member 144 may be disposed at the sixth end 16 of the cartridge body 10 in the third direction, such that the lower end of the rotating member 144 abuts against the bottom wall **95*a* or the third side wall 53 of the drum cartridge. In some other embodiments, the rotating member 144 may also be disposed at the fifth end 15 of the cartridge body 10 in the third direction, and the rotating member 144 may extend downward from the fifth end 15. The rotating member 144 may be block-shaped. The rotating mounting part 143 may be integrally formed with the cartridge body 10** or the protective cover 111, or may be installed and fixed on the cartridge body 10 or the protective cover 111. The lifting element of this embodiment may be provided solely at the first end 11 or the second end 12 in the first direction, or may be provided on both ends.

First Variation of Embodiment 9

Figure 38:
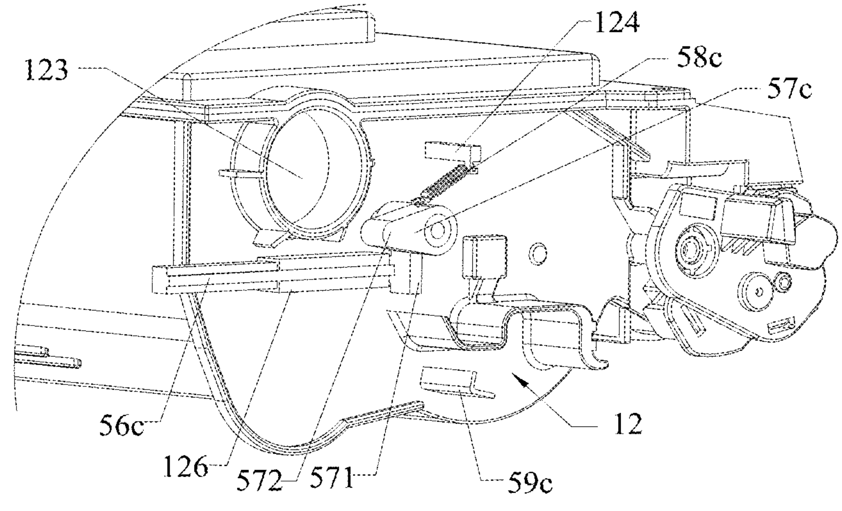
FIG. 38 illustrates another exemplary developing cartridge according to various disclosed embodiments of the present disclosure.
Figure 40:
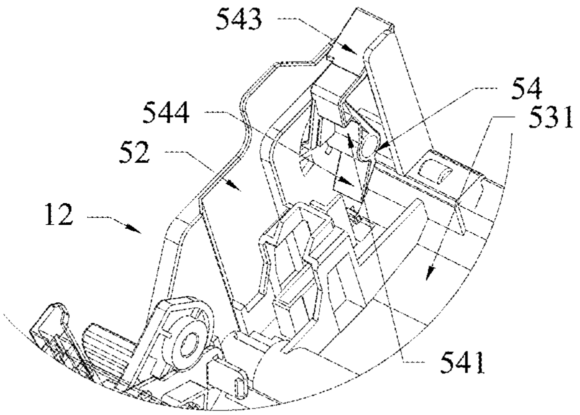
FIG. 40 illustrates a drum cartridge according to various disclosed embodiments of the present disclosure.

In another embodiment shown in FIG. 38 and FIG. 40, the lifting element may be disposed at the second end 12 of the cartridge body 10. The lifting element may be used to receive the force of the door cover 95 and cooperate with the drum cartridge to lift the developing cartridge 1 relative to the drum cartridge 5. The lifting element may include a sliding member 56c, a rotating member 57c and a lifting member 59c. The sliding member 56c may extend along the second direction. The sliding member 56c may be used to receive the force of the door cover 95. The rotating member 57c may be used to receive the force of the sliding member 56c and rotate. The lifting member 59c may be used to receive the force of the sliding member 56c to lift the developing cartridge 1 upward.

The rotation axis of the rotating member 57c may extend along the first direction. The first end part 571 of the rotating member 57c may be used to receive the contact force exerted by the sliding member 56c, to make the rotating member 57c rotate. The second end part 572 of the rotating member 57c may be used to abut against the drum cartridge when the rotating member 57c rotates, to make the components on the drum cartridge 5 rotate and provide upward lifting force to the lifting member 59c on the developing cartridge 1, such that the developing cartridge 1 is lifted relative to the drum cartridge 5. Therefore, the contact between the electrical contact surface 1131 and the second identification contact 916 may be realized. The first end part 571 may be positioned below the second end part 572.

The second end 12 of the cartridge body 10 may be provided with a guide rail 126, and the sliding member 56c may be slidingly connected to the guide rail 126. The lifting element may also include a reset elastic member 58c. The reset elastic member 58c may be used to provide a reset elastic force for the rotating member 57. The second end 12 of the cartridge body 10 may be also provided with a connecting protrusion 124. One end of the reset elastic member 58c may be connected to the connecting protrusion 124, and the other end of the reset elastic member 58c may be connected to the second end part 572 of the rotating member 57. The reset elastic member 58c may be preferably a tension spring. The lifting member 59c may protrude leftward from the side wall of the second end 12 of the cartridge body 10 in the first direction, and may be positioned below the sliding member 56c and the rotating member 57c in the third direction.

Figure 39:
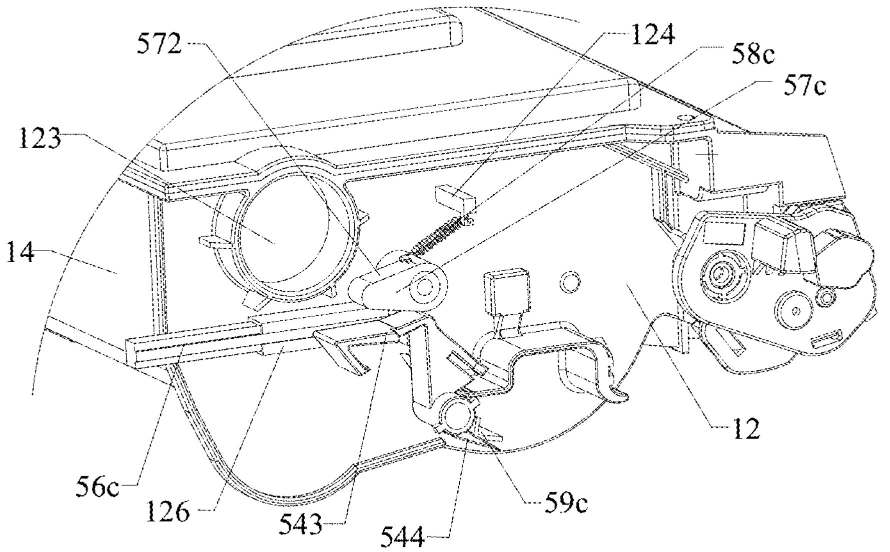
FIG. 39 illustrates a rotating member and a locking member cooperating with each other, according to various disclosed embodiments of the present disclosure.

The drum cartridge 5 may be also provided with a locking member 54 close to the second side wall 52. When the developing cartridge 1 is installed into the drum cartridge 5, the second end part 572 of the rotating member 57c may be positioned above the pressing part 543 of the locking member 54, and the lifting member 59c may be positioned above the lifting part 544 of the locking member 54 in the third direction. During the installation process of the process cartridge, the storage medium 113 may be positioned below the second upper guide part 914 and may smoothly pass over the second upper guide part 914. At this time, the storage medium 113 may be positioned below the second identification contact 916 and may be not connected to the second upper guide part 914. When the door cover 95 is closed, the sliding member 56c may be abutted by the door cover 95 and may move relative to the cartridge body 10 in the second direction to abut against the first end part 571 of the rotating member 57c, such that the rotating member 57c may rotate in the counterclockwise direction (in the angle of view in FIG. 38 and FIG. 39). That is, the upper end of the rotating member 57c may rotate in the direction away from the developing roller 131 and the lower end of the rotating member 57c may rotate in the direction close to the developing roller 131. The second end part 572 of the rotating member 57c may abut against the pressing part 543 of the locking part 54 and cause the locking part 54 to rotate in the same direction. Then, the lifting part 544 of the locking part 54 may abut against the lifting member 59c and exert an upward force on the lifting member 59c, such that the fourth end 14 of the cartridge body 10 moves upward relative to the drum cartridge 5 and the electrical contact surface 1131 comes into contact with the second identification contact 916. During this process, the reset elastic member 58c may be stretched.

When taking out the process cartridge, the door cover 95 may be opened, the sliding member 56c may lose the contact force of the door cover 95, the rotating member 57c may rotate clockwise under the elastic force of the reset elastic member 58c, and the locking member 54 may rotate in the same direction, such that the developing cartridge 1 may return to the initial position. Therefore, the process cartridge may be taken out of the image forming device.

In the present embodiment, the lifting element may be disposed at the second end 12 and may be applied to the drum cartridge whose locking member 54 is disposed on the second side wall 52. That is, the lifting element at the second end 12 may correspond to the locking member 54 of the second side wall 52, and there may be no need to adjust the position of the locking member of the drum cartridge. It may be applied to the existing drum cartridge 1. In some other embodiments, the lifting element may also be disposed at the first end 11, and correspondingly, the locking member 54 of the drum cartridge may be disposed on the first side wall 51.

Second Variation of Embodiment 9

Figure 41:
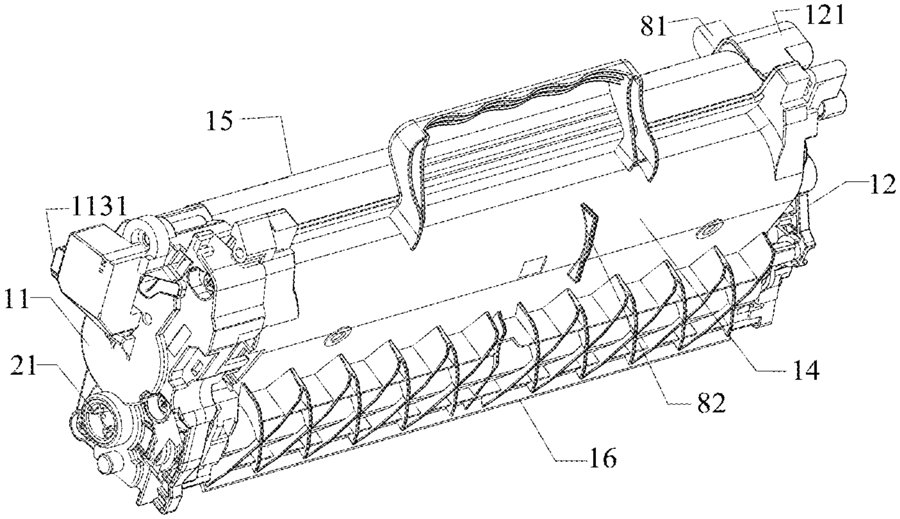
FIG. 41 illustrates another exemplary developing cartridge according to various disclosed embodiments of the present disclosure.

In another variation of Embodiment 9 shown in FIG. 41, the lifting element may include a pressing protrusion 81 and a support protrusion 82. The pressing protrusion 81 may be provided at the second end 12 and the fifth end 15 of the cartridge body 10. The pressing protrusion 81 may be used to receive the downward pressing force of the door cover 95. The support protrusion 82 may be provided at the sixth end 16 of the cartridge body 10. The support protrusion 82 may be used to support the developing cartridge 1 such that the developing cartridge 1 is able to rotate around the support protrusion 82 in the up-down direction. In a state where the developing cartridge 1 is installed into the drum cartridge 5 and both are not installed to the image forming device, the first end 11 of the developing cartridge 1 may be lower than the second end 12 in the third direction. During the installation process of the process cartridge, the electrical contact surface 1131 of the first end 11 may be positioned below the second upper guide part 914 and smoothly pass over the second upper guide part 914. At this time, the electrical contact surface 1131 may not come into contact with the second identification contact 916. When the door cover 95 is closed, the upper part of the door cover 95 may abut against the pressing protrusion 81 and exert a downward contact force on the pressing protrusion 81 of the second end 112, such that the second end 12 of the developing cartridge 1 moves downward around the support protrusion 82 and the first end 11 moves upward. When the door cover 95 is completely closed, the developing cartridge 1 may no longer move, the door cover 95 may remain in contact with the pressing protrusion 81, and the electrical contact surface 1131 may remain in contact with the second identification contact 916.

The second end 12 of the cartridge body 10 may be provided with another protective cover 121. The pressing protrusion 81 may be integrally formed with the protective cover 121 of the second end 12. The pressing protrusion 81 may protrude upward from the top wall of the fifth end 15 of the cartridge body 10. The pressing protrusion 81 may be closer to the second end 12 than the electrical contact surface 1131 in the first direction, and further away from the developing roller 131 than the electrical contact surface 1131 in the second direction. The support protrusion 82 may protrude from the bottom wall of the sixth end 16 and extend along the second direction. The support protrusion 82 may be positioned between the first end 11 and the second end 12 in the first direction. The support protrusion 82 may be used to abut against the drum cartridge 5 or the bottom wall of the installation cavity of the image forming device, such that the cartridge body 10 is able to rotate up and down around the support protrusion 82. In some embodiments, the pressing protrusion 81 may also be fixedly installed at the second end 12 of the protective cover 121, or the pressing protrusion 81 may be directly provided on the cartridge body 10. In some embodiments, the support protrusion 82 may be disposed at the fourth end 14 of the developing cartridge in the second direction. The front end of the pressing protrusion 81 may have a pressing slope. The pressing slope may be used to receive the force of the door cover 95. The upper end of the pressing slope may be relatively further back than the lower end. In this way, when the door cover 95 acts on the pressing slope of the pressing protrusion 81, the second end 12 of the developing cartridge may receive a backward force in the second direction, ensuring that the developing cartridge 1 is able to rotate around the support protrusion 82 at its rear end and the first end 11 of the developing cartridge swings upward. By arranging the support protrusion 82 at the rear end of the developing cartridge 1, the layout of the bottom structure of the developing cartridge may be facilitated. The second end 12 of the developing cartridge may be set higher than the first end 11, such that the developing cartridge 1 is able to rotate around the support protrusion 82 when the support protrusion 82 receives the downward pressing force of the door cover 95. In some other embodiments, the second end 12 of the developing cartridge may be lower than the second end 12, as long as the first end 11 of the developing cartridge is able to rotate upward to make the electrical contact surface come into electrical contact with the second identification contact 916 when the door cover acts on the pressing protrusion 81 and the developing cartridge rotates around the support protrusion 82.

In some other embodiments, the support protrusion 82 may not be provided on the developing cartridge 1, but may be provided on the drum cartridge 5. The support protrusion 82 may protrude upward relative to the bottom of the drum cartridge 5. When the developing cartridge 1 is installed on the drum cartridge 5, the support protrusion 82 may abut against the sixth end 16 of the developing cartridge 1, and the first end 11 may be lower than the second end 12 in the third direction in the initial state. It is understood that the pressing protrusion 81 may also be provided on the second side wall 52 of the drum cartridge 5 to receive the force of the door cover 85, such that the developing cartridge and the drum cartridge as a whole are lifted upward relative to the image forming device.

Third Variation of Embodiment 9

Figure 42:
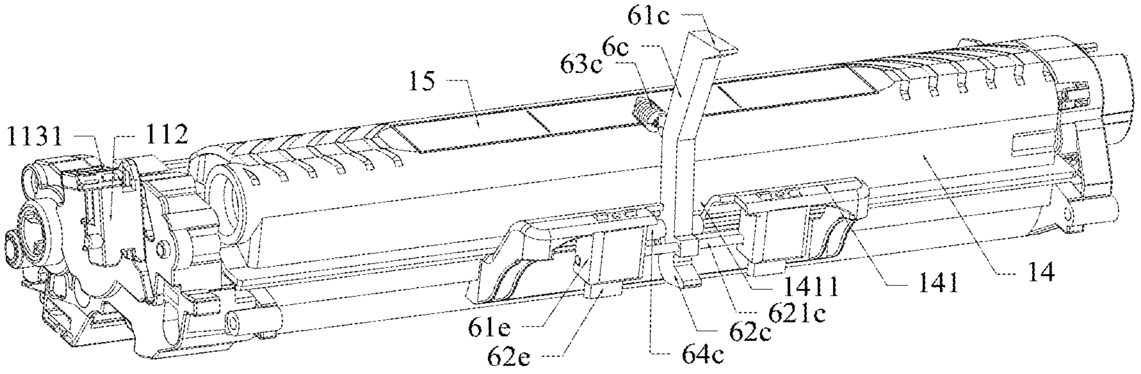
FIG. 42 illustrates another exemplary developing cartridge according to various disclosed embodiments of the present disclosure.
Figure 43:
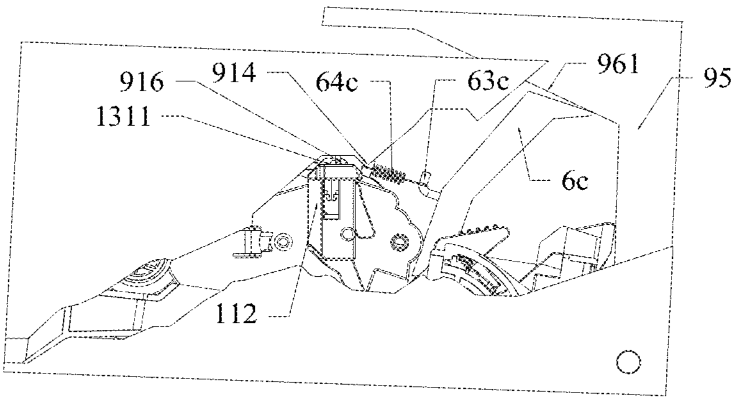
FIG. 43 illustrates another exemplary developing cartridge cooperating with a cover of an image forming device, according to various disclosed embodiments of the present disclosure.

In another variation of Embodiment 9 shown in FIG. 42 and FIG. 43, the rotating member of the lifting element may be a second swing lever **6*c*. The second swing lever 6*c* may be rotatably connected to the cartridge body 10. When the second swing lever 6*c* rotates, the developing cartridge may be lifted upward, such that the electrical contact surface may be electrically connected to the second identification contact. The second swing lever 6*c* may extend along the third direction, and the rotation axis of the second swing lever 6*c* may extend along the first direction. The upper end of the second swing lever 6*c* may be used to receive the force of the door cover, such that the upper end of the second swing lever 6*c* rotates in the direction away from the cartridge body 10. The lower end of the second swing lever 6*c* may abut against the drum cartridge 5 and lift up the developing cartridge 1 relative to the drum cartridge 5**, such that the electrical contact surface comes into contact with the second identification contact.

The avoidance groove 1411 of the handle 141 may avoid the second swing lever **6*c*. The second swing lever 6*c* may be rotatably connected to the side wall of the fourth end 14 of the cartridge body through a pivot shaft 64*c*. The pivot shaft 64*c* may extend along the first direction. The upper end of the second swing lever 6*c* may be provided with a force receiving part 61*c*, and the lower end of the second swing lever 6*c* may be provided with a force applying part 62*c*. The pivot shaft may be positioned between the force receiving part 61*c* and the force applying part 62*c*. Both the force receiving part 61*c* and the force applying part 62*c* may be protrusions extending rearward. The force receiving part 61*c* may form a cam mechanism when the force applying part 62*c*** rotates around the pivot shaft.

Figure 53:
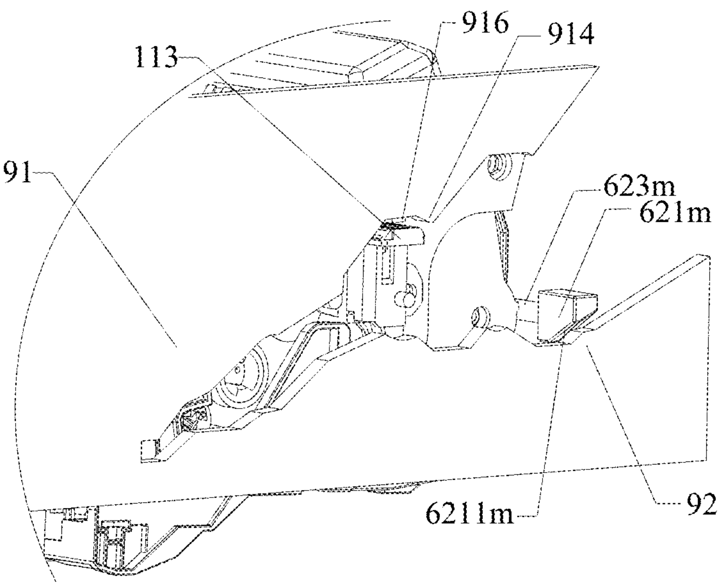
FIG. 53 illustrates another exemplary developing cartridge installed in an image forming device, according to various disclosed embodiments of the present disclosure.

When the door cover 95 is closed, the door abutment slope 961 of the door cover 95 may abut against the force receiving part **61*c* at the upper end of the second swing lever 6*c* and exert a downward and rearward force on the force receiving part 61*c*, that is, the upper end of the rotating member may rotate in the direction away from the developing roller 13, such that the second swing lever 6*c* swings in the clockwise direction as shown in FIG. 53. The force applying part 62*c* at the lower end of the second swing lever 6*c* may rotate to abut against the third side wall 53 of the drum cartridge 5 (that is, the lower end of the rotating member rotates in the direction close to the developing roller) and support the developing cartridge 1 upward. Therefore, the cartridge body 10 may rotate counterclockwise around the cartridge limiting part 130 (that is, the second swing lever 6*c* may rotate in a position opposite to the rotation direction of the cartridge body 10) and may be lifted, such that the electrical contact surface 1131 comes into contact with the second identification contact 916**.

Further, a reset elastic member **63*c* may also be provided between the second swing lever 6*c* and the cartridge body, and the reset elastic member 63*c* may be used to reset the second swing lever 6*c*. When the door cover 95 is closed, the reset elastic member 63*c* may be stretched. The reset elastic member 63*c* may be a tension spring. One end of the reset elastic member 63*c* may be connected to the second swing lever 6*c*, and the other end may be connected to the fifth end 15 of the cartridge body. The reset elastic member 63*c* may be positioned above the pivot shaft 64*c*. When the door cover 95 is opened, the force receiving part 61***c* may no longer receive the force of the door abutment slope 961 and rotate counterclockwise under the elastic force of the reset elastic member 63*c*, such that the force applying part 62*c* may no longer abut against the third side wall 53 of the drum cartridge 5. The developing cartridge may rotate clockwise around the cartridge limiting part 130 under its own weight and falls, and the electrical contact surface 1131 may fall with the developing cartridge until it is positioned below the second upper guide part 914 in the third direction. The electrical contact surface 1131, the bracket 112 may be prevented from contacting and colliding with the second upper guide part 914 when the developing cartridge is taken out. The reset elastic member 63*c* may also be provided below the pivot shaft 64*c*, which can also achieve a reset effect.

Fourth Variation of Embodiment 9

Figure 44:
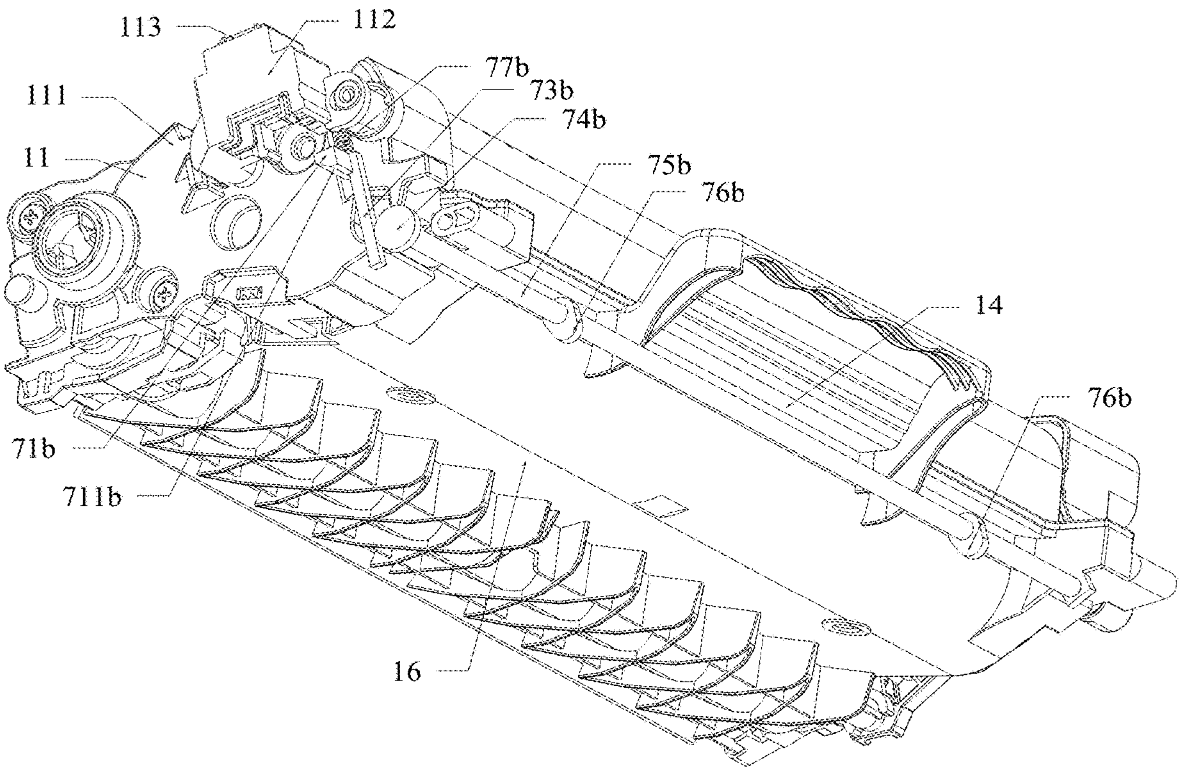
FIG. 44 illustrates another exemplary developing cartridge according to various disclosed embodiments of the present disclosure.
Figure 45:
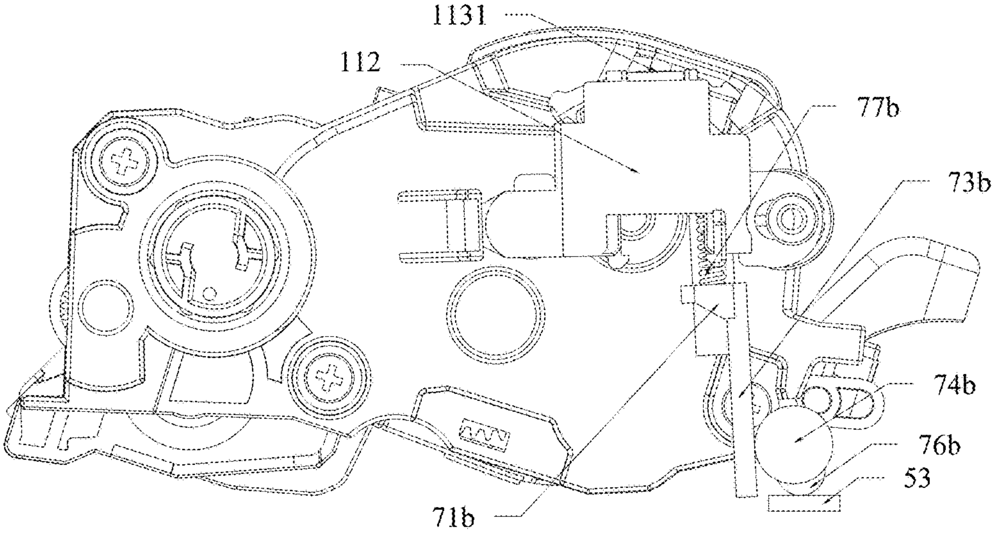
FIG. 45 illustrates another exemplary developing cartridge cooperating with a drum cartridge according to various disclosed embodiments of the present disclosure.

In another variation of Embodiment 9 shown in FIG. 44 and FIG. 45, the lifting element may include a sliding member and a rotating member. The sliding member may be used to cooperate with the lower guide rail 92 of the image forming device to move in the up-down direction. The rotating member may be rotatably connected with the sliding member. The rotating member may be used to cooperate with the drum cartridge when receiving the force of the sliding member, to lift the developer cartridge 1 upward relative to the drum cartridge 5.

The sliding member may be installed on the right end of the protective cover 111, and the sliding member may include a sliding part 71*b* and a rack 73*b*. The protective cover 111 may be provided with slide rails along the up-down direction. The sliding part 71*b* may be slidably connected to the protective cover 111 through the slide rails. The sliding part 71*b* may include a contact slope 711*b*, and the front end of the contact slope 711*b* may be higher than the rear end. The contact slope 711*b* may be used to abut against the lower guide rail 92 of the image forming device. The lifting element may also include a reset elastic member 77*b*. The upper end of the reset elastic member 77*b* may abut against the lower end of the bracket 112. The lower end of the reset elastic member 77*b* may be abut against the upper end of the sliding part 71*b*. The rack 73*b* may extend in the up-down direction. The rack 73*b* may be fixedly connected to the sliding part 71*b*. The rack 73*b* may be able to move in the up-down direction together with the sliding part 71*b*.

The rotating member may include a rotating shaft 75*b*, a gear 74*b*, and a cam 76*b*. The rotating shaft 75*b* may extend along the first direction. The rotating shaft 75*b* may be rotatably installed at the sixth end 16 of the cartridge body. The rotating shaft 75*b* may be closer to the fourth end 14 than the third end in the front-rear direction. The cam 76*b* may be relatively fixedly arranged on the rotating shaft 75*b*. The gear 74*b* may be relatively fixedly arranged on the right end of the rotating shaft 75*b*, and the gear 74*b* may mesh with the rack 73*b*. The rotating member may have a lifted position and a non-lifted position. The rotating member may be able to rotate between the lifted position and the non-lifted position. When the rotating member is in the lifted position, the cam 76*b* may abut against the third side wall 53 of the drum cartridge and lift up the developing cartridge 1 relative to the drum cartridge 5. When the rotating member is in the non-lifted position, the cam 76*b* may not contact the third side wall 53 of the drum cartridge, or contact the third side wall 53 but not lift the developing cartridge 1 upward.

During the installation process of the process cartridge, after the electrical contact surface 1131 and the bracket 112 pass over the second upper guide part 914, the contact slope 711*b* may move forward along the second lower guide part 922, such that the sliding part 71*b* moves forward and upward. The sliding part 71*b* may drive the rack 73*b* to move upward, and the rack 73*b* may drive the gear 74*b* to rotate clockwise as shown in FIG. 45, such that the rotating member rotates from the non-lifted position to the lifted position and the cam 76*b* abuts against the third side wall of the drum cartridge 53 and lifts the developing cartridge 1 upward. The developing cartridge 1 may rotate counter-clockwise around the cartridge limiting part 130, such that the electrical contact surface 1131 comes into contact with the second identification contact 916. During this process, the reset elastic member 77*b* may be compressed. This technical solution enables the developing cartridge to be rigidly supported at the position where the electrical contact surface 1131 contacts the second identification contact 916, instead of being supported inelastically. In this way, the developing cartridge may not shake because of overcoming the supporting force of the lifting element when receiving the torque output from the image forming device, to prevent the electrical contact between the electrical contact surface 1131 and the second identification contact 916 from being unstable. The gear 74*b* may rotate in a clockwise direction, causing the rotating member to rotate from the non-lifted position to the lifted position, that is, the upper end of the rotating member may rotate in a direction away from the developing roller 131 and the lower end of the rotating member may rotate closer to the developing roller 131.

When taking out the process cartridge, the contact slope 711*b* of the sliding part 71*b* may move backward and gradually break away from the contact with the second lower guide part 922. At this time, the elastic force of the reset elastic member 77*b* may cause the sliding part 71*b* and the rack 73*b* to move downward. The rack 73*b* may drive the gear 74*b* to rotate in the counterclockwise direction, such that the rotating member rotates from the lifting position to the non-lifted position.

Fifth Variation of Embodiment 9

Figure 46:
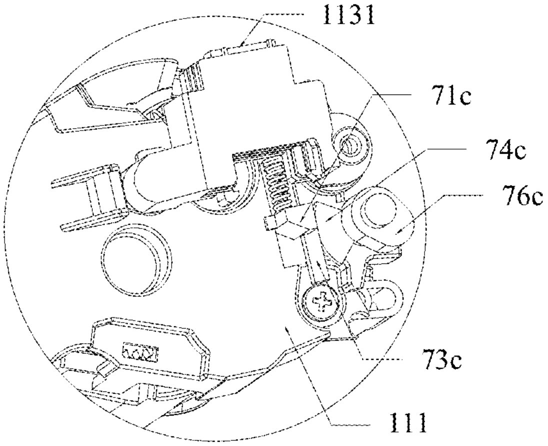
FIG. 46 illustrates another exemplary developing cartridge according to various disclosed embodiments of the present disclosure.
Figure 47:
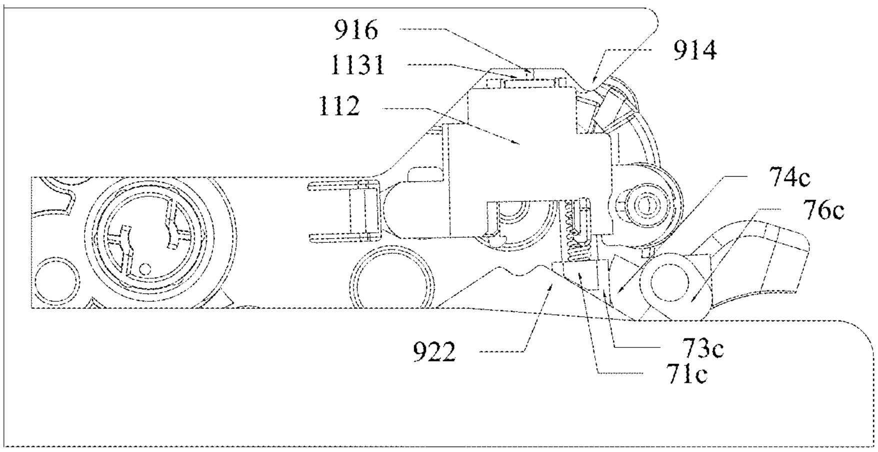
FIG. 47 illustrates another exemplary developing cartridge cooperating with an image forming device according to various disclosed embodiments of the present disclosure.

In another variation of Embodiment 9 shown in FIG. 46 and FIG. 47, the gear 74*c* and the cam 76*c* of the rotating member may be arranged at the first end 11 of the cartridge body 10. The gear 74*c* may be a missing tooth gear, and the gear 74*c* and the cam 76*c* may be both arranged at one end in the second direction. The gear 74*c* and the cam 76*c* may be both arranged at one end in the second direction, which reduces the structural size of the rotating member, has a simple structure and saves costs. The cam 76 *c* may be used to abut the lower guide rail 92 of the image forming device to lift the developing cartridge 1 upward relative to the drum cartridge 5. The gear 74*c* and the cam 76*c* may be coaxially fixed or coaxially integrated. The gear 74*c* and the cam 76*c* may be rotatably installed on the right end surface of the protective cover 111 and the rotation axis may extend along the first direction. When the rotating member is in the non-lifted position, the cam 76*c* may not contact the lower guide rail 92, or it may contact the lower guide rail 92 but does not lift the developing cartridge 1 upward. When the rotating member is in the lifted position, the cam 76*c* may abut against the lower guide rail 92 and lift the developing cartridge 1 up. When the rotating member receives the power of the rack 73*c* and rotates in the clockwise direction of the viewing angle as shown in FIG. 47, the cam 76*c* may abut the lower guide rail 92 and lift the developing cartridge 1, such that the electrical contact surface 1131 and the second identification contact 916 come into contact.

Sixth Variation of Embodiment 9

Figure 48:
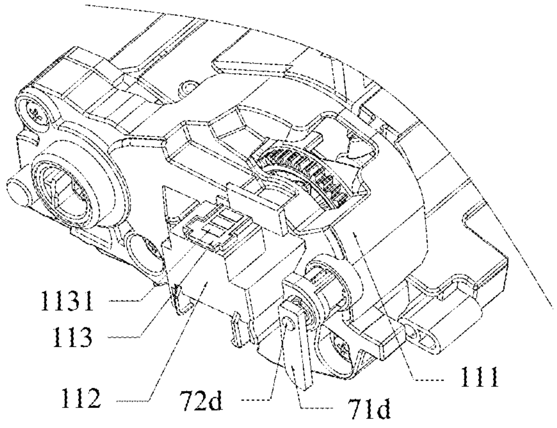
FIG. 48 illustrates a partial structure of another exemplary developing cartridge according to various disclosed embodiments of the present disclosure.
Figure 49:
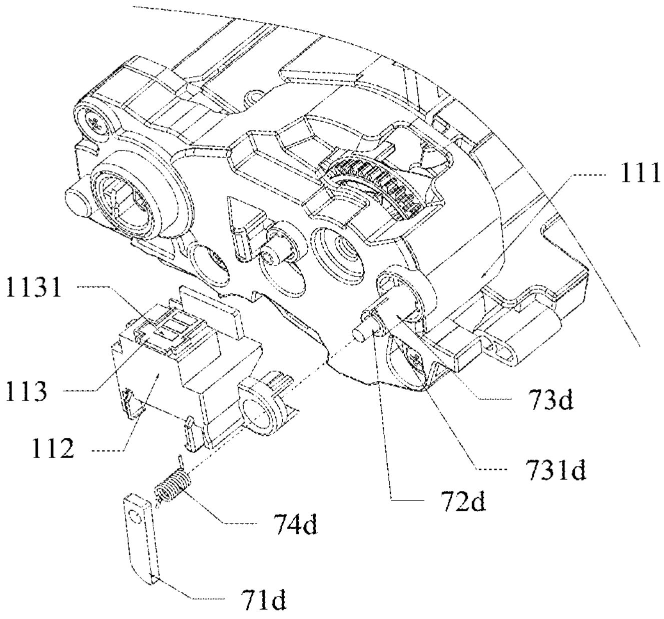
FIG. 49 illustrates an explosive view of another exemplary developing cartridge according to various disclosed embodiments of the present disclosure.
Figure 50:
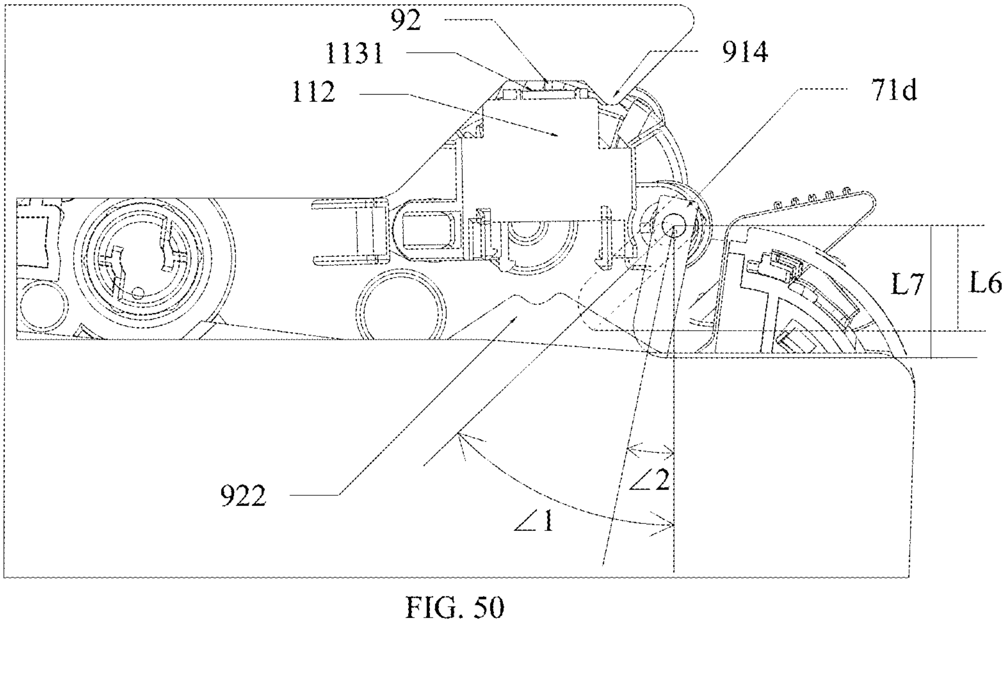
FIG. 50 illustrates another exemplary developing cartridge cooperating with an image forming device, according to various disclosed embodiments of the present disclosure.

In another variation of Embodiment 9 shown in FIG. 48 to FIG. 50, the rotating member of the lifting element may include a support rod 71*d*. The support rod 71*d* may be rotatably disposed at the first end 11 of the cartridge 10, and the rotation axis of the support rod 71*d* may extend along the first direction.

For example, the protective cover 111 may be provided with a support column 72*d*. The support column 72*d* may be used to rotatably support the support rod 71*d*. The protective cover 111 may be provided with a tube part 73*d*, and the outer periphery of the tube part 73*d* may be able to support the mounting part of the rear end of the bracket 112. The tube part 73*d* may be coaxial with the support column 72*d*. The radius of the tube part 73*d* may be larger than the radius of the support column 72*d* such that the support column 72*d* may be enclosed in the tube part 73*d*. There may be a gap between the tube part 73*d* and the support column 72*d*, and an elastic member 74*d* may be provided in the gap. The elastic member 74*d* may be preferably a torsion spring set on the support column 72*d*. The tube part 73*d* may include a notch 731*d*. One end of the torsion spring may be inserted into the notch 731*d* such that the torsion spring is limited in the peripheral direction of the support column 72*d*. The support rod 71*d* may be fixedly connected to the other end of the torsion spring, such that the elastic force of the torsion spring is able to be applied to the support rod 71*d*. The torsion spring may be used to maintain the support rod 71*d* in the third position.

The support rod 71*d* may be able to rotate between a third position (shown as a dotted line in FIG. 50) and a fourth position (shown as a solid line in FIG. 50). When the support rod 71*d* is in the third position, there may be a first included angle L1 between the support rod 71*d* and the up-down direction, and the lower end of the support rod 71*d* may be positioned in front of the support column 72*d* in the front-rear direction. The distance from the lower end of the support rod 71*d* to the support column 72*d* is L6 in the up-down direction. When the support rod 71*d* is in the fourth position, there may be a second included angle L2 between the support rod 71*d* and the up-down direction, and the lower end of the support rod 71*d* may be also positioned in front of the support column 72*d* in the front-rear direction. The distance between the lower end of the support rod 71*d* and the support columns 72*d* is L7 in the up-down direction. Among them, L1 may be larger than L2, L6 may be smaller than L7, and the support column 72*d* may be closer to the front and upper side when it is in the fourth position than when it is in the third position (not shown in the figure).

During the installation process of the process cartridge, after the electrical contact surface 1131 passes over the second upper guide part 914, the lower end of the support rod 71*d* may abut against the second lower guide part 922, and the lower end of the support rod 71*d* may receive a backward force from the second lower limiting guide 922 such that the support rod 71*d* rotates from the third position to the fourth position in the counterclockwise direction as shown in FIG. 50 against the elastic force of the torsion spring (that is, the lower end of the rotating member rotates in the direction away from the developing roller 131). And the developing cartridge 1 may be driven to rotate in the counterclockwise direction, such that the electrical contact surface 1131 comes into contact with the second identification contact 916. When taking out the process cartridge, the lower end of the support rod 71*d* may gradually break out of contact with the second lower guide part 922. Under the elastic force of the torsion spring, the support rod 71*d* may rotate clockwise at a certain angle from the fourth position to the third position, such that the developing cartridge rotates clockwise at a certain angle under its own weight and the electrical contact surface 1131 moves downward along with the developing cartridge. Therefore, the process cartridge may be taken out.

In the previous embodiments, the lifting element may be rotatably connected to the developing cartridge 1, and the lifting element may cooperate with the image forming device or the drum cartridge 5, such that the developing cartridge 1 is lifted upward as a whole and the electrical contact surface 1131 of the identification element comes into electrical contact with the second identification contact 916.

Embodiment 10

Figure 51:
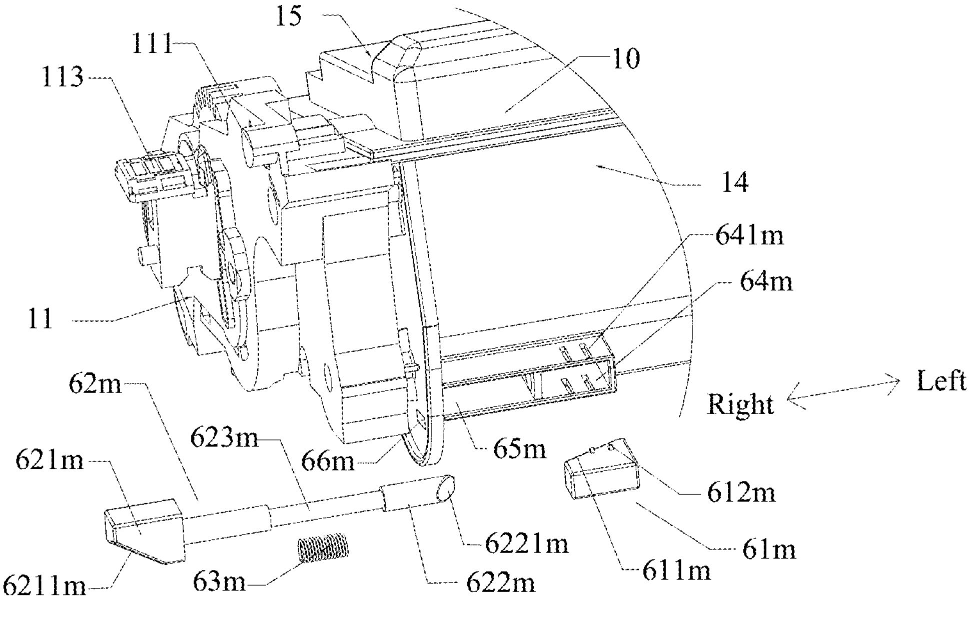
FIG. 51 illustrates an explosive view of a lifting element of another exemplary developing cartridge according to various disclosed embodiments of the present disclosure.
Figure 52:
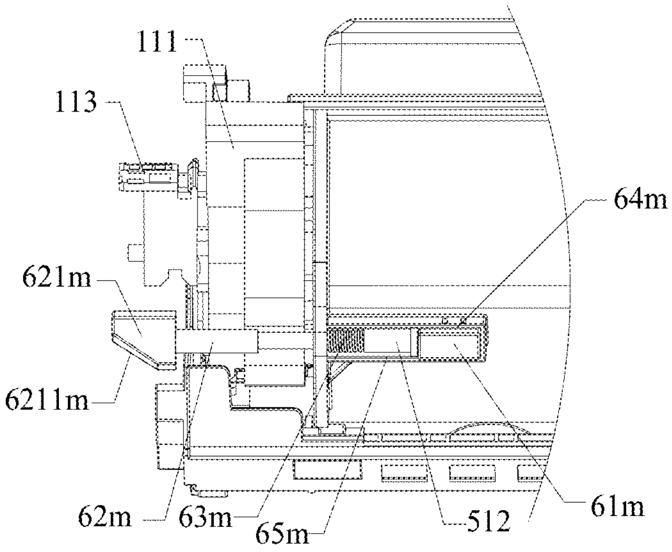
FIG. 52 illustrates another exemplary developing cartridge according to various disclosed embodiments of the present disclosure.

In another embodiment shown in FIG. 51 to FIG. 53, the lifting element may be slidably connected to the developing cartridge and may be telescopic in the first direction relative to the cartridge body 10. The lifting element may be used to cooperate with the lower guide rail 92. During the installation process of the process cartridge, the lifting element may extend along the lower guide rail 92 and lift the developing cartridge 1 upward, thereby achieving electrical contact between the electrical contact surface 1131 and the second identification contact 916.

For example, the lifting element may include a telescopic member 62*m* and a pressing member 61*m*. The pressing member 61*m* may be used to exert force on the telescopic member 62*m*, such that the telescopic member 62*m* extends along the first direction relative to the cartridge body 10. The telescopic member 62*m* may be used to cooperate with the lower guide rail 92 and lift the developing cartridge 1 upward when the telescopic member 62*m* extending out along the first direction relative to the cartridge body 10, such that the electrical contact surface 1131 comes into electrical contact with the second identification contact 916.

The pressing member 61*m* may be used to receive the force of the door cover 95 and may be able to move in the second direction relative to the cartridge body 10, to exert the force of moving in the first direction to the telescopic member 62*m*. The lifting element may be disposed close to the fourth end 14 of the cartridge body 10 and close to the first end 11. The front end of the pressing member 61*m* may be provided with a force applying part. The force applying part may include a force applying slope 611*m*. The front end of the force applying slope 611*m* may be further to the left than the rear end. The left end 622*m* of the telescopic member may be provided with a force receiving part. The force receiving part may cooperate with the force applying slope. The force receiving part may include a force receiving slope 6221*m*. The front end of the force receiving slope 6221*m* may be further to the left than the rear end. The force receiving slope 6221*m* may be used to receive the force of the force applying slope 611*m* to move the telescopic member 622*m* in the first direction. The right end 621*m* of the telescopic member may be provided with an abutment part, that is, the abutment part may be further away from the second end 12 than the force receiving part. The abutment part may include an abutment slope 6211*m*, and the right end of the abutment slope 6211*m* may be higher than the left end. The abutment slope 621*m* may be used to cooperate with the lower guide rail 92 when the telescopic member 62*m* extends relative to the cartridge body 10, such that the different positions in the left-right directions of the abutment slope 621 may come into contact with the lower guide rail, thereby lifting the developing cartridge 1 relative to the drum cartridge 5. The abutment slope 621 may abut against the lower guide rail at different positions in the left-right directions. For example, the right end of the abutment slope 621 may first abut against the lower guide rail 92, and then the left end of the abutment slope 621 may abut against the lower guide rail 92.

The fourth end 14 of the cartridge body 10 may be provided with a second mounting member. The second mounting member may be used to install the pressing member 61*m* and the telescopic member 62*m*. The pressing member 61*m* may be slidably connected to the second mounting member and may be able to move along the second direction relative to the second mounting member. The telescopic member 62*m* may be slidably connected to the second mounting part and may be able to move in the first direction relative to the second mounting member. The second mounting member may include a third mounting part 64*m* and a fourth mounting part 65*m*. In this embodiment, the third mounting part 64*m* and the fourth mounting part 65*m* may be mounting grooves. The third mounting part 64*m* and the fourth mounting part 65*m* may be connected in the first direction, and the third mounting part 64*m* may be closer to the second end 12 than the fourth mounting part 65*m* in the first direction. The pressing member 61*m* may be movably installed in the third mounting part 64*m* and may be able to move in the second direction relative to the third mounting part 64*m*. The third mounting part 64*m* may be provided with a second anti-detachment opening 641*m*. The second anti-detachment opening 641*m* may cooperate with the anti-detachment protrusion 612*m* provided on the outside of the pressing member 61*m* to prevent the pressing member 61*m* from detaching from the third mounting part 64*m* when moving relative to the third mounting part 64*m*. The positions of the second anti-detachment opening 641*m* and the anti-detachment protrusion 612*m* may be interchangeable. The telescopic member 62*m* may be movably installed in the fourth mounting part 65*m*. The left end 622*m* of the telescopic member 62*m* may extend into the third mounting part 64*m* and abut against the pressing member to receive the force of the pressing member.

When the process cartridge is installed into the image forming device, the telescopic member 62*m* may be in a retracted state to prevent the telescopic member 62*m* from interfering with the first wall 90 and affecting the installation of the process cartridge into the image forming device. After the process cartridge is installed in the image forming device and before the door cover 95 is closed, the storage medium 113 may be positioned below the second upper guide part 914 and pass over the second upper guide part 914, and there may be a gap between the electrical contact surface 1131 and the second identification contact 916. That is, the electrical contact surface 1131 and the second identification contact 916 may not contact. During the process of closing the door cover 95, the door cover 95 may abut against the pressing member 61*m* and exert a forward force on the pressing member 61*m*, causing the pressing member 61*m* to move forward relative to the third mounting part 64*m*. The force applying slope 611*m* may abut against the force receiving slope 6221*m* on the telescopic member 62*m*, such that the telescopic member 62*m* extends to the right relative to the first end 11 of the cartridge body 10 in the first direction and the abutting slope 6211*m* of the telescopic member 62*m* abuts against the lower guide rail 92. Different positions in the left-right directions of the abutment slope 6211*m* may move along the lower guide rail 92, and then the telescopic member 62*m* may move upward to drive the cartridge body 10 to move upward. When the door cover 91 is completely closed, the lifting element and the cartridge body 10 may stop moving, the developing cartridge 1 may be positioned in the fourth position of the drum cartridge 5, the telescopic member 62*m* may be supported by the lower guide rail 92, and the storage medium 113 may be in the contact position contacting the second identification contact 916.

There may be a connecting part 623*m* between the left end 622*m* and the right end 621*m* of the telescopic member 62*m*. The telescopic member 62*m* may pass through the third mounting part 64*m* and the fourth mounting part 65*m*, and the left end 622*m* of the telescopic member may be positioned in the third mounting part 64*m*. The connecting part 623*m* may be positioned in the fourth mounting part 65*m*. The right end 621*m* of the telescopic member may be positioned outside the fourth mounting part 65*m*. The first end 11 of the cartridge body 10 may also be provided with a limiting hole 66*m*. The limiting hole 66*m* may be connected with the fourth mounting part 65*m*. The right end 621*m* of the telescopic member may be positioned at the right side of the limit hole 1115 to prevent the telescopic member 62*m* from moving too much to the left.

The lifting element may also be provided with a reset elastic member 63*m*. The reset elastic member 63*m* may abut between the second mounting member and the telescopic member 62*m*. The reset elastic member 63*m* may be used to reset the telescopic member 62*m* and the pressing member 61*m*. For example, the left end 622*m* of the telescopic member 62*m* may be set larger than the outer diameter of the connecting part 623*m*, and the left end 622*m* of the telescopic member may be partially positioned in the fourth mounting part 65*m*. One end of the reset elastic member 63*m* may abut against the right wall of the fourth mounting part 65*m* and the other end may abut against the left end 622*m* of the telescopic member. Therefore, when the telescopic member 62*m* moves relative to the second mounting member, the reset elastic member 63*m* may be compressed. Further, the arrangement of the reset elastic member may also cause the telescopic member 62*m* to be in a retracted state after being installed on the developing cartridge. In this way, it may be convenient for the process cartridge to be installed into the image forming device. In other embodiments, the reset elastic member may also be disposed in the third mounting part 64*m*. One end of the reset elastic member 63*m* may abut against the right wall of the third mounting part 64*m*, and the other end may abut against the left end 622*m* of the telescopic member positioned in the third mounting part 64*m*. When installing the telescopic member 62*m* to the developing cartridge, the left end 622*m* and the connecting part 623*m* of the telescopic member 62*m* may pass through.

When taking out the processing cartridge, the door cover 95 may be opened, the pressing member 61*m* may lose contact with the door cover 95, and the telescopic member 62*m* may retract along the first direction relative to the first end 11 under the action of the elastic restoring force of the reset elastic member 63*m*. The abutting force of the second end 622 against the pressing member 61*m* may cause the pressing member 61*m* to move in a direction away from the third end 13, and the first end 621*m* may be no longer supported by the lower guide rail 92. The developing cartridge 1 may return from the fourth position to third position. The developing cartridge 1 and the drum cartridge 5 may be smoothly taken out of the image forming device in the opposite direction to the installation direction.

In some embodiments, the pressing member 61*m* may also be used to receive the force from the upper part of the door cover 95 or the top wall of the image forming device, that is, the top wall of the installation cavity, and may be able to move relative to the cartridge body 10 along the third direction. Therefore, the upper end of the force applying slope of the pressing member 61*m* may be closer to the right than the lower end, and the upper end of the force receiving slope of the telescopic member 62*m* may be closer to the right than the lower end. In this embodiment, the telescopic member 62*m* may be in the shape of a rod, and the pressing member 61*m* may be in the shape of a block. In some other embodiments, the telescopic member 62*m* may also be in the shape of a block, and the pressing member 61*m* may be in the shape of a rod. In this embodiment, the second mounting member may be specifically an installation groove, and the telescopic member 62*m* and the pressing member 61*m* may be sleeved in the installation groove, such that the telescopic member 62*m* and the pressing member 61*m* are limited in multiple directions, which makes it easier for the telescopic member 62*m* to move along the first direction and for the pressing member 61*m* to move in the second direction. The front end of the installation groove may be a blind hole or a through hole. In some embodiments, the second mounting member may also be rod-shaped. The third mounting part and the fourth mounting part may be L-shaped and have protrusions on the outside. The telescopic member 62*m* and the pressing member 61*m* may be provided with chutes and may be sleeved on the outside of the second mounting member, the pressing member may also move in the second direction, and the telescopic member may move in the first direction. When the pressing member moves in the second direction, a force moving in the first direction may be applied to the telescopic member.

In some other embodiments, only one of the force applying slope 611*m* of the pressing member 61*m* and the force receiving slope e 6221*m* of the telescopic member 62*m* may be provided, and the telescopic member 62*m* may be able to be retracted. The abutting slope 6211*m*, the force receiving slope 6221*m* and the force applying slope 611*m* may be embodied as inclined planes in this embodiment, but may also be curved surfaces in other embodiments. The lifting element of this embodiment does not need to be provided with the pressing member 61*m*. The door cover 95 may be provided with a pressing member. When the door cover 95 is closed, the pressing member structure of the door cover may act on the force receiving slope 6221*m* of the telescopic member 62*m*, which may also make the telescopic member 62*m* extend out relative to the cartridge body 10 in the first direction. The second mounting member may be integrally formed with the cartridge body 10, or may be installed and fixed on the cartridge body 10. The second mounting member may also be provided at the first end 11 of the cartridge body 10 through the protective cover 111. The telescopic member of this embodiment may be arranged at the first end 11 and the fourth end of the developing cartridge. The cartridge body 10 may also be provided with the telescopic member at the fourth end 14 and the second end 12 such that the left and right ends of the developing cartridge 1 are balanced for support and lifting.

It can be understood that a slope may also be provided on the front end of the telescopic member 62*m* in some other embodiments, with the right end of the slope being farther back than the left end. In this way, when the process cartridge is installed into the image forming device, the slope of the front end of the telescopic member 62*m* may abut against the first wall 90 such that the telescopic member 62*m* is retracted to avoid affecting the installation of the process cartridge. In addition, in this case, the pressing member 61*m* may not be provided, but the telescopic member 62*m* and the reset elastic member may be provided. The reset elastic member may be used to reset the telescopic member 62*m* after the process cartridge is installed into the image forming device. Therefore, the abutment slope of the telescopic member may also be able to move along the lower guide rail 92 and lift the developing cartridge upward to achieve electrical contact between the electrical contact surface and the second upper guide part.

First Variation of Embodiment 10

Figure 54:
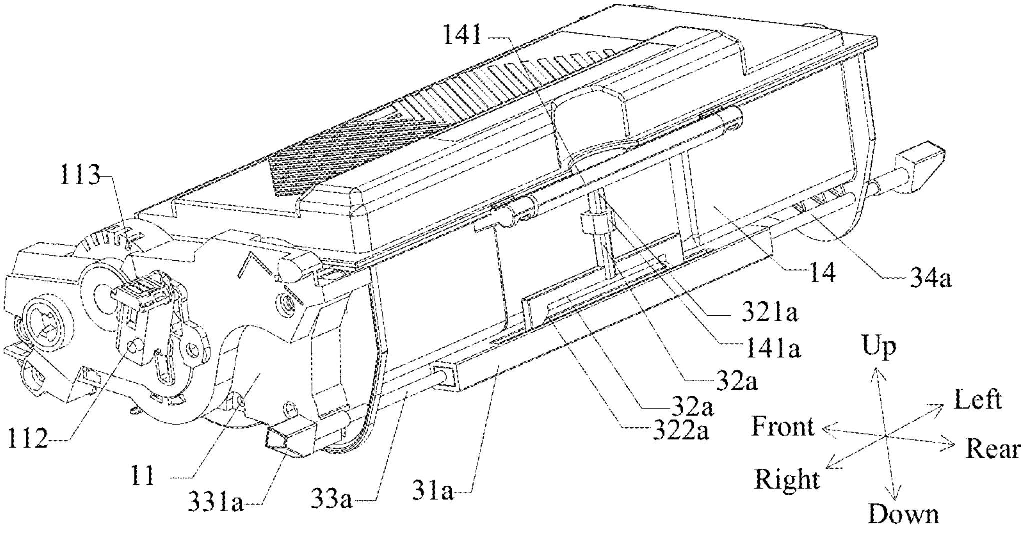
FIG. 54 illustrates another exemplary developing cartridge cooperating with an image forming device, according to various disclosed embodiments of the present disclosure.
Figure 55:
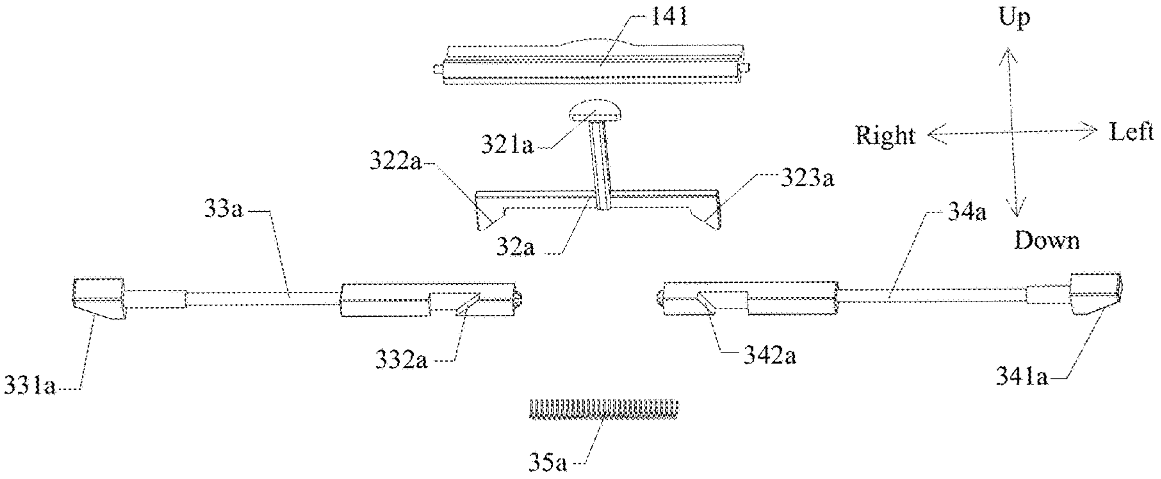
FIG. 55 illustrates an explosive view of a lifting element of another exemplary developing cartridge according to various disclosed embodiments of the present disclosure.
Figure 56:
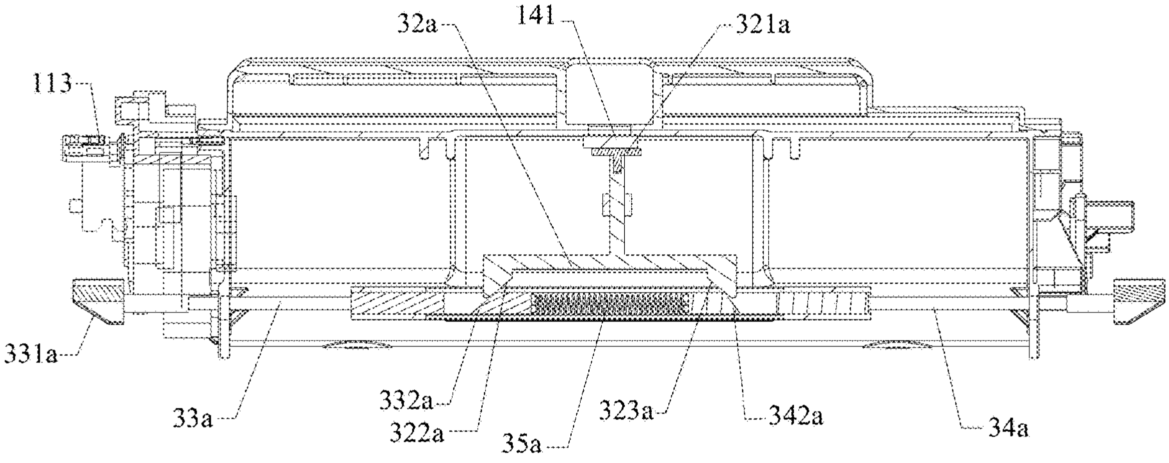
FIG. 56 illustrates a cross-sectional view of another exemplary developing cartridge according to various disclosed embodiments of the present disclosure.

In a variation of Embodiment 10 shown in FIG. 54 to FIG. 56, the force receiving slope of the telescopic member of the lifting element may be arranged in different ways, and the pressing member may be arranged in different ways from Embodiment 10. The part of the lifting element close to the first end 11 of the cartridge body 10 will be used as an example to illustrate the present disclosure. In this embodiment, the upper end of the force receiving slope 332*a* of the telescopic member 33*a* may be further to the left than the lower end. The pressing member 32*a* may be able to move in the up-down direction relative to the cartridge body 10. The force applying slope 322*a* may be provided at the lower end of the pressing member 32*a*. The upper end of the force applying slope 322*a* may be further to the left than the lower end. The pressing member 32*a* may be used to apply a force to the telescopic member 33*a*, to cause the telescopic member 33*a* to retract relative to the cartridge body 10 along the first direction. The telescopic member 62*m* may be used to cooperate with the lower guide rail 92 when extending relative to the cartridge body 10 along the first direction and lift the developing cartridge 1 up. The lifting element may also include a lifting elastic member 35*a*. The lifting elastic member 35*a* may be used to provide an elastic force for the telescopic member 33*a* to extend relative to the cartridge body 10. The lifting element of this embodiment may be close to the first end 11 of the cartridge body 10, that is, the lifting element or the telescopic member 33*a* may be disposed at the first end 11 of the developing cartridge, which is a special case.

The handle 141 may be rotatably connected to the cartridge body 10. The rotation axis of the handle 141 may extend along the first direction. The pressing member 32*a* may extend along the up-down direction. The upper end 321*a* of the pressing member may be connected to the handle 141. The second mounting member may be an installation groove 31*a*. The installation groove 31*a* may open upward for the lower end of the pressing member 32*a* to be inserted. The installation groove 31*a* may also open to the right for the telescopic member 33*a* of the first end 11 to be inserted. The side walls of the installation groove 31*a* may be used to limit the pressing member 32*a* and the telescopic member 33*a*, to prevent the pressing member 32*a* and the telescopic member 33*a* from being separated when they move. The lower end of the installation groove may be a blind hole or a through hole. The fourth end 14 of the cartridge body 10 may be provided with a limiting part 141*a* to limit the pressing member. The lifting elastic member 35*a* may be disposed in the installation groove 31*a*. One end of the lifting elastic member 35*a* may be connected to the left end of the telescopic member 33*a*, and the other end may be connected to the left wall of the installation groove 31*a*. By pressing the handle 141, the handle 141 may rotate and drive the pressing member 32*a* to move downward. The force applying slope 322*a* of the pressing member 32*a* may exert a force on the force receiving slope 332*a* of the telescopic member 33*a*, causing the telescopic member 33*a* to move to the left and retract. At this time, the elastic member 35*a* may be compressed.

When the developing cartridge 1 is installed in the drum cartridge 5 and the handle 141 is not pressed and rotated by the user, the telescopic member 33*a* may be in an extended state relative to the first end 11. When the process cartridge is installed into the image forming device, the user may press the handle 141 to rotate the handle 141, and the handle 141 may drive the telescopic member 33*a* to retract to the left through the pressing member 32*a* and avoid the first wall 90 of the image forming device, to allow the process cartridge to move smoothly. After being installed into the image forming device, the electrical contact surface 1131 and the storage medium 113 may smoothly pass over the second upper guide 914. At this time, the process cartridge may stop moving forward in the image forming device, and the electrical contact surface 1131 may be positioned at the second identification contact 916 and may be not in contact with the second identification contact 916. When the user releases the handle 142, the telescopic member 33*a* may extend to the right under the action of lifting elastic member 35*a*. The different positions of the abutment slope 331*a* of the telescopic member 33*a* may come in contact with the lower guide rail 92 to lift the developing cartridge up, such that the electrical contact surface 1131 contacts the second identification contact 916. When taking out the process cartridge, the user may press the handle 141 to retract the telescopic member 33*a*, and then the process cartridge may be taken out.

The second end 12 of the developing cartridge may also be provided with a telescopic member 34*a*. The telescopic member 34*a* may also include a force receiving slope 342*a* and an abutment slope 341*a*. The lower end of the pressing member 32*a* may also be provided with a force applying slope 323*a* on one side of the force applying slope 322*a*. The lifting elastic member 35*a* may abut between the telescopic member 33*a* and the telescopic member 34*a*. When the pressing member 32*a* moves downward, the force applying slope 323*a* may exert force on the force receiving slope 342*a*, such that the telescopic member 34*a* moves to the right and retracts and the lifting elastic member 35*a* is compressed. In some other embodiments, only the lifting element of the second end 12 may be provided, and the electrical contact surface 113 may also be brought into contact with the second identification contact 916.

The pressing member 32*a* of this embodiment may be connected to the handle 141 to receive the force of the handle 141. The pressing member 32*a* may be fixedly connected or movably connected to the handle 141, as long as the pressing member 32*a* is able to receive the force of the handle 141 and exert force on the telescopic member 33*a*. In some embodiments, the pressing member 32*a* may also receive the force of the top wall or the door cover 95 of the image forming device and move downward relative to the cartridge body 10 along the third direction. In this embodiment, the pressing member 32*a* may be integrally formed with the handle 141, or may be installed and fixed to the handle 141. The pressing member 32*a* may also be a separate structure from the handle 141, as long as the handle 141 is able to exert downward force on the pressing member 32*a*. In this embodiment, only one of the force receiving slope 332*a* of the force receiving part of the telescopic member 34*a* and the force applying slope 322*a* of the force applying part of the pressing member 32*a* may be provided, which is also able to make the force applying part of the pressing member 32*a* to exert force on the force receiving part of the telescopic member 34*a* to realize the retraction of the telescopic member 34*a* relative to the cartridge body 10.

Second Variation of Embodiment 10

Figure 57:
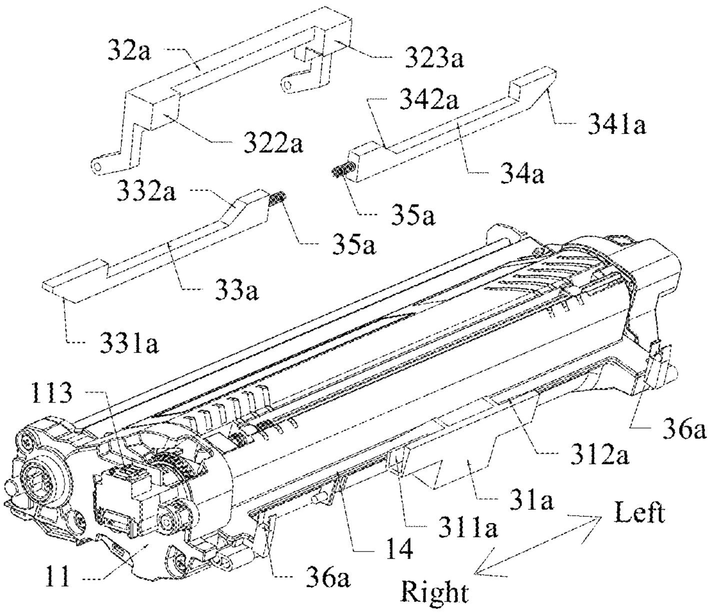
FIG. 57 illustrates an explosive view of another exemplary developing cartridge according to various disclosed embodiments of the present disclosure.
Figure 58:
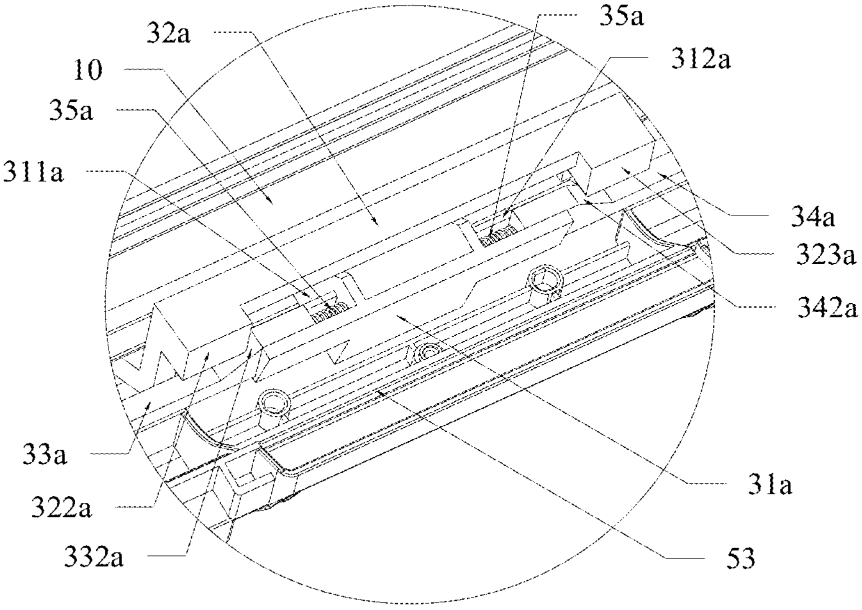
FIG. 58 illustrates a partial structure of another exemplary developing cartridge according to various disclosed embodiments of the present disclosure.

In another variation of Embodiment 10 shown in FIG. 57 and FIG. 58, the pressing member 32*a* of the lifting element may be arranged in a manner different from Embodiment 1. The pressing member 32*a* may be rotatably connected to the cartridge body 10. When the pressing member 32*a* rotates, it may press the force receiving 332*a* of the telescopic member 33*a*, causing the telescopic member 33*a* to retract relative to the cartridge body 10. The installation method of the process cartridge in this embodiment and the principle of contact between the electrical contact surface 1131 and the second identification contact 916 may the same as those in the first variation of Embodiment 10, and will not be described again.

The pressing member 32*a* may include a force applying part 322*a*. The lower end of the pressing member 32*a* may be rotatably connected to the cartridge body 10. The force applying part 322*a* may be provided at the upper end of the pressing member 32*a*. The upper end of the force receiving slope 332*a* of the telescopic member 33*a* of the first end 11 may be further to the left than the lower end. When the pressing member 32*a* is rotated by the force, the force applying part 322*a* may rotate downward and apply force to the force receiving slope 332*a* of the telescopic member 33*a* of the first end 11, causing the telescopic member 33*a* to retract to the left. A second installation groove 311*a* may be formed on the right end of the second mounting member 31*a*. The second installation groove 311*a* may be used for the force receiving slope 332*a* of the telescopic member 33*a* and the force applying part 322*a* of the pressing member 32*a* to be inserted. A lifting elastic member 35*a* may abut against between the left end of the telescopic member 33*a* and the second installation groove 311*a*.

In this embodiment, the force applying part 322*a* may be positioned above the telescopic member 33*a*. In some other embodiments, the force receiving slope of the telescopic member 33*a* may be disposed below the telescopic member. The upper end of the force receiving slope may be further to the right than the lower end. The force applying part 322*a* may be disposed below the telescopic member 33*a*. When the pressing member 32*a* rotates, the force applying part 322*a* may rotate upward and exert force on the force receiving slope of the telescopic member 33*a* of the first end 11, such that the telescopic member 33*a* retracts to the left. In this embodiment, a second installation groove 312*a* may be also formed on the left end of the second mounting member 31*a*. The second installation groove 312*a* may be used for the insertion of the force receiving slope 342*a* of the telescopic member 34*a* and the other force applying part 322*a* of the pressing member 32*a*. Another lifting elastic member 35*a* may abut between the right end of the telescopic member 34*a* and the second installation groove 312*a* at the left end of the second mounting member 31*a*.

Embodiment 11

In another embodiment shown in FIG. 6, FIG. 60 to FIG. 63, the lifting element may be a push element 70, which is different from Embodiment 1. The push element may include the lifting element. The push element may abut against the drum push member of the drum cartridge and may be used to receive the pushing force of the drum push member such that the developing roller 131 abuts against the photosensitive drum. The push element may be also used to lift the developing cartridge 1 such that the electrical contact surface 1131 comes into electrical contact with the second identification contact 916.

The drum push member may include a first drum push member 55 and a second drum push member 56. The first drum push member 55 may be close to the first side wall 51, and the second drum push member 56 may be close to the second side wall 52. The first drum push member 55 and the second drum push member 56 may be relatively fixed to the drum frame 50. The drum frame 50 may also include a push groove 532 as shown in FIG. 3 and FIG. 5. The push groove 532 may be used to install the first drum push member 55 and the second drum push member 56. The drum push member may be fixedly connected with the drum frame 50.

The push element may be provided at the first end 11 and/or the second end 12 of the cartridge body 10. The push element may include a first push member 71 and a second push member 72. The first push member 71 may be provided at the first end 11 of the cartridge body 10 and may be used to receive the force of the first drum push member 55. The second push member 72 may be provided at the second end 12 of the cartridge body 10, and may be used to receive the force of the second drum push member 56. The first push member 71 may protrude outward from the side wall of the first end 11 of the cartridge body 10 in the first direction, and the second push member 72 may protrude outward from the side wall of the second end 12 of the cartridge body 10 in the first direction.

Figure 62:
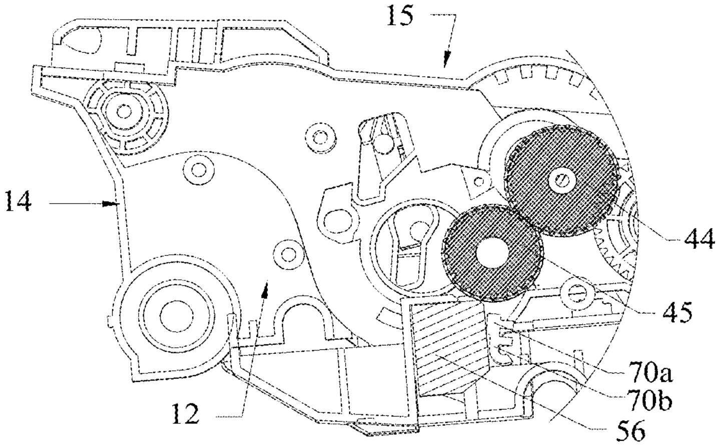
FIG. 62 and FIG. 63 illustrate a first push part and a second push part of a second push element in an exemplary developing cartridge cooperating with a second drum push part of a drum cartridge, according to various disclosed embodiments of the present disclosure.
Figure 63:
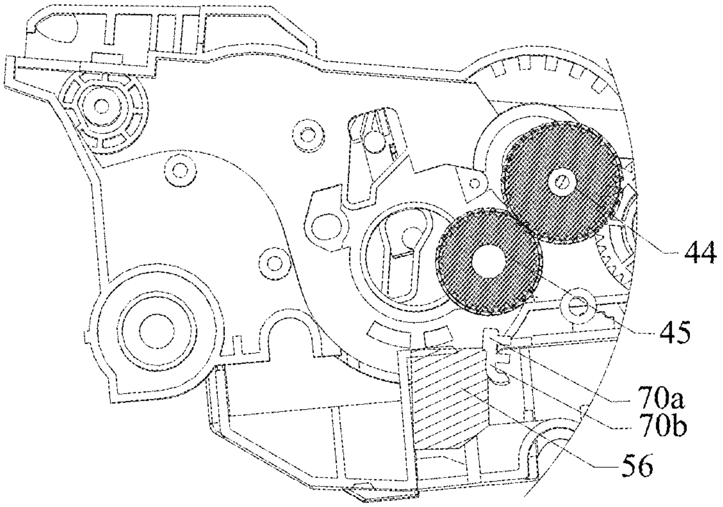

The push element may include a first push part 70*a* and a second push part 70*b*. The first push part 70*a* may be positioned above the second push part 70*b*. The developing cartridge 1 may have a first position and a second position on the drum cartridge 5, and the developing cartridge 1 may be movable relative to the drum cartridge 5 between the first position and the second position. When the developing cartridge 1 is in the first position, as shown in FIG. 62, the first push part 70*a* may be abutted and pushed by the drum push member. When the developing cartridge 1 is in the second position, as shown in FIG. 63, the developing cartridge 1 may be lifted from the drum cartridge 5 compared with the state when the developing cartridge 1 is in the first position, and the first push part 70*a* may abut against the upper end of the drum push member and the rear end of the second push part 70*b*. The drum push member and the drum frame 50 may be relatively fixed, and the rear end of the first push part 70*a* may protrude from the rear end of the second push part 70*b* to lift the developing cartridge 1 in the first position from the drum cartridge 5. After a certain distance, the first push part 70*a* positioned above may abut against the drum push member, such that the developing cartridge may be in the second position. A step 70*c* may be formed at the rear end of the first push part 70*a* and the rear end of the second push part 70*b*, such that the first push part 70*a* may be stably abut against the drum push member when the developing cartridge 1 is in the second position. Therefore, the developing cartridge may be stably maintained in the second position. The first push part 70*a* and the second push part 70*b* may be provided on the first push member 71 and the second push member 72 respectively.

Figure 61:
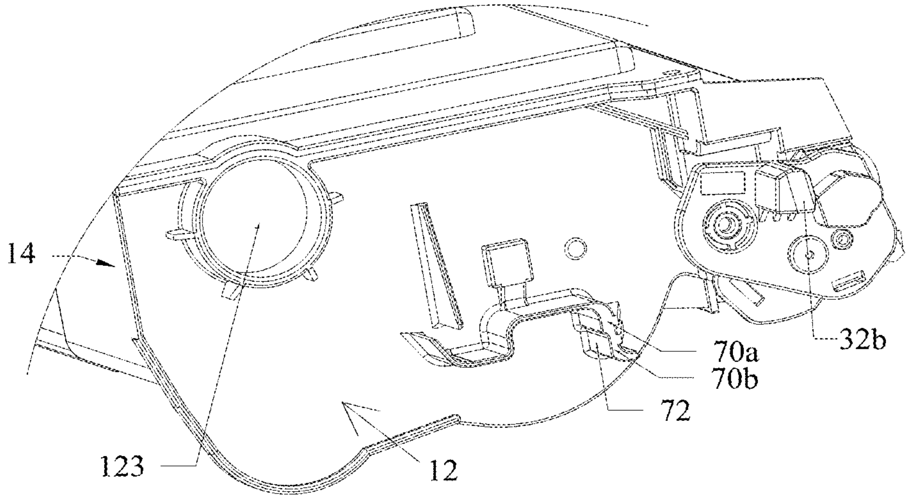
FIG. 61 illustrates a partial structure of another exemplary developing cartridge according to various disclosed embodiments of the present disclosure.

The second push member 72 is taken as an example for description. As shown in FIG. 61, the first push part 70*a* of the second push member 72 may be abutted and pushed by the second drum push member 56, that is, the developing cartridge 1 may be in the first position. At this time, the process cartridge may be installed to the image forming device. During the installation process, the storage medium 113 may be positioned below the second upper guide part 914. After the storage medium 113 successfully passes over the second upper guide part 914, the electrical contact surface 1131 may be positioned below the second identification contact 916 and may not be connected to the second upper guide part 914. The developing cartridge 1 may be still in the first position. Then, the user may hold the handle 141 of the developing cartridge 1 and lift the developing cartridge 1 upward. That is, the developing cartridge 1 may be rotated upward around the cartridge limiting part 130 relative to the drum cartridge 5, such that the first push part 70*a* of the second push member 72 abuts against the top of the second drum push member 56 as shown in FIG. 62, and the second push part 70*b* may be abutted by the second drum push member 56. That is, the developing cartridge 1 may be in the second position, such that the electrical contact surface 1131 comes to in contact with the second identification contact 916. When taking out the process cartridge, the user may first press down the developing cartridge 1 such that the developing cartridge 1 returns to the first position from the second position. The storage medium 113 may avoid the second upper guide part 914 such that the process cartridge is able to be taken out.

The first drum push member 55 and the second drum push member 56 may be arranged to overlap in the first direction. Correspondingly, the first push member 71 and the second push member 72 may be arranged to overlap in the first direction, such that the forces on the two ends of the developing cartridge 1 in the first direction are more balanced, and the contact between the developing roller 131 and the photosensitive drum may be more stable. The first push part 70*a* of the first push member 71 and the first push part 70*a* of the second push member 72 may overlap in the first direction, and the second push part 70*b* of the first push member 71 and the second push part 70*b* of the second push member 72 may be arranged to overlap in the first direction. The first push member 71 may be at least partially positioned between the rotation axis of the stirring gear 45 and the rotation axis of the driving part 21. In the second direction, the distance between the first push member 71 and the rotation axis of the driving receiving part 40 may be the same as the distance between the stirring gear 45 and the rotation axis of the driving receiving part 40.

In some embodiments, a push slope may be formed at the rear end of the push element, and the upper end of the push slope may be farther back than the lower end, such that the upper end of the push slope abuts the drum push member after the developing cartridge 1 is lifted at a certain distance from the first position. The push slope may be formed on the first push part 70*a* and the second push part 70*b*. The upper end of the push slope may be the first push part 70*a*, and the lower end of the push slope may be the second push part 70*b*. The number of the drum push member may be one, and the push element may also be provided with only one push member. The first push member 71 may also be positioned outside the rotation axis of the stirring gear 45 and the rotation axis of the driving part 21. The push element may be directly or indirectly disposed on the cartridge body 10. For example, the push element may indirectly disposed on the cartridge body 10 through the protective cover 111. The push element may be integrally formed with the cartridge body 10 or installed on the cartridge body 10. The first push part 70*a* and the second push part 70*b* may be an integral structure or a separate structure. The first push part 70*a* and the second push part 70*b* may be integrally formed or installed and fixed together. In some other embodiments, the first drum push member 55 and the second drum push member 56 may not overlap. Correspondingly, the first push member 71 and the second push member 72 may not overlap. It can be understood that the above effect may also be achieved even when the push element is slightly movable relative to the drum frame 50. The push element of this embodiment may be disposed closer to the developing roller 131 than the handle 141 in the second direction, such that the pushing effect of the push element and the electrical contact effect between the electrical contact surface 1131 and the second identification contact 916 are better. In some embodiments, the push element may be closer to the handle 141 than the developing roller 131 in the second direction. The push element may also be disposed at the fourth end 14 in the second direction.

In this embodiment, by arranging the lifting element in the push element, not only the developing roller 131 may be brought into contact with the photosensitive drum, but also the electrical contact surface 1131 and the second identification contact 916 may be brought into electrical contact, thereby reducing the structural configuration and saving costs.

First Variation of Embodiment 11

Figure 64:
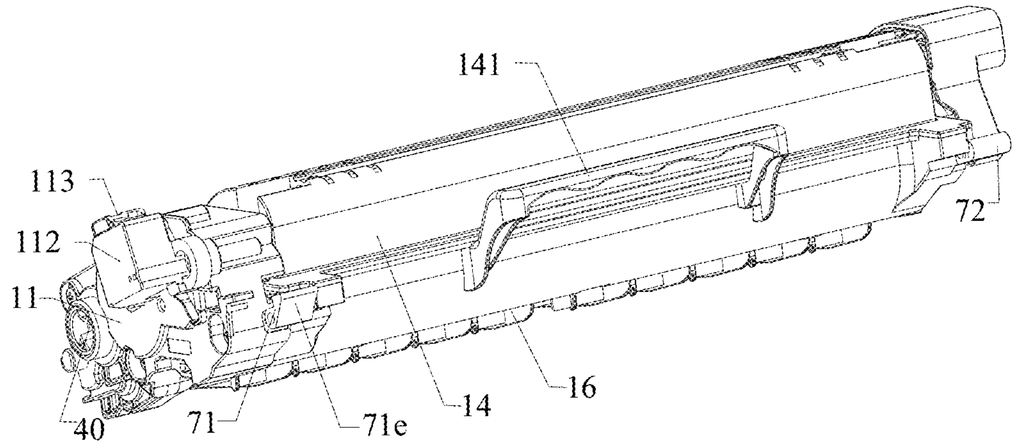
FIG. 64 illustrates another exemplary developing cartridge according to various disclosed embodiments of the present disclosure.
Figure 65:
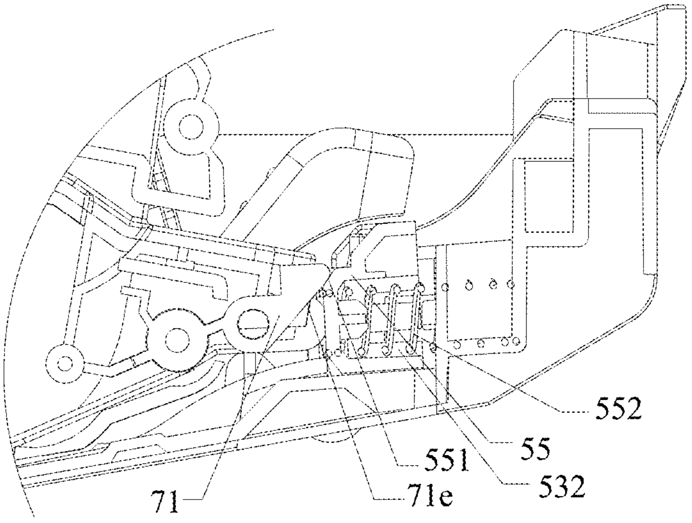
FIG. 65 illustrates a partial structure of another exemplary developing cartridge cooperating with a drum cartridge, according to various disclosed embodiments of the present disclosure.

In a variation of Embodiment 11 shown in FIG. 64 and FIG. 65, the drum push member may be able to move in the front-rear direction relative to the drum frame 50. A push elastic member 552 may be provided between the first drum push member 55 and the push groove 532, and a push elastic member 552 may be provided between the second drum push member 56 and the push groove 532, such that the first drum push member 55 and the second drum push member 56 are movable in the front-rear direction. The front end of the drum push member may have a drum push slope 551. The drum push slope 551 may be a plane or a curved surface. The rear end of the drum push slope 551 may be higher than the front end. The drum push slope 551 may match the push slope 71*e*. That is, the extending directions of the push slope 71*e* and the drum push slope 551 may be substantially the same. The drum push slope 551 may be formed on the first drum push member 55 and the second drum push member 56.

The push element may be disposed at the fourth end 14 of the cartridge body 10. The first push member 71 may protrude outward relative to the fourth end 14. The first push member 71 may have a push slope 71*e*, and the push slope 71*e* may be used to receive the pushing force of the drum push slope 551. The upper end of the push slope may be farther back than the lower end, and the push slope 71*e* may be a flat or curved surface. The second push member 72 may protrude outward relative to the fourth end 14. The second push member 72 may be arched. The structures of the first push member 71 and the second push member 72 may be different. In some other embodiments, the structures of the first push member 71 and the second push member 72 may be the same.

When the developing cartridge 1 is installed on the drum cartridge, the drum push member 55 may abut against the push element and apply upward pushing force and forward pushing force to the push element. The drum push slope 551 may be positioned below the push slope, and the drum push slope 551 may abut against the push slope 71*e* of the first push member 71 and the lower end of the arched part of the second push member 72, such that the first push member 71 and the second push member 72 receive forward force and upward pushing force.

During the installation process of the process cartridge, the storage medium 113 may be abutted by the second upper guide part 914 and receive a downward force by the second upper guide part 914, such that the entire developing cartridge 1 is subjected to a downward force. The first drum push member 55 may exert an upward force on the first push member 71. Therefore, the downward force of the second upper guide part 914 may be larger than the upward force of the first drum push member 55, such the developing cartridge 1 moves downward since the first push member 71 drives the first drum push member 55 to move backward. The storage medium 113 may avoid the second upper guide part 914. When the first drum push member 55 moves backward, it may compress the push elastic member 552. After the storage medium 113 passes over the second upper guide part 914, the developing cartridge 1 may move upward under the elastic force of the push elastic member 552, such that the electrical contact surface 1131 comes into electrical contact with the second identification contact 916.

In Embodiment 11 and its variations, the push element may be disposed at the first end 11, the second end 12, the fourth end 14, or the sixth end 16 of the cartridge body 10, to achieve similar effects.

In Embodiment 1 to Embodiment 11 and their variations, the developing cartridge may be provided with the lifting element. The lifting element may lift the developing cartridge upward relative to the drum cartridge, such that the electrical contact surface enters the recess and makes electrical contact with the identification contact. Therefore, the image forming device may be able to read the information of the storage medium 113. Further, the bracket and the electrical contact surface may be fixedly arranged relative to the developing cartridge, and there may be no need to provide structures such as slide rails in the developing cartridge to make the bracket and the electrical contact surface being able to slide relative to the cartridge body. Therefore, the structure of the bracket and the electrical contact surface may be simple, the accuracy requirements for the bracket may be low, the number of parts may be reduced, and the cost may be saved.

Embodiment 12

Figure 66:
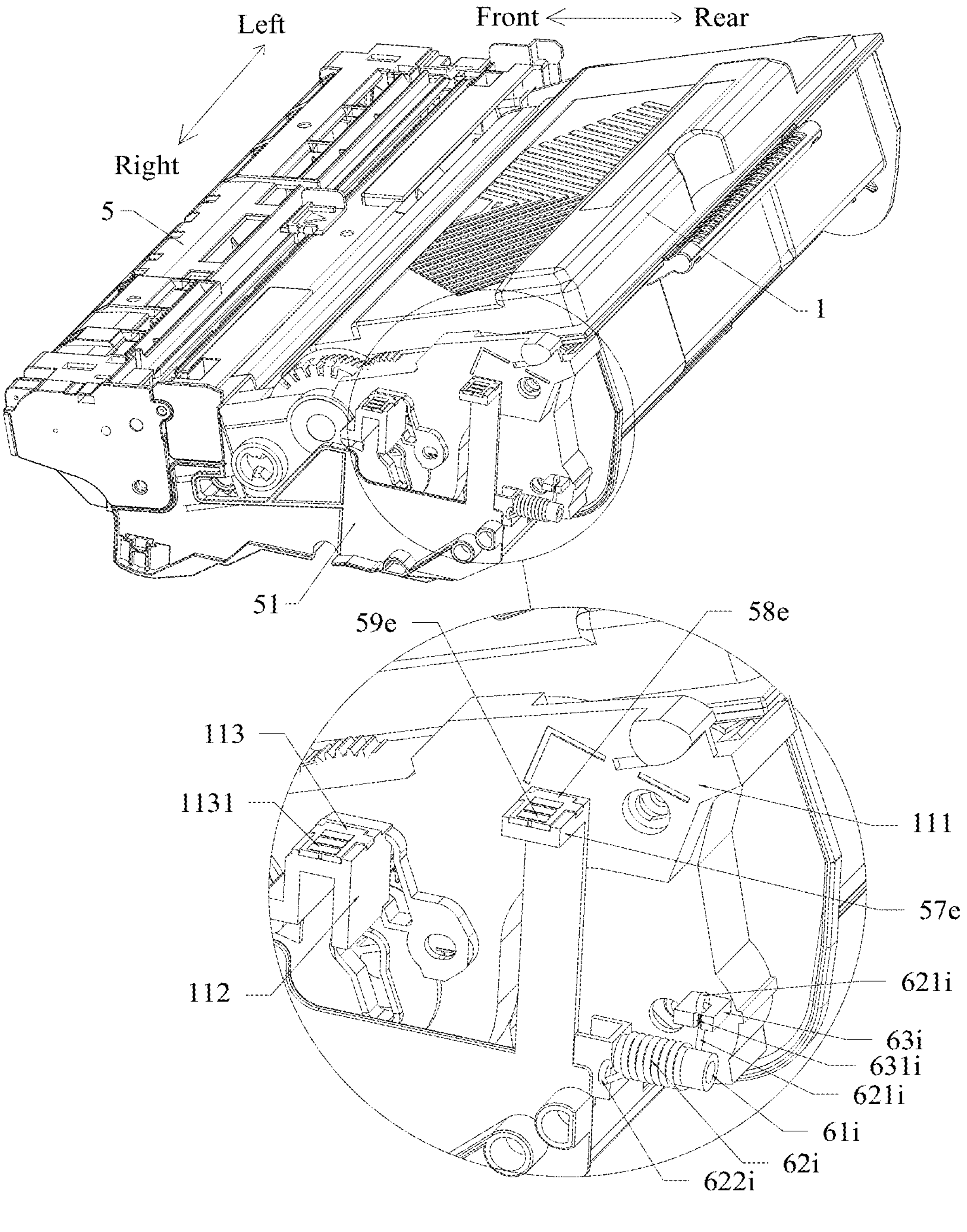
FIG. 66 illustrates another exemplary process cartridge according to various disclosed embodiments of the present disclosure.
Figure 67:
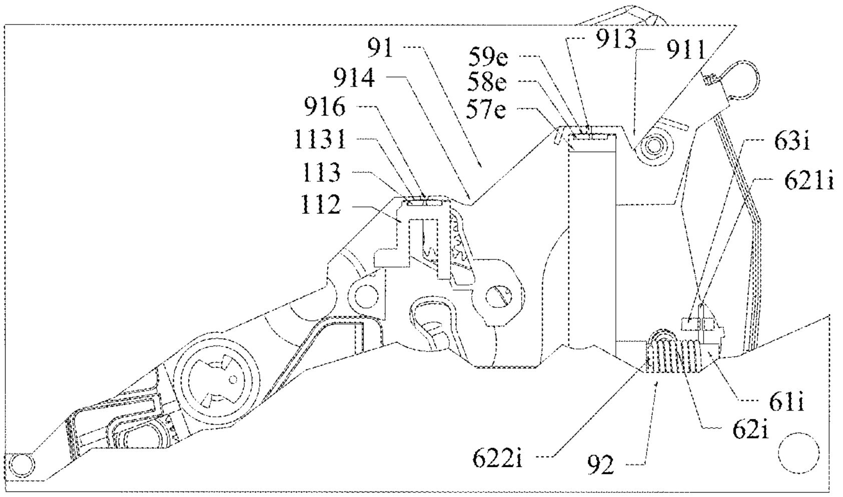
FIG. 67 illustrates another exemplary process cartridge installed in an image forming device, according to various disclosed embodiments of the present disclosure.

In another embodiment shown in FIG. 66 to FIG. 67, the lifting element may include a drum elastic element. The drum elastic element may be arranged on the drum cartridge. The drum elastic element may abut against the guide rail in the image forming device and may lift the drum cartridge upward together with the developing cartridge, such that the electrical contact surface of the developing cartridge comes into electrical contact with the second identification contact 916. Therefore, the image forming device may identify the information of the developing cartridge. The drum cartridge may also include a drum identification element. The drum identification element may include a drum bracket 57*e*, a drum storage medium 58*e*, and a drum electrical contact surface 59*e*. The drum elastic element may abut against the guide rail in the image forming device and lift the drum cartridge upward together with the developing cartridge. This may also cause the drum electrical contact surface 59*e* to be in electrical contact with the first identification contact 913, such that the image forming device identifies the information of the drum cartridge.

The drum identification element may be fixedly installed on the first side wall 51 of the drum cartridge 5. The drum bracket 57*e* may be formed by a protrusion to the right and integrally formed with the first side wall 51. The drum bracket 57*e* may be provided with an installation recess, and the installation recess may be from top to bottom. The drum storage medium 58*e* may be fixedly installed in the installation recess by gluing, snapping, etc., and the drum electrical contact surface 59*e* may be fixedly provided on the upper surface of the drum storage medium 58*e*. After the drum storage medium 58*e* is installed on the drum bracket 57*e*, the drum storage medium 58*e* may be flush with the drum bracket 57*e* to prevent the drum storage medium 58*e* from falling off due to interference.

The drum elastic element may include a drum elastic member 62*i* and a drum holder 61*i*. The drum holder 61*i* may be fixedly provided on the first side wall 51 and extend rearward along the second direction. The drum elastic member 62*i* may be sleeved on the drum holder 61*i*. The drum elastic member 62*i* may be elastically deformed. The drum elastic member 62*i* may be preferably a torsion spring. In some other embodiments, the drum elastic member 62*i* may also be other elastically deformable structures or materials. For example, the drum elastic member 62*i* may also be made of a plastic material able to be elastically deformed. The drum elastic member may include a first arm 621*i* extending toward the second end 12 along the first direction and a second arm 622*i* extending along the first direction away from the first end 11. The right end of the protective cover 111 of the developing cartridge may be fixedly provided with a positioning part 63*i*. The positioning part 63*i* may include a positioning groove. The positioning groove may be opened in the third direction. The first arm 621*i* of the drum elastic member 62*i* may be inserted into the positioning groove from the opening and may be limited by the positioning groove. The opening of the positioning groove in the third direction may be a through hole, or the positioning groove may not open above the third direction but open below the third direction. The right end of the positioning groove may be open for the first arm 621*i* to be inserted, and a buckle 631*i* may be provided at the opening of the positioning groove. When the first arm 621*i* passes through the buckle 631*i*, the buckle 631*i* may be elastically deformed, thereby making the opening larger and enabling the first arm to be inserted into the positioning groove smoothly. The buckle 631*i* may also have a limiting effect on the first arm 621*i* to prevent the first arm 621*i* from coming out of the positioning groove to the right. Since the first arm 621*i* is inserted into the positioning groove, the first arm 621*i* may be limited by the positioning groove in both the second direction and the first direction. The first arm 621*i* may be fixedly connected to the drum elastic member 62*i*, such that the drum elastic member 62*i* is also limited. During the process of assembling the developing cartridge to the drum cartridge 5 from top to bottom, the positioning groove may be aligned with the first arm 621*i*, and the first arm 621*i* may be inserted into the positioning groove to be limited by the positioning groove. In other embodiments, the positioning groove may also be provided on the first side wall 51 of the drum cartridge 5, such that the first arm 621*i* does not need to be aligned when the developing cartridge is installed on the drum cartridge 5, making the installation simpler. The positioning part and the positioning groove may also be directly provided at the first end 11 of the cartridge body.

The first upper guide part 911 may be positioned behind the first identification contact 913 in the second direction, and the lower end of the first upper guide part 911 may be positioned below the lower end of the first identification contact 913 in the third direction. Therefore, the drum identification element may need to at least partially pass over the lower end of the first upper guide part 911 such that the drum electrical contact surface 59*e* is able to contact and electrically connect with the first identification contact 913. After the drum electrical contact surface 59*e* reaches the position in contact with the first identification contact 913, it may be blocked by the first upper guide part 913 and may not be able to move backward, thereby preventing the drum electrical contact surface 59*e* from disengaging from the first identification contact 913.

When the developing cartridge 1 and the drum cartridge 5 are installed together into the image forming device, the second arm 622*i* may contact the lower guide rail 92 and elastically support the drum cartridge 5 when the drum bracket 57*e* moves to contact the first upper guide 911. The drum bracket 57*e* may receive the downward force provided by the first upper guide part 911, such that the drum cartridge 5 overcomes the elastic force of the drum elastic member 62*i* and the drum elastic member 62*i* generates elastic deformation. The drum cartridge 5 as a whole may move downward relative to the image forming device in the third direction. The drum cartridge 5 and the drum identification element on the drum cartridge 5 may avoid the first upper guide part 911, and the drum electrical contact surface 59*e* may move downward along with the drum bracket 57*e* to avoid the first upper guide part 911. The drum cartridge 5 may continue to be installed forward, the drum identification element may pass through the first upper guide part 911, and the drum elastic member 62*i* may elastically return, such that the drum cartridge 5 and the drum identification element on it move upward relative to the image forming device. Therefore, the drum electrical contact surface 59*e* may be in contact with and electrically connected with the first identification contact 913.

When the drum cartridge 5 is taken out, the drum identification element may contact the first upper guide part 911 and receive the downward force of the first upper guide part 911, causing the drum elastic member 62*i* to elastically deform. And then the drum identification element may move downward with the drum cartridge 5 to avoid the first upper guide part 911. Therefore, the drum cartridge 5 may be smoothly taken out of the image forming device.

There may be no elastically deformable lifting element provided on the developing cartridge. When the drum cartridge 5 avoids the first upper guide part 911, the developing cartridge and the identification element on the developing cartridge may move downward along with the drum cartridge 5 to avoid the second upper guide part 914. And then when the drum cartridge 5 passes through the first upper guide part 911, the developing cartridge and the identification element thereon may also pass through the second upper guide part 914. When the drum elastic member 62*i* elastically returns to move the drum cartridge 5 upward such that the drum electrical contact surface 59*e* contacts the first identification contact 913, the developing cartridge and the identification element on it may also move upward together with the drum cartridge 5, such that the electrical contact surface 1131 on the developing cartridge is in contact with the second identification contact 916. It can be understood that, in some other embodiments, the developing cartridge may also be provided with an elastically deformable lifting element described above, such that the developing cartridge is able to be lifted up and down relative to the drum cartridge. Therefore, both the drum cartridge and the developing cartridge may be able to move upwards by a suitable distance, and the drum electrical contact surface 59*e* may be in electrical contact with the first identification contact 913, and the electrical contact surface 1131 may be in electrical contact with the second identification contact 916. When the drum cartridge 5 is taken out, the developing cartridge and the identification element on it may also move downward along with the drum cartridge 5 to avoid the second upper guide 914, such that the developing cartridge along with the drum cartridge 5 may be smoothly removed from the image forming device.

In this embodiment, the front side and the rear side of the second upper guide part 911 may be both slopes. Therefore, when the drum identification element contacts the front side and the rear side of the first upper guide part 911, the first upper guide part 911 may exert a downward component of the force to the drum identification element. When the first upper guide part 911 in the image forming device using the drum cartridge 5 in this embodiment does not have a slope, a first drum guide slope may also be provided at the front end of the drum bracket 57*e* and a second drum guide slope may be provided at the rear end. The front end of the first drum guide slope may be lower than the rear end. The rear end of the second drum guide slope may be lower than the front end. That is, the first drum guide slope may be inclined in the same manner as the first guide slope of the bracket, and the second drum guide slope may be inclined in the same manner as the second guide slope of the bracket. The first drum guide slope may be used to guide the drum identification element to move downward, such that the drum identification element passes over the first upper guide part 911 and enters the first recess 912 to prevent the drum identification element from being damaged by collision due to rigid contact. The second drum guide slope may be used to guide the drum identification element to move downward, such that the drum identification element avoids the first upper guide part 912 to prevent the drum identification element from being damaged due to collision of rigid contact when the drum cartridge is taken out from the installation cavity. It can be understood that, in some other embodiments, the first drum guide slope and the second drum guide slope may not be provided on the drum bracket, but may be provided on the drum storage medium or the drum electrical contact surface. That is, the first drum guide slope of the drum identification element may be disposed on at least one of the drum bracket, the drum storage medium or the drum electrical contact surface, and the second drum guide slope of the drum identification element may be disposed on at least of the drum bracket, the drum storage medium or the drum electrical contact surface.

In some embodiments, only the identification element of the developing cartridge may be provided. When the developing cartridge 1 and the drum cartridge 5 are installed together in the image forming device, the second arm 622*i* may contact the lower guide rail 92 and elastically support the drum cartridge 5. When the bracket 112 moves to contact the upper guide part 911, the bracket 112 may receive the downward force provided by the first upper guide part 911, causing the developing cartridge 1 and the drum cartridge 5 to overcome the elastic force of the drum elastic member 62*i* and the drum elastic member 62*i* to produce elastic deformation. The developing cartridge 1 and the drum cartridge 5 as a whole may move downward relative to the image forming device in the third direction. The developing cartridge 1 and the identification element thereon may avoid the second upper guide part 914, and the electrical contact surface 1131 may move downward along with the bracket 112 to avoid the second upper guide part 914. As the process cartridge continues to be installed forward, the identification element may pass over the second upper guide part 914, and the drum elastic member 62*i* may elastically recover, such that the drum cartridge 5, the developing cartridge 1 and the identification elements thereon move upward relative to the image forming device to make the electrical contact surface 1131 and the second identification contact 916 contact and electrically connect. This embodiment may also provide only the drum identification element of the drum cartridge without providing the identification element of the developing cartridge. The drum elastic element may also be provided on the second side wall 52 alone, or on both the first side wall 51 and the second side wall 52. The drum bracket 57*e* may be integrally formed with the drum frame 50 or may be installed and fixed on the drum frame 50.

First Variation of Embodiment 12

Figure 68:
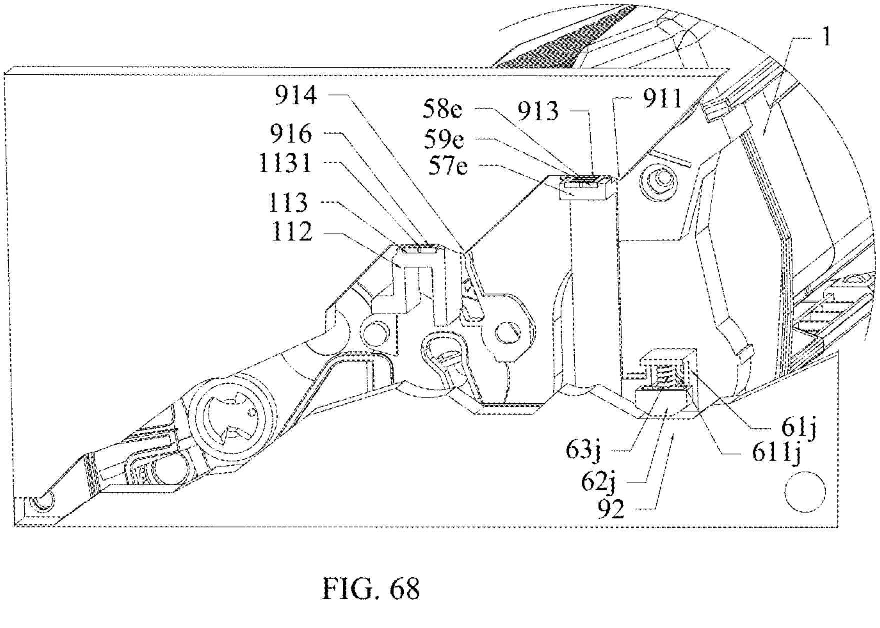
FIG. 68 illustrates another exemplary process cartridge installed in an image forming device, according to various disclosed embodiments of the present disclosure.

In a variation of Embodiment 12 shown in FIG. 68, the drum elastic element may be disposed in a different manner and the manner for achieving the electrical contact may be the same as Embodiment 12. The drum holder 61*j* may be fixed on the first side wall 51 of the drum cartridge 5. The drum holder 61*j* may be provided with a guide rail 611*j* extending in the third direction. A drum support member 62*j* that is able to slide relative to the drum cartridge in the third direction along the guide rail 611*j* may be slidably installed in the guide rail 611*j*. The drum support member 62*j* may be provided with an upward opening. The drum elastic member 63*j* may be provided between the upper wall of the guide rail 611*j* and the opening of the drum support member. The drum elastic member 63*j* may be preferably a spring, such as a compression spring. The upper wall of the guide rail 611*j* may be also provided with a positioning post protruding downward, and the drum elastic member 63*j* may be sleeved on the positioning post to prevent the drum elastic member 63*j* from being distorted. The left end of the drum support member 62*j*, that is, the end closer to the second side end 12, may be inserted into the guide rail 611*j* and may be able to slide along the guide rail 611*j*. The right end of the drum support member 62*j*, that is, the end farther away from the second side end 12, may be positioned outside the guide rail 611*j*. The lower end surface of the part of the drum support member 62*j* positioned outside the guide rail 611*j* may be used to abut the lower guide rail 92 to support the drum cartridge 5 and the developing cartridge 1.

Second Variation of Embodiment 12

Figure 69:
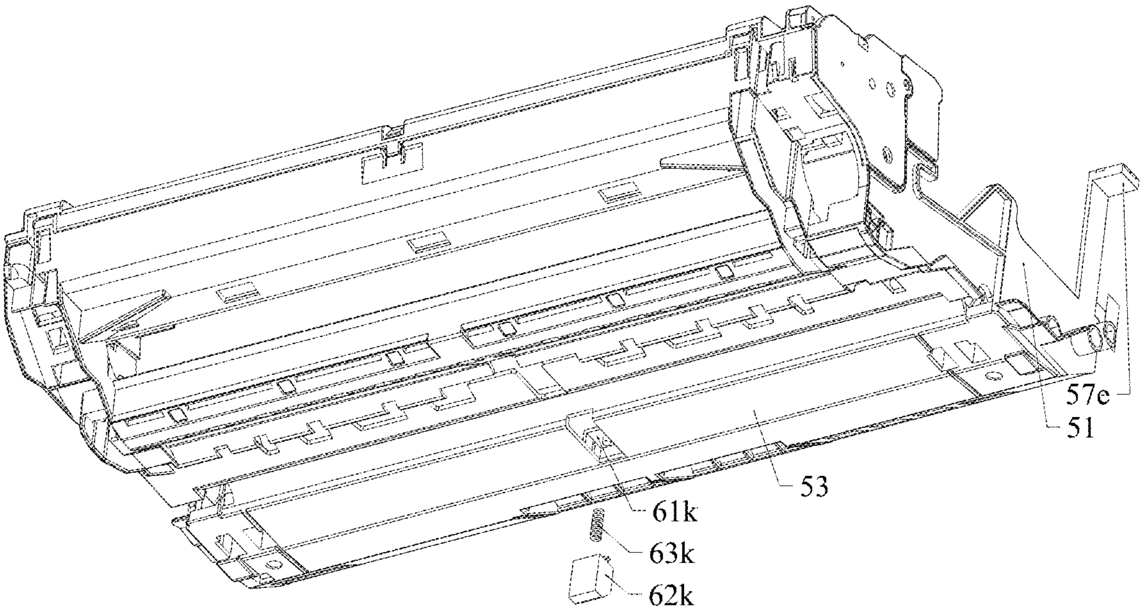
FIG. 69 illustrates another exemplary drum cartridge according to various disclosed embodiments of the present disclosure.

In another variation of Embodiment 12 shown in FIG. 69, the drum elastic element may be disposed at the bottom of the third side wall 53, and the drum elastic element may be in contact with the bottom wall 95*a* of the image forming device. The drum holder 61*k* may be fixedly disposed at the bottom of the third side wall 53 of the drum cartridge 5, and the drum elastic member 63*k* may extend in the up-down direction. The drum elastic member 63*k* may abut between the drum holder 61*k* and the drum support member 62*k*. The drum support member 62*k* may be used to abut the bottom wall 95*a* within the image forming device such that the drum cartridge and the developing cartridge are lifted relative to the image forming device.

In Embodiment 12 and its variations, when the drum identification element contacts the first upper guide part 911 and moves downward, the drum elastic element may elastically deform. After the drum identification element crosses the first upper guide part 911, under the elastic action of the drum elastic element, the drum cartridge and the drum identification element thereon may be lifted upward relative to the image forming device, such that the drum electrical contact surface is in electrical contact with the first identification contact 911. When the identification element comes into contact with the second upper guide part 914 and moves downward, the drum elastic element may be compressed. After the identification element crosses the second upper guide part 914, under the action of the drum elastic element, the developing cartridge, its identification element, and the drum cartridge may be lifted upward relative to the image forming device, such that the drum electrical contact surface is in electrical contact with the second identification contact 916.

The process cartridge may be provided with the lifting element that abuts against the image forming device to lift the developing cartridge and the drum cartridge upward relative to the image forming device, such that the electrical contact surface is in electrical contact with the identification contact. Further, the bracket and the electrical contact surface may be fixed relative to the developing cartridge, and there may be no need to set up slide rails and other structures in the developing cartridge to make the bracket and the electrical contact surface slide relative to the cartridge body. Therefore, the structure of the bracket and the electrical contact surface may be simple, and the accuracy requirements for the bracket may be low, which reduces number of parts and saves cost.

Embodiment 13

Figure 70:
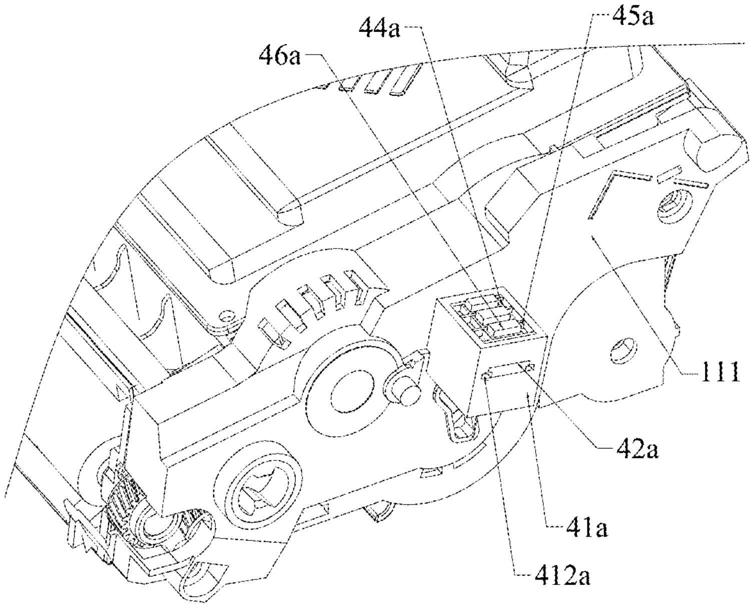
FIG. 70 illustrates a partial structure of an identification element of another exemplary developing cartridge, according to various disclosed embodiments of the present disclosure.
Figure 71:
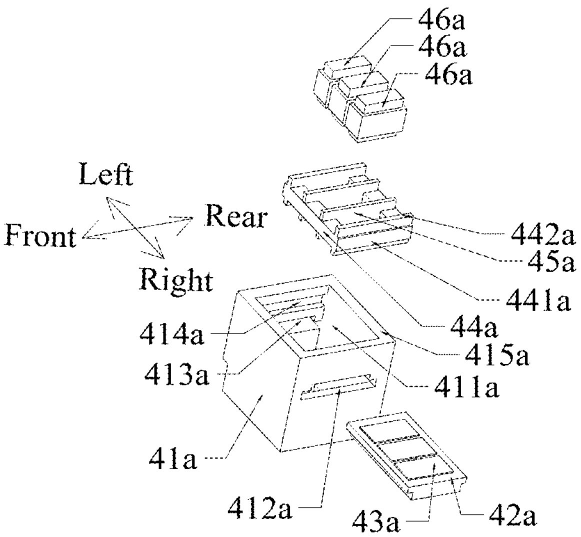
FIG. 71 illustrates an explosive view of an identification element in FIG. 70.
Figure 72:
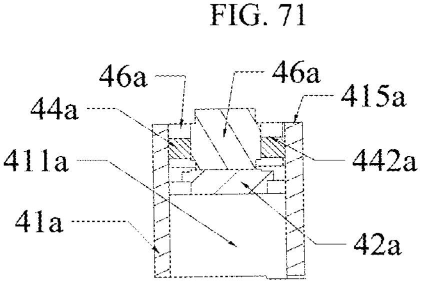
FIG. 72 illustrates a cross-sectional view of an identification element in FIG. 70.

In another embodiment shown in FIG. 70 to FIG. 72, the lifting element may be disposed on the identification element, which is different from Embodiment 5. The lifting element may include an electrical contact member 46*a*. The identification element may include the electrical contact member 46*a* in addition to the bracket, the storage medium 42*a*, and the electrical contact surface. The electrical contact member 46*a* may be provided on the bracket. The electrical contact member 46*a* may at least partially protrude from the upper end surface of the bracket. The electrical contact member 46*a* may be capable of being elastically deformed. The electrical contact member 46*a* may be used to make electrical contact with the second identification contact 916 and the electrical contact surface. During the installation process of the process cartridge, the electrical contact member 46*a* may abut the second upper guide part 914 and receive a downward force. Therefore, the electrical contact member 46*a* may be elastically deformed and may cross the second upper guide part 914. After crossing the second upper guide part 914, the electrical contact member 46*a* may recover from deformation and spring up to make electrical contact with the second identification contact 916, such that the storage medium 42*a* is electrically connected to the second identification contact 916. The electrical contact member 46*a* may move downward relative to the bracket and the cartridge body 10 during elastic deformation. After being installed in place, the upper end surfaces of the bracket and the storage medium 42*a* may be positioned below the second identification contact 916 and the second upper guide part 914. There may be gaps between the bracket, the storage medium 42*a*, and the second upper guide part. 914 in the up-down direction. It can be understood that the bracket may also be in slight contact with the second upper guide part 914 in the up-down direction in some other embodiments, as long as the electrical contact member 46*a* is able to bounce upward after crossing the second upper guide part 914 and make electrical contact with the second identification contact 916.

The bracket may include a first support part 41*a* and a frame 44*a*. The first support part 41*a* may be used to install the storage medium 42*a*. The frame 44*a* may be used to install the electrical contact member 46*a*. The frame 44*a* may be installed above the first support part 41*a*. The electrical contact member 46*a* may at least partially protrude from the upper end surface 415*a* of the first support part and the upper end surface 442*a* of the frame in the second direction, such that there are gaps from the upper end surface 415*a* of the first support part and the upper end surface 442*a* of the frame to the lower end of the second upper guide part 914 during the installation of the process cartridge. The electrical contact member 46*a* may be able to abut the second upper guide part 914 and undergo elastic deformation, and then the electrical contact member 46*a* may cross the second upper guide part 914. It can be understood that, when there is an upwardly recessed space at the left or right side of the second upper guide part 914, the upper end surface 415*a* of the first support part may be positioned at the left or right side of the second upper guide part 914. The part of the upper end surface 442*a* of the frame positioned at the left or right side of the second upper guide part 914 may also be higher than the lower end of the second upper guide part 914.

The first support part 41*a* may be provided at the first end 11 of the cartridge body 10. For example, the first support part 41*a* may be fixedly provided on the right side of the protective cover 111. The first support part 41*a* may include an installation space 411*a* in the up-down direction. An installation opening 412*a* may be opened on the right side wall of the installation space 411*a*. An installation groove 413*a* recessed to the left may be opened on the left side wall of the installation space 411*a*. The storage medium 42*a* may be inserted into the installation space 411*a* through the installation opening 412*a*. The left and right ends of the storage medium 42*a* may be supported by the installation groove 413*a* and the installation opening 412*a*, such that the storage medium 42*a* is detachably installed on the first support part 41*a*. Further, the installation opening 412*a* may be provided on the right side of the first support part 41*a*. When the first support part 41*a* and the protective cover 111 or the cartridge body 10 are integrally formed or installed and fixed together, it may be convenient for the storage medium 113 to be installed into the first support part 41*a* from the right side of the developing cartridge. The projections of the installation opening 412*a* and the installation groove 413*a* in the left-right directions may overlap, such that the storage medium 42*a* is supported horizontally. Of course, the projections of the installation opening 412*a* and the installation groove 413*a* in the left-right directions may not overlap in some other embodiments. The first support part 41*a* may be provided with a first positioning part. The first positioning part may be formed by a recess in the side wall of the installation space. The first positioning part may be used to install the frame 44*a*. For example, the first positioning part may be a positioning groove. The positioning groove may include a first positioning groove and a second positioning groove 414*a*. The first positioning groove may be formed by a recess in the right side wall of the installation space 411*a*. The second positioning groove 414*a* may be formed by a recess in the left side wall of the installation space 411*a*. Therefore, the left and right ends of the frame 44*a* may be supported by the positioning groove, such that the frame 44*a* is installed on the first support part 41*a*. The projections of the first positioning groove and the second positioning groove 414*a* in the left-right direction may overlap, such that the frame 44*a* is supported horizontally. The first positioning groove may be positioned above the installation opening 412*a*, and the second positioning groove 414*a* may be positioned above the installation groove 413*a*, such that the electrical contact member 46*a* and the frame 44*a* is positioned above the storage medium 42*a*.

The frame 44*a* may include a second positioning part. The second positioning part may be used to cooperate with the first positioning part. The bracket may be provided with an isolation part. In this embodiment, the isolation part 45*a* may be provided on the frame 44*a*. For example, the second positioning part may be a positioning protrusion 441*a*. The positioning protrusion 441*a* may be formed on the left end surface and the right end surface of the frame 44*a*. The positioning protrusion 441*a* may be used to snap into the first positioning groove and the second positioning groove 414*a* to install the frame 44*a* on the first support part 41*a*. The isolation part 45*a* may be used to isolate the electrical contact member 46*a* to prevent different electrical contact member 46*a* from contacting each other and causing a short circuit. For example, the isolation part 45*a* may extend along the front-rear direction, and multiple isolation parts 45*a* may be arranged at intervals along the left-right direction. An isolation space may be formed in the up-down direction between two adjacent isolation parts 45*a*. The isolation space may be used for installing electrical contact member 46*a*. In some embodiments, after the frame 44*a* is installed in the first support part 41*a*, the isolation part 45*a* and the side wall of the first support part may also form an isolation space, that is, the side wall of the first support part may also be an isolation part. The isolation part 45*a* may be plate-shaped, sheet-shaped, or strip-shaped.

The electrical contact surface may include a first electrical contact surface 43*a* and a second electrical contact surface. The first electrical contact surface 43*a* may be provided on the storage medium 42*a*. The second electrical contact surface may be provided on the electrical contact member 46*a*. The first electrical contact surface 43*a* and the second electrical contact surface may be electrically connected, and the second electrical contact surface may be used to make electrical contact with the second identification contact 916. The first electrical contact surface 43*a* may be fixed to the storage medium 42*a*, and may extend along the first direction and the second direction. The first electrical contact surface 43*a* may intersect the third direction. The first electrical contact surface 43*a* may be fixedly disposed on the storage medium 42*a* in this embodiment. The second electrical contact surface may be positioned on the upper end of electrical contact member 46*a*.

The electrical contact member 46*a* may be able to be elastically deformed. In this embodiment, the electrical contact member 46*a* may be made of a flexible conductive material, such as conductive rubber. In some other embodiments, the electrical contact member 46*a* may be an elastically deformable conductive structure, such as a copper sheet or a steel wire. The electrical contact member 46*a* may penetrate into the isolation space between the isolation parts 45*a*, such that the electrical contact member 46*a* is separated by the isolation parts 442*c*, thereby preventing adjacent electrical contact member 46*a* from being short-circuited due to mutual contact. The electrical contact member 46*a* may penetrate into the isolation space, such that the surroundings of the electrical contact member 46*a* are limited by the isolation parts 45*a*. The lower end of the electrical contact member 46*a* may abut the first electrical contact surface 43*a* and may be supported by the first electrical contact surface 43*a*, such that the electrical contact member 46*a* is able to maintain stable electrical contact with the storage medium 42*a*. After being installed in the isolation space, the electrical contact member 46*a* may be squeezed by the isolation part 45*a* and elastically deform, such that the friction between the electrical contact member 46*a* and the isolation part 45*a* increases to prevent the electrical contact member 46*a* from upwardly detaching from the frame 44*a*. Protrusions may also be provided on the frame 44*a* or the electrical contact member 46*a*, to also prevent the electrical contact member 46*a* from detaching from the frame 44*a* after being installed in the isolation space. It can be understood that there may also be a gap between the lower end of the electrical contact member 46*a* and the first electrical contact surface 43*a*. When the upper end of the electrical contact member 46*a* is in electrical contact with the second identification contact 916, the electrical contact member 46*a* may be deformed to make electrical contact between the lower end of the electrical contact member 46*a* and the first electrical contact surface 43*a* of storage medium 42*a*. When installing the electrical contact member 46*a* and the frame 44*a*, the electrical contact member 46*a* may be installed into the isolation space of the frame 44*a*, and then the frame 44*a* may be installed into the first support part 41*a*. After installation, the lower end of the electrical contact member 46*a* may be in electrical contact with the first electrical contact surface 43*a*, and the upper end of the electrical contact member 46*a* may protrude from the upper end surface 442*a* of the frame and the upper end surface 415*a* of the first support part.

In some embodiments, the first support part 41*a* may be detachably installed and fixed on the cartridge body 10 or the protective cover 111, or may be non-detachably installed and fixed. The positions of the positioning groove and the positioning protrusion may be interchanged. The installation groove 413*a*, the first positioning groove and the second positioning groove 414*a* may be blind holes or through holes. The installation opening 412*a* and the installation groove 413*a* of the first support part 41*a* may also be provided in the front-rear direction of the first support part 41*a*, and the first positioning groove and the second positioning groove 414*a* may also be provided in the front-rear direction of the first support part 41*a*. The frame 44*a* may be integrally formed with the first support part 41*a*, or the frame 44*a* may be installed on the first support part 41*a*. Multiple isolation parts 45*a* may also be arranged at intervals along the front-rear direction. The electrical contact member 46*a* may be limited by the isolation parts 45*a* in the front-rear direction, and may be limited by the frame 44*a* in the left-right direction. The number of isolation parts 45*b* may be adjusted, thereby changing the number of isolation spaces to adapt to different numbers of electrical contact members 46*a*. There may be one or more electrical contact members 46*a*, preferably three. The storage medium 42*a* may not be installed in the bracket, but may be installed in other positions of the cartridge body 10. The electrical contact member 46*a* and the storage medium 42*a* may be connected through wires, such that the electrical connection between the storage medium 42*a* and the second identification contact is also be realized.

When the developing cartridge 1 shakes during operation, the electrical contact member 46*a* may elastically deform, such that the upper end of the electrical contact member 46*a* remains in contact with the second identification contact 916 and the lower end of the electrical contact member 46*a* remains in contact with the first electrical contact surface 43*a*. Therefore, the storage medium 42*a* may remain electrically connected to the second identification contact 916 through the electrical contact member 46*a* and the first electrical contact surface 43*a*.

When the process cartridge is taken out, the electrical contact member 46*a* may abut against the second upper guide part 914 and undergo elastic deformation. The electrical contact member 46*a* may pass over the second upper guide part 914, and the process cartridge may be taken out of the image forming device.

In the present embodiment, the lifting element may only need to provide the elastically deformable electrical contact member 46*a* in the identification element to realize the electrical connection between the storage medium 42*a* and the second identification contact 916. There may be no need to lift the entire developing cartridge 1 upward to achieve electrical connection. The connection method may be simple. Further, the bracket of the lifting element in this embodiment may be fixed relative to the cartridge body 10, and there may be no need to provide the bracket with structures and components that are able to move relative to the cartridge body 10. The accuracy requirements for the bracket may be low and the cost may be saved.

First Variation of Embodiment 13

Figure 73:
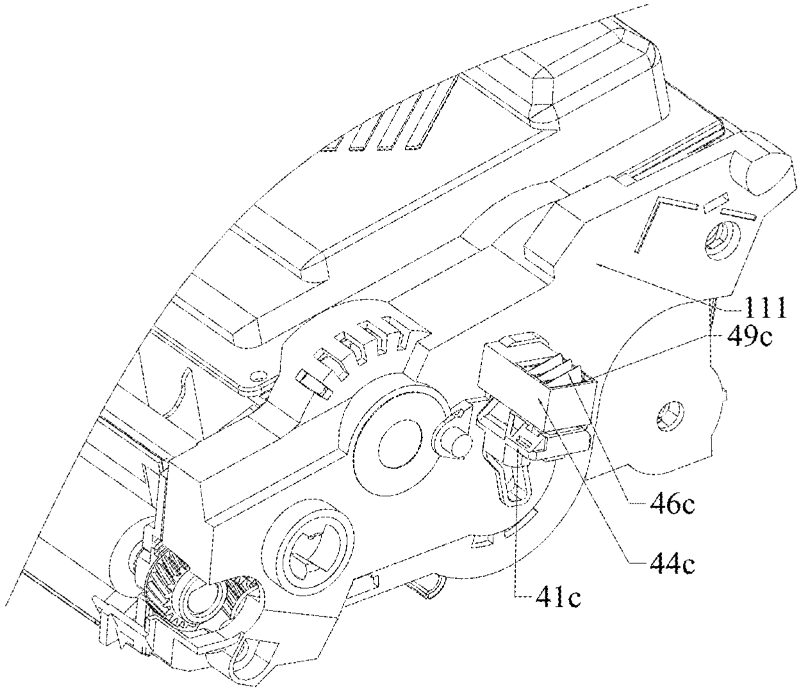
FIG. 73 illustrates a partial structure of another exemplary developing cartridge, according to various disclosed embodiments of the present disclosure.
Figure 74:
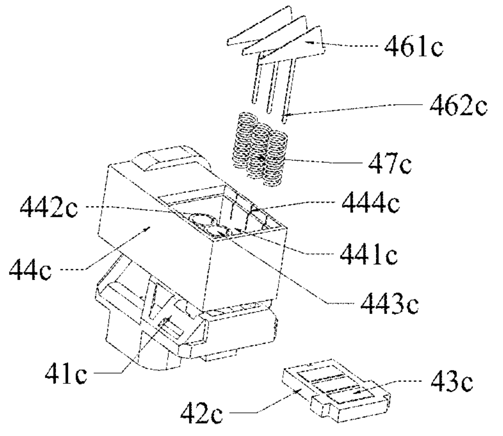
FIG. 74 illustrates an explosive view of an identification element in FIG. 73.
Figure 75:
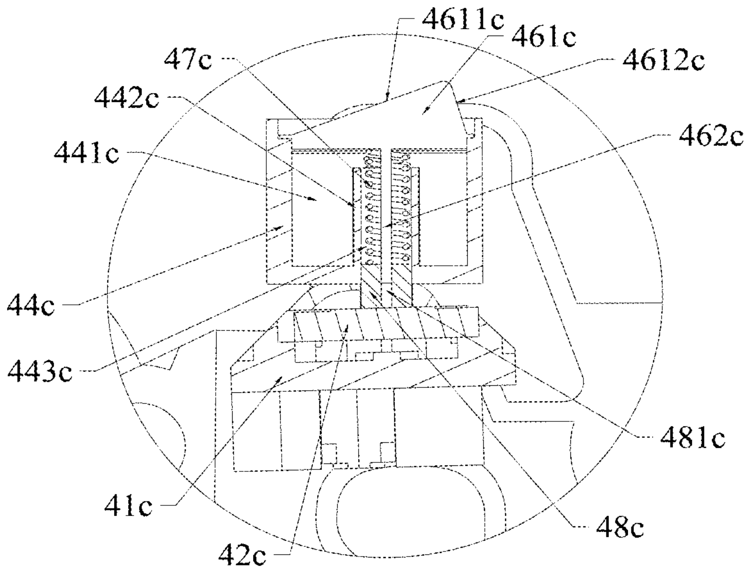
FIG. 75 illustrates a cross-sectional view of an identification element in FIG. 73.
Figure 76:
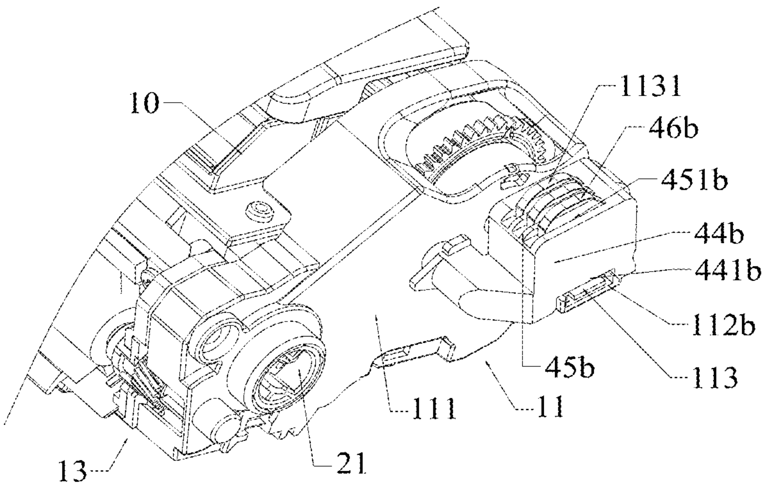
FIG. 76 illustrates a partial structure of another exemplary developing cartridge, according to various disclosed embodiments of the present disclosure.
Figure 77:
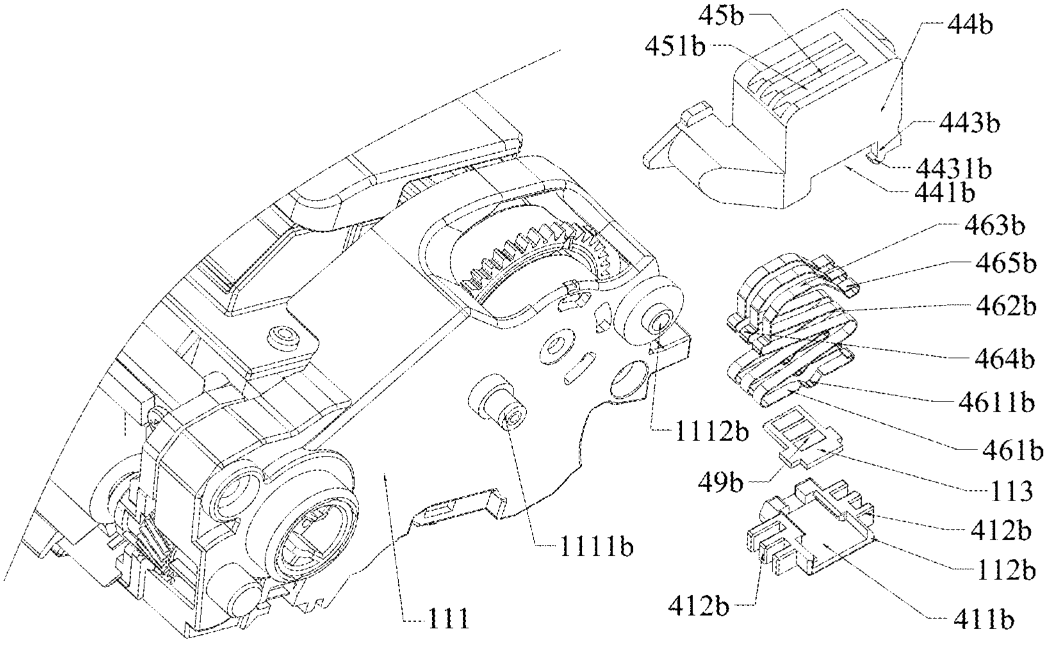
FIG. 77 and FIG. 78 illustrate explosive views of an identification element according to various disclosed embodiments of the present disclosure.
Figure 78:
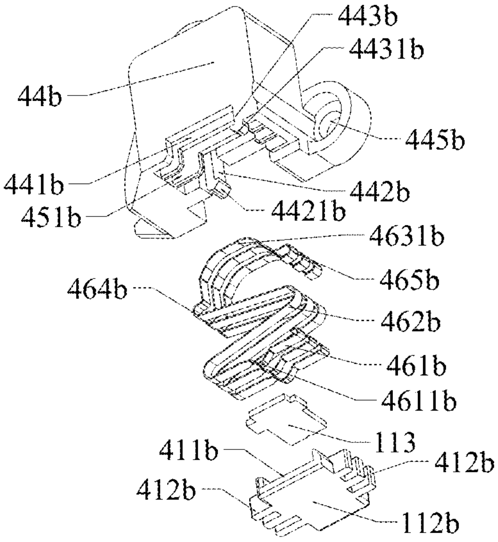
Figure 79:
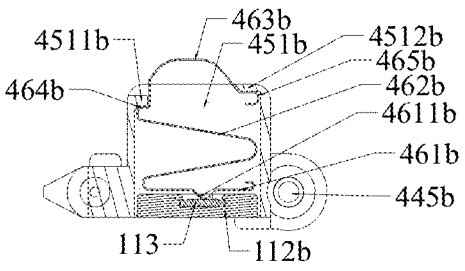
FIG. 79 illustrates a cross-sectional view of an identification element according to various disclosed embodiments of the present disclosure.

In a variation of Embodiment 13 shown in FIG. 73 to FIG. 75, the identification element may include the bracket, the storage medium 42*c*, an electrical contact surface, an electrical contact member, and an elastic member 47*c*. The electrical contact member may include a first electrical contact member 46*c* and a second electrical contact member 48*c*. The second electrical contact member 48*c* may be fixedly connected to the first electrical contact surface 43*c* and may be positioned above the first electrical contact surface 43*c*. One end of the first electrical contact member 46*c* may be in electrical contact with the second identification contact 916, and the other end may be in electrical contact with the second electrical contact member 48*c*. The first electrical contact member 46*c* may be able to move in the up-down direction relative to the frame 44*c*, and the elastic member 47*c* may abut between the first electrical contact member 46*c* and the second electrical contact member 48*c*. The first electrical contact member 46*c* may be electrically connected to the storage medium 42*c* through the second electrical contact member 48*c*, and the second electrical contact surface may be positioned on the first electrical contact member 46*c*. During the process of installing the process cartridge, the first electrical contact member 46*c* may abut the second upper guide part 914 and move downward. The first electrical contact member 46*c* may compress the elastic member 47*c*. After crossing the second upper guide part 914, the first electrical contact member 46*c* may springs up under the action of the elastic member 47*c* and electrically contact the second identification contact 916, thereby realizing the electrical connection between the storage medium 42*c* and the second identification contact 916.

The bracket may include a first support part 41*c* and a frame 44*c*. The frame 44*c* may be used to install the electrical contact member and the elastic members 47*c*. The first support part 41*c* and the frame 44*c* may have an integrally formed structure or separate structures. The storage medium 42*c* may be fixedly installed in the installation recess above the first support part 41*c*. The first electrical contact surface 43*c* may be arranged upward, and the second electrical contact member 48*c* may be fixed above the first electrical contact surface 43*c* and connected with the first electrical contact surface 43*c* electrically. The second electrical contact member 48*c* may be made of a conductive material, such as copper or conductive resin. Therefore, the second electrical contact member 48*c* may be electrically connected to the first electrical contact surface 43*c*. The second electrical contact member 48*c* may extend along the up-down direction. The second electrical contact member 48*c* may be provided with sliding holes 481*c* along the up-down direction. The number of second electrical contact member 48*c* may correspond to the number of the first electrical contact surface 43*c*.

The frame 44*c* may be provided at the first end 11 of the cartridge body 10. The frame 44*c* may be provided with an accommodating cavity 441*c* in the up-down direction. The front and rear walls of the accommodating cavity 441*c* may be provided with guide grooves 444*c* along the up-down direction. The guide grooves 444*c* may be used to guide the first electrical contact member 46*c*. Accommodating limiting members 442*c* may be fixedly provided in the accommodating cavity 441*c*. The accommodating limiting members 442*c* may be used to install the first electrical contact member 46*c* and the elastic member 47*c* and limit them. The number of the accommodating limiting members 442*c* may correspond to the number of the first electrical contact members 46*c*. The accommodating limiting members 442*c* may extend in the up-down direction and may be tubular. One accommodating limiting member 442 may be provided with a mounting limiting hole 443*c* in the up-down direction. The upper part of one corresponding second electrical contact member 48*c* may be inserted into the mounting limiting hole 443*c*, such that the second electrical contact member 48*c* is inserted into the mounting limiting hole 443*c*. One first electrical contact member 46*c* may be movably connected to one corresponding accommodating limiting member 442*c*. The first electrical contact member 46*c* may include an upper end 461*c* and a lower end 462*c*. The lower end 462*c* may be inserted into the mounting limiting hole 443*c* of the accommodating limiting member 442*c*. The upper end 461*c* may be positioned above the mounting limiting hole 443*c*. The upper end 461*c* may be inserted into the guide groove 444*c*, such that the first electrical contact member 46*c* is limited in the left and right and front-rear directions. The size of the upper end 461*c* may be larger than the size of the mounting limiting hole 443*c*, to prevent the first electrical contact part member 46*c* from being greatly displaced when moving downward relative to the accommodating limiting member 442*c* in the mounting limiting hole 443*d*. In this embodiment, the upper end 461*c* may be in the shape of a triangular sheet, and the lower end 462*c* may be in the shape of a strip. The upper end 461*c* and the lower end 462*c* may be integrally formed. The upper end 461*c* and the lower end 462*c* may also be in other shapes in other embodiments. The upper end 461*c* may protrude above the frame 44*c* in the third direction, such that the first electrical contact member 46*c* abuts the second upper guide part 914 to move downward relative to the frame 44*c*. The second electrical contact surface may be positioned at the upper end 461*c*. The upper part of the lower end 462*c* may be inserted into the mounting limiting hole 443*c*, and the lower part may be inserted into the sliding hole 481*c*. The lower end 462*c* may be able to move downward in the sliding hole 481*c*. When the first electrical contact member 46*c* moves relative to the accommodating limiting member 442*c* in the up-down direction, the lower part of the lower end 462*c* may remain in electrical contact with the sliding hole 481*c*, such that the first electrical contact member 46*c* and the second electrical contact member 48*c* remain in electrical contact. The elastic member 47*c* may be installed in the mounting limiting hole 443*c*, and may be sleeved on the outside of the lower end 462*c*. The upper end of the elastic member 47*c* may abut the upper end 461*c*, and the lower end may abut the upper end of the second electrical contact member 48*c*.

The first electrical contact member 46*c* may be provided with a front guide slope 4611*c* and a rear guide slope 4612*c*. The front guide slope 4611*c* may be positioned in front of the rear guide slope 4612*c*. The front end of the front guide slope 4611*c* may be lower than the rear end. The rear end of the rear guide slope 4612*c* may be lower than the front end. The front guide slope 4611*c* may be used to guide the first electrical contact member to move downward, such that the first electrical contact member crosses the second upper guide part 914 and enters the second recess 915 to prevent the first electrical contact member 46*c* from being damaged by rigid contact and collision. The rear guide slope 4612*c* may be used to guide the first electrical contact member 46*c* to move downward, such that the first electrical contact member 46*c* avoids the second upper guide part 914 when the developing cartridge 1 is taken out from the installation cavity to prevent the first electrical contact member 46*c* from being damaged by rigid contact and collision. For example, the front guide slope 4611*c* may be provided at the front end of the upper end 461*c* of the first electrical contact member 46*c*. The front guide slope 4611*c* and the rear guide slope 4612*c* may be inclined planes or arc surfaces. In some other embodiments, only one of the front guide slope 4611*c* or the rear guide slope 4612*c* may be provided.

A mounting plate 49*c* may be also fixedly installed on the upper end of the frame 44*c*. The mounting plate 49*c* may be used to cover the accommodating cavity 441*c*, and may be also used for the upper end 461*c* of the first electrical contact member 46*c* to extend upward. Adjacent first electrical contact member 46*c* may be separated by the side walls of the mounting plate 49*c* to prevent adjacent upper ends 461*c* from contacting each other and causing a short circuit. Further, each lower end part 462*c* may be inserted into one corresponding mounting limiting hole 443*c* of one corresponding accommodating limiting member 442*c*, thereby being separated by the accommodating limiting members 442*c* and preventing adjacent lower end parts 462*c* from contacting each other and causing a short circuit. The accommodating limiting members 442*c*, the frame 44*c* and the mounting plate 49*c* may be made of insulating materials.

The isolation part of the bracket may include one or more guide grooves 444*c*, the accommodating limiting members 442*c*, or the mounting plate 49*c*, all of which are able to isolate different first electrical contact members 46*c*. The frame 44*c* may be provided with only one of the guide grooves 444*c*, the accommodating limiting members 442*c*, or the mounting plates 49*c*, such that the first electrical contact members 46*c* and the elastic member 47*c* are able to be installed on the frame 44*c*. When the accommodating limiting members 442*c* are provided, the second electrical contact member 48*c* may not need to be inserted into the mounting limiting hole 443*c* of the corresponding accommodating limiting member 442*c*. At this time, the elastic member 47*c* may partially extend and contact the second electrical contact member 48*c*, as long as one end of the elastic member 47*c* is able to be in contact with the first electrical contact member 46*c* and the other end is able to be in contact with the second electrical contact member 48*c*. The frame 44*c* may be fixedly installed at the protective cover or the cartridge body, or may be formed integrally with the protective cover or the cartridge body.

It can be understood that the lower end of the first electrical contact member 46*c* does not need to be inserted into the second electrical contact member 48*c*. The two ends of the conductive elastic member 47*c* may respectively abut against the first electrical contact member 46*c* and the second electrical contact member 48*c* to realize the electrical connection between the storage medium 42*c* and the second identification contact 916. For example, the elastic member 47*c* may be inserted into the accommodating limiting member 442*c*, the lower end 461*c* of the first electrical contact member 46*c* may be inserted into the elastic member 47*c* but not into the second electrical contact member 48*c*. one end of the elastic member 47*c* may abut the upper end. 462*c*, and the other end may abut against the second electrical contact member 48*c*. The first electrical contact member 46*c* may be in electrical contact with the first electrical contact surface 43*c* of the storage medium through the upper end 462*c*, the elastic member 47*c*, and the second electrical contact member 48*c*. As long as there is a gap between the lower end 462*c* of the first electrical contact member 46*c* and the second electrical contact member 48*c*, the second electrical contact member 48*c* may not need to open the sliding hole 481*c*.

When the developing cartridge 1 shakes during operation, since the lower end of the first electrical contact member 46*c* is still able to maintain contact with the second electrical contact member 48*c*, the storage medium 42*c* may still be able to pass through the second electrical contact member 48*c* and the first electrical contact member 46*c*, and remain in electrical connection with second identification contact 916.

Second Variation of Embodiment 13

In another variation of Embodiment 13 shown in FIG. 76 to FIG. 79, the identification element may include a bracket, a storage medium 113, an electrical contact surface, and electrical contact members 46*b*. The structures of the electrical contact members 46*b*, the first support part 112*b* and the frame 45*b* may be different from the first variation of Embodiment 13. The electrical contact members 46*b* may be bent, and may extend in the third direction and be bent multiple times to have good flexibility. During the process of installing the process cartridge, the electrical contact members 46*b* may abut the second upper guide part 914 and move downward relative to the frame 45*b* and the cartridge body 10. The electrical contact members 46*b* may elastically deform and pass over the second upper guide part 914.

The frame 44*b* may include isolation parts 45*b* which are integrally formed. The isolation parts 45*b* may be arranged between the left wall and the right wall of the frame 44*b*, such that the left wall, the right wall and the two isolation parts 45*b* of the frame 44*b* together form three isolation spaces 451*b*. Three electrical contact members 46*b* may be respectively inserted into the isolation spaces 451*b*.

The lower end of the left wall, the lower end of the right wall and the lower ends of the isolation parts 45*b* of the frame 44*b* may all be provided with engaging recesses 441*b* that are recessed from bottom to top. The lower end of the left wall of the frame 44*b* may be provided with a downwardly protruding first connecting part 442*b*. The first connecting part 442*b* may include a rearwardly protruding first claw part 4421*b*. The lower end of the right wall of the frame 44*b* may be provided with a downwardly protruding second connecting part 443*b*. The second connecting part 443*b* may include a second claw part 4431*b* protruding forward. The first connecting part 442*b* may be positioned in front of the second connecting part 443*b*, and the first connecting part 442*b* may be staggered in the first direction. The first claw part 4421*b* may include a first squeeze slope, the second claw part 4431*b* may include a second squeeze slope, the front end of the first squeeze slope may be inclined lower than the rear end, and the front end of the second squeeze slope may be inclined higher than the rear end.

The first support part 112*b* may be detachably and fixedly installed on the frame 44*b*. Three limiting protrusions 412*b* may be formed on both the front end and the rear end of the first support part 112*b* with intervals. The limiting protrusions 412*b* at the front end of the first support part 112*b* may be respectively inserted into different isolation spaces 451*b*, and the three limiting protrusions 412*b* at the rear end of the first support part 112*b* may be respectively inserted into different isolation spaces 451*b*, such that the first support part 112*b* is limited by the left and right walls of the isolation parts 45*b* and the frame 44*b* in the left-right direction. The lower end of the first support part 112*b* may be supported by the first claw part 4421*b* and the second claw part 4431*b*, and the upper end of the first support part 112*b* may abut against the upper surface of the engaging recess 441*b*, such that the first support part 112*b* is limited in the up-down direction. The front end and the rear end of the first support part 112*b* may respectively abut the front and rear surfaces of the engaging recess 441*b*, and the limiting protrusion 412*b* may also abut the front and rear walls of the frame 44*b*, such that the first support part is limited in the front-rear direction.

During the process of assembling the first support part 112*b* to the frame 44*b*, the first support part 112*b* may need to be pressed upward hard, such that the front end of the first support part 112*b* abut the first squeeze slope, and the rear end may abut the second squeeze slope, thereby causing the first connecting part 442*b* and the second connecting part 443*b* to undergo bending deformation. And then, the first support part 112*b* may continue to be pressed upward toward the engaging recess 441*b* until the upper end surface of the first support part 112*b* abuts against the upper surface of the engaging recess 441*b*. The deformation of the first connecting part 442*b* and the second connecting part 443*b* may be restored, and the first claw part 4421*b* and the second claw part 4431*b* may support the lower surface of the first support part 112*b*.

The mounting recess 411*b* may be formed by a recess from top to bottom on the upper end surface of the first support part 112*b*, and the storage medium 113 may be fixedly installed in the mounting recess 411*b* through adhesive snapping or other means. The first electrical contact surfaces 49*b* may be fixedly disposed on the upper surface of the storage medium 113, and the three first electrical contact surfaces 49*b* may correspond to the three isolation spaces 451*b* in the up-down direction.

One electrical contact member 46*b* may include an electrical connecting part 461*b*, a bent part 462*b*, and an arched part 463*b* connected in sequence. The electrical connecting part 461*b* may include an electrical contact protrusion 4611*b* formed by bending, and the electrical contact protrusion 4611*b* may protrude downward. The electrical contact protrusion 4611*b* may be used to contact the first electrical contact surface 49*b*. The lower end of the bent part 462*b* may be connected to the front end of the electrical connecting part 461*b*. The bent part 462*b* may be bent in a "V" shape, such that the entire electrical contact member 46*b* has a greater elastic limit and avoids plastic deformation of the electrical connecting part 461*b*. A first abutment part 464*b* may be formed on the upper end of the bent part 462*b*. The first abutment part 464*b* may be bent at a right angle. The lower end of the first abutment part 464*b* may be connected to the upper end of the bent part 462*b*. The arched part 463*b* may be used to abut the second upper guide part 914 such that the electrical contact member 46*b* may be elastically deformed to cross the second upper guide part 914. The second electrical contact surface may be positioned at the upper end of the arched part 463*b*. The arched part 463*b* may be connected to the rear end of the first abutment part 464*b*. The arched part 463*b* may be arched upward and extend upwardly out of the isolation space 451*b*. That is, the upper end of the arched part 463*b* may be higher than the upper end of the frame 44*b* and the upper end of the isolation part 45*b*. A second abutment part 465*b* may be formed at the rear end of the arched part 463*b*, and the second abutment part 465*b* may be also bent at a right angle. The electrical connecting part 461*b*, the bent part 462*b*, and the arched part 463*b* of the electrical contact member 46*b* may be preferably integrally formed. The electrical contact member 46*b* may be in the shape of a sheet, or may be arranged in a circular shape. The electrical contact member 46*b* may be preferably made of a steel sheet, or may also be made of copper sheet or conductive resin. As shown in the figure, the electrical contact member 46*b* may have a sheet-shaped cross-section, and may also be arranged in a circular shape as needed. The electrical contact member 46*b* may be further back than the driving part 21, and the electrical contact member 46*b* may be further back than the stirring axle.

The frame 44*b* may be formed with a first abutment protrusion 4511*b* and a second abutment protrusion 4512*b* at the upper end of each isolation space 451*b*. The first abutment protrusion 4511*b* may be positioned at the front end of the isolation space 451*b*, and the second abutment protrusion 4512*b* may be positioned at the rear end of the isolation space 451*b*. The first abutment part 464*b* may abut the first abutment protrusion 4511*b*, the second abutment part 465*b* may abut the second abutment protrusion 4512*b*. At the same time, the electrical contact protrusion 4611*b* on the electrical connecting part 461*b* may abut the first electrical contact surface 49*b* below it, thereby limiting the electrical contact member 46*b* in the up-down direction, and preventing the electrical contact member 46*b* from leaving the isolation space 451*b* in the up-down direction. The electrical contact member 46*b* may be limited in the left-right direction by the isolation part 45*b*, the left wall of the frame 44*b*, and the right wall of the frame 44*b*. The electrical contact member 46*b* may be limited in the front-rear direction by the front wall and the rear wall of the frame 44*b*. When the first support part 112*b* and the storage medium 113 are installed on the frame 44*b*, the first electrical contact surface 49*b* may exert upward pressure on the electrical contact member 46*b*, and the first abutment protrusion 4511*b* and the second abutment protrusion 4512*b* may apply downward pressure on the electrical contact member 46*b*, causing the bent part 462*b* to elastically deform. The electrical connection protrusion 4611*b* may be kept pressed against the first electrical contact surface 49*b* under the action of elastic force to prevent poor electrical contact. At the same time, the isolation parts 45*b* may insulate the multiple electrical contact members 46*b* from each other, thereby preventing the different electrical contact members 46*b* from contacting each other and causing a short circuit.

The frame 44*b* may be removably and fixedly installed on the right end surface of the protective cover 111 of the first end 11 of the cartridge body 10. The frame 44*b* may be provided with a first positioning hole and a first mounting hole 445*b*. The first positioning hole 444*b* and the first mounting holes 445*b* may all extend along the first direction. The first positioning holes may be closer to the rotation axis of the driving part 21 in the front-rear direction than the first mounting holes 445*b*. The first positioning holes may be recessed from left to right.

The right end surface of the protective cover 111 may include a first positioning post 1111*b* protruding to the right along the first direction. The first positioning post 1111*b* may be used to be inserted into the first positioning hole of the frame 44*b*. The protective cover 111 may be also provided with a second mounting hole 1112*b*. When installing the frame 44*b*, the first positioning hole 44*b* of the frame 44*b* may be first inserted into the first positioning post 1111*b* to position the frame 44*b*, and then the first mounting hole 445*b* of the frame 44*b* may be aligned with the second mounting hole 1112*b* of the protective cover 111. Subsequently, two fasteners may be inserted into the two mounting holes, such that the frame 44*b* is detachably and fixedly installed at the protective cover 111. A mounting post protruding to the right along the first direction may also be provided at the first end 11 of the cartridge body 10. The mounting post may include a third mounting hole recessed to the left along the first direction. The third mounting hole may correspond to the first mounting hole 445*b* and the second mounting hole 1112*b*. By inserting the fasteners into the first mounting hole 445*b*, the second mounting hole 1112*b* and the third mounting hole, the frame 44*b*, the protective cover 111 and the cartridge body 10 may be able to be fixedly installed at the same time. The first positioning hole 444*b* may be provided on the front side of the isolation space 451*b*, and the first mounting hole 451*b* may be provided on the rear side of the isolation space 451*b*, such that both front and rear sides of the isolation space 451*b* are positioned, making the installation more stable.

The positions of the first positioning hole and the first positioning post 1111*b* may be interchangeable. One mounting hole may be a threaded hole, and one fastener may be a threaded fastener. The number of isolation parts 45*b* may be able to be changed, thereby changing the number of isolation spaces 451*b* for adapting to different numbers of electrical contact members 46*b*. In this embodiment, the first electrical contact surface may be fixedly disposed on the upper surface of the storage medium 113. The first electrical contact surface may also be fixed on a conductive member and may be electrically connected to the storage medium 113 through the conductive member in some other embodiments.

Third Variation of Embodiment 13

Figure 80:
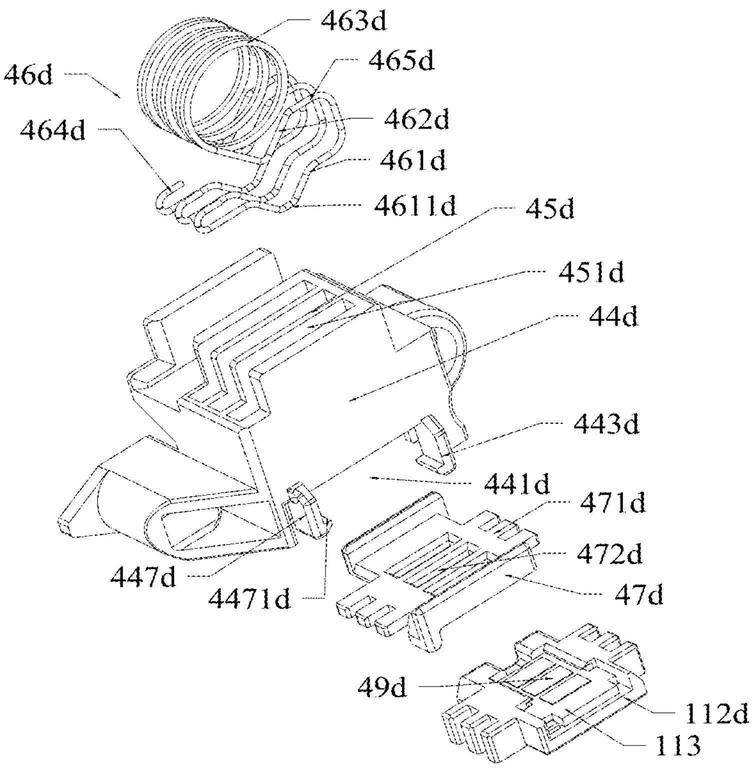
FIG. 80 and FIG. 81 illustrate explosive views of another identification element according to various disclosed embodiments of the present disclosure.
Figure 81:
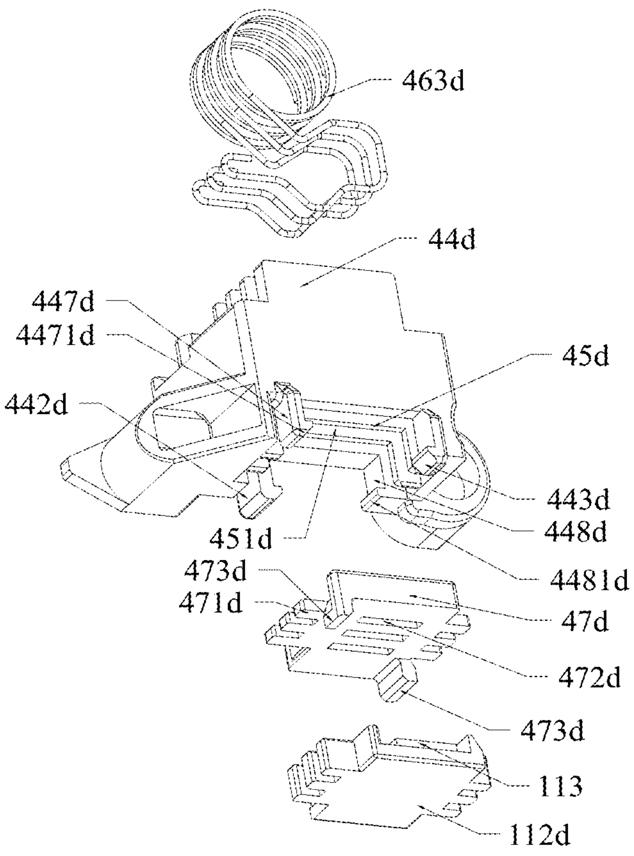
Figure 82:
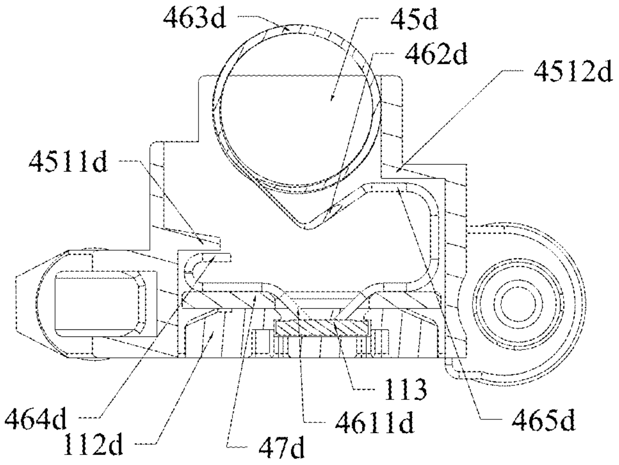
FIG. 82 illustrates a cross-sectional view of another identification element according to various disclosed embodiments of the present disclosure.

In another variation of Embodiment 13 shown in FIG. 80 to FIG. 82, one electrical contact member 46*d* may have a structure different from the second variation of Embodiment 13, and may include a first abutment part 464*d*, an electrical connecting part 461*d*, a second abutment part 465*d*, a cantilever part 462*d* and an arched part 463*d* that are connected in sequence. The second electrical contact surface may be positioned at arched part 463*d*. The first electrical contact surface 49*d* may be fixed to the storage medium 113.

The electrical contact member 46*d* may be in a bent shape, and its cross-section may be generally circular. That is, the electrical contact member 46*d* may be made of a bent circular steel wire or copper wire. The electrical contact member 46*d* may have a circular cross-section and better elasticity. The cross section of the electrical contact member 46*d* may be formed into a sheet shape or the like. The electrical connecting part 461*d* may be formed with an electrical contact protrusion 4611*d* protruding downward. The first abutment part 464*d* may be formed on the front end of the electrical connecting part 461*d*. The first abutment part 464*d* may include a first extension part and a second extension part. The first extension part may extend in the third direction and its lower end may be connected to the front end of the electrical connecting part 461*d*. The second extension part may extend in the second direction and the front end may be connected to the first extension part, such that there may be an included angle between the first extension part and the second extension part for the first abutment part 464*d* to form a bent shape. The first abutment part 464*d*, the electrical connecting part 461*d*, the second abutment part 465*d*, the cantilever part 462*d* and the arched part 463*d* may be preferably integrally formed to form the electrical contact member 46*d*.

The second abutment part 465*d* may be formed at the rear end of the electrical connecting part 461*d*. The second abutment part 465*d* may include a third extension part and a fourth extension part. The third extension part may extend along the third direction and its lower end may be connected with the rear end of the electrical connecting part 461*d*. The fourth extension part may extend along the second direction and the rear end may be connected to the upper end of the third extension part, such that there may be an included angle between the third extension part and the fourth extension part for the second abutment part 465*d* to forms a bend shape.

The first abutment part 464*d* may be used to abut the first abutment protrusion 4511*d* in the isolation space 451*d*, and the second abutment part 465*d* may be used to abut the second abutment protrusion 4512*d* in the isolation space 451*d*, such that the electrical contact member 46*d* is blocked in the up direction and cannot escape upward from the frame 44*d*.

The arched part 463*d* may be in the shape of a spiral coil. In this embodiment, the number of winding turns of the arched part 463*d* may be three. In other embodiments, the number of turns may also be any suitable number. A larger number of winding turns may increase the contact area between the arched part 463*d* and the second identification contact 916, making it easier to contact the second identification contact and reducing the requirements for manufacturing accuracy to make the contact more stable.

The cantilever part 462*d* may be in a bent shape. The front end of the cantilever part 462*d* may be connected to the arched part 463*d*, and the rear end may be connected to the fourth extension part of the second abutment part 465*d*. The arched part 463*d* may be supported by the cantilever part 462*d*, such that the elastic deformation generated by the cantilever part is able to be utilized.

Since components of identification elements may be completed on different production lines during the manufacturing process, it is possible that the identification element that is incompletely assembled may be assembled for the electrical contact member 46*d* and the frame 44*d* on one production line to form a semi-finished product, and then may be transferred to another production line to install the storage medium 113 and the first support part 112*d* on the frame 44*d* to form a complete identification element. In the complete identification element, the storage medium 113 and the first support part 112*d* may be used to limit the electrical contact member 46*d* in the downward direction to prevent the electrical contact member 46*d* from escaping downward from the frame 44*d*. However, the identification element of the semi-finished product cannot prevent the electrical contact member 46*d* from escaping downward from the frame 44*d*. Therefore, when the identification element of the semi-finished product is circulated on different production lines, the electrical contact member 46*d* may be easily detached from the isolation space 451*d* and the electrical contact member 46*d* may need to be reinstalled, causing a problem of low production efficiency.

To solve the above problem, a positioning plate 47*d* may be provided in this embodiment. The positioning plate 47*d* may be installed at the lower end of the frame 44*d* through snap-fitting. The front and rear ends of the positioning plate 47*d* may be respectively formed with positioning protrusions 471*d*, and the multiple positioning protrusions 471*d* may be inserted into different isolation spaces 451*d* one by one, such that the positioning plate 47*d* is limited in the front-rear direction and the left-right direction. The positioning plate 47*d* may be also provided with downwardly protruding engaging protrusions 473*d*, and one engaging protrusion 473*d* may be positioned at the front right, and another engaging protrusion 473*d* may be positioned at the rear left.

A third connecting part 447*d* and a fourth connecting part 448*d* protruding downward may be also formed in the engaging recess 441*d* on the frame 44*d*. The first connecting part 442*d* and the first claw part may be positioned at the left front end, the second connecting part 443*d* and the second claw part may be positioned at the right rear end, the third connecting part 447*d* and the third claw part 4471*d* may be positioned at the right front end, and the fourth connecting part 448*d* and the fourth claw part 4481*d* may be positioned at the left rear end. A third claw part 4471*d* protruding backward may be formed at the lower end of the third connecting part 447*d*, and a fourth claw part 4481*d* protruding forward may be integrally formed at the lower end of the fourth connecting part 448*d*. The third claw part 4471*d* and the fourth claw part 4481*d* may be used to abut the engaging protrusion 473*d* to position the positioning plate 47*d* in the downward direction. The upper end of the positioning plate 47*d* may abut the lower end of the isolation part 45*d* such that the positioning plate 47*d* may be positioned by the isolation part 45*d* in the upward direction.

The positioning plate 47*d* may be also provided with a first electrical contact through hole 472*d* through which the electrical contact protrusion 4611*d* passes. The size of the first electrical contact through hole 472*d* in the front-rear direction may be smaller than the size of the electrical connecting part 461*d* in the front-rear direction, such that the electrical contact member 46*d* may be positioned by abutting the positioning plate 47*d* in the downward direction. Further, the electrical contact member 46*d* may be positioned in the upward direction by the first abutment part 464*d* and the second abutment part 465*d*, by the isolation part 45*d* in the left-right direction, and by the front wall and the rear wall of the isolation space 451*d* in the front-rear direction (i.e., the frame 44*d*). Therefore, even when the storage medium 113 and the first support part 112*d* is not installed, the electrical contact member 46*d* may be positioned by installing the positioning plate 47*d* to prevent the electrical contact member 46*d* from falling off the frame 44*d*. During component, the electrical contact member 46*d*, the positioning plate 47*d* and the first support part 112*d* may be installed into the frame 44*d* from bottom to top in sequence. An avoidance space may be provided at the positions corresponding to the first support part 112*d* and the third connecting part 447*d* and the fourth connecting part 448*d*, such that the engaging protrusion 473*d* is able to extend to abut the third connecting part 447*d* and the fourth connecting part 448*d*.

Fourth Variation of Embodiment 13

Figure 83:
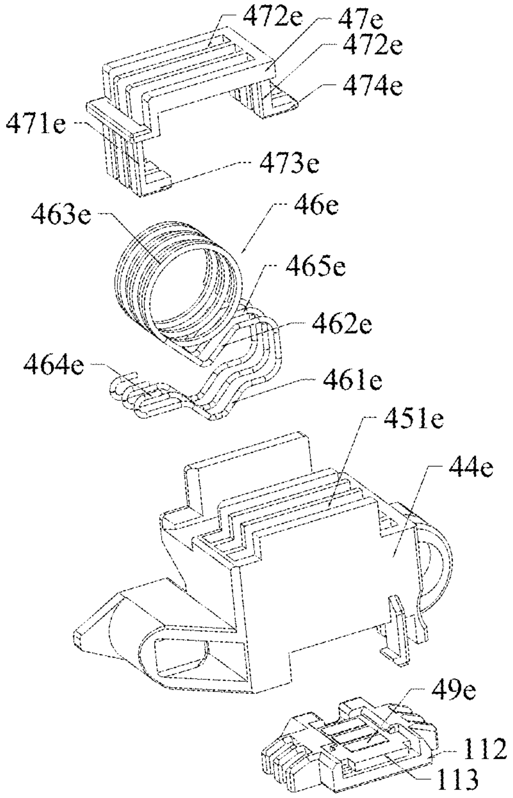
FIG. 83 and FIG. 84 illustrate explosive views of another identification element according to various disclosed embodiments of the present disclosure.
Figure 84:
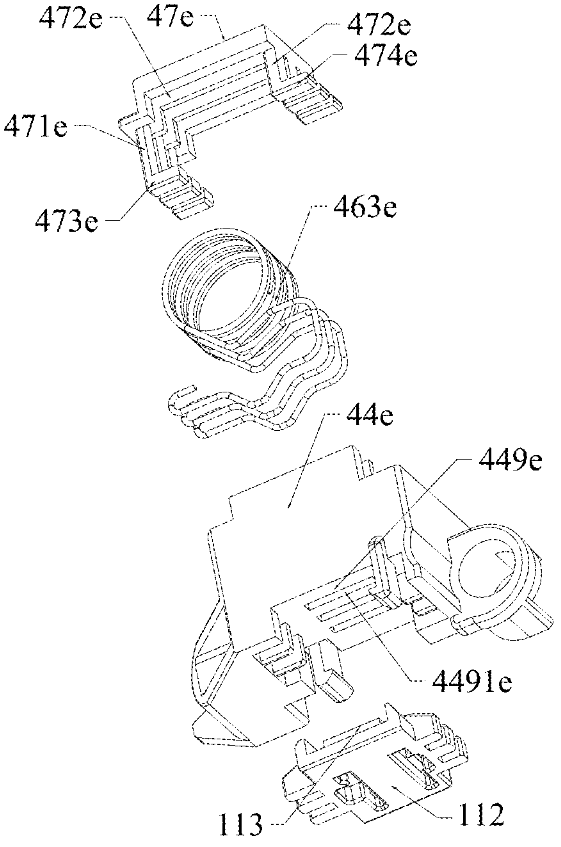
Figure 85:
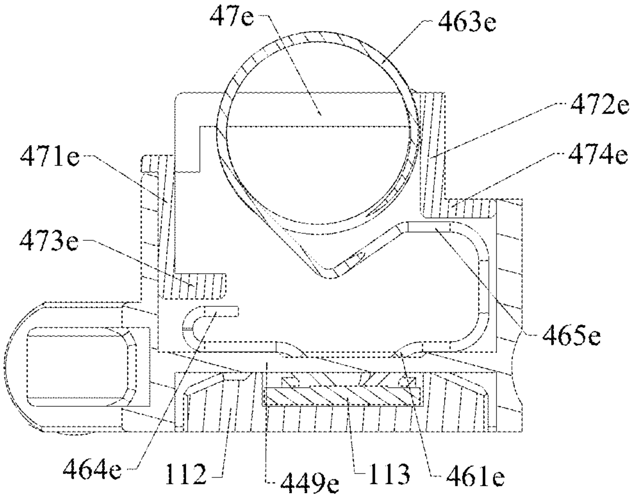
FIG. 85 illustrates a cross-sectional view of another identification element according to various disclosed embodiments of the present disclosure.
Figure 86:
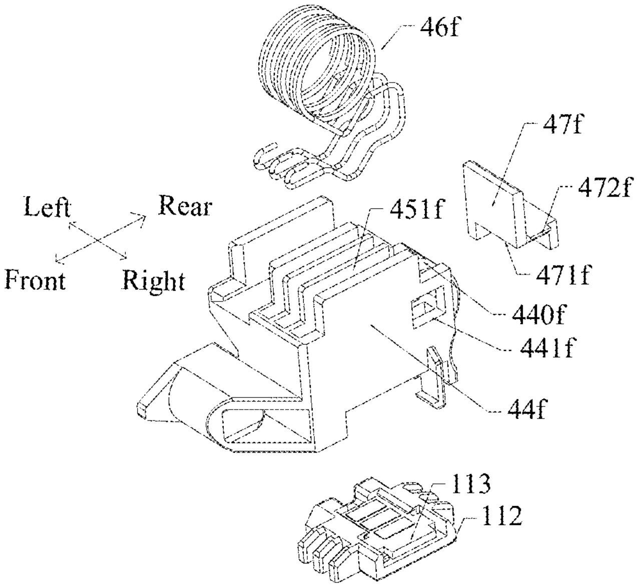
FIG. 86 to FIG. 88 illustrate explosive views of another identification element from different angles, according to various disclosed embodiments of the present disclosure.
Figure 87:
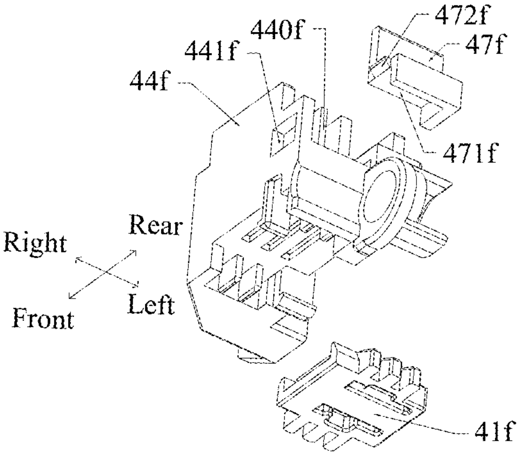
Figure 88:
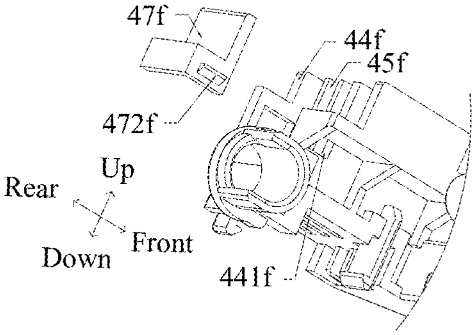
Figure 89:
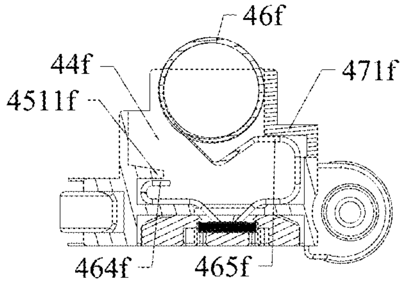
FIG. 89 illustrates a cross-sectional view of another identification element according to various disclosed embodiments of the present disclosure.
Figure 90:
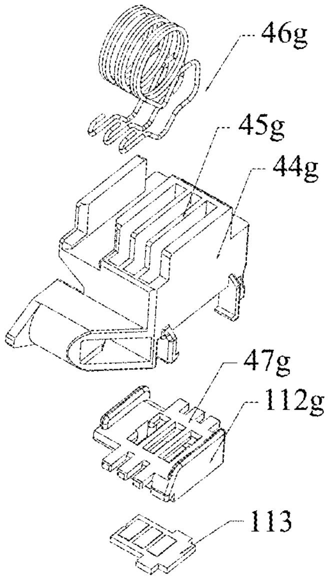
FIG. 90 to FIG. 91 illustrate explosive views of another identification element from different angles, according to various disclosed embodiments of the present disclosure.
Figure 91:
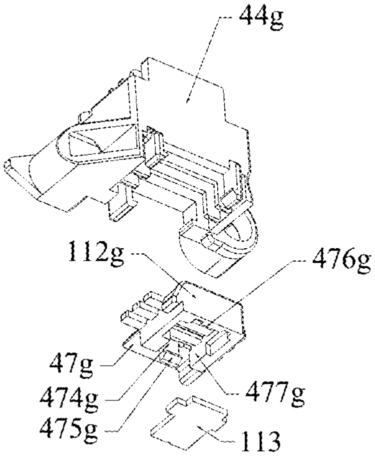

In another variation of Embodiment 13 shown in FIG. 83 to FIG. 85, the positioning plate 47*e* may be disposed at positions different from the third variation of Embodiment 13. For example, the positioning plate 47*e* may be provided at the upper end of the frame 44*e*. The front end of the positioning plate 47*e* may extend downward to form a first positioning protrusion 471*e*, and the lower end of the first positioning protrusion 471*e* may have a first abutment protrusion 473*e* extending backward. The rear end of the positioning plate 47*e* may extend downward to form a second positioning protrusion 472*e*. The lower end of the second positioning protrusion 472*e* may include a second abutment protrusion 474*e* extending backward. The second abutment protrusion 474*e* may be positioned above the first abutment protrusion 473*e* in the third direction. The positioning plate 47*e* may be provided with a second electrical contact through hole 475*e*. The second electrical contact through hole 475*e* may be used for the arched part 463*e* to pass through and extend upward through the second electrical contact through hole 475*e*, facilitating the arched part 463*e* to contact the second identification contact 916. The engaging recess may be provided with a baffle 449*e* integrally formed with the frame 44*e*, and the baffle 449*e* may be provided with a first electrical contact through hole 4491*e*.

During assembly, the electrical contact members 46*e* may be inserted into the isolation spaces 451*e* from the upper end of the frame 44*e*, and then the positioning plate 47*e* may be mounted to the upper end of the frame 44*e*, such that the arched part 463*e* passes through the second electrical contact through hole 475*e* and the electrical connecting part 461*e* passes through the first electrical contact through hole 4491*e* of the baffle 449*e*. The electrical contact protrusion may contact the first electrical contact surface 49*e* of the storage medium 113, and the first abutment protrusion 473*e* and the baffle 449*e* may abut and position the first abutment part 464*e*. The second abutment protrusion 474*e* and the baffle 449*e* may abut and position the second contact part 465*e*, such that the electrical contact member 46*e* is limited in the up-down direction. The frame 44*e* may limit the electrical contact member 46*e* in the left-right direction and the front-rear direction.

Fifth Variation of Embodiment 13

In another variation of Embodiment 13 shown in FIG. 86 to FIG. 89, the positioning plate may be arranged in ways different from the third variation of Embodiment 13. For example, the rear wall of the frame 44*f* may be partially cut away to form an installation opening 440*f*, such that the positioning plate 47*f* is installed on the rear wall of the frame 44*f* to close the installation opening 440*f*. The second abutment protrusion 471*f* of the positioning plate 47*f* may include buckles 472*f* on the left and right sides. The engaging parts 441*f* may be provided on both the left wall and the rear wall of the frame 44*f*. During component, the electrical contact member 46*f* may pass through the isolation space 451*f* and the installation opening 440*f*, and then the positioning plate 47*f* may be installed in the installation opening 440*f*, such that the lower side of the second abutment protrusion 471*f* abuts the upper side of the isolation part 45*f* and the buckles 472*f* are inserted into the engaging parts 441*f*. The second abutment part 465*f* of the electrical contact member 46*f* may abut the second abutment protrusion 471*f*.

At the same time, the first abutment part 464*f* may abut the first abutment protrusion 4511*f* on the front side of the frame.

Sixth Variation of Embodiment 13

In another variation of Embodiment 13, the first support part 112*g* may be arranged in ways different from the third variation of Embodiment 13. For example, the first support part 112*g* and the positioning plate 47*g* may have an integrally formed structure. The first support part 112*g* may include a mounting groove 477*g* recessed upward from the lower end surface of the positioning plate 47*g* and a fifth extension part 474*g* protruding downward from the lower end surface of the left wall of the positioning plate 47*g*. The fifth extension part 474*g* may include a first support claw 475*g* protruding to the right. The right wall of the mounting groove 477*g* may be provided with a second support claw 476*g* protruding to the left. The fifth extension part 474*g* may produce elastic deformation. During installation, the first support claw 475*g* may be squeezed by the storage medium 113 to drive the fifth extension part 474*g* to elastically deform, such that the storage medium 113 is installed into the mounting groove 477*g*. The storage medium 113 may be limited in the downward direction by the first support claw 475*g* and the second supporting claw 476*g*, be limited in the upward direction by the positioning plate 47*g*, and be limited by the fifth extension part 474*g* and the side walls of the mounting groove 477*g* in the left-right and front-rear directions The positioning plate 47*g* may cooperate with the claw part at the lower part of the frame 44*g* to install and fix the first support part 112*g* on the frame 44*g*.

Seventh Variation of Embodiment 13

Figure 92:
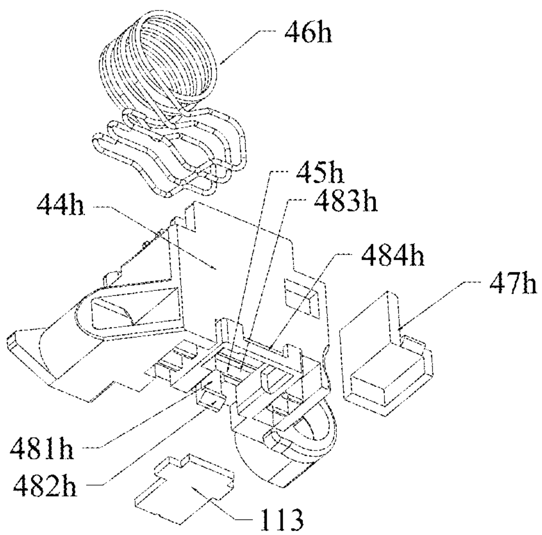
FIG. 92 illustrates an explosive view of another identification element according to various disclosed embodiments of the present disclosure.

In another variation of Embodiment 13 shown in FIG. 92, the first support part 112*h* may be arranged in ways different from the third variation of Embodiment 13 and the positioning plate 47*h* may be also provided. The first support part 112*h* and the frame 44*h* may have an integral structure. The first support part 112*h* may include a mounting groove 483*h* recessed upward from the lower end of the frame 44*h*, and a fifth extension part 481*h* protruding downwardly from the lower end of the frame 44*h*. The fifth extension part 481*h* may include a first support claw 482*h* protruding to the right. The right wall of the mounting groove 483*h* may include a support hole 484*h* for inserting the end of the storage medium 113. The fifth extension part 481*h* may be able to produce elastic deformation. During component, one end of the storage medium 113 may be inserted into the support hole 484*h*, and the other end may squeeze the first support claw 482*h* to elastically deform the fifth extension part 481*h*, such that the storage medium 113 is installed into the mounting groove 483*h*. The storage medium 113 may be limited by the first support claw 482*h* and the support hole 484*h* in the downward direction, limited by the isolation part 45*h* in the upward direction, and positioned by the first extension part 481*h* and the side wall of the mounting groove 483*h* in the left-right directions and the front-rear directions. This embodiment may have a simpler structure, reducing the number of parts and costs.

Eighth Variation of Embodiment 13

Figure 93:
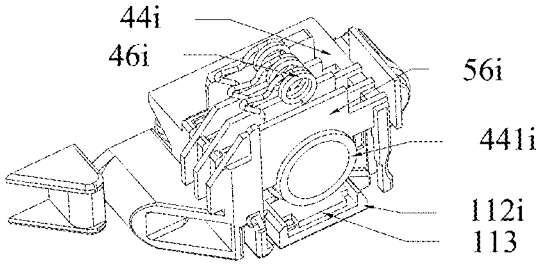
FIG. 93 illustrates another identification element according to various disclosed embodiments of the present disclosure.
Figure 94:
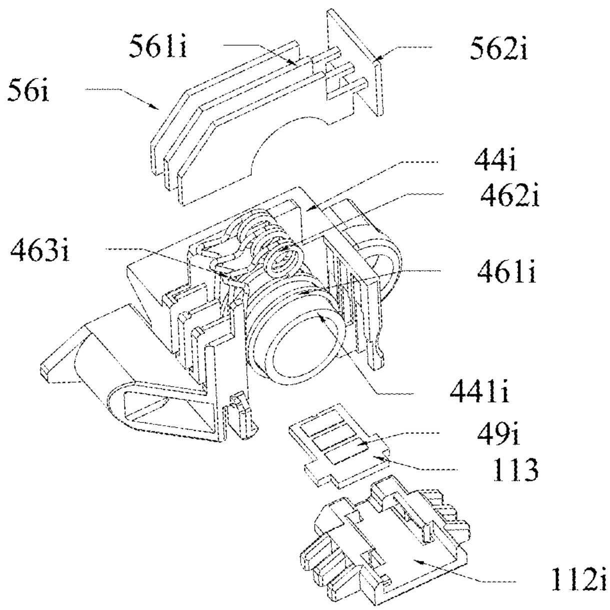
FIG. 94 illustrates an explosive view of another identification element according to various disclosed embodiments of the present disclosure.
Figure 95:
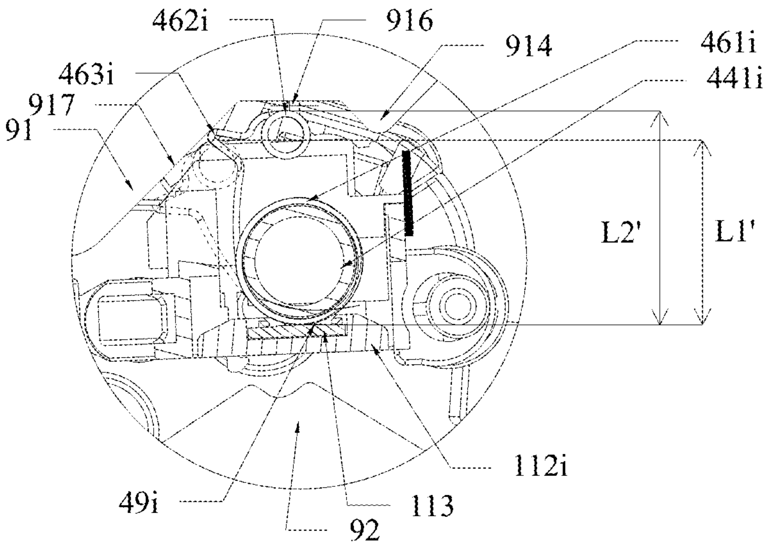
FIG. 95 illustrates another exemplary developing cartridge installed in an image forming device, according to various disclosed embodiments of the present disclosure.

In another variation of Embodiment 13 shown in FIG. 93 to FIG. 95, the identification element may have a structure different from the first variation of Embodiment 13. The identification element may include a frame 44*i*, a first support part 112*i*, an isolation member 56*i*, a storage medium 113, an electrical contact surface, and electrical contact members 46*i*. The frame 44*i* may be fixedly installed on the right end of the protective cover 111. The left wall of the frame 44*i* may be provided with a support shaft 441*i* extending in the left-right direction. The front wall and the rear wall of the frame 44*i* may be provided with isolation parts 45*i*. The support shaft 441*i* may be positioned between the front wall and the rear wall of the frame 44*i* in the front-rear direction. The right end, upper end and lower end of the frame 44*i* may be not closed to facilitate the installation of other components. The first support part 112*i* may be engaged with the lower end of the frame 44*i*, and the storage medium 113 on the first support part 112*i* may be positioned below the support shaft 441*i*. The isolation part 45*i* may be used for inserting the isolation member 56*i*.

One electrical contact member 46*i* may be in a bent shape, and may include a pivot part 461*i* and an arm part. The pivot part 461*i* may be annular in shape, sleeved on the support shaft 441*i* and may be able to rotate around the support shaft 441*i*. The arm part may be formed by extending one end of the pivot part 461*i* upward. The upper end of the arm part may be provided with a winding electrical contact part 462*i*. The electrical contact part 462*i* may be wound three times to increase the contact area of the electrical contact part 462*i*. Therefore, the electrical contact part 462*i* may be prevented from being unable to contact the second identification contact 916 due to a too small contact area. The second electrical contact surface may be positioned at the electrical contact part 462*i*. The lower end of the pivot part 461*i* may be in contact with the first electrical contact part 49*i*, that is, the first electrical contact part 49*i* may be tangent to the outer peripheral surface of the pivot part 461*i*. Since the pivot part 461*i* is annular, even when the pivot part 461*i* rotates, contact and electrical connection with the first electrical contact part 49*i* may be maintained. Three electrical contact members 46*i* may correspond to the three first electrical contact parts 49*i* one to one. The arm part may be also provided with a bent part 463*i*. The bent part 463*i* may be positioned between the electrical contact part 462*i* and the pivot part 461*i*. The bent part 463*i* may protrude forward and be used to abut the upper guide rail in front of the second identification contact 916 in the image forming device.

One isolation member 56*i* may include a connecting plate 562*i* and an isolation part 561*i*. The isolation part 561*i* may be integrally connected to the connecting plate 562*i*. The connecting plate 562*i* may extend in the left-right directions. The three isolation parts 561*i* may extend in the front-rear directions. The partition 561*i* may separate the electrical contact members 46*i*, to prevent the electrical contact members from contacting each other and causing short circuits. The isolation part 561*i* is plugged into the frame through the isolation parts 45*i*.

One electrical contact member 46*i* may have a first position (shown as dashed lines in FIG. 95) and a second position (shown as solid lines in FIG. 95) between which electrical contact member 46*i* is pivotable. In the first position, the distance between the electrical contact part 462*i* and the first electrical contact part 49*i* in the up-down direction is L1'. In the second position, the distance between the electrical contact part 462*i* and the first electrical contact part 49*i* in the up-down direction is L2', where L"<L2'.

When the process cartridge is installed into the image forming device, when the electrical contact member 46*i* is in the first position, the electrical contact part 462*i* may be positioned below the second upper guide part 914 in the vertical direction, and the electrical contact part 462*i* may follow the developing cartridge to move forward together and may not interfere with the second upper guide part 914, thereby avoiding damage to the electrical contact member 46*i* or the image forming device. When the electrical contact part 462*i* moves forward and passes through the second upper guide part 914, the bent part 463*i* may abut the slope 917 of the upper guide rail on the front side of the second identification contact 916, such that the electrical contact member 46*i* rotates clockwise around the support shaft 441*i* to the second position and that the electrical contact part 462*i* is in contact and electrically connected with the second identification contact 916*c*. When the developing cartridge is taken out backward from the image forming device, the electrical contact member 46*i* may be rotated counterclockwise to the first position, such that the electrical contact part 462*i* is positioned below the second upper guide part 914, thereby preventing the electrical contact part 462*i* from interfacing with the second upper guide part 914.

Ninth Variation of Embodiment 13

Figure 96:
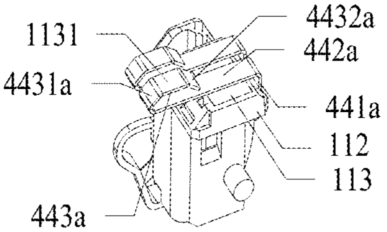
FIG. 96 illustrates another identification element according to various disclosed embodiments of the present disclosure.
Figure 97:
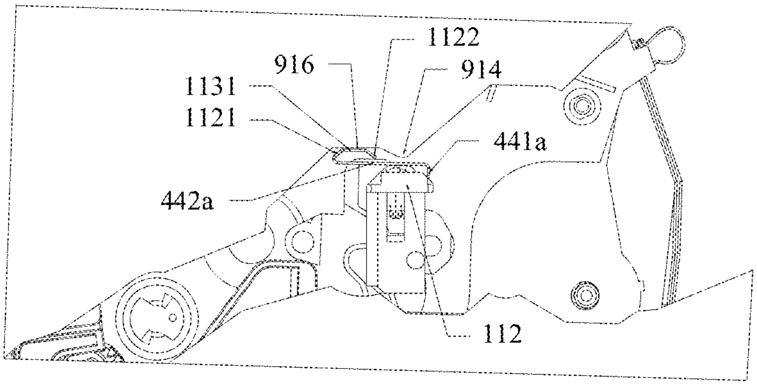
FIG. 97 illustrates another exemplary developing cartridge installed in an image forming device, according to various disclosed embodiments of the present disclosure.

In another variation of Embodiment 13 shown in FIG. 96 and FIG. 97, the arrangement of the identification element may be different. When the process cartridge is installed in place, the bracket 112 may be positioned behind the second identification contact 916 in the front-rear direction.

The identification element may include an electrical contact member which may be electrically connected to the storage medium 113, and the electrical contact surface 1131 may be provided on the electrical contact member. The electrical contact member may be made of elastically deformable material (such as steel sheet, copper sheet). The electrical contact member may include a bent part 443*a*, an extension part 442*a*, and a connecting part 441*a* connected in sequence. The connecting part 441*a* may be connected to the storage medium 113. The extension part 442*a* may extend forward from the connecting part 441*a*. The front end of the extension part 442*a* may be connected to the bent part 443*a*. The bent part 443*a* may be formed by bending backward from the front end of the extension part 442*a*. There may be a space between the bent part 443*a* and the extension part 442*a* in the up-down direction, and the extension part 442*a* may be spaced apart from the storage medium 113 and the bracket 112 in the up-down direction. The front end of the extension part 442*a* may be positioned in front of the bracket 112 and the storage medium 113. The front guide slope 4431*a* of the electrical contact member may be positioned at the front end of the bent part 443*a*, the rear guide slope 4432*a* of the electrical contact member may be positioned at the rear end of the bent part 443*a*, and the electrical contact surface 1131 may be positioned at the bent part 443*a* and between the first guide slope 4431*a* and the second guide slope 4432*a*.

During the installation process of the process cartridge, the front guide slope 4431*a* on the electrical contact member may abut the second upper guide part 914, and the second upper guide part 914 may exert a downward force on the front guide slope 4431*a*, such that the front guide slope 4431*a* is pressed to cause the bent part 443*a* to bend and avoid the second upper guide part 914. As the process cartridge continues to be installed, the front guide slope 4431*a*, the electrical contact surface 1131, and the rear guide slope 4432*a* may all pass through the second upper guide part 914, and the bent part 443*a* may no longer interfere with the second upper guide part 914 and return to its original shape under the action of elasticity, such that the electrical contact surface 1131 rebounds upward to be in contact and electrically connected with the second identification contact 916. During this process, since the bracket 112 and the storage medium 113 are both positioned below the second recess 915 and the second upper guide part 914, the bracket 112 and the storage medium 113 may move forward along the installation direction with the cartridge body and may be no interference with the second upper guide part 914, thereby avoiding damage to the bracket 112 or the storage medium 113.

In Embodiment 13 and its first variation to ninth variation, the lifting element may only need to provide one electrical contact member that is able to be elastically deformed or move in the up-down direction in the identification element to realize the electrical connection between the storage medium and the second identification contact 916. There may be no need to lift the entire developing cartridge 1 upward to achieve electrical connection. The connection method may be simple. In addition, when the developing cartridge 1 shakes during operation, the electrical contact member may elastically deform or move elastically in the up-down direction, such that the upper end of the electrical contact member may still maintain contact with the second identification contact 916 and the lower end of the electrical contact member may still maintain contact with the electrical contact surface. Therefore, the storage medium may still maintain electrical connection with the second identification contact 916, ensuring stable operation of the developing cartridge.

Tenth Variation of Embodiment 13

Figure 98:
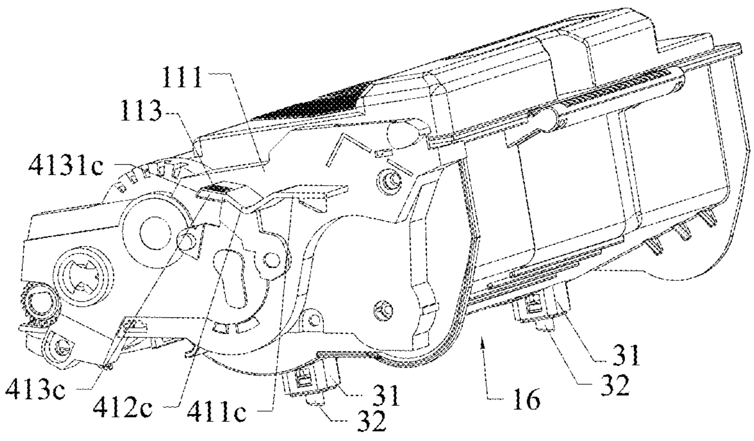
FIG. 98 illustrates another identification element according to various disclosed embodiments of the present disclosure.
Figure 99:
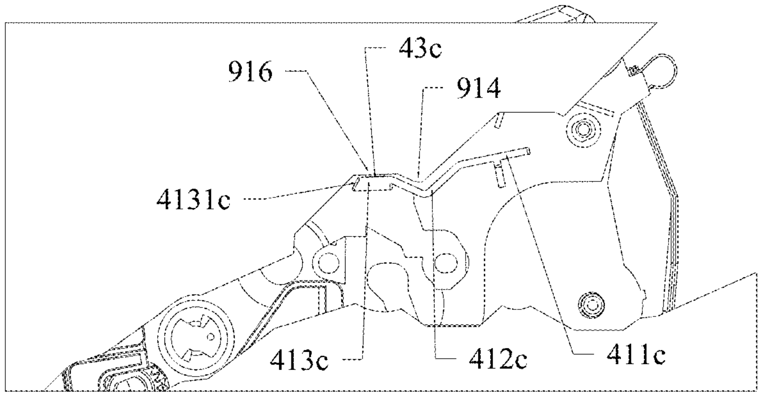
FIG. 99 illustrates another exemplary developing cartridge installed in an image forming device, according to various disclosed embodiments of the present disclosure.
Figure 100:
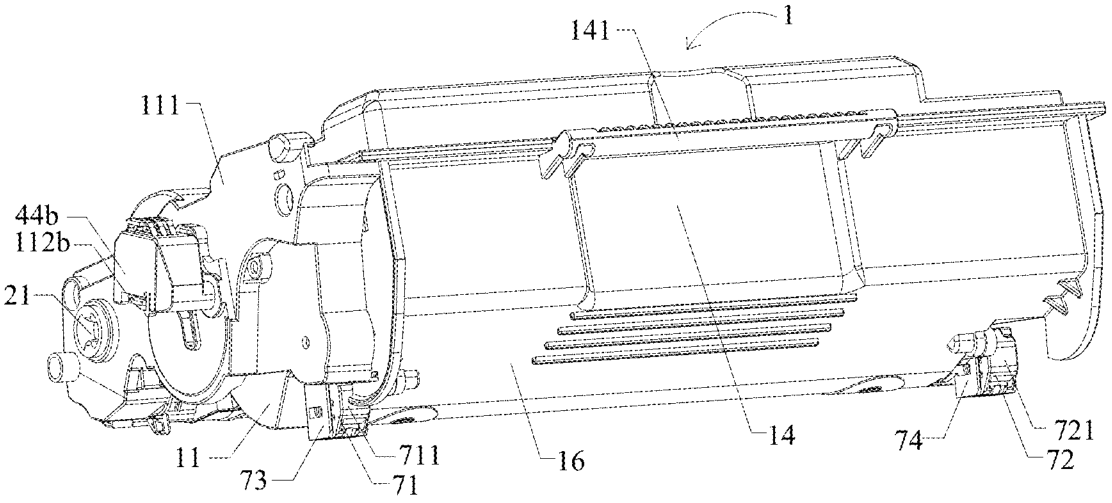
FIG. 100 illustrates another exemplary developing cartridge according to various disclosed embodiments of the present disclosure.
Figure 101:
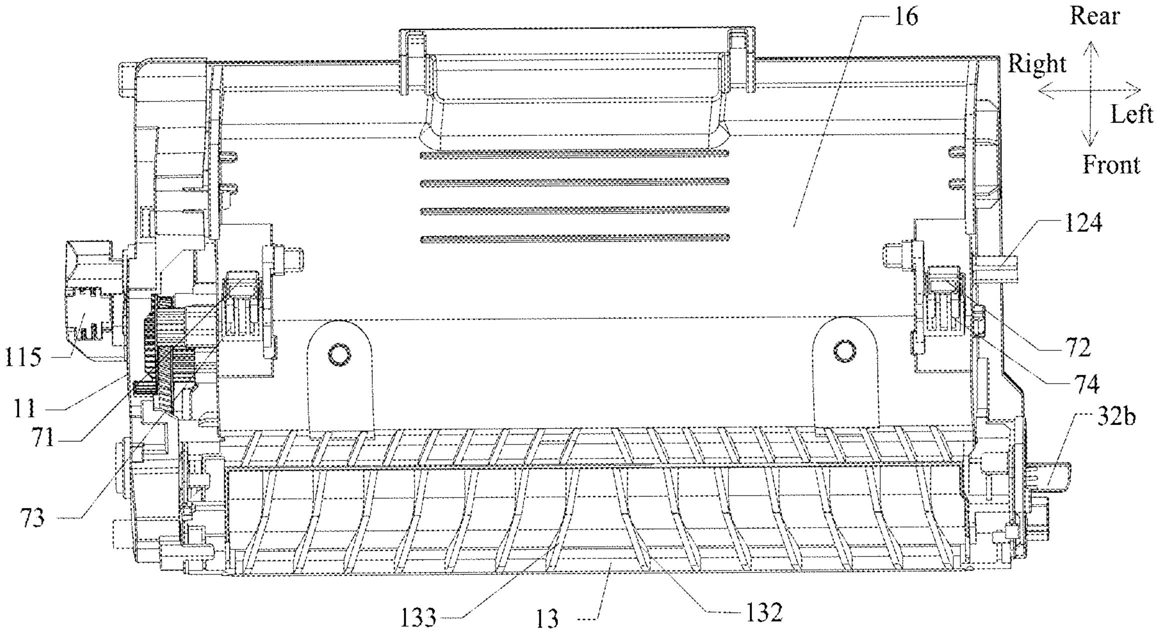
FIG. 101 illustrates a bottom view of another exemplary developing cartridge according to various disclosed embodiments of the present disclosure.
Figure 102:
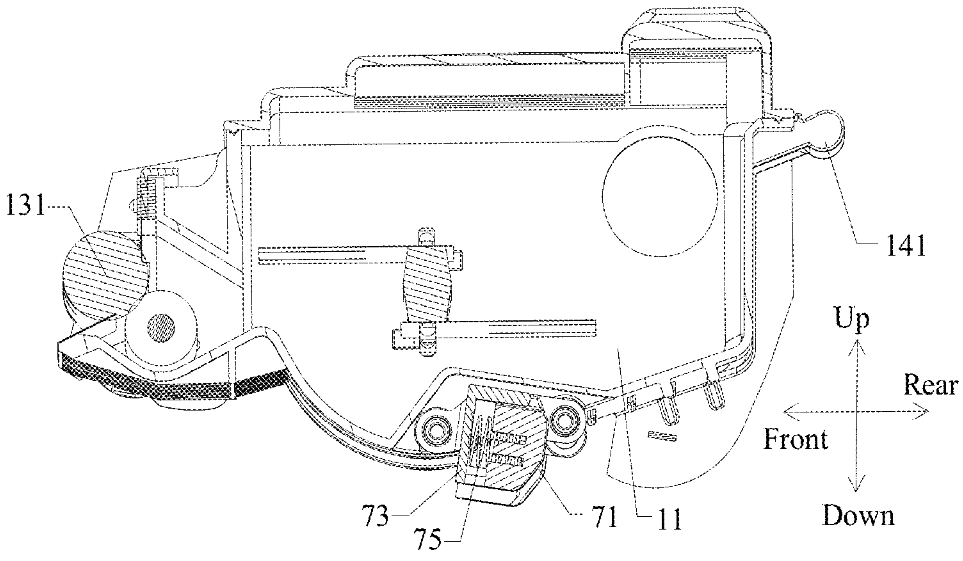
FIG. 102 to FIG. 103 illustrate cross-sectional views of another exemplary developing cartridge according to various disclosed embodiments of the present disclosure.
Figure 103:
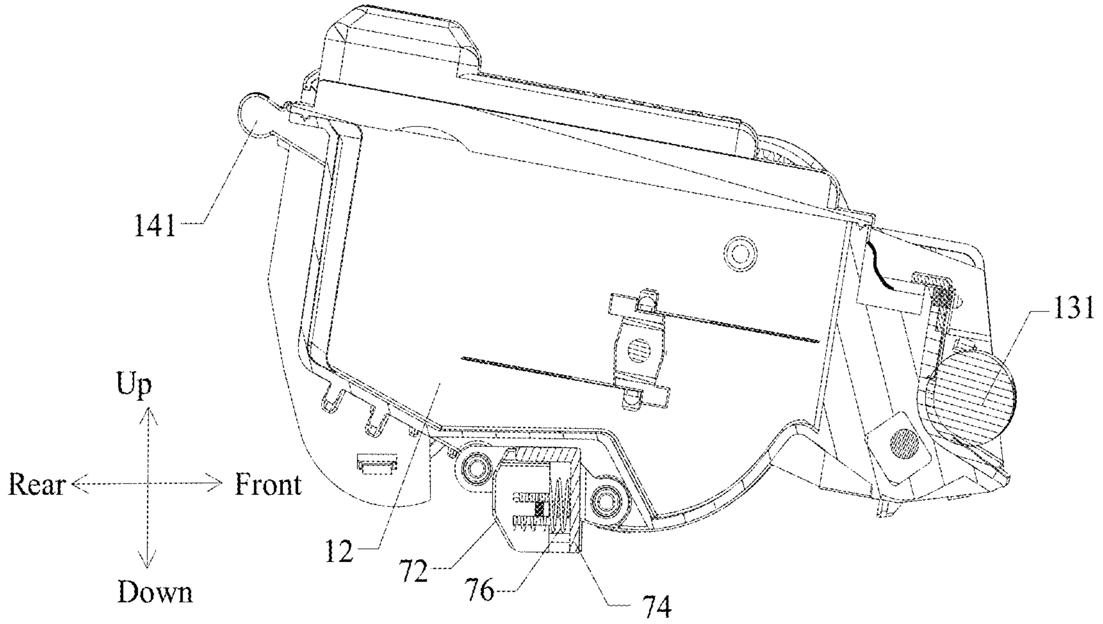
Figure 104:
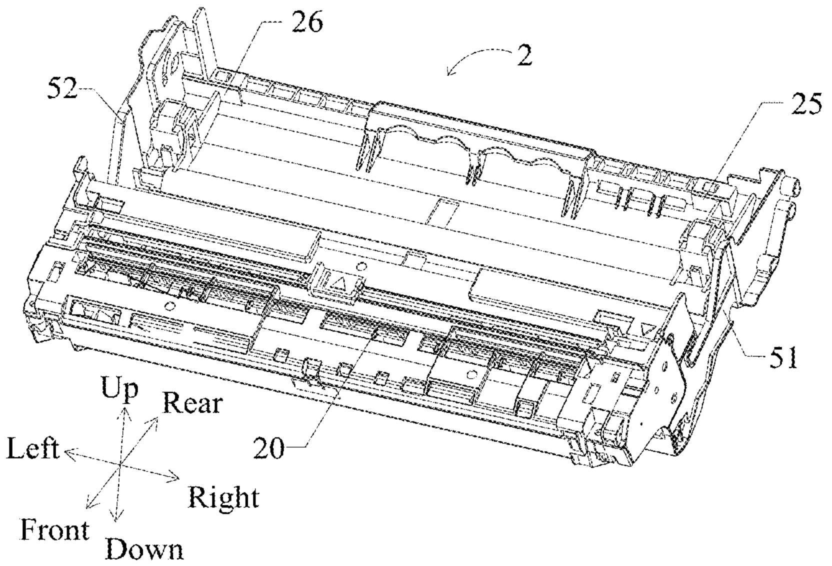
FIG. 104 illustrates another exemplary drum cartridge according to various disclosed embodiments of the present disclosure.

In another variation of Embodiment 13 shown in FIG. 98 and FIG. 99, the identification element may be arranged in different ways. The bracket 112 of the identification element may be elastically deformable. The bracket 112 may extend in the front-rear direction, and the storage medium 113 may be installed at the front end and above the bracket 112. During the installation process, when the bracket 112 and the storage medium abut the second upper guide part 914, the bracket 112 may elastically deform and move downward. After the front end of the bracket 112 and the storage medium 113 pass over the second upper guide part 914, the bracket 112 may recover from elastic deformation and move upward, such that the electrical contact surface 1131 on the storage medium is in electrical contact with the second identification contact.

The bracket 112 may be in a cantilever shape. The storage medium 113 may be fixedly mounted on the support part 413*c*. The bracket 112 may include the support part 413*c* and an avoidance part connected in sequence from front to back. The support part 413*c* may be used to install the storage medium 113. The avoidance part may be at least partially positioned below the support part 413*c*. The avoidance part may be fixedly arranged at the first end 11 of the developing cartridge. The avoidance part may be used to avoid the second upper guide part 914 when the support part 413*c* and the storage medium 113 are in contact with the second upper guide part 914. The avoidance part may include a bent part 412*c* and a mounting part 411*c* connected in sequence from front to back. The mounting part 411*c* may be fixed on the right end surface of the protective cover. The bent part 412*c* may be connected to the support part 413*c* and may be positioned behind the support part 413*c*. The bent part 412*c* may be recessed downward to make the avoidance part at least partially positioned below the support part 413*c*. The first guide slope 4131*c* of the bracket 112 may be positioned at the front end of the support part 413*c*, and the front end of the first guide slope 4131*c* may be lower than the rear end. The bracket 112 may be an integrally formed part, or may be formed by connecting various components. The mounting part 411*c* may also be directly connected to the first end of the cartridge body 10.

During the installation process of the process cartridge, when the support part 413*c* moves to the second upper guide part 914, the first guide slope 4131*c* may abut the second upper guide part 914, causing the bracket 112 to elastically deform and move downward. The support part 413*c* may avoid the second upper guide part 916 and move forward. The support part 413*c* may swing upward under the action of elastic force and enter the second recess 915, such that the electrical contact surface 1131 contacts and is electrically connected with the second identification contact 916. By providing the bent part 412*c*, the bracket 112 may be able to avoid the second upper guide part 916, to avoid insufficient upward swing distance of the support part 413*c* and the storage medium 113 because of the interference of the second upper guide part 916 on the bracket 112. The downwardly concave angle of the bent part 412*c* may be smaller than, equal to, or larger than the downwardly protruding angle of the second upper guide part 914. The included angle of the bent part 412*c* may be larger than the included angle of the second upper guide part 914, to avoid the deformation of the support part 413*c* caused by the contact between the bent part 412 and the second upper guide part 914. Therefore, the electrical contact surface 1131 may be prevented from being unable to make contact with the second identification contact.

The sixth end 16 of the cartridge body may also be provided with a lifting element as shown in FIG. 19 (that is, Embodiment 5). During the installation process of the process cartridge, when the support part 413*c* abuts the second upper guide part 914, the bracket 112 may have deformation, and the developing cartridge 1 may compress the lifting element of the sixth end 16 and move downward relative to the drum cartridge 5. When the support part 413*c* crosses the second upper guide part 914, the developing cartridge 1 may move upwards relative to the drum cartridge under the action of the lifting element, such that the support part 413*c* enters the second recess 915 and the electrical contact surface 1131 comes into contact with the second identification contact.

In this variation, the lifting element may only need to provide an elastically deformable bracket in the identification element to realize the electrical connection between the storage medium and the second identification contact 916 without lifting the whole developing cartridge 1 upward to realize the electrical connection. The implementation may be simple.

In Embodiment 13 and its first variation to tenth variation, the lifting element may be arranged on the identification element. The identification element may be elastically deformed or may be movable relative to the bracket, such that the electrical connection between the storage medium and the second identification contact 916 is able to be achieved without lifting the entire developing cartridge 1 upward to achieve electrical connection. The implementation may be simple.

Further, there may be no need to install slide rails or other structures in the cartridge body for the bracket to slide relative to the cartridge body. The bracket of the lifting element and the developing cartridge may be fixedly arranged in Embodiment 13 and its first variation to tenth variation. The structure of the bracket may be simple and the accuracy requirements for the bracket may be low, reducing the number of parts and costs.

In Embodiment 13 and its first variation to tenth variation, the lifting element may be also provided with a drum identification element in the drum cartridge to realize the electrical connection between the drum storage medium and the first identification contact 913 without lifting the drum cartridge upward. The way to implement the electrical connection may be simple.

Embodiment 14

In another embodiment shown in FIG. 100 to FIG. 104, the push element may have a different structure compared with Embodiment 11 and may be used to realize the contact between the developing roller and the photosensitive drum.

The push element may include a first push member 71 and a second push member 72. The first push member 71 and the second push member 72 may be arranged at the sixth end 16 of the cartridge body 10. In the first direction, the first push member 71 may be closer to the first end 11 than the second push member 72, that is, the first push member 71 may be disposed adjacent to the first end 11 in the first direction and the second push member 72 may be disposed adjacent to the second end 12 in the first direction. The first push member 71 may be provided with a first pushing surface 711 at one end along the first direction away from the developing roller 131, and the second push member 72 may be provided with a second pushing surface 721 at an end along the first direction away from the developing roller 131. The first pushing surface 711 and the second pushing surface 721 may be used to receive the pushing force exerted by the drum cartridge 5 such that the developing roller 131 and the photosensitive drum are in close contact. Both ends of the first push member 71 or the second push member 72 in the first direction may have pawls extending in the second direction. In this embodiment, the first push member 71 and the second push member 72 may be symmetrically arranged along the first direction and have the same structure. In other embodiments, the structures of the first push member 71 and the second push member 72 may be different, or the first push member 71 and the second push member 72 may be arranged asymmetrically, or only one of the first push member 71 and the second push member 72 may be provided. In the second direction, the first push member 71 and the second push member 72 may be positioned between the rotation axis of the stirring gear 45 and the handle 141.

The sixth end 16 of the cartridge body 10 may be provided with a first pushing mounting part 73 and a second pushing mounting part 74. The first pushing mounting part 73 may be closer to the first end 11 than the second pushing mounting part 74 in the first direction. The first pushing mounting part 73 and the second pushing mounting part 74 may be integrally formed with the cartridge body 10, or may be fixedly installed on the cartridge body 10. The first pushing mounting part 73 and the second pushing mounting part 74 may include openings in the second direction at the rear end. The first push member 71 may be movably installed on the first pushing mounting part 73 through the opening on the first pushing mounting part 73, and the second push member 72 may be movably installed on the second pushing mounting part 74 through the opening on the second pushing mounting part 74. The first pushing mounting part 73 and the second pushing mounting part may be also provided with holes extending substantially along the second direction at both ends in the first direction. The pawl of the first push member 71 may be engaged into the hole on the first pushing mounting part 73 to prevent the first push member 71 from disengaging, and the pawl on the second push member 72 may be engaged into the hole of the second pushing mounting part 74 to prevent the second push member 72 from disengaging.

The first pushing mounting part 73 may be also provided with a first elastic member 75. The first elastic member 75 may abut the first pushing mounting part 73 and the first push member 71. The second pushing mounting part 74 may be provided with a second elastic member. The second elastic member 76 may abut the second pushing mounting part 74 and the second push member 72. The first elastic member 75 and the second elastic member 76 may expand and contract along the second direction.

When the developing cartridge 1 is installed on the drum cartridge 5, the first push member 71 and the second push member 72 may receive the pushing force exerted by the drum cartridge 5 and move relative to the first pushing mounting part 73 and the second pushing mounting part 74 respectively. The first elastic member 75 and the second elastic member 76 may be compressed, and the developing roller 131 may be in close contact with the photosensitive drum. The first drum push member 25 may abut the first pushing surface 711 of the first push member 71, and the second drum push member 26 may abut the second pushing surface 721 of the second push member 72.

In this embodiment, the cartridge body 10 of the developing cartridge may be also provided with a reinforcing component. The reinforcing component may be used to enhance the strength of the cartridge body 10. The reinforcing component may include first ribs 132 and second ribs 133. The first ribs 132 may include a plurality of ribs whose extension direction crosses the third direction. The extension direction may be to extend forward along the third direction and to the right along the first direction. The second ribs 133 may also include a plurality of ribs whose extending directions intersect with the third direction. The specific extending direction may be to extend forward along the third direction and to the left along the first direction, that is, the first ribs 132 and the second ribs 133 may intersect.

Variations of Embodiment 14

In variations of Embodiment 14 shown in FIG. 105 to FIG. 111, the push element may have a structure similar to Embodiment 14, and may be disposed in different positions compared with Embodiment 14.

Figure 105:
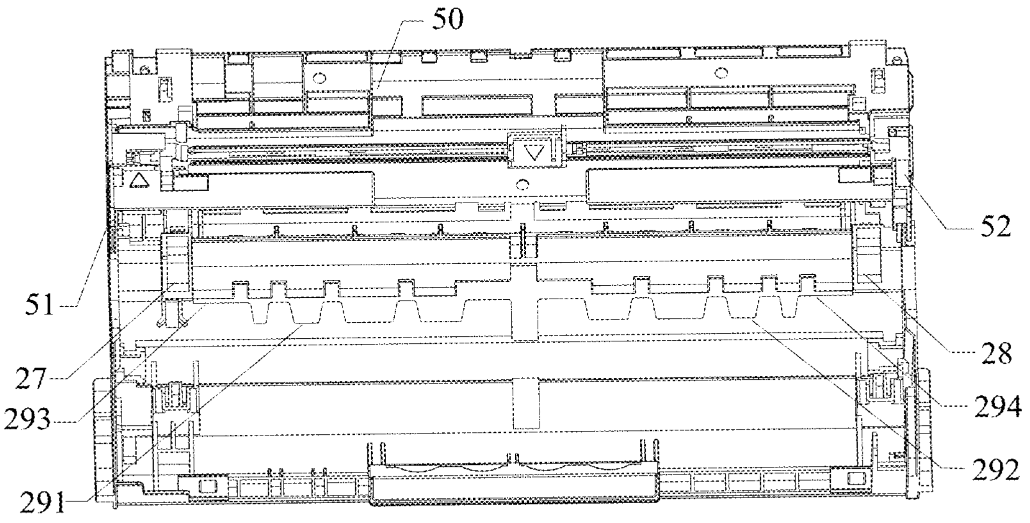
FIG. 105 illustrates another exemplary drum cartridge according to various disclosed embodiments of the present disclosure.
Figure 106:
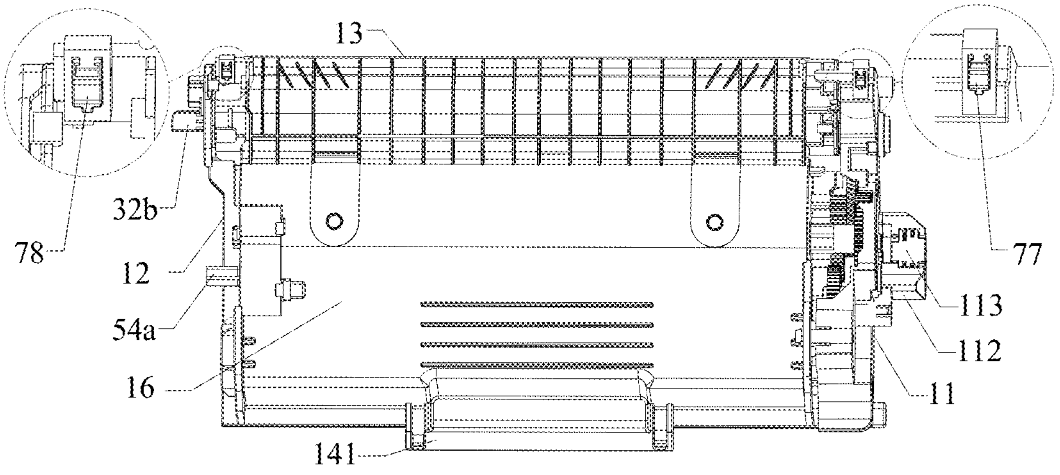
FIG. 106 to FIG. 110 illustrate some other exemplary developing cartridges according to various disclosed embodiments of the present disclosure.

In a first variation of Embodiment 14 shown in FIG. 105 and FIG. 106, the first push member 77 and the second push member 78 may be disposed at the sixth end 16 of the cartridge body 10. The first push member 77 and the second push member 78 may be disposed adjacent to the third end 13 in the second direction. In the second direction, the first push member 77 and the second push member 78 may be farther from the fourth end 14 than the electrode **32*b*. In the plane of the second direction and the third direction, the first push member 77 and the second push member 78 may be each inclined in a direction intersecting the second direction and the third direction. The first push member 77 may be disposed on one end of the protective cover 111 close to the third end 13 along the second direction. The first push member 77 may also be directly disposed on the cartridge body 10 in other embodiment. The first push member 77 and the second push member 78 may move relative to the cartridge body 10 when receiving the pushing force exerted by the drum cartridge 5. As shown in FIG. 105, the drum cartridge 5 may be provided with a first drum push member 27 and a second drum push member 28. The first drum push member 27 and the second drum push member 28 may be both groove-shaped and slopes may be provided on the top. When the developing cartridge 1 is installed on the drum cartridge 5, the first drum push member 27 and the second drum push member 28 may exert forces on the first push member 77 and the second push member 78 respectively, such that the developing roller 131** is in close contact with the photosensitive drum.

Figure 107:
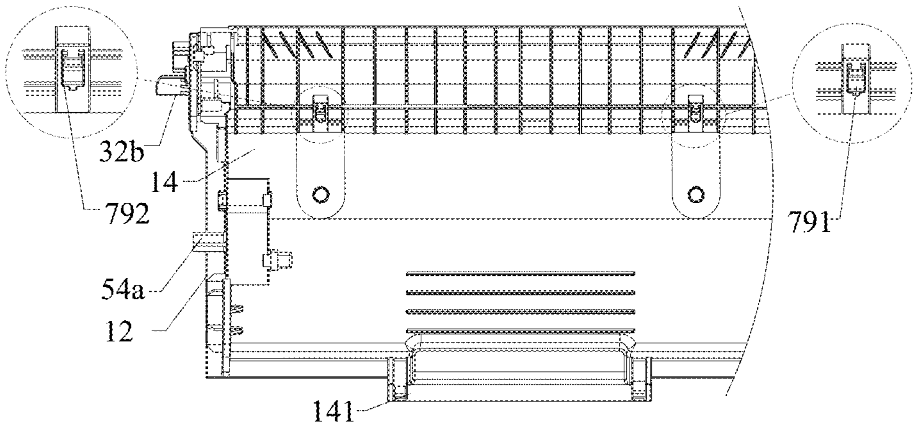

In a second variation of Embodiment 14 shown in FIG. 105 and FIG. 107, the first push member 791 and the second push member 792 may be both disposed on the cartridge body 10 and positioned at the fourth end 14, between the electrode **32*b* and the handle 141 in the second direction. Taking the developing chamber where the developing roller 131 and the supply roller are positioned as an example, the first push member 791 and the second push member 792 may overlap with the developing chamber in the third direction. When the developing cartridge 1 is installed on the drum cartridge 5, the first push member 791 may be abutted by the first drum push member 291, and the second push member 792 may be abutted by the second drum push member 292, such that the development cartridge 1 receives the pushing force exerted by the drum cartridge 5 to make the developing roller 131** and the photosensitive drum being in close contact.

Figure 108:
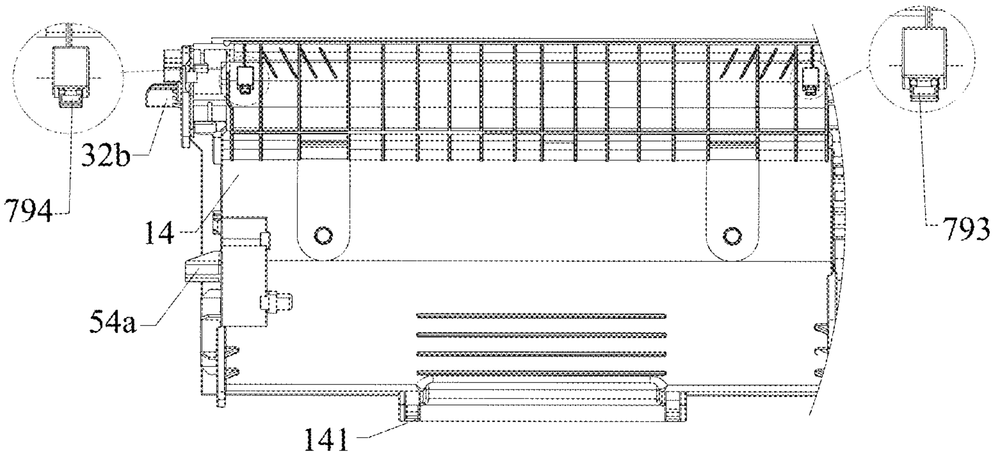

In a third variation of Embodiment 14 shown in FIG. 105 and FIG. 108, the first push member 793 and the second push member 794 may be both disposed on the cartridge body 10 and positioned at the fourth end 14. Taking the developing chamber where the developing roller 131 and the supply roller are positioned as an example, the first push member 793 and the second push member 794 may overlap with the developing chamber in the third direction. The first push member 793 and the second push member 794 may be closer to the handle 141 in the second direction than the first push member 77 and the second push member 78 in Embodiment 8. When the developing cartridge 1 is installed on the drum cartridge 5, the first push member 793 may be abutted by the first drum push member 293, and the second push member 794 may be abutted by the second drum push member 294, such that the development cartridge 1 receives the pushing force exerted by the drum cartridge 5 to make the developing roller 131 and the photosensitive drum being in close contact.

Figure 109:
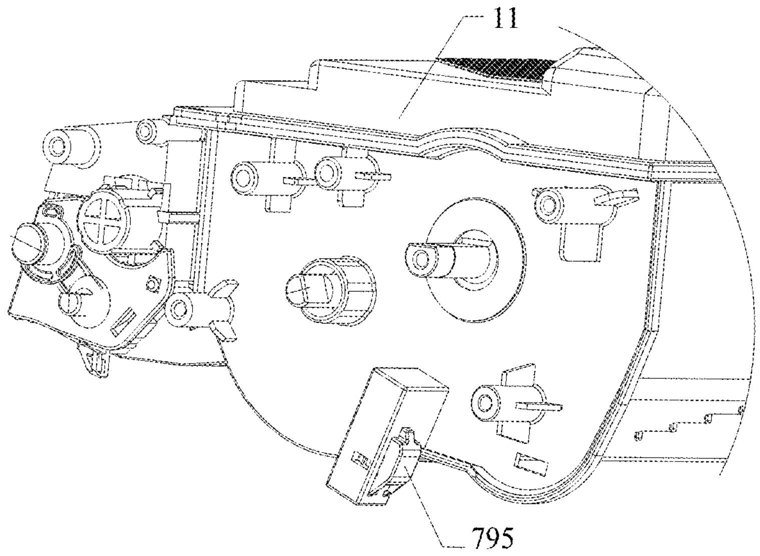
Figure 110:
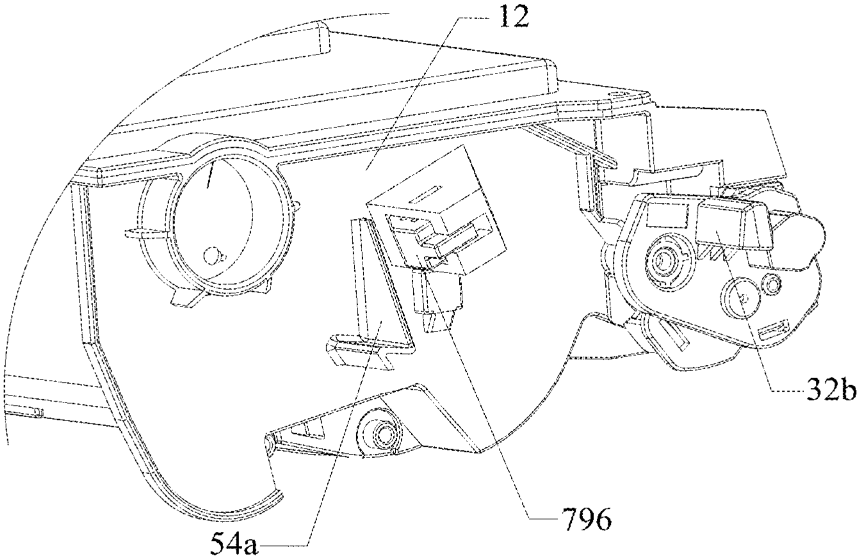
Figure 111:
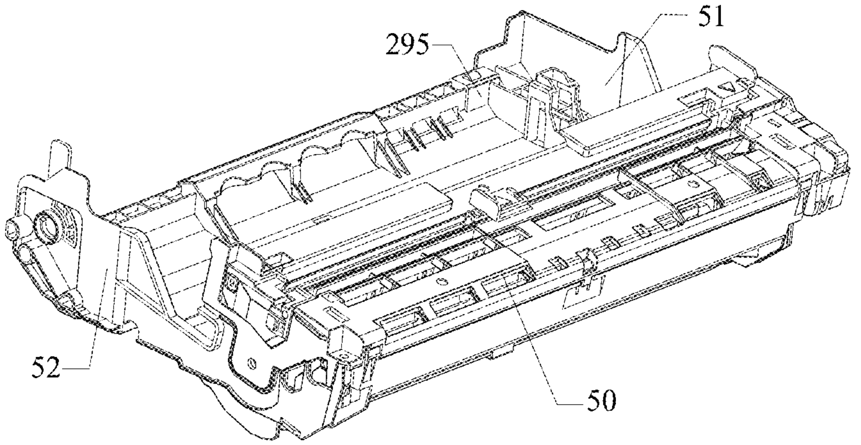
FIG. 111 illustrates another exemplary drum cartridge according to various disclosed embodiments of the present disclosure.

In a fourth variation of Embodiment 14 shown in FIG. 109 and FIG. 110, the first push member 795 may be disposed at the first end 11 of the cartridge body 10, and the second push member 796 may be disposed at the second end 12. The first push member 795 may be farther away from the developing roller 131 than the second push member 796 in the second direction. That is, the first push member 795 and the second push member 796 may be disposed asymmetrically in the first direction. The second push member 796 may be positioned between the electrode **32*b* and the locking member 54*a* in the second direction. The locking member 54*a* may protrude from the side wall of the second end 12 of the cartridge body 10. As shown in FIG. 111, the first drum push member 295 may be provided at the rear end of the drum cartridge 5, and the second drum push member may be provided on the second side wall 52. When the developing cartridge 1 is installed on the drum cartridge 5, the first push member 795 may be abutted by the first drum push member 295, and the second push member 796 may be abutted by the second drum push member, such that the development cartridge 1 receives the pushing force exerted by the drum cartridge 5 to make the developing roller 131** and the photosensitive drum being in close contact.

Embodiment 15

Another embodiment of the present disclosure provides another developing cartridge. The implementation for realizing the contact and electrical connection between the identification element of the developing cartridge and the identification contact of the image forming device provided by Embodiment 1 to Embodiment 13 and their variations may be also applied to the present embodiments.

As shown in FIG. 112 to FIG. 119, in the present embodiment, the developing cartridge may be detachably mounted to the drum cartridge 63*i*. The drum cartridge 63*i* may include a drum frame, a first push member 64*i*, a second push member 65*i*, and a separation driving member 62*i*.

The developing cartridge may include a cartridge body 10*i*, and the inside of the cartridge body 10*i* may be used to accommodate the developer. A developing roller 131*i*, a supply roller 132*i*, and a stirring member 133*i* may be rotatably installed in the cartridge body 10*i*. The axial directions of the developing roller 131*i*, the supply roller 132*i*, and the stirring member 133*i* may extend along the first direction. The developing roller 131*i* may be positioned at an end of the cartridge body 10*i* in the second direction. The second direction intersects the first direction, and the third direction intersects the first direction and the second direction.

In one embodiment, the first direction may be the left-right direction, the second direction may be the front-rear direction, and the third direction may be the up-down direction. The cartridge body 10*i* may include a first end 11*i* and a second end 12*i* in the first direction, the cartridge body 10*i* may include a third end 13*i* and a fourth end 14*i* in the second direction, and the cartridge body 10*i* may include a fifth end 15*i* and a sixth end 16*i* in the third direction. In this embodiment, the first end 11*i* may be the right end of the developing cartridge, the second end 12*i* may be the left end of the developing cartridge, the third end 13*i* may be the front end of the developing cartridge, the fourth end 14*i* may be the rear end of the developing cartridge, and the fifth end 15*i* may be the upper end of the developing cartridge. The sixth end 16*i* may be the lower end of the developing cartridge. The right end of the developing cartridge may be the right end of the cartridge body 10*i*, and the other ends of the developing cartridge may also correspond to the same ends of the cartridge body.

The developing cartridge may include a transmission element. The transmission element may include a driving part, a developing roller gear 22*i*, a supply roller gear 23*i*, and a stirring gear 24*i*. The driving part may include a coaxially integrated driving receiving part 211*i* and a driving gear 212*i*. The driving receiving part 211*i* may be used to engage with the driving output shaft in the image forming device for receiving the torque output by the image forming device. The developing roller gear 22*i* may be coaxially and fixedly connected to the developing roller 131*i*, the supply roller gear 23*i* may be coaxially and fixedly connected to the supply roller 132*i*, and the stirring gear 24*i* may be coaxially fixedly connected to the stirring member 133*i*. The developing roller gear 22*i*, the supply roller gear 23*i*, and the stirring gear 24*i* may be all positioned at the first end 11*i* of the cartridge body 10*i*. The developing roller gear 22*i*, the supply roller gear 23*i*, and the stirring gear 24*i* may be all directly or indirectly meshed with the driving gear 212*i* for being driven to rotate. In some embodiments, the transmission element may include any number of idlers to adjust the rotation direction or rotation speed of any one of the developing roller 131*i*, the supply roller 132*i*, and the stirring member 133*i*. The first end 11*i* of the cartridge body 10*i* may also be removably fixed with a protective cover 111*i* through screws or buckles. The protective cover 111*i* may cover the transmission element to protect the transmission element. The protective cover may be provided with a driving receiving port 1111*i* and the driving receiving part 211*i* may be exposed outside the protective cover 111*i* through the driving receiving port 1111*i*.

Figure 112:
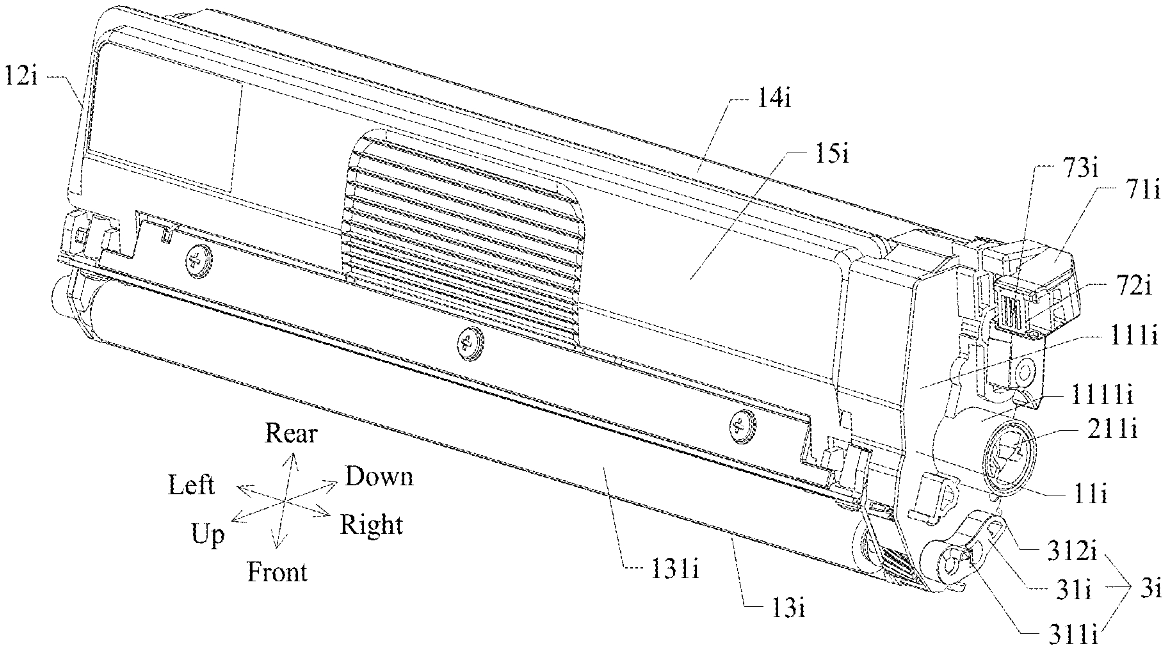
FIG. 112 illustrates another exemplary developing cartridge according to various disclosed embodiments of the present disclosure.
Figure 113:
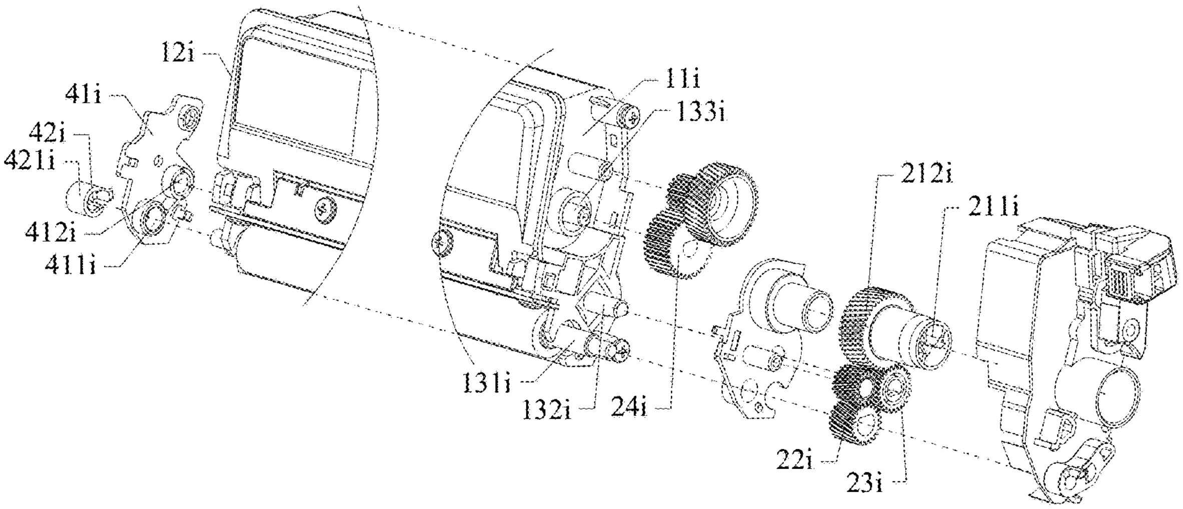
FIG. 113 to FIG. 114 illustrate explosive views of another exemplary developing cartridges according to various disclosed embodiments of the present disclosure.
Figure 114:
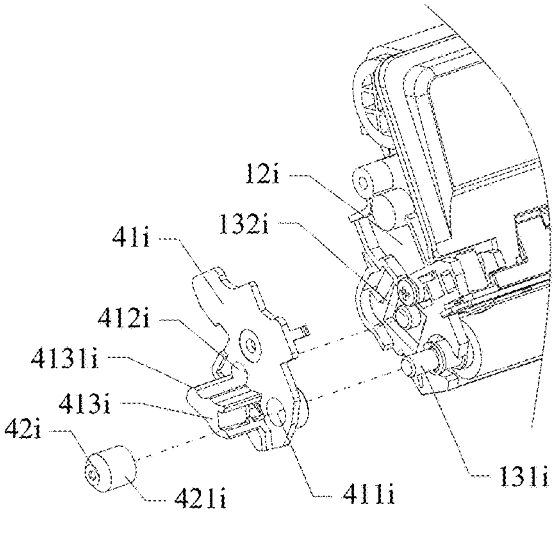
Figure 115:
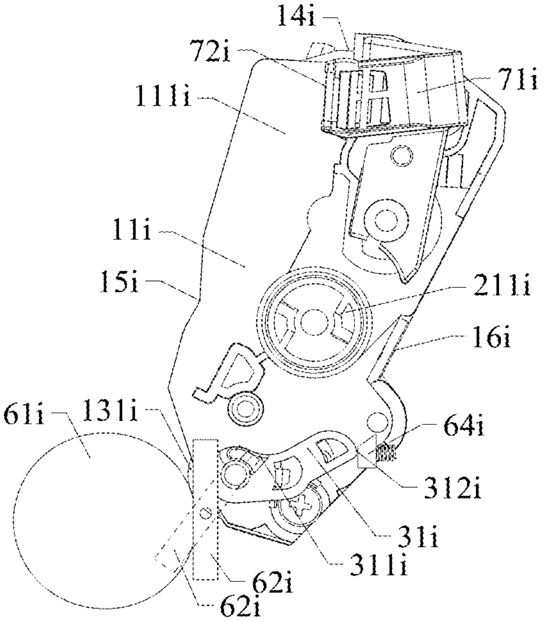
FIG. 115 illustrates another exemplary developing cartridge whose first end cooperates with a drum cartridge, according to various disclosed embodiments of the present disclosure.
Figure 116:
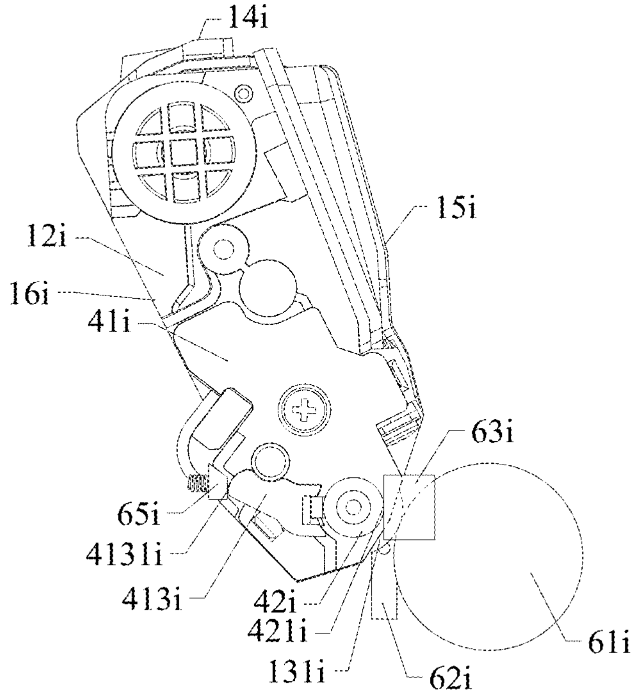
FIG. 116 illustrates another exemplary developing cartridge whose second end cooperates with a drum cartridge, according to various disclosed embodiments of the present disclosure.
Figure 117:
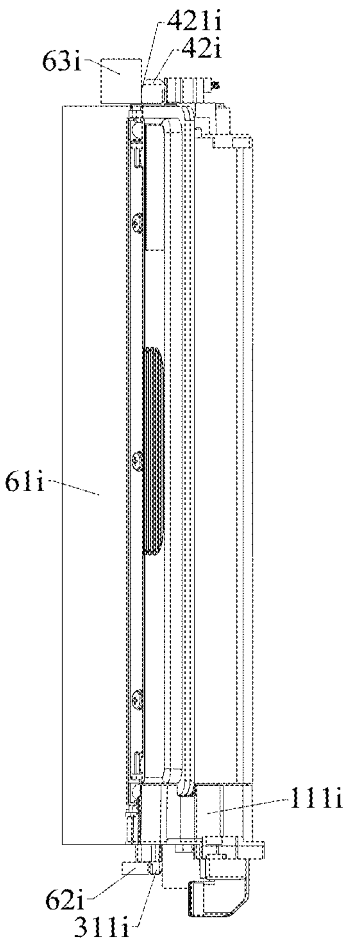
FIG. 117 illustrates a developing roller of another exemplary developing cartridge contacting with a photosensitive drum of a drum cartridge, according to various disclosed embodiments of the present disclosure.
Figure 118:
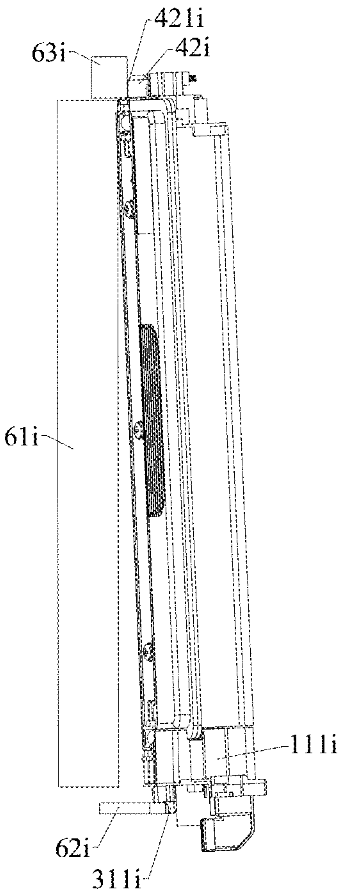
FIG. 118 illustrates a developing roller of another exemplary developing cartridge separated from a photosensitive drum of a drum cartridge, according to various disclosed embodiments of the present disclosure.

As shown in FIG. 112, the developing cartridge may include an identification element. The identification element may include a bracket 71*i*, a storage medium 72*i*, and an electrical contact surface 73*i*. The bracket 71*i* may be fixedly installed at the first end 11*i* of the cartridge body 1*i*. The storage medium 72*i* may be fixedly installed on the bracket 71*i*. The electrical contact surface 73*i* may be fixedly arranged on the surface of the storage medium 72*i*. The storage medium 72*i* may be used to store information related to the developing cartridge (such as model, life, capacity, etc.), and the electrical contact surface 73*i* may be used to contact and electrically connect the identification contact in the image forming device, such that the image forming device is able to read the information in the storage medium 72*i*. In this embodiment, the bracket 71*i*, the storage medium 72*i*, and the electrical contact surface 73*i* may be all provided at the first end 11*i* of the cartridge body 1*i*. For example, the bracket 71*i* may be positioned at the right side of the first protective cover 111*i*. In other embodiments, the storage medium 72*i* and the electrical contact surface 73*i* may be configured as separate structures, and the storage medium 72*i* and the electrical contact surface 73*i* may be electrically connected through conductive components such as wires, thereby making the installation position of the storage medium 72*i* more diverse. In some other embodiments, the electrical contact surface 73*i* may also be disposed at other positions of the cartridge body 1*i*, thereby adapting to an image forming device in which the identification contact is disposed at different positions. The bracket 71*i* may be directly fixed at the first end 11*i* of the cartridge body 1*i* without passing through the protective cover 111*i*. The bracket 71*i* may be integrally formed with the cartridge body 1*i* or the protective cover 111*i*.

The developing cartridge may include a power supply element. The power supply element may include a conductive member made of conductive material (such as conductive resin). The conductive member may be detachably fixed and installed to the second end 12*i* of the cartridge body 10*i* through screws or buckles. The conductive member may include a bearing part 41*i* and a conductive protrusion 413*i* which are integrally formed. The bearing part 41*i* may be plate-shaped. The bearing part 41*i* may include a first developing support hole 411*i* and a first developer feeding supporting hole 412*i* extending in the first direction. The left ends of the developing roller 131*i* and the supply roller 132*i* may be respectively inserted into the first developing support hole 411*i* and the first developer feeding support hole 412*i* in one-to-one correspondence and may be rotatably supported. The conductive protrusion 413*i* may be positioned at the left end surface of the bearing part 41*i*, and the conductive protrusion 413*i* may protrude leftwards from the left end surface of the bearing part 41*i* in the first direction. The bearing part 41*i* and the conductive protrusion 413*i* may also be fixed together by mounting in some other embodiments.

The first end 11*i* of the cartridge body 10*i* may be provided with a pushing protrusion 3*i*. The pushing protrusion 3*i* may be fixedly installed on the right surface of the protective cover 111*i* (the pushing protrusion may also be integrally formed on the right surface of the protective cover 111*i*). The pushing protrusion 3*i* may protrude to the right from the right surface of the protective cover 111*i*. The pushing protrusion 3*i* may include a main body 31*i*, a first pushing force receiving surface 312*i* and a first separation protrusion 311*i*, which are integrally formed. The main body 31*i* may be fixedly installed on the right end surface of the protective cover 111*i*. The first separation protrusion 311*i* may protrude rightward from the right surface of the main body part 31*i* in the first direction, and the first pushing force receiving surface 312*i* may be positioned at the lower end of the main body 31*i*. The first pushing force receiving surface 312*i* may be positioned in front of the rotation axis of the driving part. The first pushing force receiving surface 312*i* may be positioned below the rotation axis of the developing roller 131*i*.

The conductive protrusion 413*i* may be provided with a second pushing force receiving surface 4131*i*. The second pushing force receiving surface 4131*i* may be positioned in front of the rotation axis of the driving part and below the rotation axis of the developing roller 131*i*. Preferably, the projection of the second pushing force receiving surface 4131*i* in the first direction may overlap with the first pushing force receiving surface 312*i*. In other embodiments, the projection of the second pushing force receiving surface 4131*i* in the first direction may not overlap with the projection of the first pushing force receiving surface 312*i* in the first direction.

The first pushing force receiving surface 312*i* may be used to contact the first push member 64*i* to receive the upward pushing force provided by the first push member 64*i*. The second pushing force receiving surface 4131*i* may be used to contact the second push member 65*i* to receive the upward pushing force provided by the second push member 65*i*. At the same time, the second push member 65*i* may be made of conductive material. The second push member 65*i* may be electrically connected to the power supply terminal in the image forming device, such that the second push member 65*i* may be charged. When the second pushing force receiving surface 4131*i* is in contact with the second push members 65*i*, an electrical connection may be formed between the second push member 65*i* and the second pushing force receiving surface 4131*i*, such that the electric energy provided by the image forming device passes through the power supply terminal, the second push member 65*i*, the second pushing force receiving surface 4131*i*, the bearing part 41*i*, the first developer feeding support hole 412*i*, the first development supporting hole 411*i*, to the developing roller 131*i* and the supply roller 132*i*. Therefore, the power of the image forming device may be applied to the developing roller 131*i* and the supply roller 132*i*, to make the developing roller 131*i* and the supply roller 132*i* carry charges. Moreover, the pushing force of the second push member 65*i* may keep the second push member 65*i* and the second pushing force receiving surface 4131*i* in close contact, thereby preventing poor contact from affecting the conductive effect.

Under the action of the upward pushing force received by the first pushing force receiving surface 312*i* and the second pushing force receiving surface 4131*i*, the entire developing cartridge may be pushed upward, such that the developing roller 131*i* and the photosensitive drum 61*i* may be in close contact under the action of the pushing force. The contact between the developing roller 131*i* and the photosensitive drum 61*i* may be maintained closely to prevent that part of the developer is unable to be transferred to the surface of the photosensitive drum 61*i* and affecting the printing quality.

When the image forming device has no printing task or does not require a specific color developer to be delivered to the paper (for example, when printing a black and white image, a color developer does not need to be delivered to the paper), the developing cartridge may be loaded with a specific color developer. The developing roller 131*i* of the developing cartridge may need to be separated from the photosensitive drum 61*i* to prevent the developer of that color from printing onto the paper or to avoid long-term extrusion contact between the developing roller 131*i* and the photosensitive drum 61*i* causing the developing roller 131*i* or the photosensitive drum to 61*i* deformed. At this time, the separation driving member 62*i* on the drum cartridge 63*i* may receive the power provided by the image forming device and swing clockwise around the rotation axis extending in the first direction, such that the upper end of the separation driving member 62*i* contacts the first separation protrusion 311*i* and exerts a downward force on the first separation protrusion 311*i* to cause the first end 11*i* of the cartridge body 10*i* to overcome the upward pushing force and swing downward. Since the second end 12*i* of the cartridge body 10*i* does not receive the downward force, under the action of the upward pushing force, the second end 12*i* of the cartridge body 10*i* may not swing downward, such that the first end 11*i* of the cartridge body 10*i* swings around the second end 12*i* of the cartridge body 10*i*. The upper side of the conductive protrusion 413*i* of the second end 12*i* of the cartridge body 10*i* may be provided with a contact member 42*i* coaxially sleeved on the left end of the developing roller 131*i*. The contact member 42*i* may be provided with a first contact surface 421*i*. The first contact surface 421*i* may come into contact with the drum cartridge 63*i* to form a fulcrum for the swing of the developing cartridge, such that the cartridge body 10*i* swings around the first contact surface 421*i* on the contact member 42*i* to create a gap between the developing roller 131*i* and the photosensitive drum 61*i*. In this embodiment, the contact member 42*i* and the conductive protrusion 413*i* may be provided as separate bodies. In other embodiments, the contact member 42*i* and the conductive protrusion 413*i* may also be provided as one piece.

When the developer in the developing cartridge needs to be transferred to the paper, the image forming device may stop providing power to the separation driving member 62*i*, such the first pushing surface of the first end 11*i* of the cartridge body 10*i* drives the first end 11*i* of the cartridge body to swing upward under the pushing force provided by the first push member 64*i*. Therefore, the developing roller 131*i* may come into contact with the photosensitive drum 61*i* again, thereby ensuring the normal progress of the printing task.

The present embodiment may eliminate the need for the developing cartridge to be provided with mechanisms for receiving separation forces at both ends of the first end 11*i* and the second end 12*i*, thereby simplifying the structure of the developing cartridge, reducing the number of parts and reducing costs.

Figure 119:
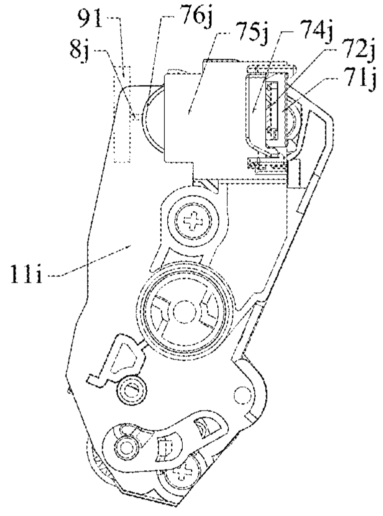
FIG. 119 illustrates an identification element of another exemplary developing cartridge cooperating with an image forming device, according to various disclosed embodiments of the present disclosure.

As shown in FIG. 119, in one embodiment, the identification element may be replaced with the identification element provided by Embodiment 13 and the third variation of Embodiment 13. When the developing cartridge is installed in the image forming device, the arched part 76*j* of the electrical contact member may be displaced in the up-down direction, causing the cantilever part to be deformed in the up-down direction. After the arched part 76*j* crosses over the second identification upper guide part 914, the arched part 76*j* may contact and be electrically connected to the second identification contact 8*j* under the action of the cantilever part. The arched part 76*j* may be squeezed by the second identification contact 8*j* such that the cantilever part is pushed downward and produces elastic deformation, which causes the cantilever part to generate a upward elastic force. Under the action of the elastic force, the arched part 76*j* may maintain close contact with the second identification contact 8*j*. When the developing cartridge performs drum roller separation, the first end 11*i* of the cartridge body 1*i* may swing downward, and the elastic force of the cantilever part may be upward, such the elastic force is able to make the arched part 76*j* move upward relative to the cartridge body 1*i* and remain in close contact with the second identification contact 8*j*. Therefore, the arched part 76*j* may be prevented from being out of contact with the second identification contact 8*j* during the drum roller separation process of the developing cartridge, and the storage medium may remain electrically connected to the second identification contact.

The identification element may be also any other identification element provided by Embodiment 13 and its first, second, and fourth to tenth variations, such that the storage medium remains electrically connected to the identification contact during the separation process of the developing roller and the photosensitive drum of the developing cartridge.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A developing cartridge having a first end and a second end arranged oppositely in a first direction, a third end and a fourth end arranged oppositely in a second direction, and a fifth end and a sixth end arranged oppositely in a third direction, and the developing cartridge comprising:

a cartridge body accommodating developer;

a driving part positioned at the first end;

a developing roller rotatable about a rotation axis extending along the first direction and positioned at the third end;

a storage medium storing information;

an electrical contact surface electrically connected to the storage medium and fixed relative to the cartridge body, wherein the electrical contact surface is positioned at the first end and is farther away from the developing roller than the driving part in the second direction; and a lifting element configured to lift up the cartridge body in the third direction, wherein the lifting element is farther away from the developing roller in the second direction than the driving part in the second direction.

2. The developing cartridge according to claim 1, wherein:

the lifting element includes a lifting elastic member.

3. The developing cartridge according to claim 2, wherein:

the lifting element is positioned at the first end.

4. The developing cartridge according to claim 2, further including a bracket, wherein:

the electrical contact surface is closer to the fifth end than the developing roller in the third direction;

the storage medium is fixed to the bracket, and the electrical contact surface is fixed to the storage medium;

the bracket includes one end and another end in the second direction; and at least one of the one end or the another end of the bracket includes a first guide slope.

5. The developing cartridge according to claim 2, wherein:

the lifting element further includes an abutment member, wherein the abutment member is movable relative to the cartridge body, and the lifting elastic member abuts against the abutment member.

6. The developing cartridge according to claim 5, wherein:

the lifting elastic member is able to undergo elastic deformation in the third direction.

7. The developing cartridge according to claim 5, further including a transmission element and a protective cover both disposed at the first end, wherein:

the protective cover at least covers a part of the transmission element, and the electrical contact surface and the abutment member are disposed at the protective cover.

8. The developing cartridge according to claim 7, wherein:

the lifting element is detachably disposed at the protective cover.

9. The developing cartridge according to claim 1, further including an accommodating chamber and a developing chamber, wherein:

the developing chamber is used to accommodate the developing roller, and the accommodating chamber is used to accommodate the developer, and projections of the lifting element and the accommodating chamber at least partially overlap along the first direction.

10. The developing cartridge according to claim 1, further including a locking protrusion, wherein:

the lifting element is positioned between the developing roller and the locking protrusion in the second direction.

11. The developing cartridge according to claim 1, wherein:

when the developing cartridge is installed in an image forming device, the lifting element lifts the developing cartridge upward in the third direction such that the electrical contact surface is in electrical contact with an identification contact of the image forming device.

12. The developing cartridge according to claim 1, wherein:

the lifting element is closer to the fourth end than the electrical contact surface in the second direction.

13. The developing cartridge according to claim 12, wherein:

the lifting element and the electrical contact surface are closer to the fifth end than the developing roller in the third direction.

14. The developing cartridge according to claim 12, wherein:

the electrical contact surface is closer to the fifth end than the developing roller in the third direction;

the lifting element includes an abutment slope; and the abutment slope faces the fourth end in the second direction and faces the sixth end in the third direction.

15. The developing cartridge according to claim 1, wherein the lifting element is farther away from the developing roller than the electrical contact surface in the second direction.

16. The developing cartridge according to claim 1, wherein the lifting element is configured to receive a force from a door cover of an image forming device to lift the cartridge body upward in the third direction.

17. The developing cartridge according to claim 1, further including a handle, wherein:

the lifting element is positioned between the developing roller and the handle in the second direction.

18. The developing cartridge according to claim 1, further including a developer supply opening, wherein at least a portion of the lifting element is farther away from the developing roller than the developer supply opening in the second direction.

19. The developing cartridge according to claim 1, further including a stirring gear, wherein at least a portion of the stirring gear is closer to the developing roller than the lifting element in the second direction.

20. The developing cartridge according to claim 1, further including an electrode, wherein:

the electrode is positioned at the second end and the lifting element is positioned at the first end.

* * * * *